US009178759B2

(12) United States Patent
Tukol et al.

(10) Patent No.: US 9,178,759 B2
(45) Date of Patent: *Nov. 3, 2015

(54) CONFIGURING AND CUSTOMIZING A SPECIFIC-PURPOSE CLIENT HAVING A WINDOWS-BASED EMBEDDED IMAGE USING EXTENSIBLE MARKUP LANGUAGE (XML) CONFIGURATION

(71) Applicants: Sanmati Tukol, Bangalore (IN); Mohan Prabhala, Telangana (IN)

(72) Inventors: Sanmati Tukol, Bangalore (IN); Mohan Prabhala, Telangana (IN)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,046

(22) Filed: Aug. 18, 2014

(65) Prior Publication Data

US 2015/0032864 A1    Jan. 29, 2015

Related U.S. Application Data

(63) Continuation of application No. 13/035,804, filed on Feb. 25, 2011, now Pat. No. 8,825,990.

(60) Provisional application No. 61/436,864, filed on Jan. 27, 2011.

(51) Int. Cl.
*H04L 12/24* (2006.01)
*G06F 9/445* (2006.01)
*H04L 29/12* (2006.01)

(52) U.S. Cl.
CPC ........ *H04L 41/0803* (2013.01); *G06F 9/44505* (2013.01); *H04L 61/2061* (2013.01)

(58) Field of Classification Search
CPC ............ H04L 41/0803; H04L 61/2061; G06F 9/44505
See application file for complete search history.

(56) References Cited

U.S. PATENT DOCUMENTS 5,452,454 A    9/1995  Basu
6,751,674 B1   6/2004  Satagopan et al.
(Continued)

FOREIGN PATENT DOCUMENTS

EP    0358292    3/1989    ............. G06F 9/445
EP    0750766    3/1995    ............. G06F 9/445
(Continued)

OTHER PUBLICATIONS

International Preliminary Report on Patentability; PCT/US2012/021605; pp. 12, Aug. 8, 2013.
(Continued)

*Primary Examiner* — M Elamin
(74) *Attorney, Agent, or Firm* — Baker Botts L.L.P.

(57) ABSTRACT

Examples of methods and apparatus are provided for configuring and customizing a specific-purpose local client having a windows-based embedded image using extensible markup language (XML) configuration and obviating reinstallation of an entire windows-based embedded image onto the specific-purpose local client. The apparatus may include a retrieval module of the specific-purpose local client configured to automatically locate a remote repository server containing an XML configuration file and automatically obtain the XML configuration file from the remote repository server each time the specific-purpose local client boots up. The apparatus may include an apply settings module of the specific-purpose local client configured to automatically apply a configuration change to the windows-based embedded image based on the XML configuration file each time the specific-purpose local client boots up. The configuration change persists across a reboot of the specific-purpose local client while obviating reinstallation of an entire windows-based embedded image onto the specific-purpose local client.

20 Claims, 52 Drawing Sheets

(56) References Cited

U.S. PATENT DOCUMENTS

| | | |
|---|---|---|
| 6,930,785 B1 | 8/2005 | Weyand et al. |
| 7,085,921 B2 | 8/2006 | Frye, Jr. ............... 713/1 |
| 7,308,487 B1 | 12/2007 | Dansie et al. |
| 7,337,359 B2 | 2/2008 | Lee |
| 7,356,679 B1 | 4/2008 | Le et al. ............... 713/1 |
| 7,363,479 B1 | 4/2008 | Walker et al. |
| 7,640,404 B2 | 12/2009 | Macintyre |
| 7,860,961 B1 | 12/2010 | Finkelstein et al. |
| 8,122,113 B2 | 2/2012 | Harrington et al. ........ 709/222 |
| 8,145,936 B2 | 3/2012 | Seelig et al. |
| 8,352,717 B2 | 1/2013 | Campbell et al. |
| 8,495,183 B2* | 7/2013 | Tukol et al. ............... 709/220 |
| 8,700,888 B2* | 4/2014 | Tukol et al. ............... 713/2 |
| 8,725,997 B2* | 5/2014 | Tukol et al. ............... 713/2 |
| 8,751,778 B2* | 6/2014 | Tukol et al. ............... 713/1 |
| 8,825,990 B2* | 9/2014 | Tukol et al. ............... 713/1 |
| 2003/0126202 A1 | 7/2003 | Watt |
| 2003/0126242 A1 | 7/2003 | Chang |
| 2003/0177208 A1 | 9/2003 | Harvey, IV |
| 2003/0182414 A1 | 9/2003 | O'Neill |
| 2003/0221083 A1 | 11/2003 | Hill et al. |
| 2004/0255179 A1 | 12/2004 | Mayer |
| 2005/0044548 A1 | 2/2005 | Page |
| 2005/0234931 A1 | 10/2005 | Yip et al. |
| 2006/0242395 A1 | 10/2006 | Fausak |
| 2006/0265386 A1 | 11/2006 | Richter |
| 2007/0016676 A1 | 1/2007 | Breuer et al. ............... 709/225 |
| 2007/0083813 A1 | 4/2007 | Lui et al. |
| 2007/0100967 A1 | 5/2007 | Smith et al. |
| 2007/0128899 A1 | 6/2007 | Mayer ............... 439/152 |
| 2007/0169084 A1 | 7/2007 | Frank et al. ............... 717/168 |
| 2007/0174410 A1 | 7/2007 | Croft et al. |
| 2007/0208846 A1 | 9/2007 | Christian et al. ............... 709/223 |
| 2007/0245333 A1 | 10/2007 | Ferlitsch |
| 2007/0282951 A1 | 12/2007 | Selimis et al. |
| 2008/0052700 A1 | 2/2008 | Han et al. ............... 717/168 |
| 2008/0133614 A1 | 6/2008 | Scott |
| 2008/0163202 A1 | 7/2008 | Kembel et al. |
| 2008/0183905 A1 | 7/2008 | Kitada |
| 2008/0270583 A1 | 10/2008 | Gonzalez et al. |
| 2008/0294888 A1 | 11/2008 | Ando ............... 713/2 |
| 2009/0006587 A1 | 1/2009 | Richter |
| 2009/0172662 A1 | 7/2009 | Liu |
| 2009/0254605 A1 | 10/2009 | Clavel ............... 709/203 |
| 2009/0254881 A1 | 10/2009 | Johnson et al. |
| 2009/0276771 A1 | 11/2009 | Nickolov et al. |
| 2009/0327390 A1 | 12/2009 | Tran et al. |
| 2010/0011353 A1 | 1/2010 | Chalupa et al. |
| 2010/0040029 A1 | 2/2010 | Doppler et al. ............... 370/338 |
| 2010/0205421 A1 | 8/2010 | Campbell et al. |
| 2010/0217843 A1 | 8/2010 | Dehaan et al. |
| 2012/0197973 A1* | 8/2012 | Tukol et al. ............... 709/203 |
| 2012/0198344 A1* | 8/2012 | Tukol et al. ............... 715/735 |

FOREIGN PATENT DOCUMENTS

| | | | |
|---|---|---|---|
| EP | 0793170 | 2/1997 | ............... G06F 9/445 |
| EP | 0845742 | 12/1997 | ............... G06F 9/445 |
| WO | WO 00/24149 | 9/2000 | ............... G06F 9/445 |

OTHER PUBLICATIONS

International Preliminary Report on Patentability; PCT/US2012/021587; pp. 10, Aug. 8, 2013.

International Preliminary Report on Patentability; PCT/US2012/021598; pp. 10, Aug. 8, 2013.

International Preliminary Report on Patentability; PCT/US2012/021589; pp. 10, Aug. 8, 2013.

international Preliminary Report on Patentability; PCT/US2012/021603; pp. 8, Aug. 8, 2013.

International Preliminary Report on Patentability; PCT/US2012/021588; pp. 10, Aug. 8, 2013.

International Preliminary Report on Patentability; PCT/US2012/021591; pp. 10, Aug. 8, 2013.

Extended European Search Report; Application No. 12739003.7—1954; pp. 7, Jun. 2, 2014.

* cited by examiner

Applying configuration file: Method C-1 ← S300d

Apply settings based on configuration file
S304d

FIG. 3D

Applying configuration file: Method C-2 ← S300e

Check reset tag
S302e

↓

Apply settings based on configuration file
S304e

FIG. 3E

Applying configuration file: Method C-3 ← S300f

Compare retrieved configuration file to last successfully applied configuration file
S302f

↓

Apply settings based on comparison
S304f

```
automatically locating a remote repository server containing a
configuration file, each time the specific-purpose local client boots up
(2402-A)
```

↓

```
automatically obtaining, at the specific-purpose local client, the
configuration file from the remote repository server over a network, while
the write-filter is enabled, each time the specific-purpose local client boots
up
(2404-A)
```

↓

```
automatically loading the configuration file, each time the specific-
purpose local client boots up
(2406-A)
```

↓

```
automatically parsing at least a portion of the configuration file associated
with a group of settings for the windows-based embedded image, each
time the specific-purpose local client boots up
(2408-A)
```

↓

```
automatically applying, to the windows-based embedded image, a
configuration change based on the at least a portion of the configuration
file, while the write-filter is enabled, each time the specific-purpose local
client boots up
(2410-A)
```

FIG. 24A

CONFIGURING AND CUSTOMIZING A SPECIFIC-PURPOSE CLIENT HAVING A WINDOWS-BASED EMBEDDED IMAGE USING EXTENSIBLE MARKUP LANGUAGE (XML) CONFIGURATION

CROSS-REFERENCES TO RELATED APPLICATIONS

The present application is a continuation of U.S. patent application Ser. No. 13/035,804 filed on Feb. 25, 2011, now U.S. Pat. No. 8,825,990; which claims the benefit of priority under 35 U.S.C. §119 from U.S. Provisional Patent Application Ser. No. 61/436,864, entitled "CONFIGURING AND CUSTOMIZING A SPECIFIC-PURPOSE CLIENT HAVING A WINDOWS-BASED EMBEDDED IMAGE USING EXTENSIBLE MARKUP LANGUAGE (XML) CONFIGURATION," filed on Jan. 27, 2011, which is hereby incorporated by reference in its entirety for all purposes.

FIELD

The subject technology relates in general to configuration management, and more particularly to configuring and customizing a specific-purpose client having a windows-based embedded image using extensible markup language (XML) configuration.

BACKGROUND

In order for a client device having an embedded image to apply changes that persist across a reboot of the client device, manual installation of software or drivers and/or a firmware update of the entire image may be needed. This process may involve downloading a customized image and installing the customized image on the client device. However, embedded images can be large in size, and thus, it may be impractical to download and install entire images just to apply changes to the images, especially when desired changes are frequent and/or relatively minor, and/or when there are a large number of client devices that require these changes, for example, in an enterprise environment.

SUMMARY

Examples of methods and apparatus are provided for configuration management. For instance, examples of methods and apparatus are provided for, among others, configuring and customizing a specific-purpose local client having a windows-based embedded image using extensible markup language (XML) configuration and obviating reinstallation of an entire windows-based embedded image onto the specific-purpose local client. The apparatus may include a retrieval module of the specific-purpose local client configured to automatically locate a remote repository server containing an XML configuration file and automatically obtain the XML configuration file from the remote repository server each time the specific-purpose local client boots up. The apparatus may include an apply settings module of the specific-purpose local client configured to automatically apply a configuration change to the windows-based embedded image based on the XML configuration file each time the specific-purpose local client boots up. The configuration change persists across a reboot of the specific-purpose local client while obviating reinstallation of an entire windows-based embedded image onto the specific-purpose local client.

BRIEF DESCRIPTION OF THE DRAWINGS

FIG. 3D illustrates an example of a method for applying a configuration file, in accordance with various aspects of the subject technology.

FIG. 3E illustrates an example of a method for applying a configuration file, in accordance with various aspects of the subject technology.

FIG. 3F illustrates an example of a method for applying a configuration file, in accordance with various aspects of the subject technology.

FIG. 24A is a block diagram representing an example of a method for automatic retrieval, parsing and application of configuration for a specific-purpose local client having a windows-based embedded image with a write-filter while obviating reinstallation of an entire windows-based embedded image onto the specific-purpose local client and while allowing persistent configuration change across a reboot, in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Overall System

Figure 1:
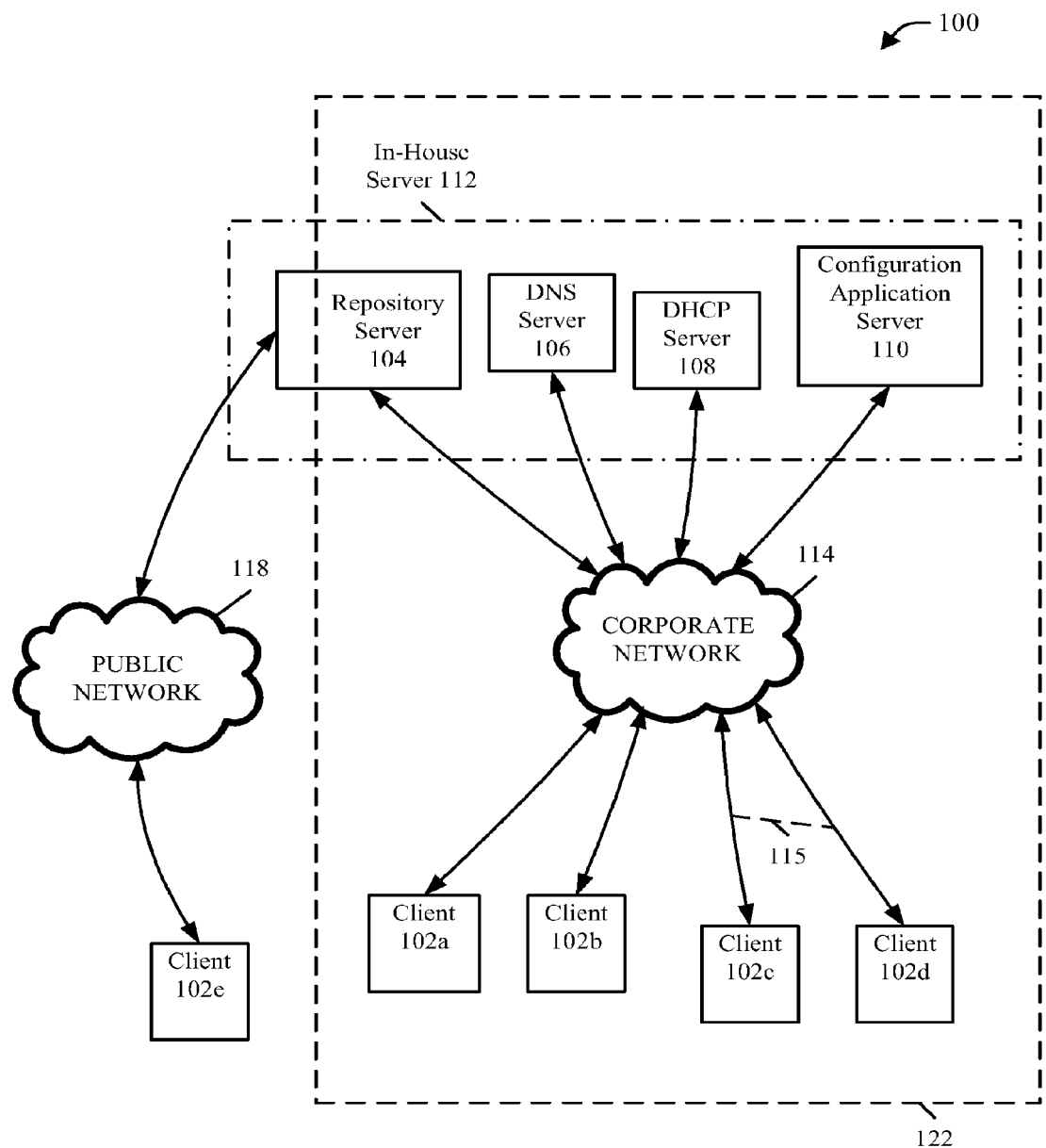
FIG. 1 illustrates a simplified diagram of a system, in accordance with various aspects of the subject technology.

FIG. 1 illustrates a simplified diagram of a system 100, in accordance with various aspects of the subject technology. The system 100 may include one or more client devices 102 (e.g., 102a, 102b, 102c, 102d, 102e) in communication with a server computing device 112 (server) via either a public network 118 or a corporate network 114. In some aspects, the server 112 is configured to allow remote sessions (e.g., remote desktop sessions) wherein users can access applications and files on the server 112 by logging onto the server 112 from a client device 102. Such a connection may be established using any of several well-known techniques such as the Remote Desktop Protocol (RDP) on a Windows-based server. In some aspects, the client devices 102 may communicate with the server 112 using file transfer protocol (FTP), hypertext transfer protocol (HTTP), hypertext transfer protocol secure (HTTPS), or other suitable protocols.

By way of illustration and not limitation, a client device 102 can represent a computer, a mobile phone, a laptop computer, a thin client device, a personal digital assistant (PDA), a portable computing device, or a suitable device with a processor. In one example, a client device 102 is a smartphone (e.g., iPhone, Android phone, Blackberry, etc.). In certain configurations, a client device 102 can represent a cashier device, an audio player, a game console, a camera, a camcorder, an audio device, a video device, a multimedia device, or a device capable of supporting a connection to a remote server. In one example, a client device 102 can be mobile. In another example, a client device 102 can be stationary. According to one aspect of the disclosure, a client device 102 may be a device having at least a processor and memory, where the total amount of memory of the client device 102 could be less than the total amount of memory in a server 112. In one example, a client device 102 does not have a hard disk. In one aspect, a client device 102 may comprise flash memory instead of a hard disk. In one aspect, a client device may include one or more client devices.

In a preferred aspect, a client device 102 is a specific-purpose client device designed for a specific-purpose (rather than a general purpose). In a preferred aspect, a client device 102 is not a conventional personal computer (PC). In one aspect, a specific-purpose client device may be designed to perform one or a few pre-defined, dedicated functions. For example, a specific-purpose client device may be designed to perform less than 10 dedicated functions, less than 5 dedicated functions, less than 3 dedicated functions, or 1 dedicated function. A specific-purpose client device may be, for example, a client device designed as a cashier machine at a department store, a client device designed to carry out specific tests or measurements, a client device designed to carry out a specific medical application for diagnosis and/or treatment of a patient, etc. A specific-purpose client device preferably includes a write-filter that is enabled during its normal operation so that if a user (e.g., a cashier, not an administrator) changes any configuration of an embedded image of the client device, such change does not persist across a reboot.

In one aspect, a server 112 may represent a computer, a laptop computer, a computing device, a database, an in-house server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server) or a suitable device with a processor. In a preferred aspect, a server 112 is stationary. In another aspect, a server 112 can be mobile. In yet another aspect, a server 112 can be embedded. In certain configurations, a server 112 may be any device that can represent a client device. In a preferred aspect, the server 112 is not a client. In one aspect, a server 112 may include one or more servers, or functions of one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network for remote operations.

When a client device 102 and a server 112 are remote with respect to each other, a client device 102 may connect to a server 112 over a public network 118 and/or the corporate network 114, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other remote network connection. The public network 118 or the corporate network 114 can be a LAN network, a WAN network, a wireless network, the Internet, an intranet or other remote network. In one aspect, the public network 118 or the corporate network 114 may include one or more routers for routing data between client devices and/or servers. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s).

According to certain aspects of the present disclosure, the terms "client device" and "remote client device" are generally used synonymously in relation to a server, and the word "remote" may indicate that a client device is in communication with a server(s), for example, over a network connection(s).

In one aspect of the disclosure, a "client device" may be sometimes referred to as a client or vice versa. Similarly, a "server" may be sometimes referred to as a server device or vice versa.

In one aspect, the terms "local" and "remote" are relative terms, and a client device may be referred to as a local client device or a remote client device, depending on whether a client device is described from a client side or from a server side, respectively. Similarly, a server may be referred to as a local server or a remote server, depending on whether a server is described from a server side or from a client side, respectively. Furthermore, an application running on a server may be referred to as a local application, if described from a server side, and may be referred to as a remote application, if described from a client side.

In one aspect, devices placed on a client side (e.g., devices connected directly to a client device(s) or to one another using wires or wirelessly (e.g., using Bluetooth having a short range such as 35 feet or Infrared)) may be referred to as local devices with respect to a client device and remote devices with respect to a server. Similarly, devices placed on a server side (e.g., devices connected directly to a server(s) or to one another using wires or wirelessly (e.g., using Bluetooth having a short range such as 35 feet or Infrared)) may be referred to as local devices with respect to a server and remote devices with respect to a client device.

In some aspects, the server 112 may comprise a repository server 104, a DNS server 106, a DHCP server 108, and a configuration application server 110. Although the server 112 is shown as comprising all of these servers, one or more of these servers may be placed outside the server 112. In some aspects, one or more of these servers may be combined together as a single server. In some aspects, the server 112 may also be referred to as an in-house server because the server 112 may primarily operate to communicate with clients 102a, 102b, 102c, and 102d over a private network such as the corporate network 114. Boundary 122 may represent the boundary of this private network in which the in-house server 112 communicates with the clients 102a, 102b, 102c, and 102d. In some aspects, client device 102c and 102d are on the same domain (e.g., as represented by the dotted line 115).

In some aspects, at least a portion of the server 112 may be accessible from the public network 118. For example, as shown in FIG. 1, the repository server 104 is accessible from the public network 118. Thus, the client device 102e may communicate with the server 112 (e.g., the repository server 104) via the public network 118.

According to various aspects of the subject technology, the clients 102 may each be running a windows-based embedded image, such as any of the Windows Embedded family of operating systems (e.g., Windows Embedded Compact, Windows Embedded Standard, Windows Embedded Enterprise, Windows Embedded POSReady, Windows Embedded NAVReady, Windows Embedded Server, etc.) or other suitable embedded images.

In general, an embedded image may comprise a write-filter that may prevent one or more changes applied to the embedded image from persisting across a reboot of a client device running the embedded image. For example, an embedded image may comprise a write filter to allow one or more changes applied to the embedded image with the write-filter enabled, to be discarded when the client device is shut down. In some embodiments, the term "shut down" may refer to shutting down a machine. In some preferred embodiments, the term "shut down" may refer to shutting down a machine. In another aspect, it may include logging off from a machine. In some embodiments, as used herein, the term "reboot" or "restart" may include situations in which a user logs off and logs back into a client device, or a client device is shut down and then powered back on. In one example, if a user applies a new wallpaper to an embedded image running on a particular client device, the new wallpaper does not remain on the embedded image after that particular client device has rebooted.

The write-filter may be enabled to ensure that a user does not make any permanent changes (e.g., changes that persist across a reboot) to an embedded image of a client device. Enabling the write-filter is beneficial because it allows an administrator to maintain a uniform configuration for all the embedded images of the client devices in a particular system. If a user makes changes to an embedded image of one of the client devices, then only that particular client device needs to be rebooted to reset that embedded image back to the original configuration that is uniform with the other embedded images of the other client devices. Another benefit of enabling the write-filter is that it may prevent harmful changes from being applied permanently (e.g., applied across reboot) to an embedded image of a client device. For example, if a user of a client device accidentally downloads a virus that causes harmful changes to an embedded image of the client device, then only that client device needs to be rebooted to reset the embedded image back to the original configuration that was not harmed by the virus.

However, because of the write-filter being enabled, making a desired change that persists across reboot to an embedded image may be difficult. According to some approaches, in order to apply, to an embedded image, a change that persists across reboot, manual installation of software drivers and/or a firmware update of the embedded image is performed to create a customized embedded image having the desired change. The customization may typically occur at the server side (e.g., at the server 112), and the entire customized embedded image is deployed to a client (e.g., the client device 102). Thus, customization of an embedded image may involve transferring an entire customized embedded image from a server 112 to a client device 102 and/or installing the entire customized image on the client device 102. However, an embedded image can be large in size. For example, Windows embedded images may need a minimum flash size of 2 gigabytes (GB) (e.g., for the Windows Embedded Standard 2009) and a maximum of 4 GB (e.g., for the Windows Embedded Standard 7). Thus, transferring and installing images at such sizes may be impractical, especially when desired changes are frequent and/or relatively minor or when it involves a large number of client devices.

For example, in a large cashier system comprising over 100 cashier machines as client devices, if an administrator wants to install a new cashier program on each embedded image running on each cashier machine, then the administer may need to create a customized embedded image having the new cashier program at a server, and then transfer the customized embedded image, from the server, to each cashier machine for installation. If the customized embedded image is large in size, then transferring this image to each of the 100 cashier machines would be cumbersome. Furthermore, if the administrator desires to make frequent changes, then a new customized embedded image may need to be transferred to each cashier machine each time a change is made.

According to various aspects of the subject technology, after boot up of a client device 102 is initiated, a change may be automatically applied to an embedded image of the client device 102 without intervention by a user of the client device 102, thereby making the change appear to the user to be persistent across a reboot of the client device 102. Thus, aspects of the subject technology obviate reinstallation of an entire embedded image with the change onto the client device 102, and the problem of downloading and/or installing large images onto the client device 102 may be avoided. According to certain aspects, a configuration file may be used to apply such a change to the embedded image. The configuration file may contain information related to one or more desired changes to be applied to the client device 102. For example, the configuration file may contain instructions to apply the one or more desired changes, parameters related to the one or more desired changes, driver information related to the one or more desired changes, application information related to the one or more desired changes, and/or other suitable information. In some aspects, a client device 102 may download a configuration file from a server 112 and/or apply, to the embedded image of the client device 102, a configuration change based on the configuration file each time the client device 102 boots up. In one preferred aspect, transferring the configuration file and applying a configuration change in this manner is critical because any changes made according to the configuration file may appear to be persistent to a user of the client device 102 even though the changes may not be retained on the client device 102 when the client device 102 shuts down or is logged off (because of an enabled write-filter). Such an arrangement may make the client device 102 independent and self-provisioning, and therefore, transferring and/or installing large customized images onto the client device 102 may be advantageously avoided.

According to certain aspects, the configuration file may be automatically obtained from a server 112. For example, the configuration file may be stored in the repository server 104. In some aspects, the repository server 104 may be a part of the configuration application server 110. In some aspects, the configuration file may be automatically obtained from the remote repository server 104 or a configuration history folder (e.g., 416 in FIG. 4) stored on the client device 102. In some aspects, the configuration file may be a default configuration file. In some aspects, the obtained configuration file may be compared to a previous configuration file that was last used to apply one or more changes (associated with the previous configuration file) to the embedded image. When the changes are successfully applied to the embedded image, such changes may be referred to as last successfully applied changes. For example, if a change is a modification of the screen resolution to 1680×1050 pixels, and if the client device supports such a resolution, then the change would be successfully applied. In some aspects, a last successfully applied change may be understood as the change is compatible with, or is supported by, the embedded image and/or a client device 102. If the obtained configuration file is the same as the previous configuration file, then the last successfully applied change is re-applied, and it would appear to the user that the change persists across reboot of the client device 102.

According to certain preferred aspects, providing an option of applying a last successfully applied change is beneficial because it ensures that at least one configuration change can be applied to an embedded image, especially if a new change that is desired to be applied is not compatible with, or is not supported by, the embedded image and/or the client device 102. Furthermore, providing an option of applying a last successfully applied change is beneficial because it can allow a user to revert back to the last successfully applied change, especially if a new change that was applied is no longer desired.

According to various aspects of the subject technology, a configuration file may be an extensible markup language (XML) configuration file or any other suitable files. In a preferred aspect, a configuration file is an XML configuration file. In some aspects, an XML configuration file may refer to an XML-based configuration file. In some aspects, an XML configuration file may comprise some or all of the following types of settings: 1) remote desktop connections settings, 2) device settings, 3) operating system (OS) settings, and 4) common settings. The remote desktop connections settings, which may also be referred to as connections tags, may define settings for remote desktop protocol (RDP), independent computing architecture (ICA), VMware View, and other suitable remote desktop connections. The device settings may define settings for displays, keyboards, mice, networks, audio, power, wireless connections, or other suitable settings of a client device 102. The OS settings section may define settings for Aero, Firewall, a web browser (e.g., Internet Explorer (IE) or other suitable web browsers), one or more clocks, or other suitable settings of a client device 102.

According to certain aspects, a configuration file may conform to a suitable schema. For example, an XML configuration file may conform to an XML schema definition (XSD) file. XSD can be used to express a set of rules to which an XML document (e.g., an XML configuration file) conforms in order to be considered valid according to that schema. In some preferred aspects, using an XML configuration file is essential because it allows the XML configuration file to be validated against the XSD file to ensure that the XML configuration file is in a proper format that is compatible and/or supported by a client device. The proper format can allow a configuration change based on the XML configuration file to be applied correctly to an embedded image of the client device. Without such a proper format, it may not be possible to apply the configuration change correctly. In some aspects, validating the XML configuration file using the XSD file before the XML configuration file is transferred and/or applied can prevent a XML configuration file in an improper format from being unnecessarily transferred and/or applied, thereby beneficially saving resources and time.

Overall Methods

Figure 2:
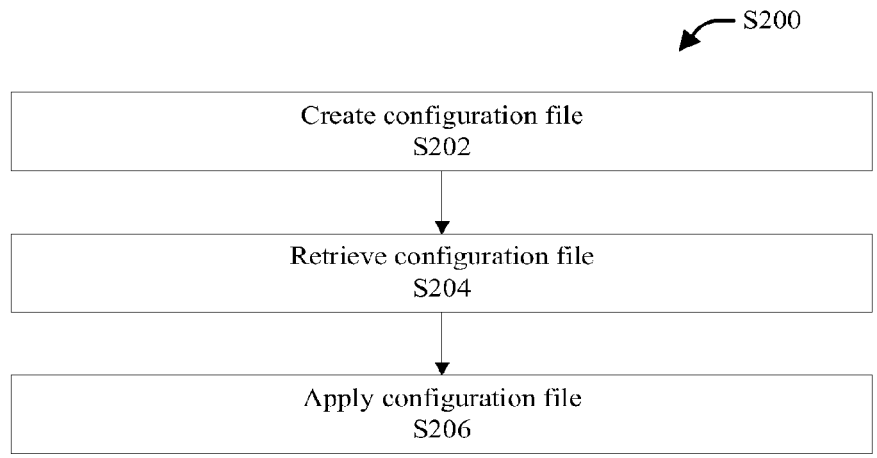
FIG. 2 illustrates an example of a method for applying a change to an embedded image of a client device such that the change would appear to a user of the client device to be persistent across a reboot of the client device, in accordance with various aspects of the subject technology.

FIG. 2 illustrates an example of a method for applying a change to an embedded image of a client device such that the change would appear to a user of the client device to be persistent across a reboot of the client device, in accordance with various aspects of the subject technology. Method S200 may comprise creating a configuration file (S202), retrieving a configuration file (S204), and applying a configuration file (S206). Aspects of the subject technology allow a client device 102 to be independent and self-provisioned by downloading a configuration file (e.g., an XML configuration file) automatically from a server 112 (e.g., from a repository server 104), and applying one or more configurations and/or installing applications/drivers based on the downloaded configuration file for customization of the embedded image. In some aspects, management software for customization of an embedded client configuration and customization of firmware may be reduced or eliminated. Aspects of the subject technology also reduce the usage of high bandwidth and time by not transferring large entire image files over a network.

Figure 3A:
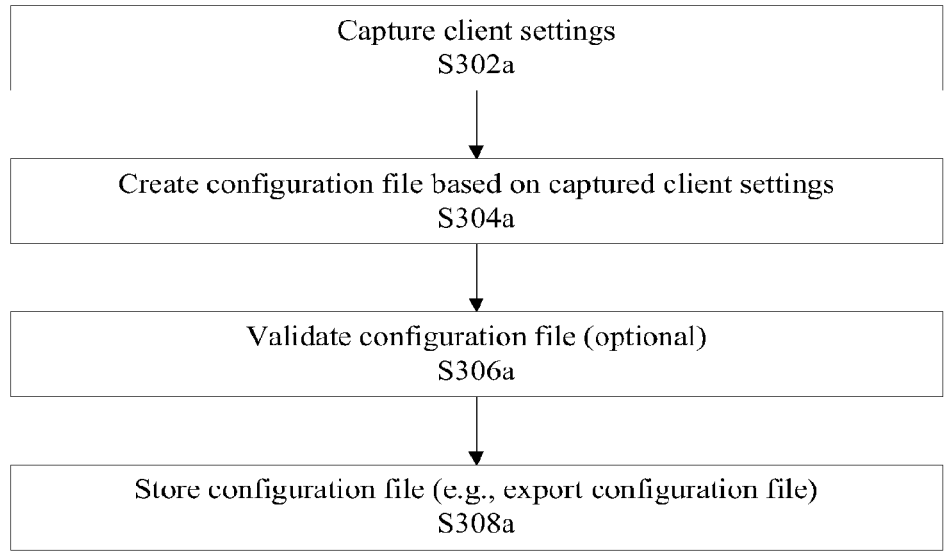
FIG. 3A illustrates an example of a method for creating a configuration file, in accordance with various aspects of the subject technology.

FIG. 3A illustrates an example of a method (e.g., also referred to as Method A-1) for creating a configuration file, in accordance with various aspects of the subject technology. Method S300a may comprise capturing client settings of a client device 102 (S302a) and creating a configuration file based on the captured client settings (S304a). In some aspects, method S300a may comprise an optional process of validating the configuration file (S306a). For example, an XSD schema file may be used to validate an XML configuration file. In some aspects, method S300a may comprise storing the configuration file (S308a). For example, the configuration file may be exported to a storage location, such as a universal serial bus (USB) drive, another client device 102, a repository server 104, a server 112 or another location. In one preferred aspect, storing the configuration file is advantageous because it allows the configuration file to be accessed by more than one client device 102. Thus, the same configuration as specified in the configuration file can be applied to different client devices 102 by storing the configuration file and distributing the same configuration file to different client devices 102.

Figure 3B:
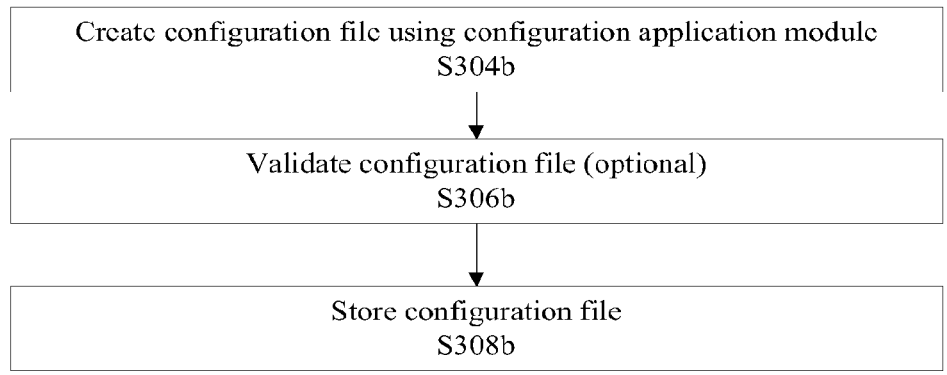
FIG. 3B illustrates an example of a method for creating a configuration file, in accordance with various aspects of the subject technology.

FIG. 3B illustrates an example of a method (e.g., also referred to as Method A-2) for creating a configuration file, in accordance with various aspects of the subject technology. Method S300b may comprise creating a configuration file using a configuration application module. In some aspects, the configuration application module may be an editor for creating and/or editing configuration files. In some aspects, the configuration application module may provide a user interface for a user to create and/or edit a configuration file. In some preferred aspects, the configuration application module may beneficially allow the user to visualize a configuration change before the configuration application module is used to create the configuration file that reflects the configuration change. For example, the user can use the configuration application module to visualize a new display resolution for a particular client device before using the configuration application module to create a configuration file that reflects the new display resolution. This configuration file may then be downloaded by other client devices, which can apply the new display resolution to their respective embedded images based on the configuration file. In some aspects, method S300b may comprise an optional process of validating the configuration file (S306b). For example, an XSD schema file may be used to validate an XML configuration file. In some aspects, method S300b may comprise storing the configuration file (S308b), such as storing a configuration file in a configuration application server 110, a repository server 104, a server 112, a client device 102, a USB drive, or another location. In a preferred aspect, method 300b may store a configuration file in a configuration application server 110, a repository server 104, or a server 112, which can be accessed by some or all of client devices 102.

Figure 3C:
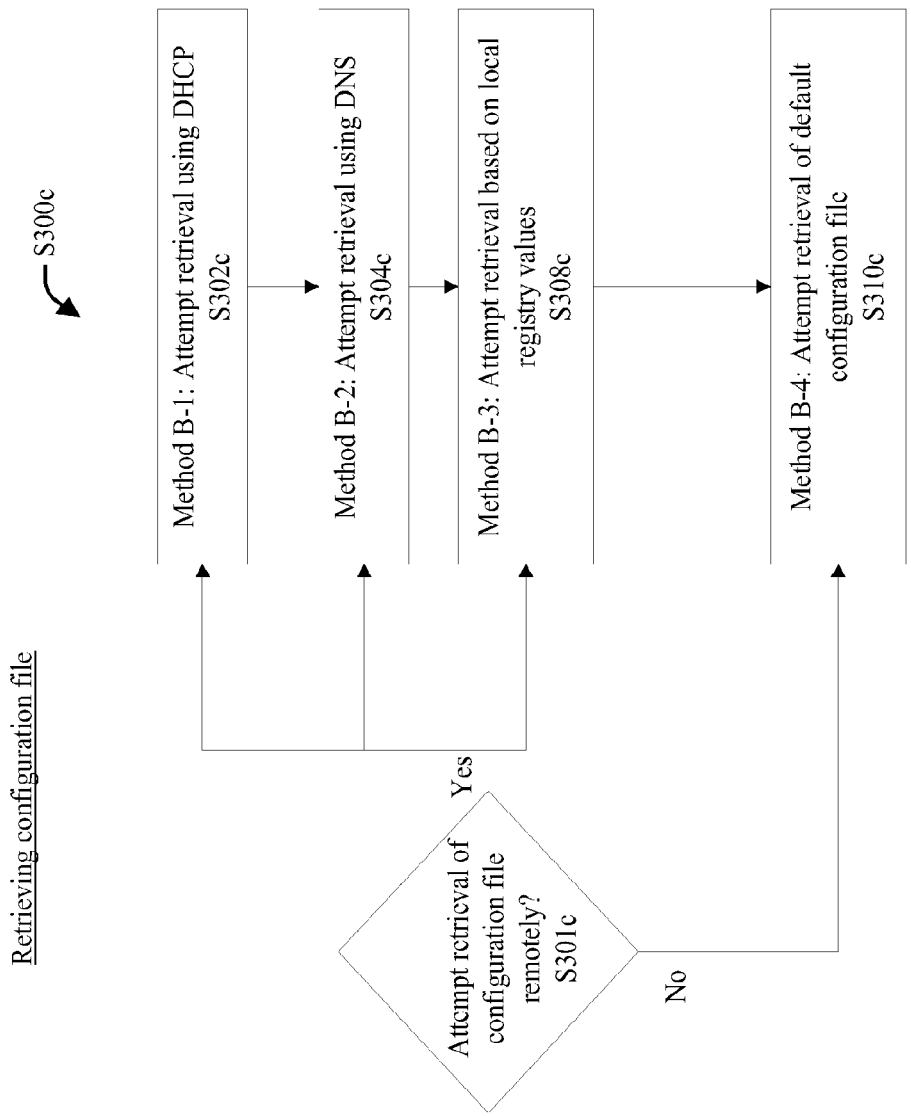
FIG. 3C illustrates an example of a method for retrieving a configuration file, in accordance with various aspects of the subject technology.

FIG. 3C illustrates an example of a method for retrieving a configuration file, in accordance with various aspects of the subject technology. According to process S301c, if a desired configuration file is to be retrieved remotely, then process S302c (e.g., also referred to as Method B-1), process S302d (e.g., also referred to as Method B-2), and/or process S302e (e.g., also referred to as Method B-3) may be utilized. Otherwise, process S310c (e.g., also referred to as Method B-4) may be utilized. Method B-1 may comprise attempting to retrieve a configuration file using DHCP (e.g., using DHCP server 108). Method B-2 may comprise attempting to retrieve a configuration file using DNS (e.g., using the DNS server 106). Method B-3 may comprise attempting to retrieve a configuration file (e.g., a configuration file on a server 112) based on local registry values on a client device 102. Method B-4 may comprise attempting to retrieve a default configuration file that may be used to apply a default configuration to the embedded image. A default configuration file can be a factory default configuration file or another configuration file that is saved locally on the client device 102. A locally saved configuration file may be on the client device 102 or on a storage device that is locally attached to the client device 102 (e.g., flash memory, USB drive, a removable hard disk drive, etc.). In one preferred aspect, having a default configuration file is beneficial because it can ensure that at least a certain configuration can be applied to an embedded image based on the default configuration file, especially if another configuration file cannot be retrieved and/or applied. For example, a new configuration file may specify new connections settings to be applied to an embedded image of a client device. However, if the new configuration file cannot be retrieved, then default connections settings specified in the default configuration file can be applied instead.

In one example, configuration data may be transferred from the server 112 to a client device 102, and then be applied on the client device 102. The configuration data may be transferred using any of Method B-1, Method B-2, and/or Method B-3 (preferably in this order, or in another order). Otherwise, Method B-4 may be used. For example, if a client device 102 fails to connect to the server 112 using DHCP, DNS or local registry values, then configuration settings from a factory default configuration file may be applied. According to certain aspects, a module that implements method S300c may be a part of a module referred to as Hagent_Ulexe.

FIG. 3D illustrates an example of a method (e.g., also referred to as Method C-1) for applying a configuration file, in accordance with various aspects of the subject technology. Method S300d may comprise applying settings based on a configuration file. In some aspects, a module that implements method S300d may be a part of a module referred to as ClientApp.dll. In some aspects, the ClientApp.dll may be a COM library that may take a configuration file as input. Tags from the configuration file may be read and the appropriate application programming interfaces (APIs) may be used to apply most of the settings contained in the configuration file. In some aspects, if APIs are not available, a direct registry writing method may be used (e.g., in the case of VMware View and ICA connections).

FIG. 3E illustrates an example of a method (e.g., also referred to as Method C-2) for applying a configuration file, in accordance with various aspects of the subject technology. Method S300e may comprise checking a reset tag contained in a configuration file (S302e) and applying settings based on the configuration file (S304e). Method S300e may be useful for implementing state-based provisioning of embedded client configurations.

In some aspects, a configuration file may specify whether to reset a previous state of the embedded image. If the configuration file specifies a reset be applied, then a default configuration is applied to the embedded image before a configuration change based on a new configuration file (e.g., a retrieved configuration file) is applied to the embedded image. This is beneficial in situations where a completely new configuration is desired while an old configuration is not needed anymore. For example, if a user of a client device changes from a first job to a second job within the same company but retains the client device for use, then the client device can be reset to completely remove any applications on the client device that were directed to the first job. A new configuration (e.g., adding applications directed to the second job) can then be applied to the client device. In some aspects, if the configuration file does not specify a reset, then the configuration change based on the new configuration is applied to the embedded image while disallowing the default configuration from being applied to the embedded image. Applying the new configuration while disallowing the default configuration from being applied is beneficial because it may allow new changes to be appended to an existing configuration of the embedded image.

FIG. 3F illustrates an example of a method (e.g., also referred to as Method C-3) for applying a configuration file, in accordance with various aspects of the subject technology. Method S300f may comprise comparing a retrieved configuration file to a last successfully applied configuration file (S302f) and applying settings based on the comparison (S304f). For example, if the retrieved configuration file is the same as the last successfully applied configuration file, a previous configuration change is applied to the embedded image. The previous configuration change may be based on the last successfully applied configuration file. If the retrieved configuration file is different from the last successfully applied configuration file, then a new configuration change is applied to the embedded image. The new configuration change may be based on the retrieved configuration file.

Client Device

Figure 4:
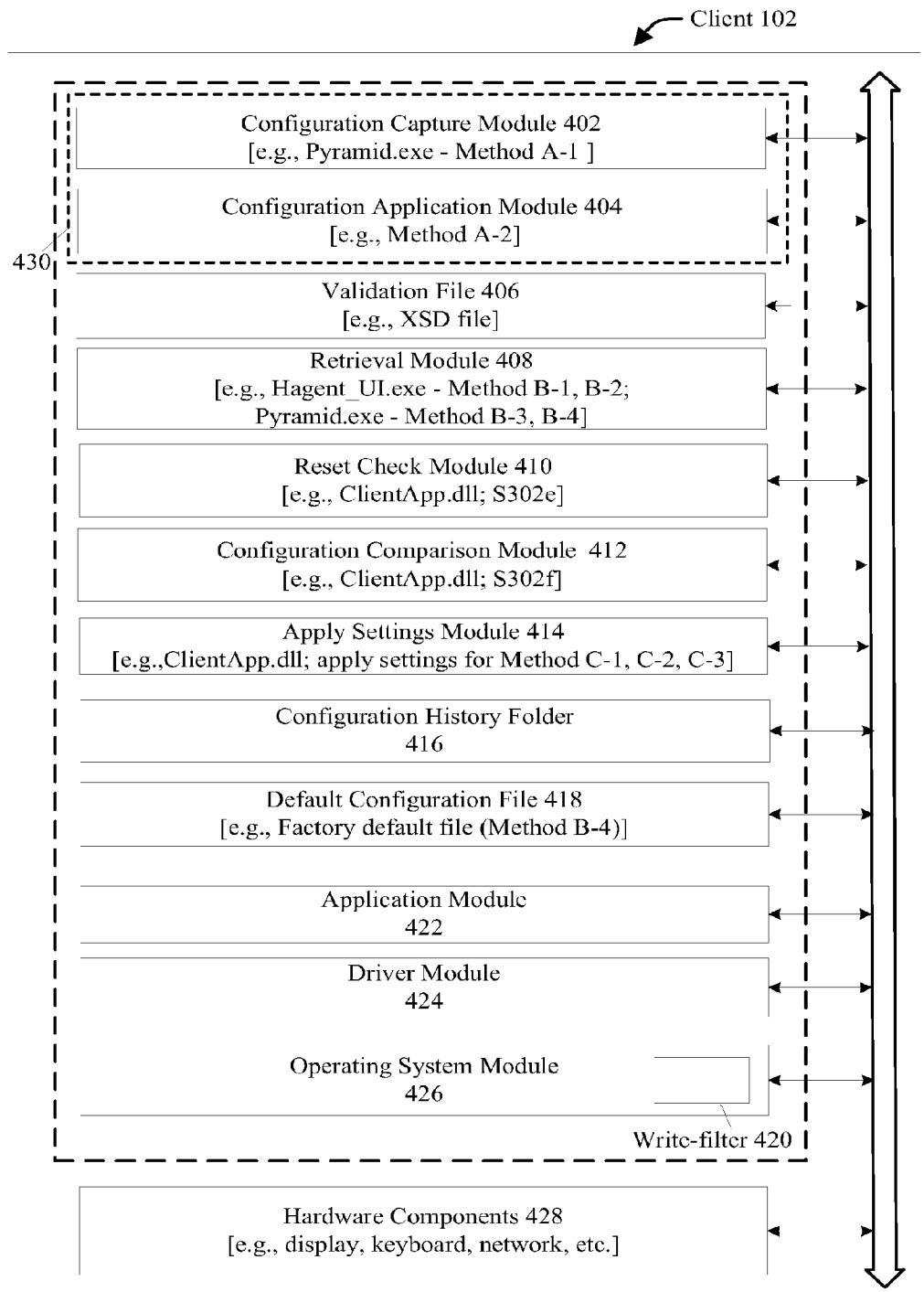
FIG. 4 illustrates a simplified block diagram of a client device, in accordance with various aspects of the subject technology.

FIG. 4 illustrates a simplified block diagram of a client device, in accordance with various aspects of the subject technology. A client device 102 may comprise some or all of the following: a configuration generation module 430, a validation file 406, a retrieval module 408, a reset check module 410, a configuration comparison module 412, an apply settings module 414, a configuration history folder 416, a default configuration file 418, an application module 422, a driver module 424, an operating system module 426, and hardware components 428. The configuration generation module 430 may comprise one or both of: a configuration capture module 402 and a configuration application module 404. The operating system module 426 may preferably include a write-filter 420, which may contain an exclusion list. In some aspects, the reset check module 410, the configuration comparison module 412, and/or the apply settings module 414 may be a part of ClientApp.dll. The modules and/or components of the client device 102 may be in communication with one another. In some aspects, the hardware components 428 may comprise various interface devices, and the modules of client device 102 are further in communication with the various user interface devices via a human interface devices (HID) connection. The user interface devices may include one or more output devices (e.g., one or more of a display, a speaker, or other audio, image or video output devices) and one or more input devices (e.g., one or more of a keyboard, a mouse, a trackball, a microphone, a stylus, a touch screen, a touch pad, a pen, a tablet, or other audio, image or video input devices). The modules may also be in communication with the public network 118 or the corporate network 114 via a network connection.

In a preferred embodiment, the modules (e.g., 402 through 426) are implemented in software (e.g., subroutines and code). In another embodiment, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the present disclosure are further described in the disclosure.

In one example, an embedded image of a client device 102 may comprise the operating system module 426 and some or all of the following: modules 422, 424, 408, and 414. In another example, an embedded image of a client device 102 may comprise the operating system module 426 and some or all of the following: modules 422, 424, 408, 414, and 402. In another example, an embedded image of a client device 102 may comprise the operating system module 426 and some or all of the following: modules 422, 424, 408, 414, 402, 404, 406, 410, and 412. In another example, an embedded image of a client device 102 may comprise the operating system module 426 and some or all of the following: modules 402, 404, 406, 408, 410, 412, 414, 416, 418, 422, and 424.

According to some approaches, to mass deploy thin client firmware through management software, a customized firmware image may need to be created as a package. A write-filter of the image may need to be disabled, software/drivers may need to be installed, appropriate configurations may need to be set, and the write-filter may then need to be enabled. After this process, the firmware on the client may need to be pulled from a remote server. This firmware image may be of a large size and may need to be pushed to all the appropriate clients using the customized firmware change.

To prevent this process of a large firmware from being pushed on multiple clients over a network, drivers/applications to be installed may be specified in a configuration file. In some aspects, the applications may also be stored along with the configuration file. As soon as a client boots up, a retrieval module (e.g., Hagent_UI.exe) may download the configuration file and use an apply settings module (e.g., ClientApp.dll) to parse the configuration file, check for differences (e.g., deltas) between a previous configuration file and the newly downloaded configuration file, and download and install an appropriate application/driver.

Configuration Application Server

Figure 5:
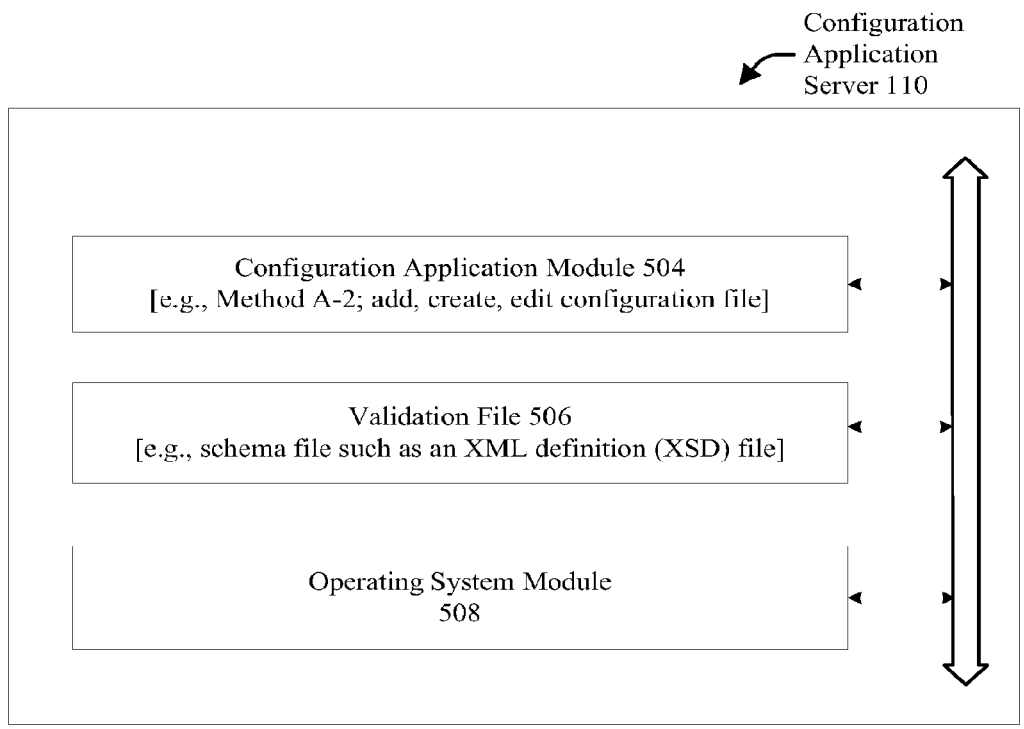
FIG. 5 illustrates a simplified block diagram of a configuration application server, in accordance with an aspect of the present disclosure.

FIG. 5 illustrates a simplified block diagram of a configuration application server, in accordance with an aspect of the present disclosure. A server 110 may comprise a configuration application module 504, a validation file 506, and an operating system module 508, all of which can be in communication with one another. The server 110 may be communicatively coupled with the corporate network 114 via a network interface, for example. These modules can be implemented in software, hardware and/or a combination of both. In a preferred embodiment, they are implemented in software. Features and functions of these modules according to various aspects are further described in the present disclosure.

Retrieving a Configuration File

FIGS. 6A through 8B illustrate examples of different methods of retrieving a configuration file (e.g., Methods B-1, B-2, B-3). A configuration file may be retrieved from a repository server where the configuration file is stored. In one aspect, a repository server may be any server, a client, any computing device, a database, or any storage device.

Figure 6A:
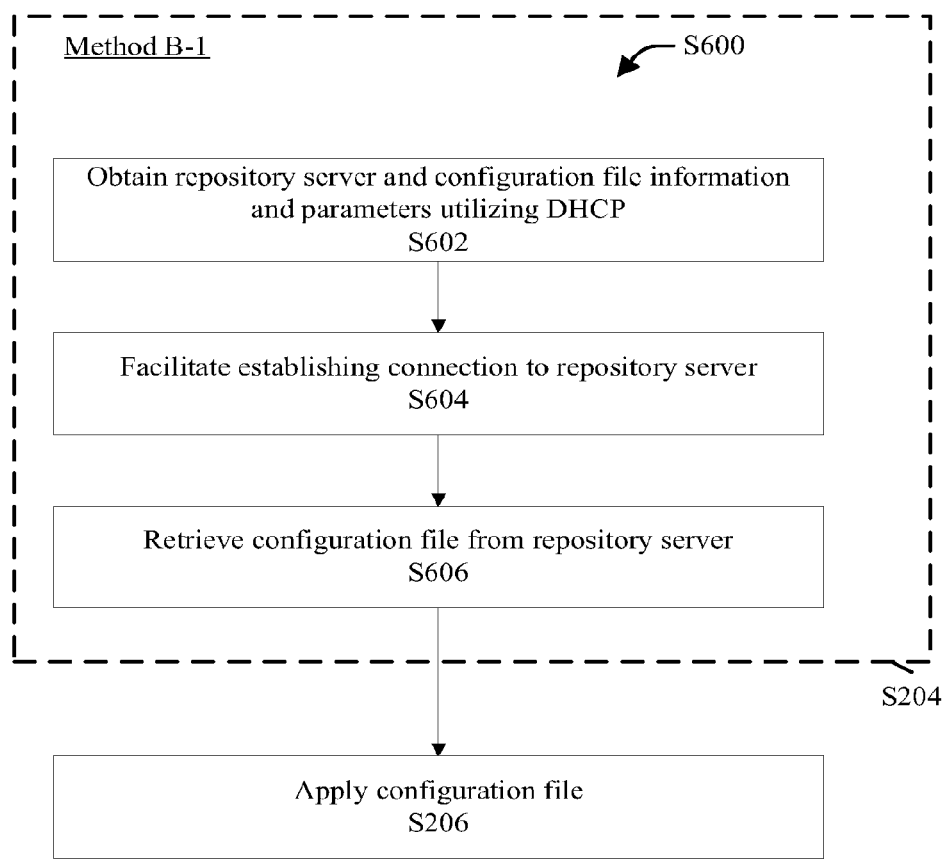
FIG. 6A illustrates an example of a method for retrieving a configuration file, in accordance with various aspects of the subject technology.

FIG. 6A illustrates an example of a method for retrieving a configuration file (e.g., Method B-1), in accordance with various aspects of the subject technology. Method S600 may comprise obtaining information regarding a repository server 104 and a configuration file, and parameters utilizing DHCP (S602). For example, this information and parameters may be obtained from a DHCP server 108. Method S600 may comprise facilitating establishing a connection to the repository server 104 (S604) and retrieving the configuration file from the repository server 104 (S606). In some aspects, a retrieval module 408 may be used to implement method S600.

Figure 6B:
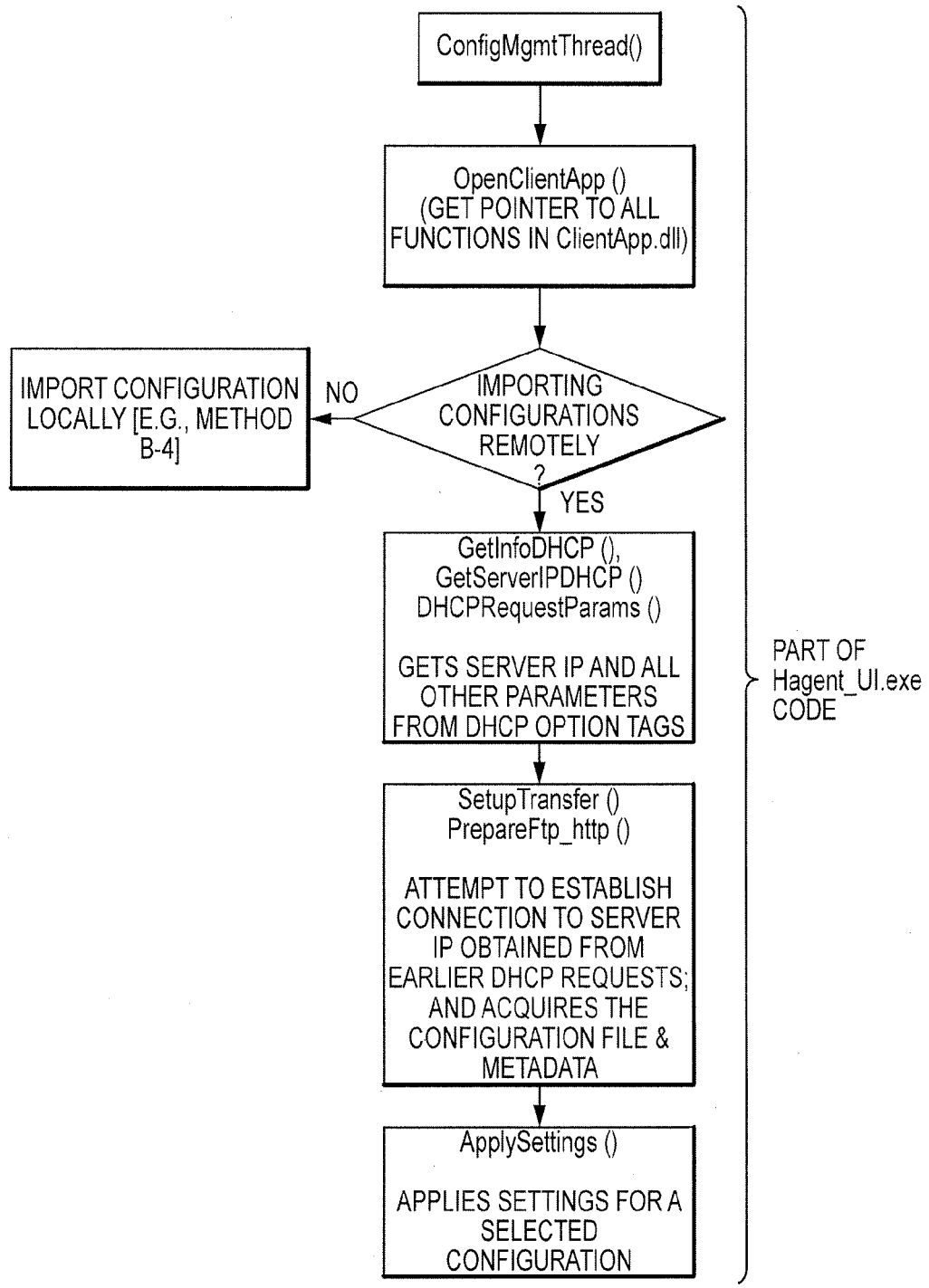
FIG. 6B illustrates an example of an implementation of the method shown in FIG. 6A, in accordance with various aspects of the subject technology.

FIG. 6B illustrates an example of an implementation of the method shown in FIG. 6A, in accordance with various aspects of the subject technology. According to certain aspects, a retrieval module 408 (e.g., Hagent_UI.exe) may be launched by the operating system module 426 after client drivers are loaded. The retrieval module 408 may use multiple methods to identify the repository server 104, which may contain a desired configuration file. In some aspects, Method B-1 may comprise a DHCP option tag method in which it makes use of DHCP client APIs and Internet Protocol Helper API (IPHLPAPI) functions to retrieve the below mentioned DHCP options:

| "DHCPServerTag" = "161" | for server IP (e.g., IP address of a repository server where a configuration file is located) |
| "DHCPPathTag" = "162" | for the location of the configuration file in the server |
| "DHCPUsernameTag" = "184" | for a username to be used for authentication |
| "DHCPPasswordTag" = "185" | for a password for the username to be using for authentication |
| "DHCPProtocolTag" = "183" | for the type of protocol to be used in downloading the configuration file |

The retrieval module 408 may also validate the DHCP tag values. In some aspects, the server IP may be needed in order to implement Method B-1. Depending on the protocol tag, port values may be fixed. If the DHCP has FTP as a protocol, then the port considered may be 21. Port values of 80 and 443 may be considered in the case of HTTP and HTTPS, respectively. If the username tag is not set, then anonymous login may be considered. If a protocol tag is not configured, then HTTP may be considered by default. In some aspects, retrieval module 408 may make sure that even if certain tags are not set, default values for those fields may be used (see, e.g., S1306 in FIG. 13). The foregoing tag values and port values are presented as examples. It is understood that other suitable values may be used.

Figure 7A:
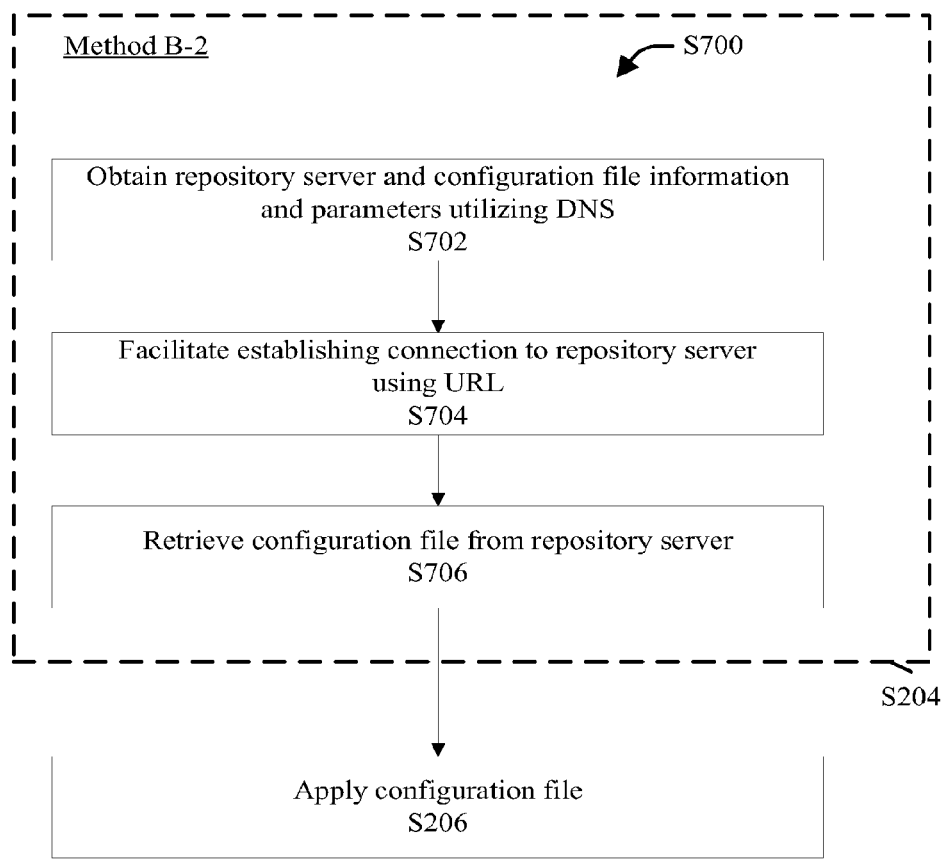
FIG. 7A illustrates an example of a method for retrieving a configuration file, in accordance with various aspects of the subject technology.

FIG. 7A illustrates an example of a method for retrieving a configuration file (e.g., Method B-2), in accordance with various aspects of the subject technology. Method S700 may comprise obtaining information regarding a repository server 104 and a configuration file, and parameters utilizing DNS (S702). For example, the information and parameters may be obtained from a DNS server 106. Method S700 may comprise facilitating establishing a connection to the repository server 104 using a Uniform Resource Locator (URL) (e.g., as obtained from the DNS server 106). Method S700 may comprise retrieving the configuration file from the repository server 104 (e.g., using the URL to locate the repository server 104). In some aspects, the retrieval module 408 may be used to implement method S700.

Figure 7B:
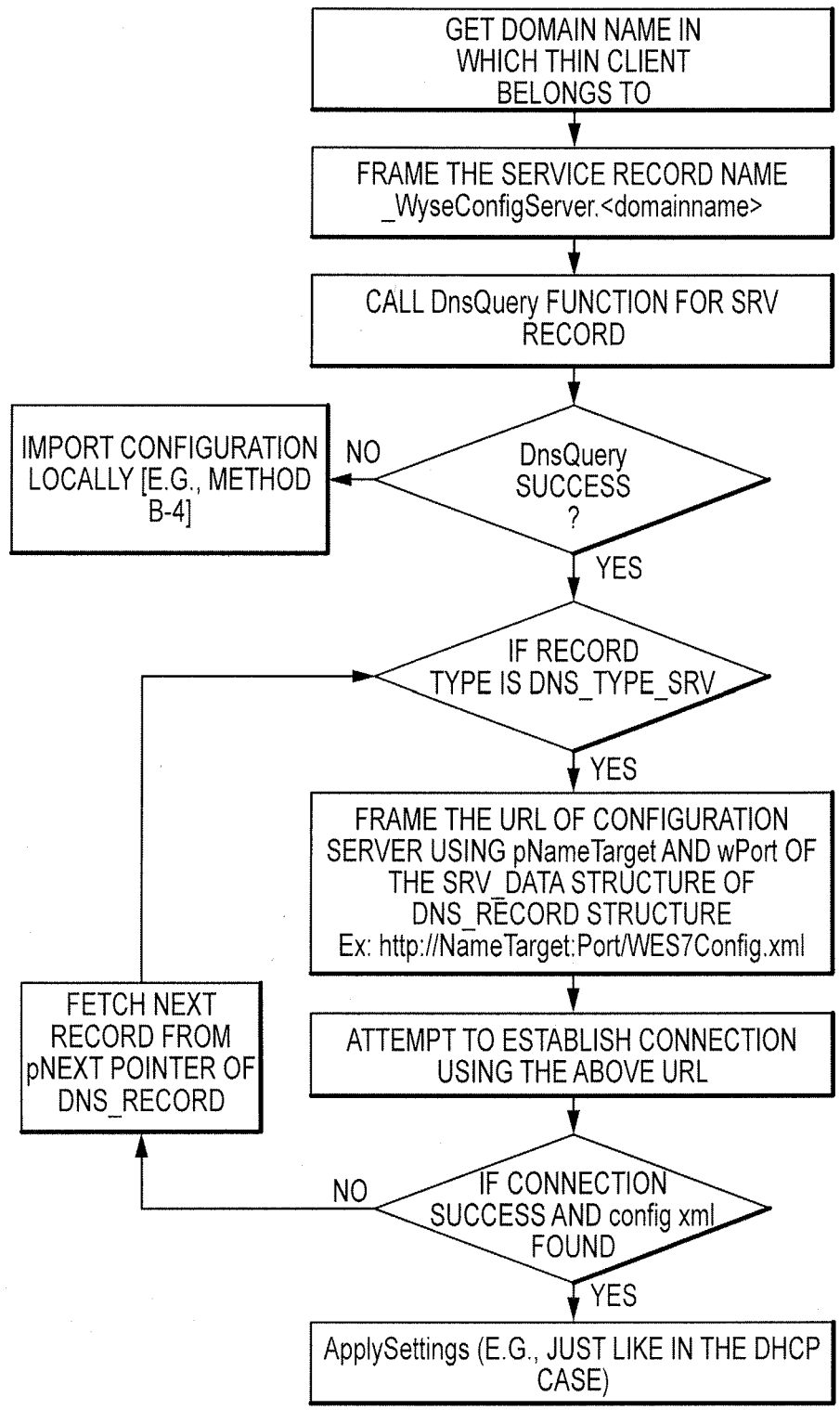
FIG. 7B illustrates an example of an implementation of the method shown in FIG. 7A, in accordance with various aspects of the subject technology.

FIG. 7B illustrates an example of an implementation of the method shown in FIG. 7A, in accordance with various aspects of the subject technology.

In some aspects, a first one of Method B-2 may comprise a DNS service record lookup. An administrator can configure a DNS server (e.g., the DNS server 106) to provide server and port number for a service that may, for example, be referred to as "_wyseconfigserver._tcp." Multiple configuration repository server/port values can be provided. The retrieval module 408 may access them in order, according to the weight and priority associated with each entry. Since the DNS server may not supply a protocol string associated with each server/port entry, the retrieval module 408 may try HTTP as a protocol if port number is 80. Otherwise, it may try HTTPS and then HTTP for all other port numbers. If lookup for "_wyseconfigserver._tcp" fails, retrieval module 408 may try "_wyseconfigserver._tcp" plus a domain name, and then each sub-domain name. For example, if the domain name is x.y.z, the retrieval module 408 may issue a DNS service location lookup using the following names in order until the DNS server returns a valid answer:

1. _wyseconfigserver._tcp
2. _wyseconfigserver._tcp.x.y.z
3. _wyseconfigserver._tcp.y.z
4. _wyseconfigserver._tcp.z In some aspects, if the retrieval module 408 is unable to get a valid answer to DNS service record lookup requests, then the retrieval module 408 may implement another method. In this regard, a second one of Method B-2 may comprise a DNS host name lookup. An administrator can configure the DNS server to provide server IP for a host name (e.g., "wyseconfigserver"). Since the DNS server may not supply a protocol string nor a port number, the retrieval module 408 may use HTTPS on port 443 first. If this fails, the retrieval module 408 may use HTTP on port 80. If lookup for "wyseconfigserver" fails, the retrieval module 408 may try "wyseconfigserver" plus a domain name, and then each sub-domain name. For example, if the domain name is x.y.z, the retrieval module 408 may issue DNS host name lookup on the following names below until the DNS server returns a valid answer:

1. wyseconfigserver
2. wyseconfigserver.x.y.z
3. wyseconfigserver.y.z
4. wyseconfigserver.z If the retrieval module 408 receives any valid answer for either the DNS service record lookup or the DNS hostname look up, the retrieval module 408 will attempt to download the configuration file using the server details that it received from either of these methods.

Figure 8A:
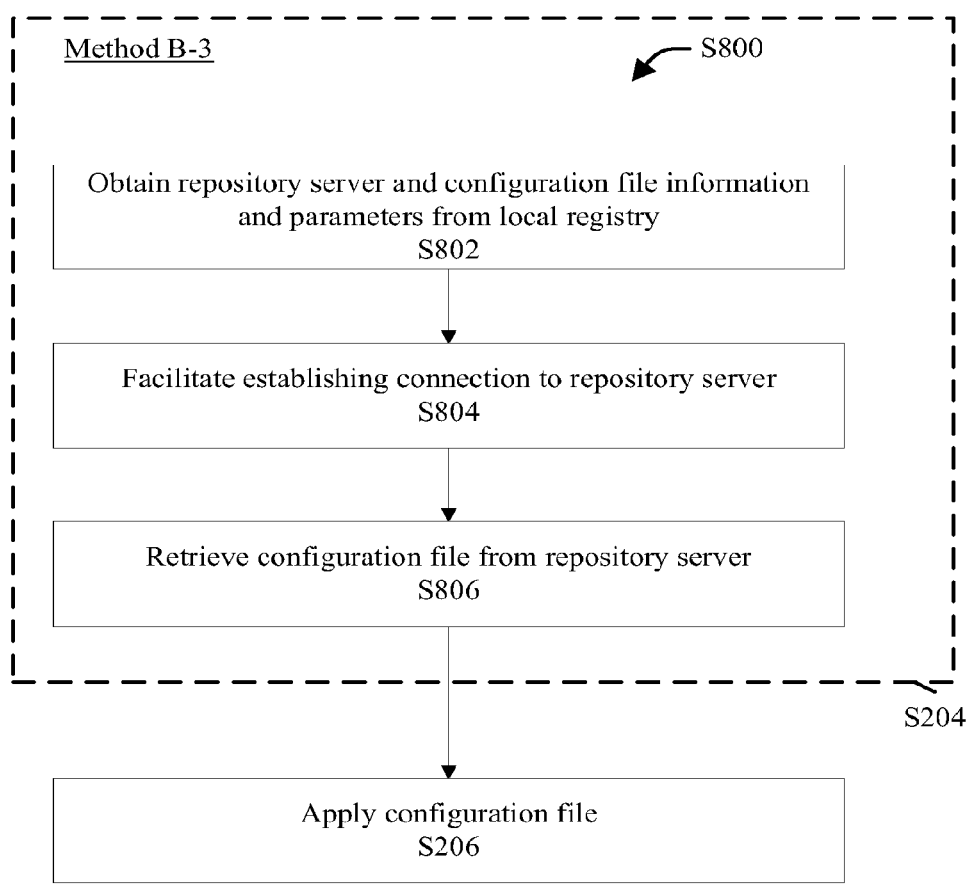
FIG. 8A illustrates an example of a method for retrieving a configuration file, in accordance with various aspects of the subject technology.

FIG. 8A illustrates an example of a method for retrieving a configuration file (e.g., Method B-3), in accordance with various aspects of the subject technology. Method S800 may comprise obtaining information regarding a repository server and a configuration file, and parameters from a local registry of the client device 102 (S802). Method S800 may comprise facilitating establishing a connection to the repository server 104 (e.g., using the information and the parameters from the local registry) (S804). Method S800 may comprise retrieving the configuration file from the repository server 104 (S806). In some aspects, the retrieval module 408 may be used to implement method S800.

Figure 8B:
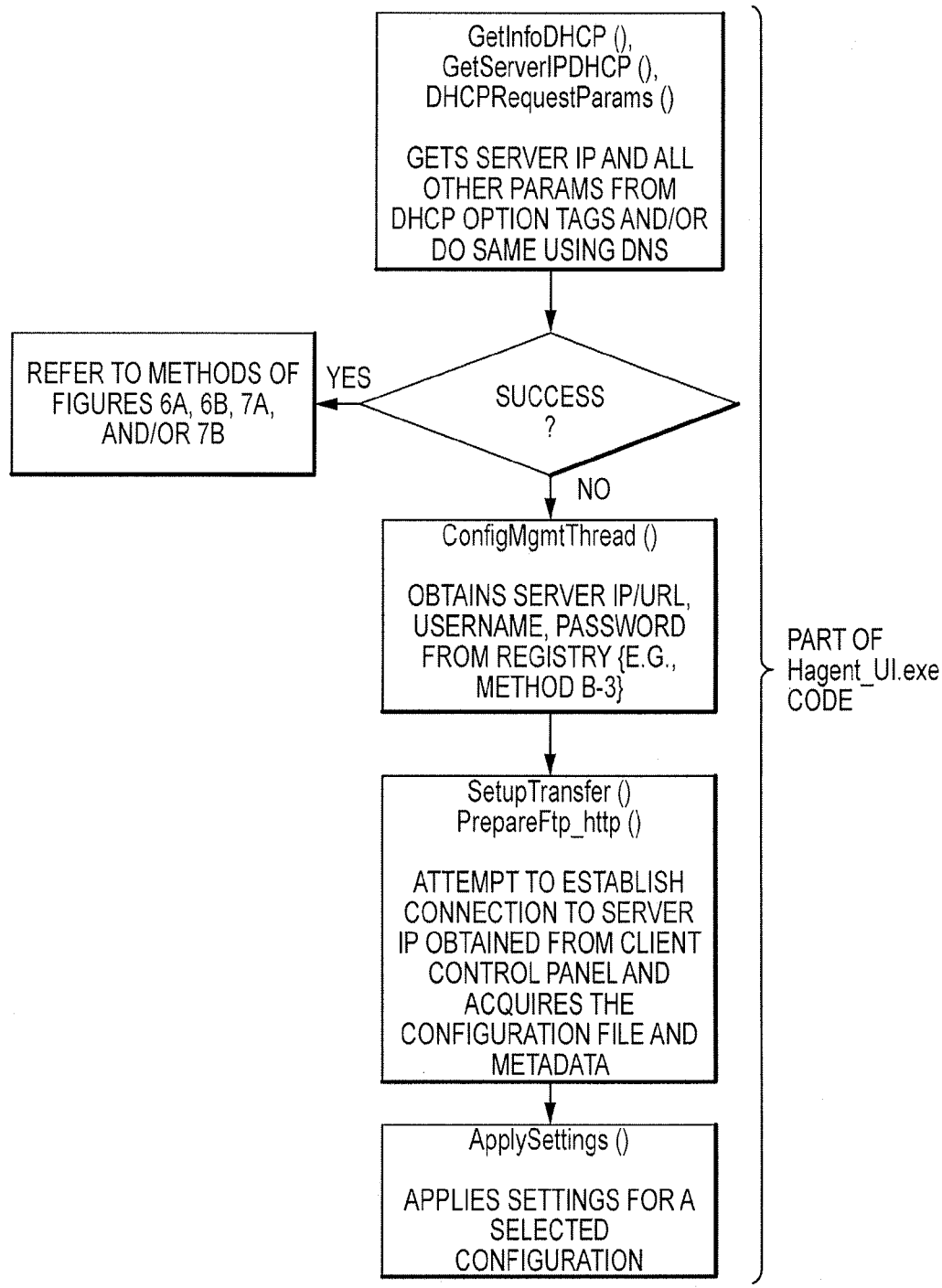
FIG. 8B illustrates an example of an implementation of the method shown in FIG. 8A, in accordance with various aspects of the subject technology.

FIG. 8B illustrates an example of an implementation of the method shown in FIG. 8A, in accordance with various aspects of the subject technology. According to certain aspects, if connection to the server 112 fails with the methods mentioned in FIGS. 6A, 6B, 7A, and 7B, the retrieval module 408 may fall back to settings in the local registry of the client device 102. The remote server values may be stored in the local registry, and the retrieval module 408 may use these values to access the server 112 in order to retrieve the configuration file. If the retrieval module 408 fails to connect to the server 112 using the local registry values, then configuration settings from a factory default file (e.g., default configuration file 418) that is embedded with the client device 102 may be applied (e.g., Method B-4).

Applying a Configuration File

Figure 9A:
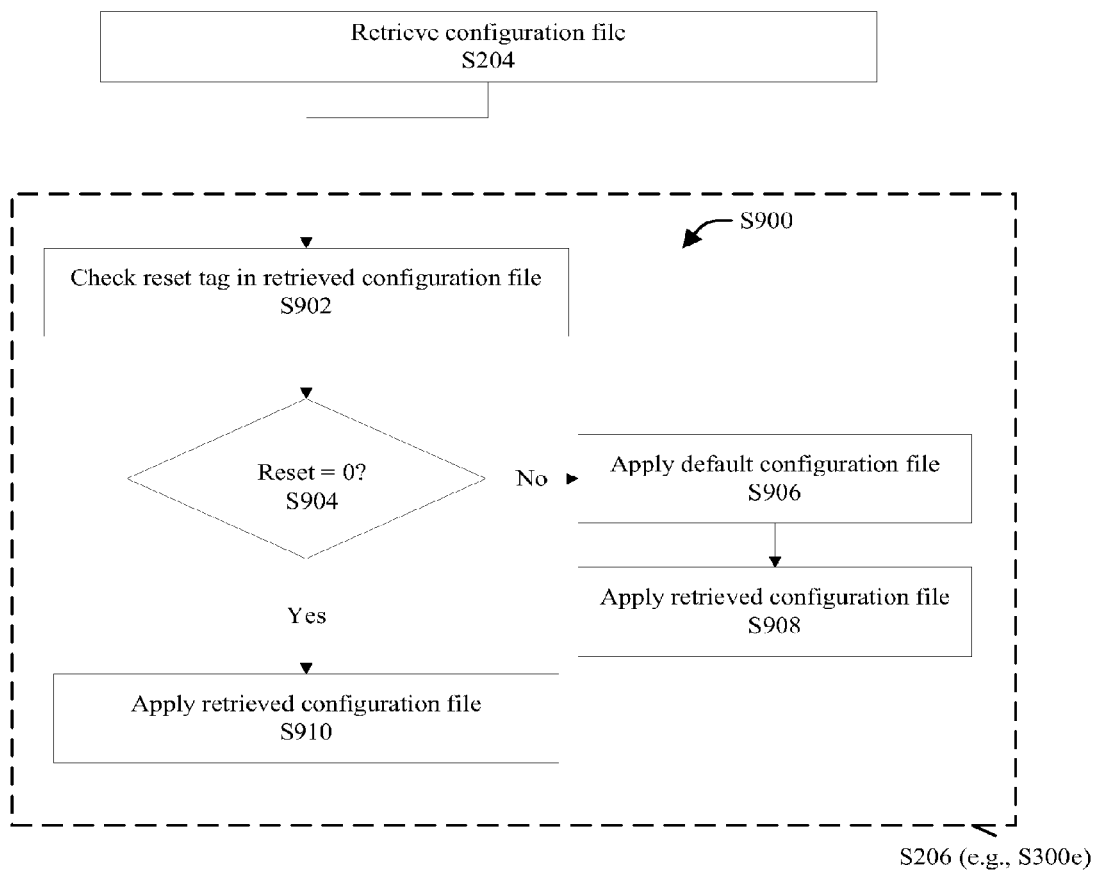
FIG. 9A illustrates an example of a method for applying a configuration file, in accordance with various aspects of the subject technology.

FIG. 9A illustrates an example of a method for applying a configuration file (e.g., Method C-2), in accordance with various aspects of the subject technology. In some aspects, the apply settings module 414 and/or the reset check module 410 may be used to implement method S900. Method S900 may comprise checking a reset tag in the retrieved configuration file (S902). The reset tag may have a value of "1" to command the previous state of the configuration of the client device 102 to be reset, or a value of "0" to command no reset (i.e., the previous state of the configuration of the client device 102 does not need to be reset). According to process S904, if the reset tag value is not "0," then a default configuration file is applied (S906) before a retrieved configuration file is applied (S908). If the reset value is "0," then a retrieved configuration file is applied while disallowing the default configuration file from being applied (S910). Although the reset tag values of "1" and "0" are described, it is understood that other suitable values may be used.

Figure 9B:
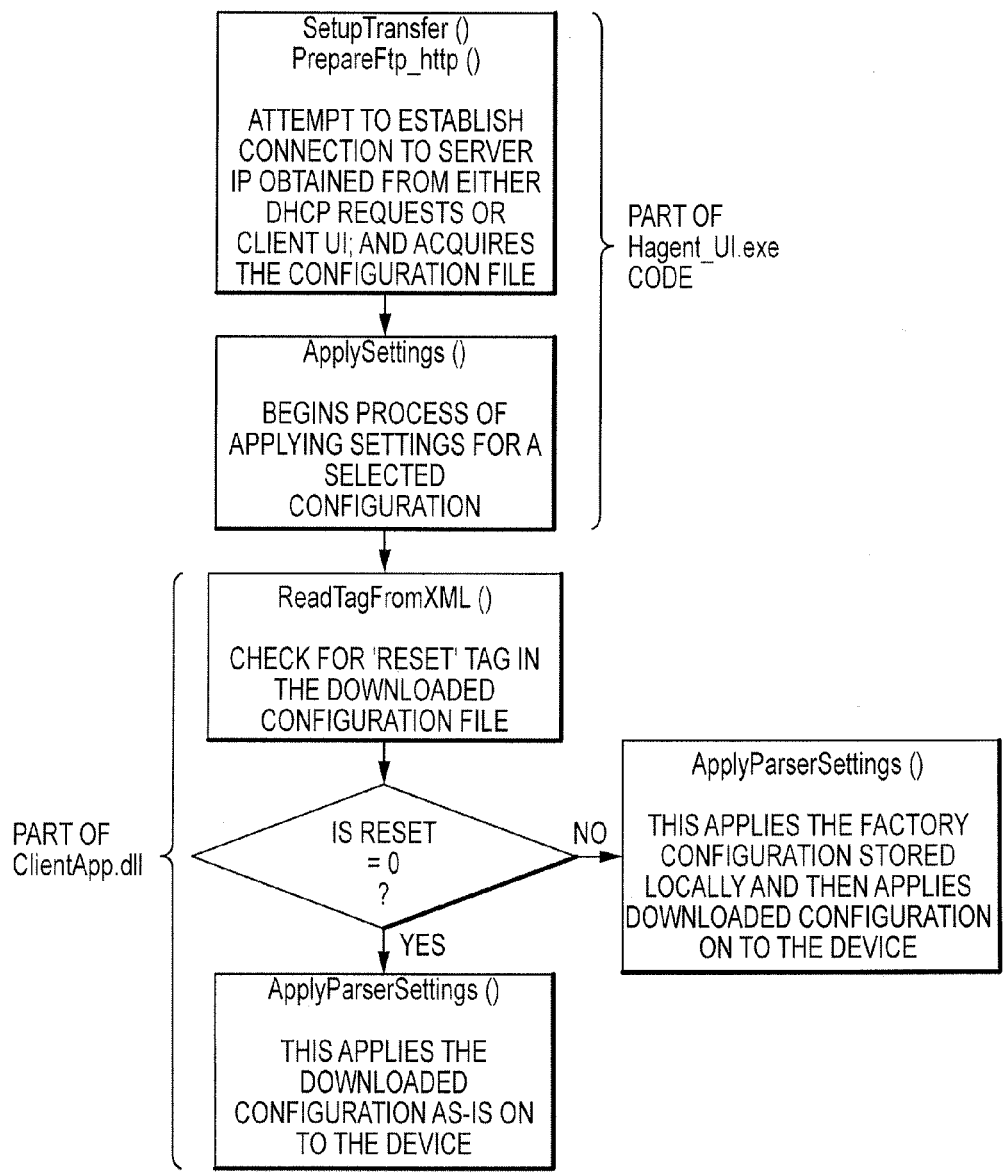
FIG. 9B illustrates an example of an implementation of the method shown in FIG. 9A, in accordance with various aspects of the subject technology.

FIG. 9B illustrates an example of an implementation of the method shown in FIG. 9A, in accordance with various aspects of the subject technology.

According to certain aspects, a reset feature or state-based provisioning feature may help a client device 102 to be reset to factory settings, which may be predefined in the client device 102. The reset feature may be enabled by setting a reset tag to "1" in the configuration file. When this reset tag is set, the apply settings module 414 may first set a default configuration using a default configuration file present in the client device 102 and then apply the configuration in the configuration file, which may be downloaded as mentioned in FIGS. 3C, 6A, 6B, 7A, 7B, 8A, and 8B. Thus, the client device 102 may be ensured to always have settings that are mentioned in the configuration file.

According to certain aspects, the reset tag may remove all RDP connections (or other suitable connection settings), view settings, and web browser settings (e.g., Internet explorer favorites) in addition to resetting the client device 102 and its OS configurations. Below is an example of how the reset tag may be represented in XML:

```
<common>
    <commonSettings>
        <reset>0</reset>
    </commonSettings>
</common>
```

The reset tag may help with state-based application of a client configuration. In some aspects, a client configuration can either simply append to an existing configuration state of a client device 102, or completely reset an existing state of the client device 102 to factory defaults, and then apply a new configuration.

Figure 10A:
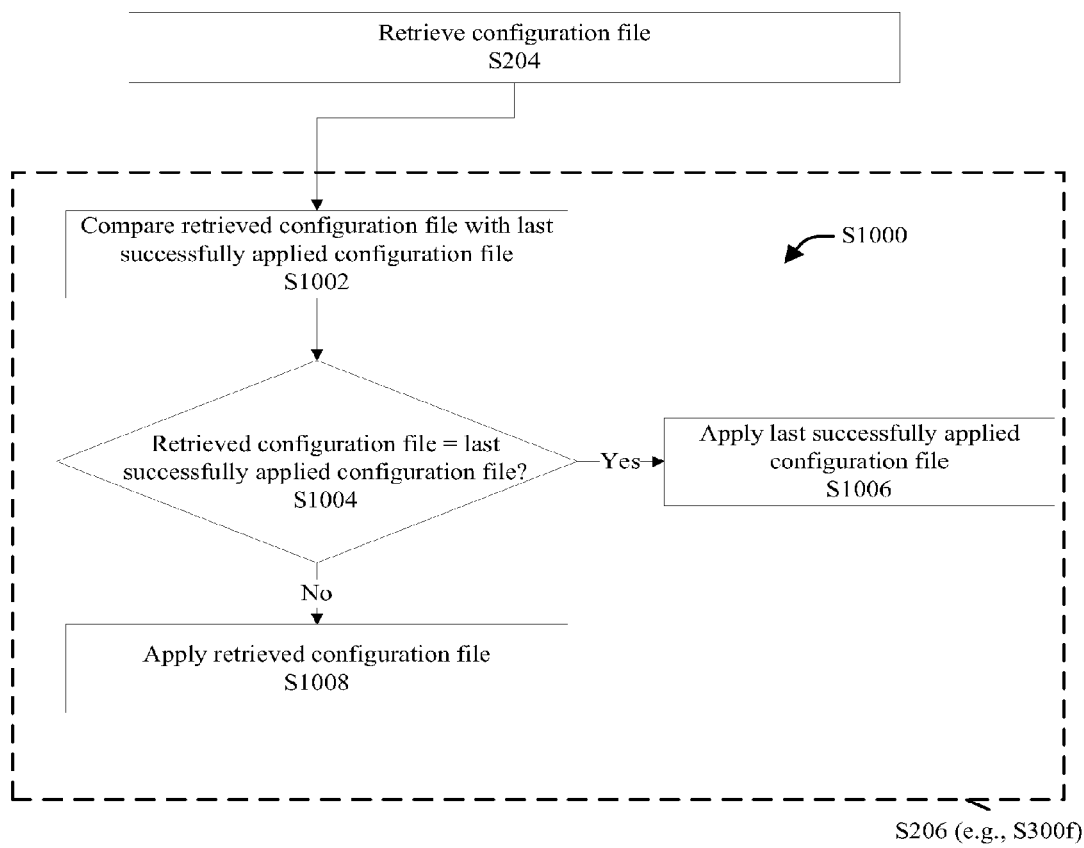
FIG. 10A illustrates an example of a method for applying a configuration file, in accordance with various aspects of the subject technology.
Figure 10B:
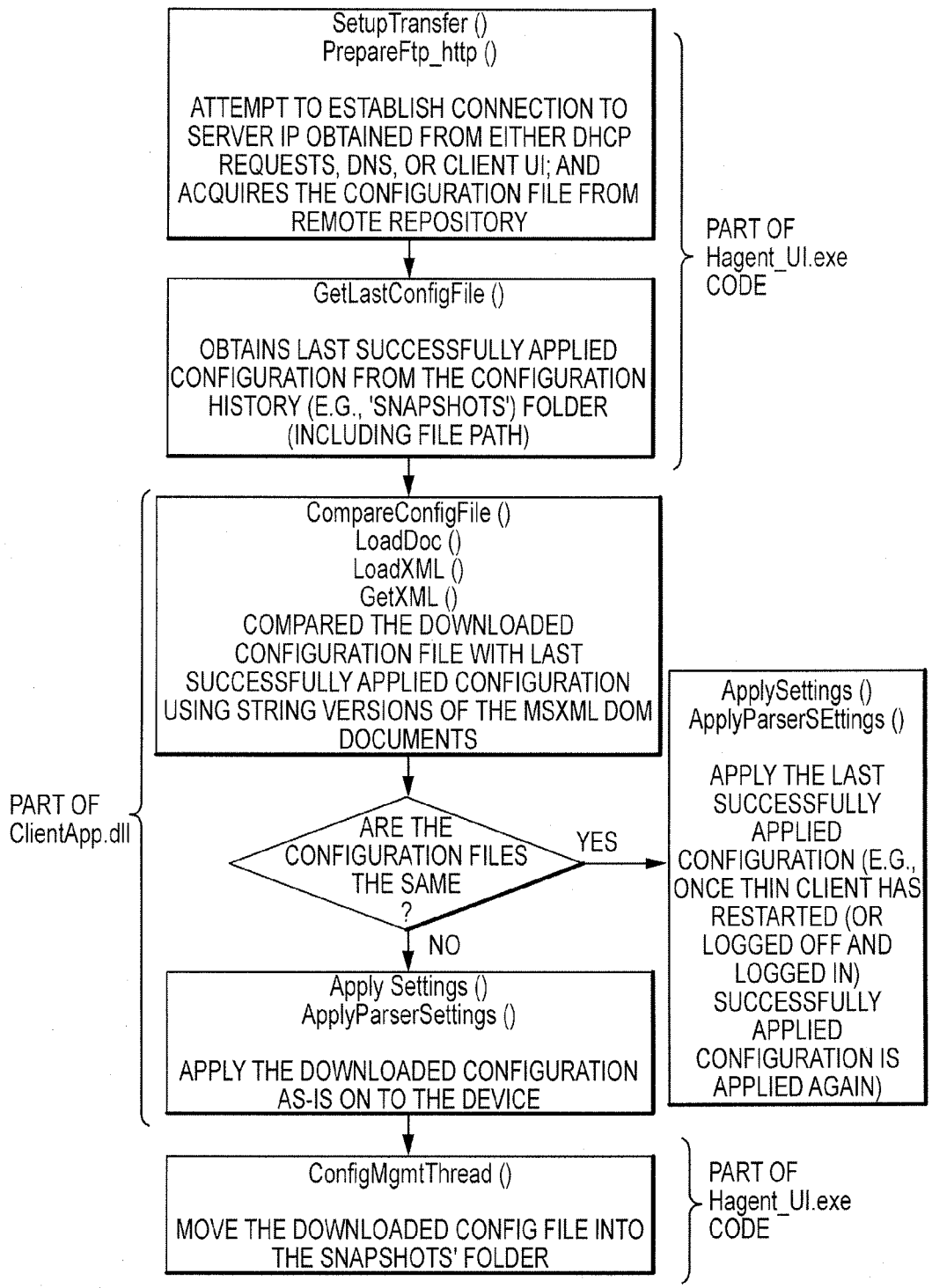
FIG. 10B illustrates an example of an implementation of the method shown in FIG. 10A, in accordance with various aspects of the subject technology.

FIG. 10A illustrates an example of a method for applying a configuration file (e.g., Method C-3), in accordance with various aspects of the subject technology. In some aspects, the apply settings module 414 and/or the configuration comparison module 412 may be used to implement method S1000 to apply various settings as specified in the configuration file. Method S1000 may comprise comparing the retrieved configuration file with a last successfully applied configuration file (S1002). In some aspects, the last successfully applied configuration file may be stored in the configuration history folder 416. The configuration comparison module 412 may compare the retrieved configuration file with the last successfully applied configuration file. If these two files are the same, then the last successfully applied configuration file is applied (S1004 and S1006). If these two files are different, then the retrieved configuration file is applied (S1004 and S1008). For example, the apply settings module 414 may be used to apply either the last successfully applied configuration file or the retrieved configuration file. FIG. 10B illustrates an example of an implementation of the method shown in FIG. 10A, in accordance with various aspects of the subject technology.

Figure 11A:
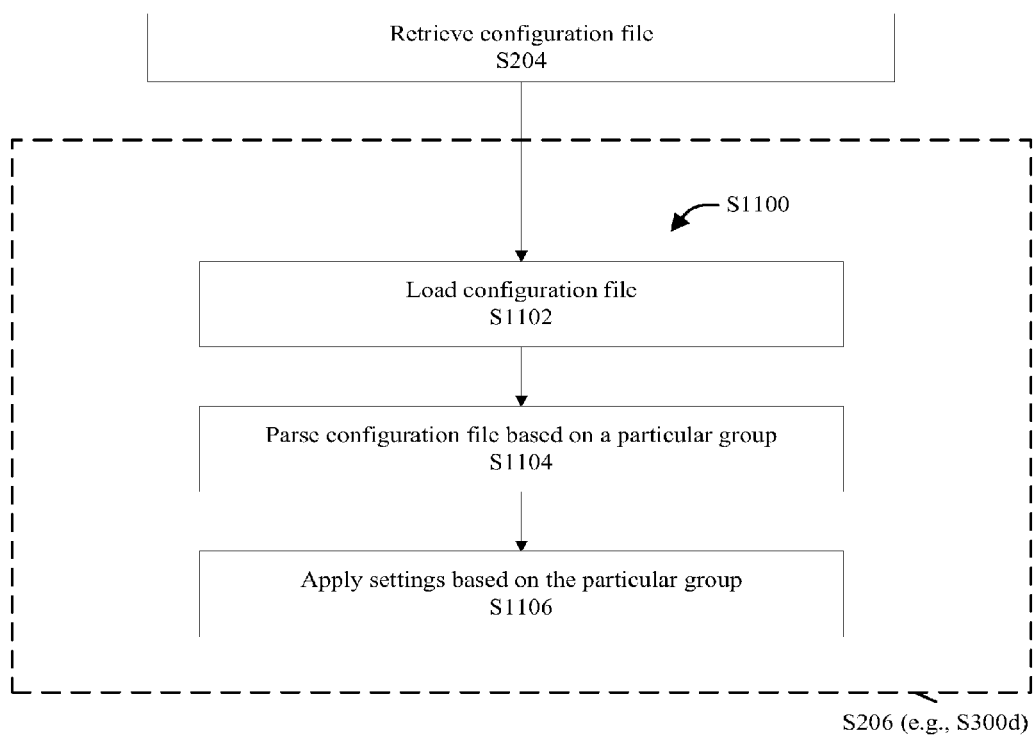
FIG. 11A illustrates an example of a method for applying a configuration file, in accordance with various aspects of the subject technology.
Figure 11B:
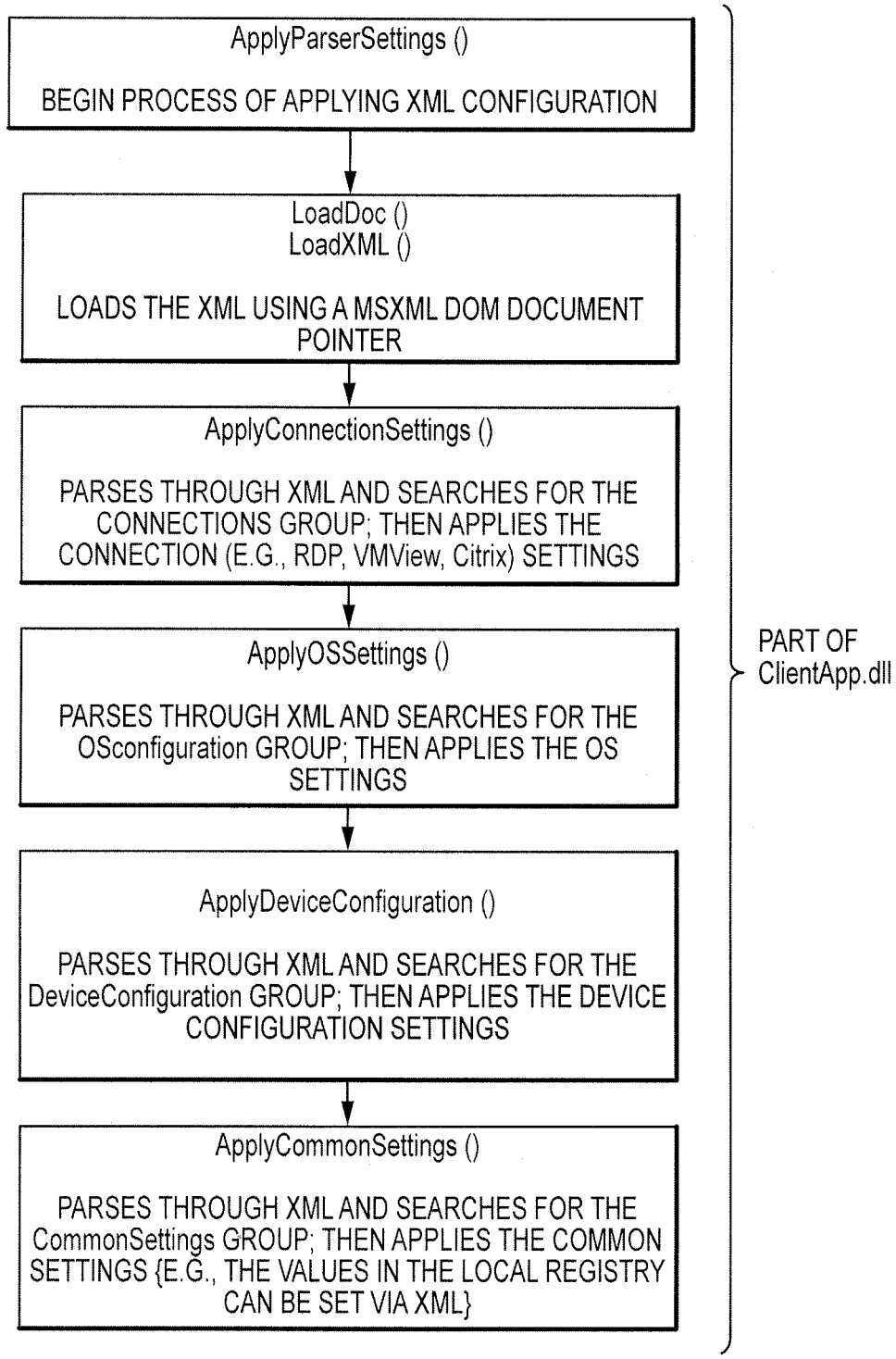
FIG. 11B illustrates an example of an implementation of the method shown in FIG. 11A, in accordance with various aspects of the subject technology.

FIG. 11A illustrates an example of a method for applying settings based on a configuration file (e.g., Method C-1, S304d, S304e, S304f), in accordance with various aspects of the subject technology. For example, the apply settings module 414 may be used to implement method S1100 to apply various settings as specified in the configuration file. Method S1100 may comprise loading the configuration file (S1102). Method S1100 may comprise parsing the configuration file based on a particular group (S1104). For example, the configuration file may be parsed for a particular group of settings related to the connections settings, the device settings, the OS settings, the common settings, etc. Method S1100 may comprise applying the settings based on the particular group (S1106). For example, if the particular group of settings is related to the connections settings, then the apply settings module 414 may apply the connections settings specified in the configuration file. Method S1100 is advantageous because it may allow for a specific group of settings to be applied at a time. In one example, if a user only wants to apply, to an embedded image of a client device, a particular group of settings specified in a configuration file instead of all the settings specified in the configuration file, method S1100 may allow the user to apply only the settings for that desired particular group of settings. FIG. 11B illustrates an example of an implementation of the method shown in FIG. 11A, in accordance with various aspects of the subject technology. In some aspects, FIG. 11B illustrates a customization of client device 102 firmware by application of configurations.

Figure 12A:
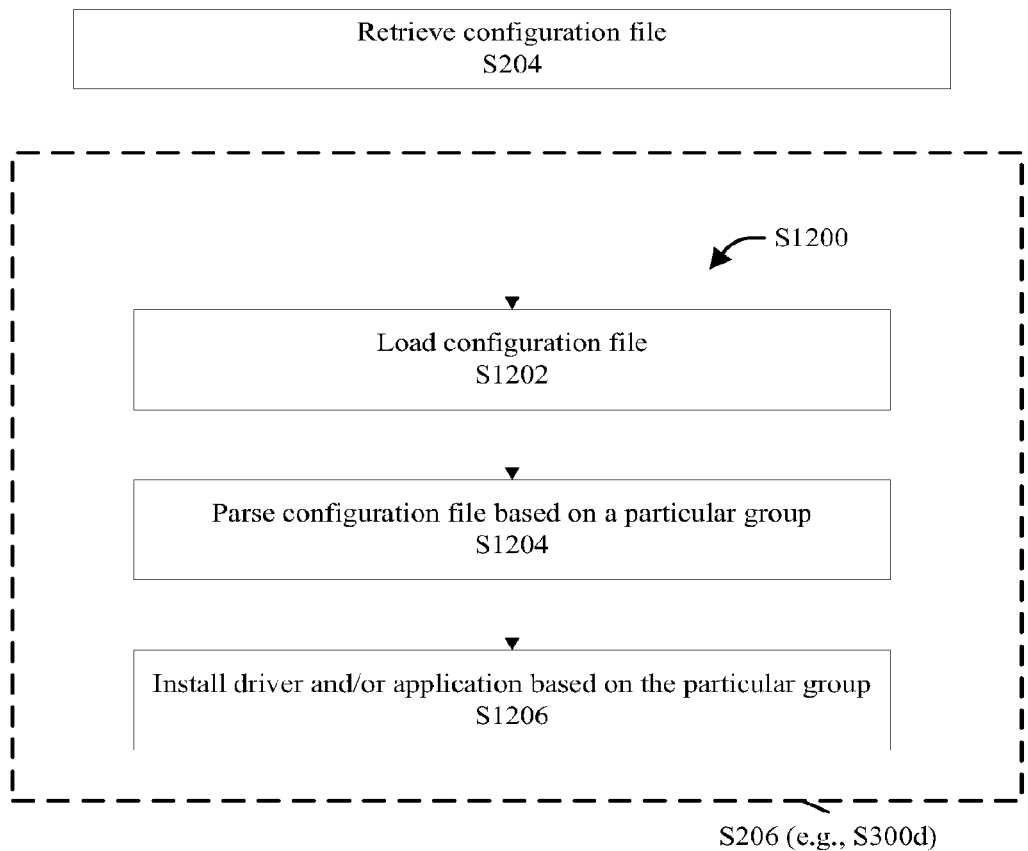
FIG. 12A illustrates an example of a method for applying a configuration file, in accordance with various aspects of the subject technology.

FIG. 12A illustrates an example of a method for applying a configuration file (e.g., Method C-1, S304d, S304e, S304f), in accordance with various aspects of the subject technology. For example, the apply settings module 414 and/or the configuration comparison module 412 may be used to implement method S1200 to install drivers and/or applications based on the various settings as specified in the configuration file. Method S1200 may comprise loading the configuration file (S1202). Method S1200 may comprise parsing the configuration file based on a particular group (S1204). Method S1200 may comprise applying the settings based on the particular group, such as by installing a driver and/or an application based on the particular group (S1206).

Figure 12B:
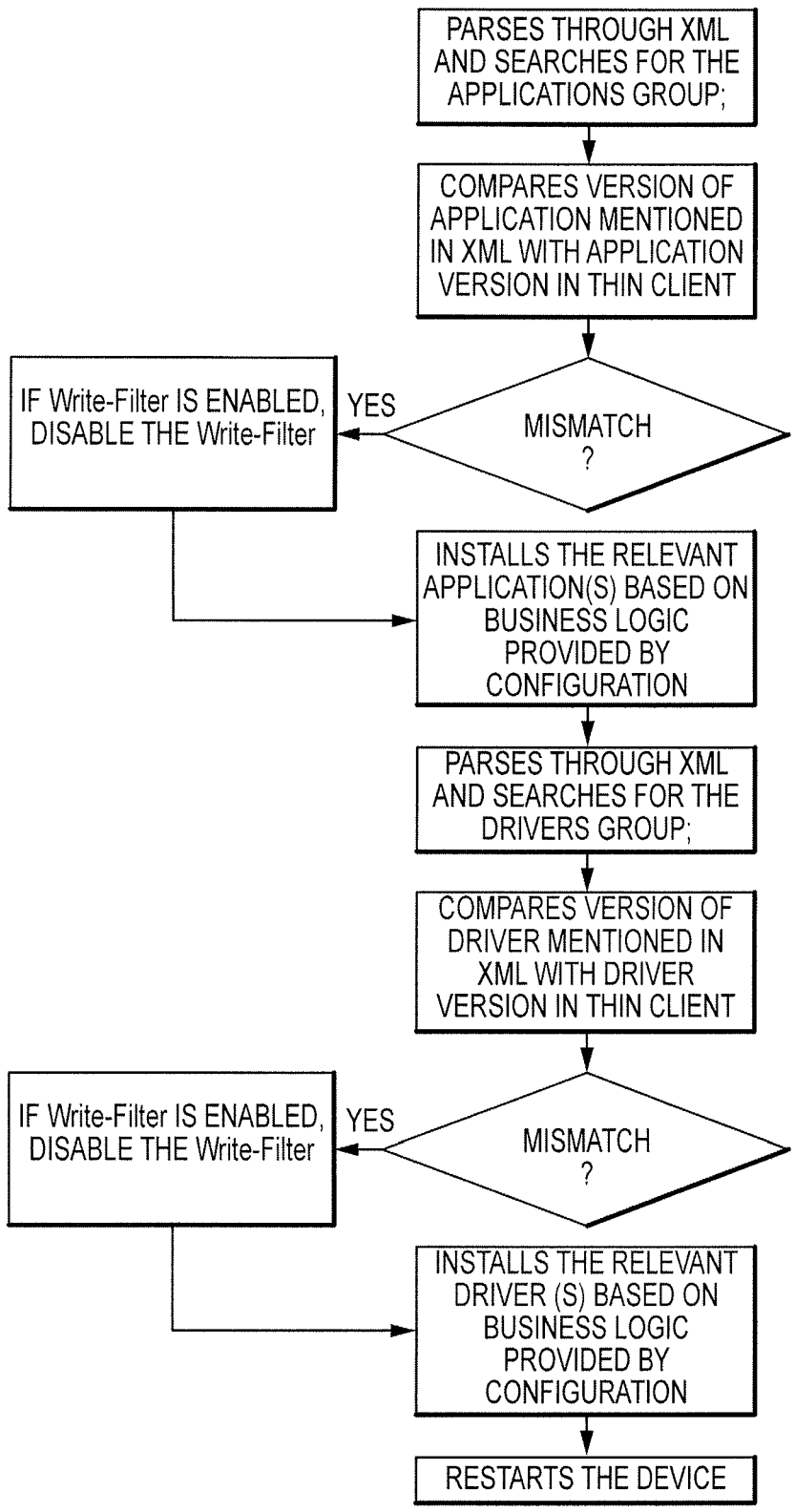
FIG. 12B illustrates an example of an implementation of the method shown in FIG. 12A, in accordance with various aspects of the subject technology.

As an example of an implementation of method S1200, the apply settings module 414 may load a configuration file and parse the configuration file for a particular group of settings related to drivers or applications to be installed on the client device 102. The apply settings module 414 may be configured to determine if the configuration file specifies a new version of a driver or an application to be installed. The configuration comparison module 412 may be configured to compare the new version of the driver or the application to a previous version of the driver or the application, respectively. If the new version is different from the previous version, then the apply settings module 414 is configured to: determine if the write-filter is enabled; disable the write-filter if it is enabled; and install, on the client device 102, the new version of the driver or the application while the write-filter is disabled. Doing so may advantageously allow the new version of the driver (e.g., driver module 424) or the application (e.g., application module 422) to remain on the client device 102 even if the client device 102 is restarted or shut down. FIG. 12B illustrates another example of an implementation of the method shown in FIG. 12A, in accordance with various aspects of the subject technology.

Figure 13:
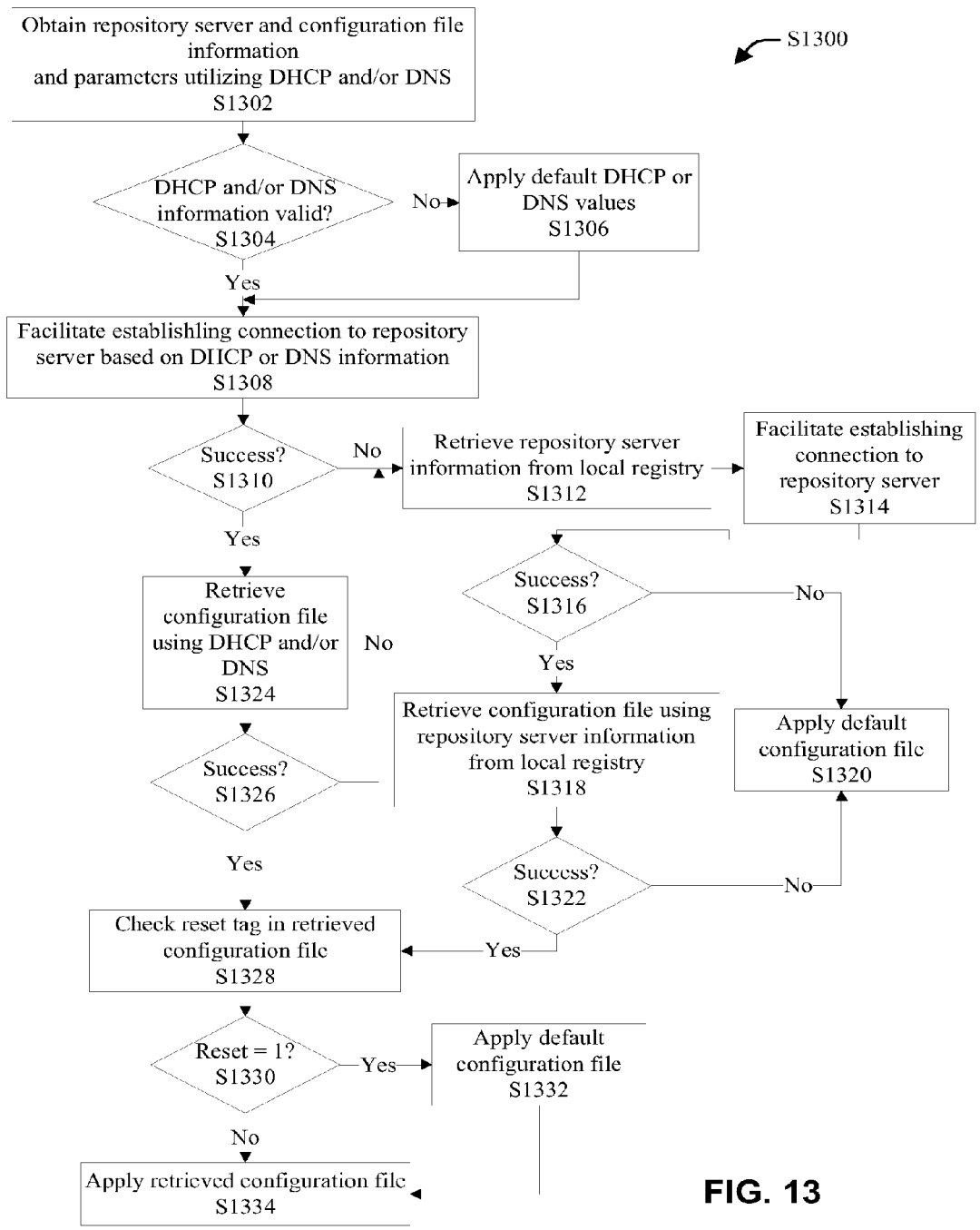
FIG. 13 illustrates an example of a method for retrieving a configuration file and applying a configuration file, in accordance with various aspects of the subject technology.

FIG. 13 illustrates an example of a method for retrieving a configuration file and applying the retrieved configuration file, in accordance with various aspects of the subject technology. In some aspects, the retrieval module 408 and the apply settings module 414 may implement method S1300. As shown by method S1300, a hierarchy of connection methods may be used to connect to the server 112 to retrieve a configuration file. For example, an attempt to retrieve the configuration file may use DHCP or DNS. If these connection methods are not successful, then repository server information from a local registry of the client device 102 may be used to attempt to retrieve the configuration file. If this fails, then a default configuration file is applied. Although a specific hierarchy is shown in FIG. 13, the subject technology is not limited to this hierarchy. Other suitable hierarchies having more or less connection methods and/or different arrangements may be utilized to retrieve the configuration file.

Installation of Software Modules

Figure 14A:
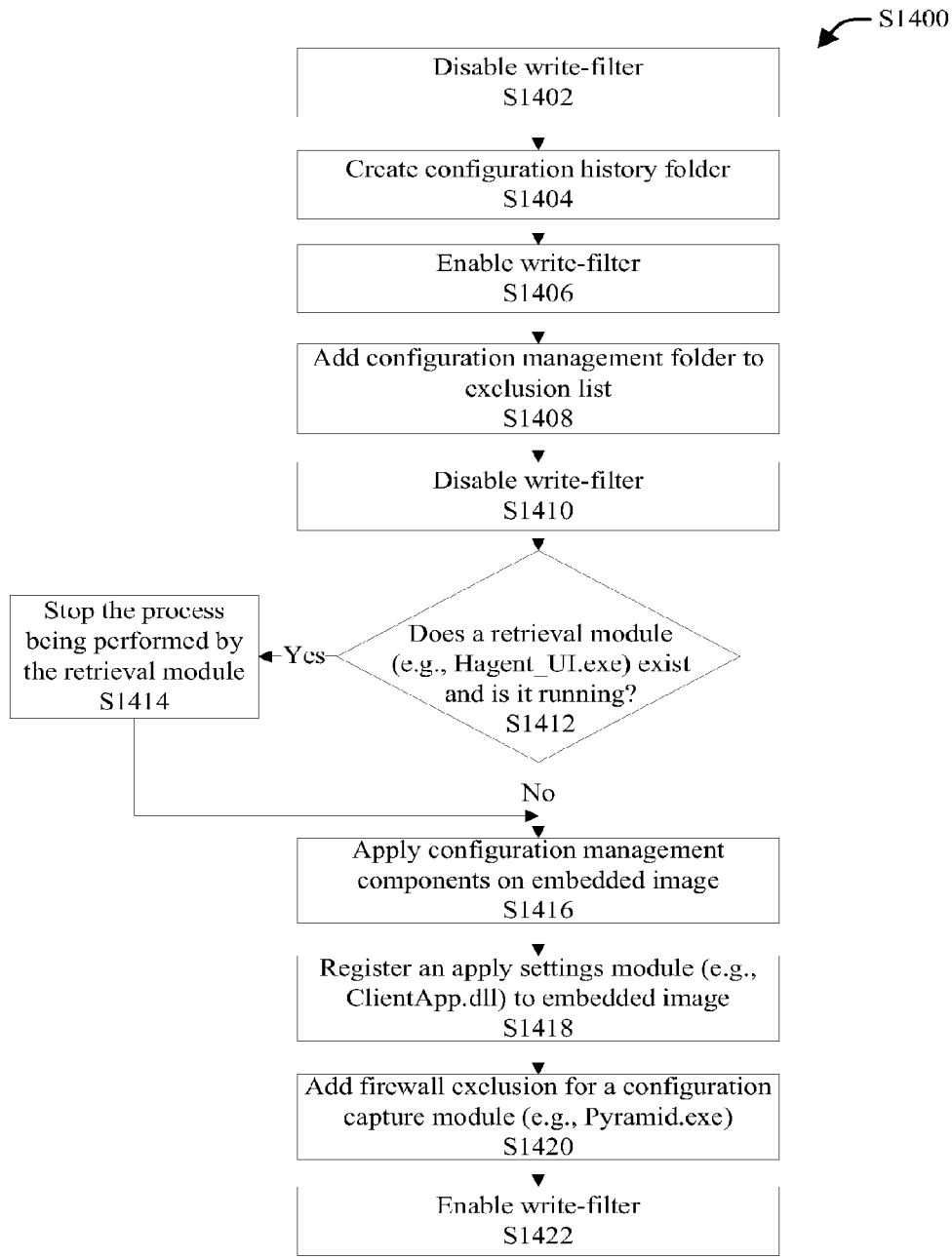
FIG. 14A illustrates an example of applying one or more components on an embedded image of a client, in accordance with various aspects of the subject technology.

FIG. 14A illustrates an example of installing software modules on a client device to allow process S202, process S204, and/or process S206 to be automatically executed on boot up of the client device 102, in accordance with various aspects of the subject technology. These software modules (or components) may be applied to an embedded image running on a client device 102, and may include folders, functions (or subroutines or code), and other components used for implementing process S202, process S204, and/or process S206. As a result of installing these components onto the embedded image, these components may remain on the embedded image even if the client device 102 is shut down or restarted. This is because these components are placed into an exclusion list. The write filter of the embedded image does not discard components placed into the exclusion list when the client device 102 is restarted or shut down. For example, the configuration history folder 416 may be installed on the embedded image. Thus, any files (e.g., previously applied configuration files) that are stored in this folder may remain on the client device 102 even if the client device 102 is restarted or shut down.

According to certain aspects, installing the configuration history folder 416 on the embedded image of the client device 102 is beneficial because it allows previous configuration files stored in the configuration history folder 416 to be compared with a newly retrieved configuration file while obviating the need to retrieve the previous configuration files from a location different from the client device 102. Such an arrangement may also obviate the need to store the previous configuration files at the different location in order to preserve a history of the configuration changes made to the embedded image if the client device 102 is restarted or shut down.

Figure 14B:
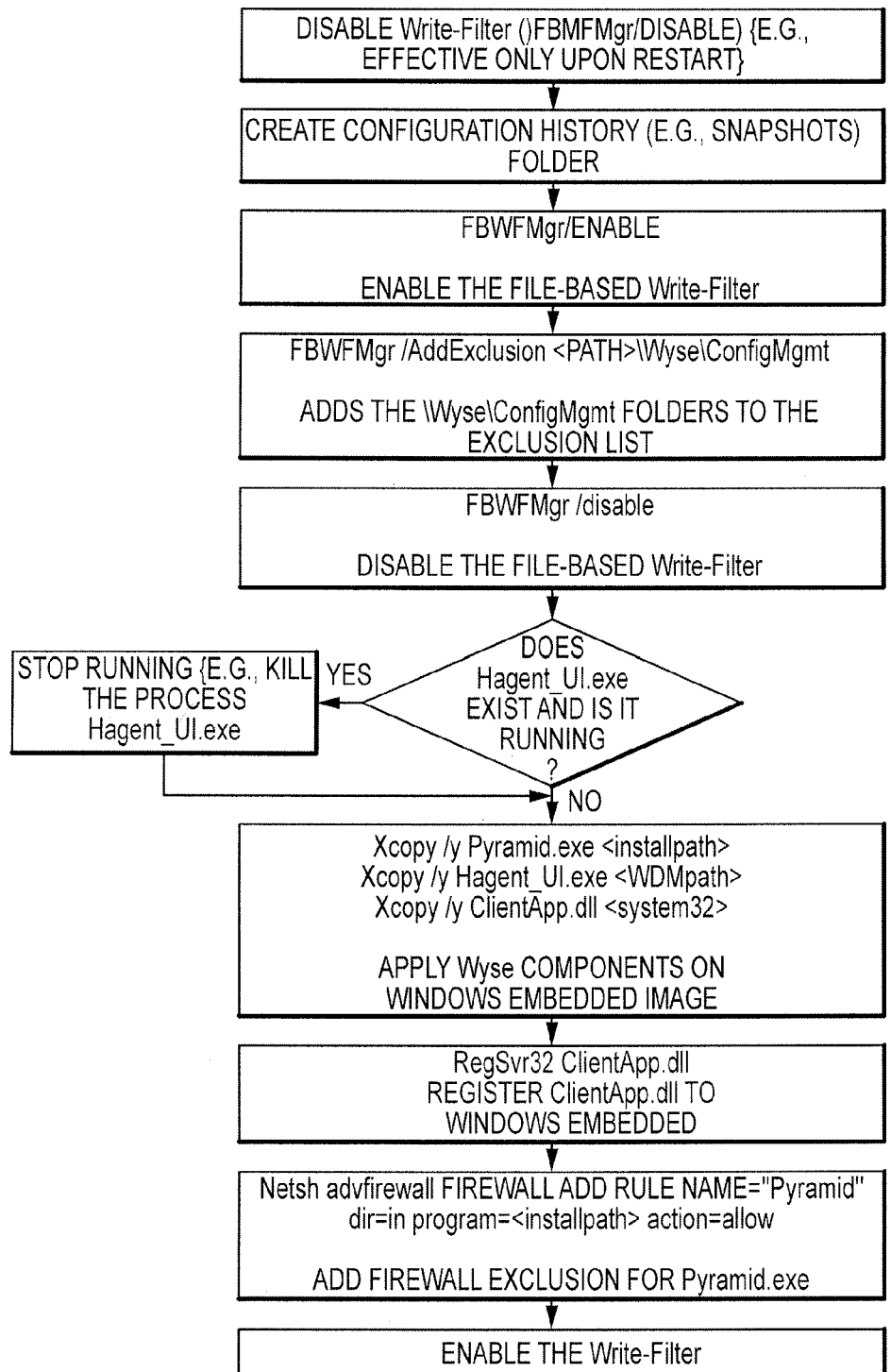
FIG. 14B illustrates an example of an implementation of the method shown in FIG. 14A, in accordance with various aspects of the subject technology.

In one example, a user interface application module, which may sometimes be referred to herein as Pyramid.exe, may be installed on the embedded image of the client device 102 to provide a user interface to allow a user to implement process S202, process S204, and/or process S206. FIG. 14B illustrates an example of an implementation of the method shown in FIG. 14A, in accordance with various aspects of the subject technology.

Examples of Screenshots

Figure 15A:
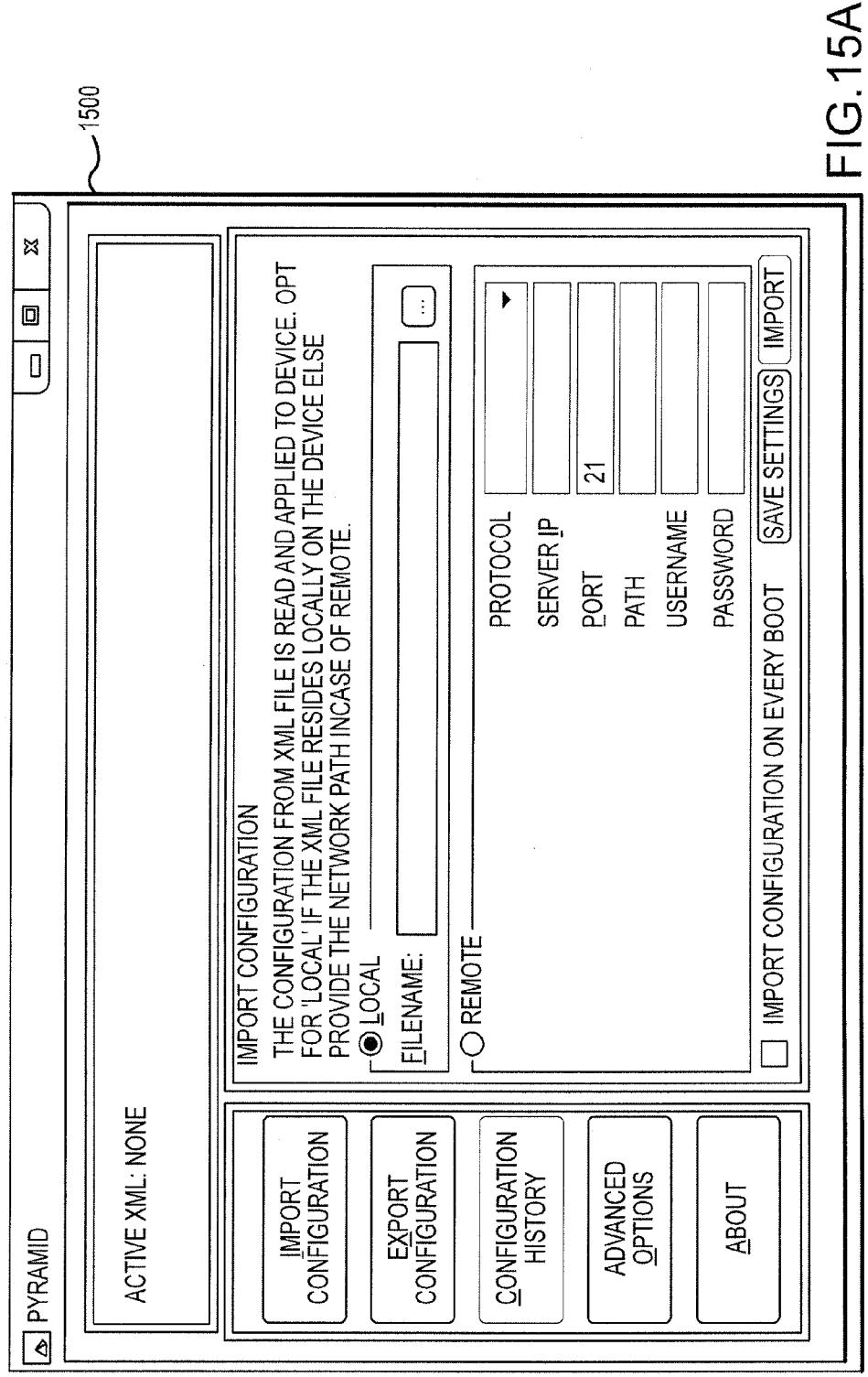
FIG. 15A illustrates an example of locally importing a configuration file, in accordance with various aspects of the subject technology.
Figure 15B:
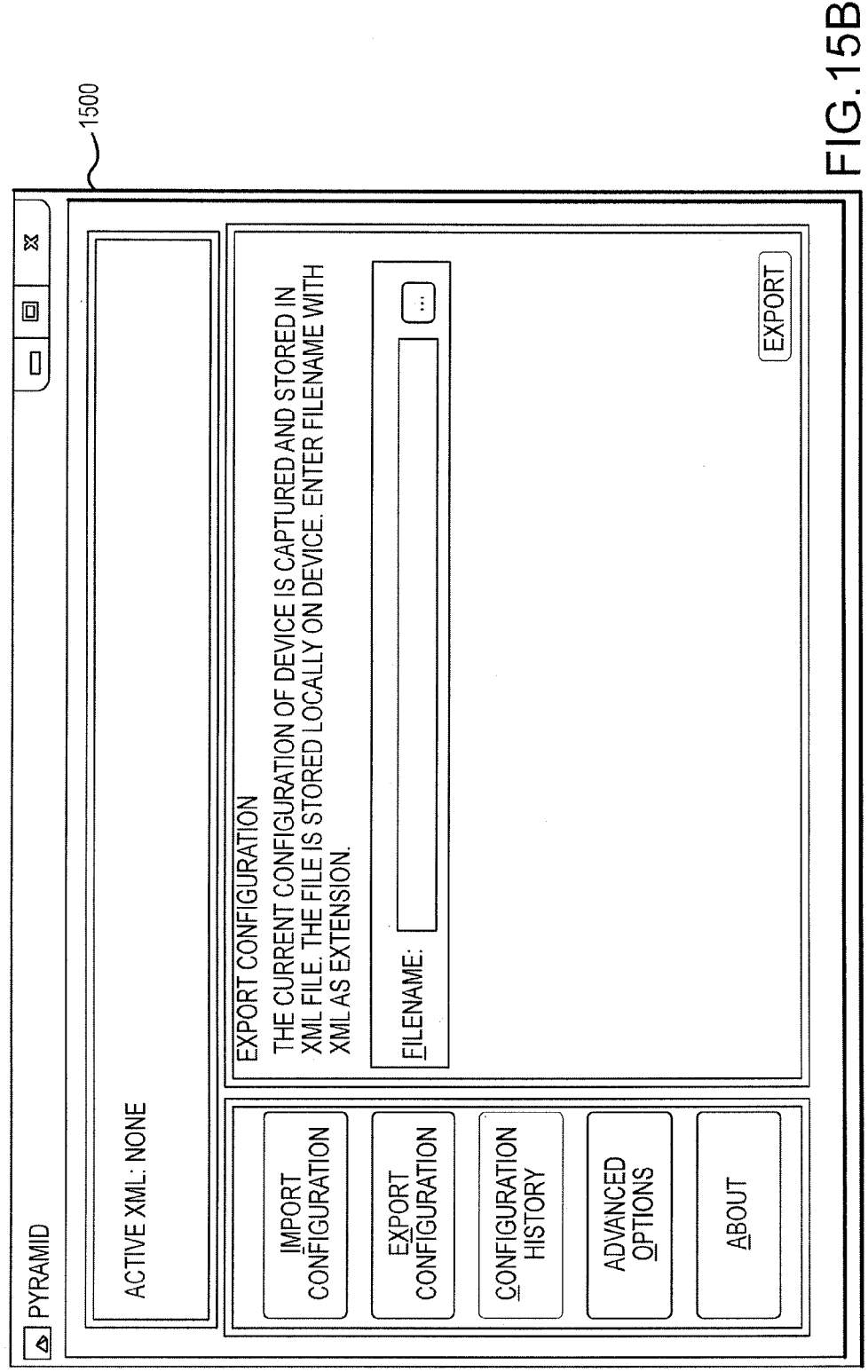
FIG. 15B illustrates an example of exporting a configuration file, in accordance with various aspects of the subject technology.

FIGS. 15A and 15B illustrate examples of screenshots of a user interface application module 1500 that a user may use to implement process S202, process S204, and/or process S206, in accordance with various aspects of the subject technology. In some aspects, the top horizontal window may be a status window, which may denote a present active configuration being implemented. It may also display the progress of exporting or importing a configuration file. In some aspects, the user interface application module 1500 may provide import configuration functionality, export configuration functionality, access to a configuration history (e.g., configuration history folder 416), and/or other advanced options. In some aspects, the advanced options may allow a user to push a configuration file. In some aspects, the advanced options may allow a user to configure DHCP tag options or other connection settings. According to certain aspects, the user interface application module 1500 may comprise a configuration capture module 402 and a portion of a retrieval module 408. The user interface application module 1500 may have access to a configuration history folder 416 and display the contents (e.g., a list of configuration files stored under the configuration history folder) to a user. The user interface application module 1500 may be utilized to implement at least portions of processes S202, process S204, and/or process S206.

FIG. 15A illustrates an example of locally importing a configuration file, in accordance with various aspects of the subject technology. In some aspects, Method B-4 (e.g., S310c) may comprise importing a default configuration file, such as from a USB drive. For example, activating the import configuration functionality may bring up the screenshot shown in FIG. 15A. Two options may be available, either local or remote. When the local option is selected, the controls under the local option may become enabled while the controls under the remote option may become disabled. Under the local option, a user (e.g., an administrator) can apply configuration settings from a configuration file onto a client device 102. To select the configuration file to import, the user may click on the browse button (e.g., the button with three dots) which may open a file-open dialog. The user can select a USB pen drive (if plugged in) also as a source. Once the configuration file is selected, an ApplyparserSettings function may be called and implemented by the apply settings module 414. At the bottom of the top horizontal window, a status message may be displayed while settings are being applied/imported.

When the remote option is selected, the controls under the remote option become enabled and the controls under local option become disabled. Selecting the remote option may make the client device 102 function in a stand-alone mode. The user can select either FTP, HTTP, or HTTPs as the protocol to be used. For example, the default FTP path may be <ftproot>\Wyse\WES7, if no path is specified in the path field. If the path is mentioned in the user module 1500, then the configuration file may be located under <ftproot>\Wyse\WES7\<UIPath> path, for example. If a local user has logged in to the client device 102, then the configuration file downloaded from a remote FTP server may be named Wes7Config.xml, for example. If the login is a domain login, then the <user>.xml file may exist in that FTP path.

In the case of HTTPs, a web server (e.g., a configuration application server 110) may have webDav installed. A virtual directory called Pyramid, for example, may be created. This may be the default context. The virtual directory may be nothing but an alias to a path. On the server, the Pyramid virtual directory can be c:\ConfigMgr, for example. Under the virtual path, another directory named Wyse\WES7, for example, may be created.

In the user interface application module 1500, if no path is mentioned, then a default path may be taken, such as c:\ConfigMgr\Wyse\WES7. If the administrator desires a different path, the different path may be created under c:\ConfigMgr\Wyse\WES7, for example. The customized path that the administrator has created may be entered under the path field in the user interface application module 1500.

According to certain aspects, if a user desires to persist settings across reboot, then a "Persist settings across reboot" option should be selected. If the user desires to persist a locally existing configuration file (e.g., preferably on the client device 102), then the local option should be checked, and a recently imported/applied configuration file may be applied on every boot.

In some aspects, the "Save Settings" button may save the settings into registry. This is useful if the user just wants to set the client device 102 for remote download and import. If the remote option is selected and the "Import" button is clicked, then the configuration file may be downloaded and imported immediately. If the "Persist settings across reboot" option is selected, then the configuration file may be downloaded and imported on every login (or on every boot). In some aspects, a password may be encrypted and stored in registry. If the username and password paths are empty, then anonymous login may be considered.

FIG. 15B illustrates an example of exporting a configuration file (utilizing, for example, Method A-1), in accordance with various aspects of the subject technology. A configuration file may be created by capturing settings of a client (e.g., S302a). In some aspects, the configuration capture module 402 may capture the settings of a client. For example, the configuration file may be created by taking a "snapshot" of the current settings of a client, and then creating the configuration file based on the captured client settings (e.g., S304a). According to certain aspects, the created configuration file may be compared with a validation configuration file (e.g., the validation file 406) to verify that the created configuration file is in a proper format according to the validation configuration file (S306a). The configuration file may then be exported (e.g., S308a), as shown in FIG. 15B.

According to certain aspects, clicking on the "Export Configuration" button may display the screenshot of the user interface application module 1500 shown in FIG. 15B. If a user wants to store a current device configuration into a configuration file, then the Export Configuration option is to be selected. The user can click on the browse button, which may open a "Save As" dialog box. The destination can be any folder within a configuration management folder installed as a component (e.g., as discussed with respect to FIGS. 14A and 14B) (not the configuration history folder 416) or on any external USB device (if plugged in). Exporting the configuration file may be useful, for example, when a configuration of a first client device 102 is desired to be copied onto a second client device 102. Thus, the configuration file of the first client device 102 can be exported and then applied to the second client device 102.

Figure 16:
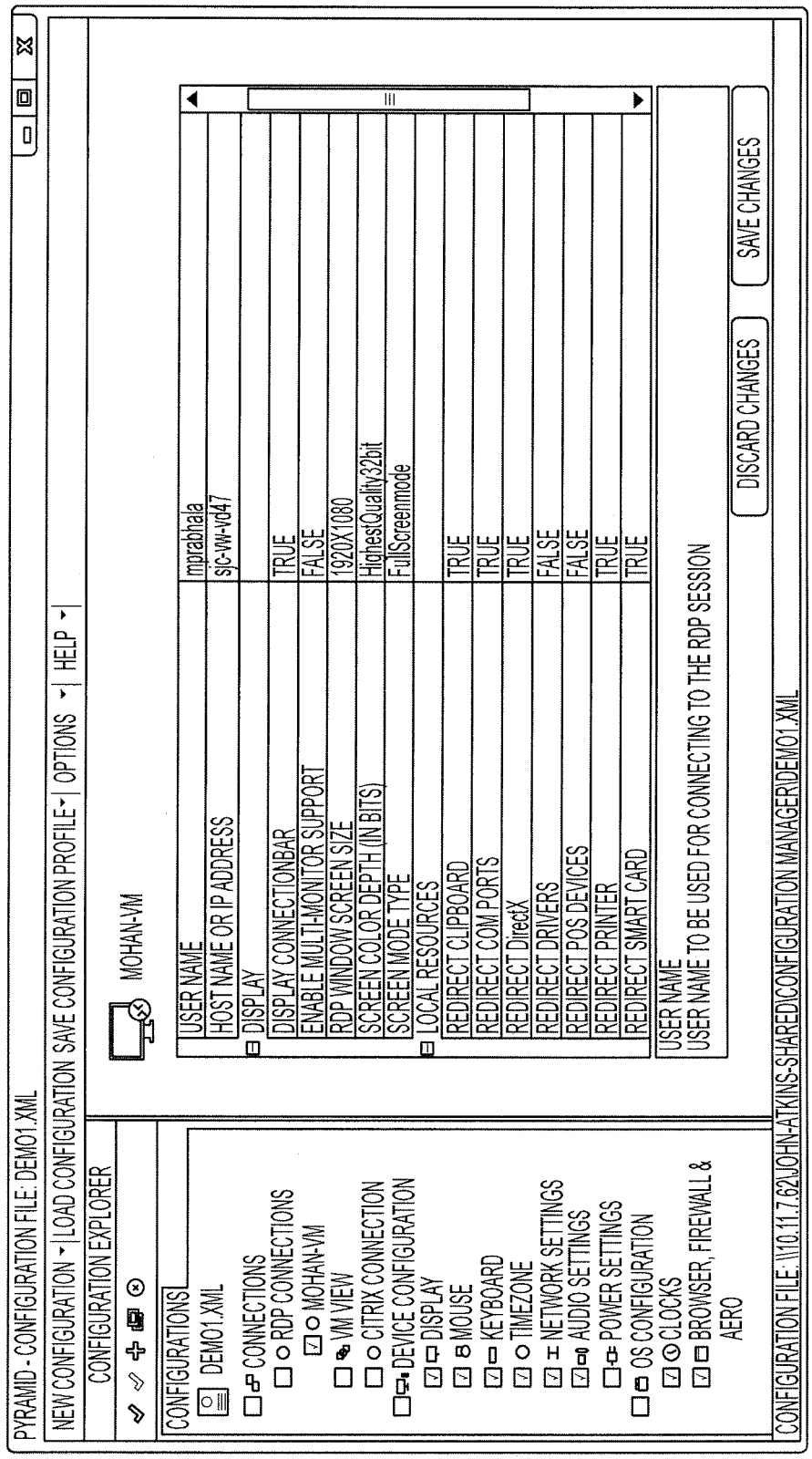
FIG. 16 illustrates an example of creating a configuration file, in accordance with various aspects of the subject technology.

FIG. 16 illustrates an example of creating a configuration file (e.g., Method A-2), in accordance with various aspects of the subject technology. In some aspects, the configuration application module 404 and/or 504 may be used to create and/or edit a configuration file. In some aspects, the configuration application module 404 and/or 504 may provide a management user interface, for example as shown in FIG. 16, to allow a user to adjust various settings specified in the configuration file. For example, the configuration application module 404 and/or 504 may be used to adjust display settings such as a wallpaper of an embedded image and/or the resolution of the display of the embedded image. Furthermore, as discussed above, the configuration application module 404 and/or 504 may beneficially allow a user to visualize a configuration change before the configuration application module 404 and/or 504 is used to create the configuration file that reflects the configuration change.

Figure 17:
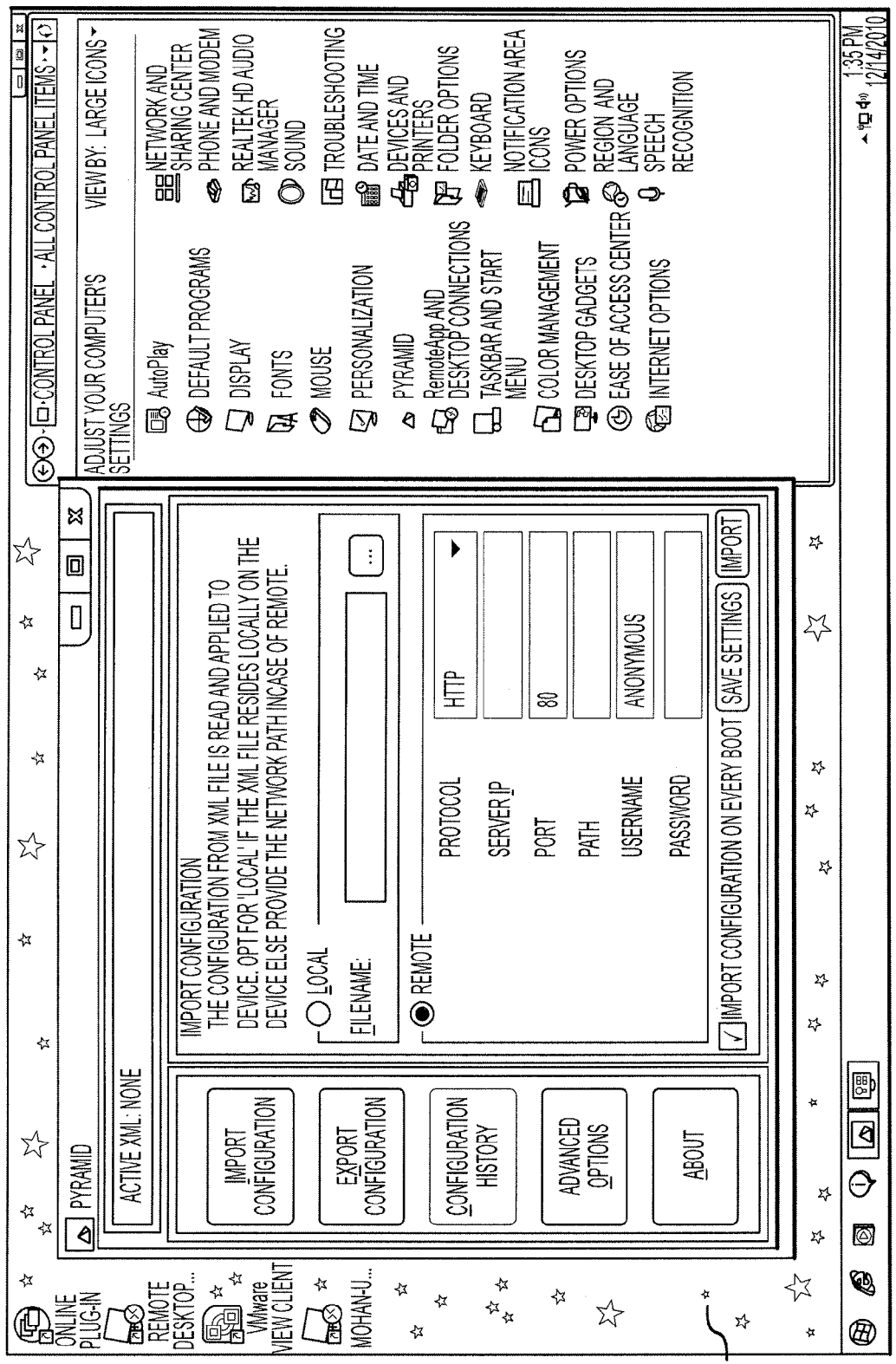
FIG. 17 illustrates an example of a screenshot of a desktop of a client, in accordance with various aspects of the subject technology.

FIG. 17 illustrates an example of a screenshot of a desktop of a client device, in accordance with various aspects of the subject technology. For example, a configuration file may be downloaded to the client device 102 in order to change the wallpaper 1700. In some aspects, this change may appear to a user of the client device 102 to persist across a reboot of client device 102. Other settings of the embedded image may be changed, including, but not limited to, connection settings, display settings, application settings, and driver settings. In this example, a user interface application module (e.g., Pyramid.exe) displays "Import Configuration," where "Remote" is selected, and an administrator can preset the type of protocol to be used, the IP address of a repository server, the port number, the path where a configuration file is located in the repository server, a username and a password.

Figure 18:
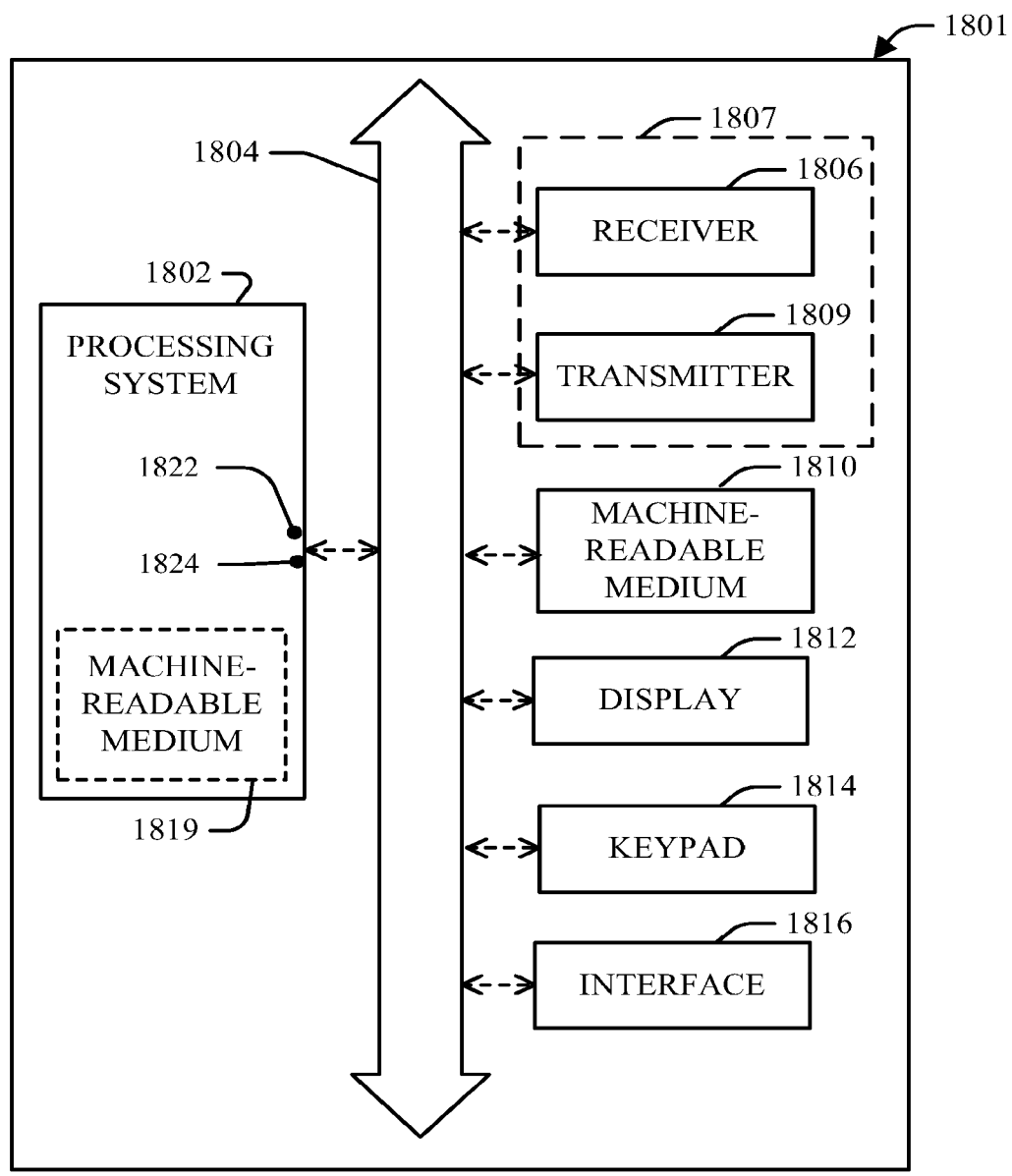
FIG. 18 is a conceptual block diagram illustrating an example of a system, in accordance with various aspects of the subject technology.

FIG. 18 is a conceptual block diagram illustrating an example of a system, in accordance with various aspects of the subject technology. A system 1801 may be, for example, a client device (e.g., client device 102) or a server (e.g., server 112, 104, 106, 108, 110). The system 1801 may include a processing system 1802. The processing system 1802 is capable of communication with a receiver 1806 and a transmitter 1809 through a bus 1804 or other structures or devices. It should be understood that communication means other than busses can be utilized with the disclosed configurations. The processing system 1802 can generate audio, video, multimedia, and/or other types of data to be provided to the transmitter 1809 for communication. In addition, audio, video, multimedia, and/or other types of data can be received at the receiver 1806, and processed by the processing system 1802.

The processing system 1802 may include a processor for executing instructions and may further include a machine-readable medium 1819, such as a volatile or non-volatile memory, for storing data and/or instructions for software programs. The instructions, which may be stored in a machine-readable medium 1810 and/or 1819, may be executed by the processing system 1802 to control and manage access to the various networks, as well as provide other communication and processing functions. The instructions may also include instructions executed by the processing system 1802 for various user interface devices, such as a display 1812 and a keypad 1814. The processing system 1802 may include an input port 1822 and an output port 1824. Each of the input port 1822 and the output port 1824 may include one or more ports. The input port 1822 and the output port 1824 may be the same port (e.g., a bi-directional port) or may be different ports.

The processing system 1802 may be implemented using software, hardware, or a combination of both. By way of example, the processing system 1802 may be implemented with one or more processors. A processor may be a general-purpose microprocessor, a microcontroller, a Digital Signal Processor (DSP), an Application Specific Integrated Circuit (ASIC), a Field Programmable Gate Anay (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1819) may include storage integrated into a processing system, such as might be the case with an ASIC. Machine-readable media (e.g., 1810) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. Those skilled in the art will recognize how best to implement the described functionality for the processing system 1802. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a non-transitory machine-readable medium, a machine-readable storage medium, or a non-transitory machine-readable storage medium. In one aspect, a computer-readable medium is a non-transitory computer-readable medium, a computer-readable storage medium, or a non-transitory computer-readable storage medium. Instructions may be executable, for example, by a client device or server or by a processing system of a client device or server. Instructions can be, for example, a computer program including code.

An interface 1816 may be any type of interface and may reside between any of the components shown in FIG. 18. An interface 1816 may also be, for example, an interface to the outside world (e.g., an Internet network interface). A transceiver block 1807 may represent one or more transceivers, and each transceiver may include a receiver 1806 and a transmitter 1809. A functionality implemented in a processing system 1802 may be implemented in a portion of a receiver 1806, a portion of a transmitter 1809, a portion of a machine-readable medium 1810, a portion of a display 1812, a portion of a keypad 1814, or a portion of an interface 1816, and vice versa.

Example of Implementation of Subject Technology

According to certain aspects, process S202, process S204, and/or process S206 may be run as stand-alone applications. In one example, the user interface application module 1500 does not support editing of a configuration file. In one example, the user interface application module 1500 does not support filtering of settings. In some aspects, the user interface application module 1500 may be provided as a control panel applet (e.g., Pyramid.exe) that is bundled along with an embedded image. In some aspects, a default name for the configuration file may be WesCfg.xml. In some aspects, a default configuration file (for factory defaults) and an active configuration file may be used.

In some aspects, a workflow of the subject technology may present two scenarios, one as the control panel applet scenario, and another as a stand-alone scenario. In the control panel applet scenario, the control panel applet can be used to: 1) capture settings from a device and write it to a configuration file residing locally or on a USB pen drive; and 2) apply the settings read from the configuration file residing locally or on the pen drive onto a device. Clicking on a "Capture" button of the control panel applet may perform the capture settings functionality, and clicking on an "Apply" button of the control panel applet may perform the apply settings functionality.

In the stand-alone scenario, DHCP option tags may be set on a proper DHCP server (e.g., DHCP server 108) or a proxy DHCP server. Once the client device 102 boots up, the retrieval module 408 may query the DHCP tag options and download the configuration file from the repository server 104 using HTTP. Once the file is downloaded, the apply settings module 414 may call an export function (e.g., ClientApp.dll's exported function) to apply the settings on to the client device 102. A file server path can be configured using a user interface (e.g., the user interface application module 1500) present on the client device 102. The UI may take the file server path along with a port number to specify whether it will be HTTP or HTTPS. According to certain aspects, the configuration file can be derived from capturing the client device 102 settings or built from scratch using the configuration application module 404 and/or 504.

According to certain aspects, the user interface (e.g., a user interface application module 1500) may provide the following functionality: a) apply to client device 102 the settings from the a configuration file; b) save the client device 102 settings to a configuration file (e.g., capture settings); c) reset client device 102 to a default configuration; d) provide a status output; and e) provide configuration histories, which may sometimes be referred to herein as snapshots.

According to certain aspects, the apply settings functionality may comprise importing a configuration file and/or reading settings from the configuration file and applying the settings to the client device 102. The capture settings functionality may comprise writing the captured settings to a configuration file and/or exporting the settings. In some aspects, a no-filtering option may be available. According to certain aspects, the reset functionality may comprise applying default settings to the client device 102 internally, which means the settings of the default configuration file (e.g., may be named WyseDefCfg.xml) is applied to the client device 102. In some aspects, the provide configuration histories functionality may comprise displaying a list of configuration histories (e.g., snapshots) present on the client device 102. A user interface may be provided that will provide an option to create a snapshot and/or to revert to a snapshot.

According to certain aspects, the apply settings module 414, the reset check module 410, and/or the configuration comparison module 412 may implement ClientApp.dll and export the following functions: ReadDeviceSettingstoXML; ApplyParserSettings; RevertToSnapshot; ListSnapshots. The ReadDeviceSettingstoXML function may read a client device 102's settings and write it to a configuration file. The filename may be passed as a parameter. The ApplyParserSettings function may read settings from a configuration file (which is passed as a parameter), and apply the settings to the client device 102. These two functions may be called, for example, by the control panel applet as well as from the retrieval module 408 during the retrieval of configuration settings. The ClientApp.dll may be used by the configuration application module 404 and/or 504.

In some aspects, the RevertToSnapshot function may take a snapshot filename as an input parameter, and in turn, call the ApplyParserSettings function. The ListSnapshots function may return the list of all snapshot files that are residing on the client device 102.

According to certain aspects, an XSD file may be used to express a set of rules to which an XML document (e.g., an XML configuration file) may conform in order to be considered valid according to that schema. The XSD file may be named as WESTypes.xsd, for example.

In some aspects, the retrieval module 408, which may include Hagent_UI.exe, may be modified to query for DHCP options tags to download the configuration file from a repository server (e.g., repository server 104) and apply the settings onto the client device 102.

According to certain aspects, the configuration file may be an XML file. In some aspects, the XML file can have three main sections: 1) connections section; 2) device configuration section; and 3) an OS configuration section.

The connections section may comprise settings related to RDP, ICA, view types of connections, and other suitable connections. Examples of settings for RDP connections include:
    screen mode id
    use multimon
    desktopwidth
    desktopheight
    session bpp
    winposstr
    compression
    keyboardhook
    audiocapturemode
    videoplaybackmode
    connection type
    displayconnectionbar
    disable wallpaper
    allow font smoothing
    allow desktop composition
    disable full window drag
    disable menu anims
    disable themes
    disable cursor setting
    bitmapcachepersistenable
    full address
    audiomode
    redirectprinter
    redirectcomports
    redirectsmartcards
    redirectclipboard
    redirectposdevices
    redirectdirectx
    autoreconnection enabled
    authentication level
    prompt for credentials
    negotiate security layer
    remoteapplicationmode
    alternate shell
    shell working directory
    gatewayhostname
    gatewayusagemethod
    gatewaycredentialssource
    gatewayprofileusagemethod
    promptcredentialonce
    use redirection server name
    devicestoredirect
    drivestoredirect Examples of settings for ICA connections include:
    Citrix server IP/friendly name
    Systray icon enable/disable Examples of settings for VMware View connections include:
    ServerURL
    DomainNarne
    Username
    Password
    Desktopname
    Desktoplayout
    Desktopprotocol
    LoginasCurrentUser
    Brokerhistory
    mrBroker
    mrAutoConnect
    mrUsemame
    mrDomain According to certain aspects, the device configuration section may comprise settings related to displays, mice, keyboards, time zones, audio, networks, power, wireless, and other suitable settings. The settings related to displays may include:
    Resolution with color depth
    Display size
    Display orientation
    Extended monitor The settings related to mice may include:
    Hide mouse pointer while typing
    Mouse speed
    Swap mouse buttons
    Enable Pointer trails Configure mouse wheel scroll
Double click speed
Snap pointer to default button
Mouse click lock
Mouse click lock time
The settings related to keyboards may include:
Layout
Repeat Delay
Repeat rate
Keyboard preferences
Menu access
The settings related to time zones may include:
ZoneName
StandardName
DaylightNarne
The settings related to audio may include:
Default audio output (lineout) volume and format
Capture (mic) volume and format
Default sounds and/or Sound theme
The settings related to networks may include:
Static IPv4 address
Subnetmask
Default gateway
DNS server
The settings related to power may include:
Power plan
Dim/Sleep/Turnoff/brightness settings
Custom power plan
The settings related to wireless may include:
Network Name
Security type
Security key
Encryption type
Network profile
PIPS compliance
The OS configuration section may include the following settings to be considered:
RAM Disk Size
Enable/Disable USB ports
Windows firewall
Enable/Disable aero theme
Change aero theme, wallpaper, account picture
Configure additional clocks
Computername, domain name, user account name, password, autologon
Date/Time format
IE settings
Default IE homepage
IE Favorites
Security levels for each IE zone
IE proxy settings An operating system that may support the subject technology may include WES 7.

Example of Implementation of Subject Technology

Aspects of the subject technology enable small businesses (SMBs) to have a lightweight application to manage Windows-based thin clients. To achieve this objective, SMBs may perform four activities: 1) configuration management; 2) imaging; 3) packaging; and 4) scheduling. Aspects of the subject technology provide configuration management for SMBs. One objective of configuration management is for information technology (IT) administrators to easily configure their Windows based thin clients and get them configured for their users in the least amount of time possible. Currently, this may be done via customizations in the image, which may be pulled and then deployed. This can become time consuming because image files (e.g., Windows-based image files) are large. In addition, customization changes may occur frequently per user, and hence, this consuming process may need to be repeated. Aspects of the subject technology provide configuration management, wherein only a single image from the factory is installed onto the thin clients, while all customizations may be pushed from a single configuration file rather than an entire image.

According to certain aspects of the subject technology, a configuration manager may provide an out-of-box experience, supportability, and personalization. With respect to the out-of-box experience, upon IT administrators receiving embedded thin clients (e.g., Windows embedded thin clients), customers are able to boot directly into Windows, and have all global configurations pushed onto the Windows thin clients, from either a local or a remote source. A customer may also be able to create a configuration of their choice, by exporting an already configured image (via OS) or by using a configuration editor application (e.g., Configuration Application Module 404 and/or 504). In some aspects, the user or IT administrator does not have to update the image to get any general functionality working With respect to supportability, an IT administrator may be able to keep supporting changes in global or user configurations throughout the support lifecycle of a thin client. This may also apply to any configuration changes needed once the support lifecycle for a particular user is over. Features are provided that allow for the IT administrator to easily keep track of any configuration changes made on a particular device. Furthermore, in addition to configurations related to the device, the IT administrator may also change policies on the client that are configuration manager specific to allow for flexibility and fault tolerance.

With respect to personalization, upon a user logging into his/her IT environment, thin clients may gather domain joined user specific profile's configurations, either locally and/or from a network. The granularity of OS, device, and network settings may allow for the user to have a completely personal experience on a thin client. The user may be productive the moment the user logs onto the thin client because the user-specific corporate or preferred configurations may have already been applied with little or no down-time.

The following scenarios may be implemented by the subject technology. In a first scenario, an administrator has three thin clients in his possession. He opens one thin client and configures this client as he desires (e.g., he may change the wallpaper, RDP connecting via TS, and IE favmites). He can export the configuration file and place it on an FTP server (which can be, for example, the repository server 104 and/or the configuration application server 110). He can then open the other two clients, connect them via an Ethernet cable and power the two clients up. The remaining two clients may pick the configuration posted on the FTP server through DHCP.

In a second scenario, an administrator has three thin clients that are powered up and already domain joined. Three separate configuration files for three users, respectively, have already been created. These configuration files have different wallpapers, RDP connections (through TS), and IE favorites from one another. The administrator may place the configuration files in respective user's specific folders on an FTP server (which can be, for example, the repository server 104 and/or the configuration application server 110). He may log in to the three clients as three different users. Each of the three clients may pick up the user configuration specific to the user.

In a third scenario, an administrator may receive a support request from a user to add a new browser favorite and to lower the display resolution (e.g., to 1280×1024 pixels). The administrator may obtain the specific user configuration file, open it up using the configuration capture module 504, change the display resolution to the desired display resolution, and add in the web browser favorite. The administrator may save this configuration, and place the corresponding configuration file in the user's specific folder on an FTP server (which can be, for example, the repository server 104 and/or the configuration application server 110). The administrator may then ask the user to log off and log in again. The updated user settings may then be picked up by the thin client of the user using DHCP.

In a fourth scenario, an administrator may receive another support request from the same user in the third scenario. The user may not like the new resolution and request the old resolution to be re-applied. The administrator may then ask the user to open the control panel applet (e.g., the user interface application module 1500), click on the configuration history tab, click on the previous configuration history, and hit apply in order to return the user's settings back to the previous configuration.

In a fifth scenario, a user has a mobile thin client and would like to access his configuration from his home network. To achieve this, the specific user's configuration file is placed on an HTTP server (on DMZ) by the administrator (e.g., this contains the same configuration as the user.xml.) The user may log onto his thin client (e.g., which may be a laptop) and wait for the client to connect over wireless to the home network. The new updated user settings may be picked up by the mobile thin client by HTTPS on the home network.

In a sixth scenario, a user now has changed his office location permanently and no longer needs the thin client he is using. Thus, the administrator may take back the client. The administrator may configure the same client for another new user. The administrator may open up a stand-alone configuration manager (e.g., the configuration application module 404 and/or 504) and make relevant changes for that specific new user (e.g., settings related to RDP, IE, the wallpaper). The configuration file, as created or edited by the stand-alone configuration manager, may indicate that the thin client wipe out any previous settings before applying the settings from this particular configuration file. The administrator may copy the configuration file onto a USB key, open the control panel applet, select the import configuration option, select the local option, specify the path of the configuration file, and click on the 'Import' button. In this case, the existing thin client configuration may be wiped out, and the new configuration may be applied locally from a USB key.

According to certain aspects, a Windows thin client may obtain and apply configurations from remote locations (e.g., FTP server and/or HTTP server) via DHCP, DNS, and/or other suitable methods. In addition, an administrator may be allowed to place the location of the FTP or HTTP server via an IP address or a friendly name. An appropriate message (e.g., a balloon tip at the bottom right of a system tray of an OS) may be displayed to the user when a configuration is being applied (and hence the system state is being changed).

In some aspects, DHCP may be used by default when obtaining configurations from remote locations. If DHCP does not work via the default option tags, then the location (e.g., via the IP address or the friendly name) specific in the client may be used. If even the location specified in client does not work, then local default settings may be applied.

According to certain aspects, a thin client may also have the ability for an administrator to configure the client locally using user interfaces provided by the operating system and to export that configuration locally onto a flash or a USB drive.

According to certain aspects, a configuration manager, by default, may be able to push updated configurations to an already configured device. These updates may be subsets of a full configuration. When pushing updated configurations, only those settings that are part of the update may change without changing the overall state of the device. In some aspects, configurations being pushed on thin clients may also be able to reset (e.g., 'wipe-out') the existing configuration on the thin clients and then apply the new configurations. The particular configuration may depend on the 'reset' tag that comes from the configuration definition file. These features may be implemented, for example, using method S900.

In some aspects, the configuration history may be exposed to an administrator per thin client. This may be the last five successfully applied unique configurations on a particular thin client, although more or less configurations may be stored in the configuration history (e.g., in the configuration history folder 416). An administrator may be able to select any configuration exposed as part of the configuration history and successfully apply it. The configuration history may store configurations for domain joined and non-domain-joined users. According to certain aspects, no two configurations in the configuration history may be the same (e.g., if the exact same configuration file is being applied over and over on the same thin client, multiple entries of the same configuration may not need to be stored within the configuration history and only the time stamp of the applied configuration may need to be updated).

According to certain aspects, an option to apply the last successfully applied configuration may be allowed. In some aspects, an application (e.g., the configuration application module 404 and/or 506) for IT administrators to create, view, and edit/update configuration files may be provided to ensure ease-of-use in working with the number of settings/configurations by providing a human readable format for all settings.

According to various aspects of the subject technology, a domain joined user may be able to access or set his/her preferred settings either locally or from a network. Local settings may be specific to hardware, such as preferred graphics resolution, keyboard/mouse settings etc. Network level settings may be specific to user profile, the presentation layer, and domain. This may allow users to log in to the same terminal, and give each user a personalized experience reflective of the user's preferences for as long as the user uses that terminal.

Settings that may be applied on a client may fall into the following categories: 1) presentation layer settings (e.g., ICA, RDP, View, etc.); 2) device settings; and 3) OS settings. In some aspects, all chosen settings by an administrator may be applied when a system of clients is locked and before users see their desktops upon logging in. In some aspects, the settings may be applied in less than ten seconds.

With respect to presentation layer settings, a user's presentation layer environment and settings (e.g., .rdp file) may be placed on the user's desktop. An administrator may be able to allow a thin client to boot in a way such that the administrator-selected protocol may only be used as a connection broker upon logging in. This may ensure that the USB stacks support for View, RDP, and ICA do not conflict when using software such as HP remote graphics (e.g., RGS).

The following presentation layer settings for RDC (e.g., based on RDC 7) may be supported:
   screen mode id
   use multimon
   desktopwidth
   desktopheight
   session bpp
   winposstr compression
keyboardhook
audiocapturemode
videoplaybackmode
connection type
displayconnectionbar
disable wallpaper
allow font smoothing
allow desktop composition
disable full window drag
disable menu anims
disable themes
disable cursor setting
bitmapcachepersistenable
full address
audiomode
redirectprinter
redirectcomports
redirectsmartcards
redirectclipboard
redirectposdevices
redirectdirectx
autoreconnection enabled
authentication level
prompt for credentials
negotiate security layer
remoteapplicationmode
alternate shell
shell working directory
gatewayhostname
gatewayusagemethod
gatewaycredentialssource
gatewayprofileusagemethod
promptcredentialonce
use redirection server name
devicestoredirect
drivestoredirect The following presentation layer settings for ICA (e.g., based on ICA 11.2) may be supported:
  Citrix server IP/friendly name
  Systray icon enable/disable
  Logon mode
  Window size
  Color depth The following presentation layer settings for VMWare View may be supported:
  View connection server
  Port
  Secure connection
  AutoConnect According to various aspects of the subject technology, a primary purpose of OS settings may be to ensure that the operating system is in a best possible state for an end-user to use and be productive, and for an IT administrator to reduce support calls/costs. Whenever applicable, the OS settings listed below may have volatile/persist options. The volatile option may imply that the respective setting does not persist upon reboot, while the persist option may imply that the respective setting persists upon reboot.

According to certain aspects, the following OS settings may be supported:
  Date, Time, Time Zone, Additional Clocks (½) and respective time zones and clock names
  Network printer authorized for a specific user's access (may involve installing custom printer driver)
  Display size (e.g., 100%, 125%, custom size, etc.),
  Graphics resolution
  Display orientation (e.g., landscape, portrait, flipped portrait, flipped landscape)
  Extended monitor (e.g., duplicate on both monitors, extend on the first monitor or the second monitor, display on only one monitor, display on only the second monitor, etc.)

The following OS settings with respect to a web browser such as IE may be supported:
  Default IE homepage
  IE favorites
  Security levels for each IE zone (High I Medium I Low)
  IE proxy settings—proxy server and port, with or without bypass
  Kiosk mode The following OS settings with respect to a keyboard may be supported: keyboard repeat delay, repeat rate, and cursor blink rate.

The following OS settings with respect to mouse settings may be supported:
  Button configuration (light/left)
  Double-click speed
  Clicklock
  Mouse pointer scheme
  Pointer shadow,
  Pointer trails (w/ or w/o enhance pointer precision)
  Automatically move pointer to default button in dialog The following OS settings with respect to IP v4 may be supported:
  Static 1Pv4 address
  Subnet mask
  Default gateway
  DNS sever The following OS settings with respect to wireless settings may be supported:
  Network name
  Security key
  Security type
  Encryption type
  Network profile
  PIPS compliance The following OS settings with respect to audio settings may be supported:
  Default audio output (lineout) volume and format
  Capture (mic) volume and format
  Default sounds The following OS settings with respect to power settings may be supported:
  Power plan
  Dim/Turn off/Sleep/brightness settings for chosen power plan for battery and plugged in scenarios
  Ability to provide custom power plan The following OS settings may be supported:
  Default RAM disk size
  Default aero theme, background, wallpaper, account picture
  Completely Disable/Enable USB ports to run on client
  Date/Time format (short/long)
  Reset configuration ("wipe-out" existing configuration)
  Location setting
  System and Keyboard language
  Computer name, domain name, user account name, custom password for user, autologon for <username> with default password
  Windows firewall on/off
  Client side configuration manager import parameters
    FTP/HTTP protocol
    IP address I friendly name of server Apply last successfully applied configuration DHCP option tags for ftp, server ip address, port, protocol, vendor tag According to various aspects of the subject technology, the configuration manager provided may provide two applications with user interfaces: 1) a stand-alone application (e.g., the configuration application module 404 and/or 504) and 2) a control panel applet (e.g., the user interlace application module 1500 comprising the configuration capture module 402, the retrieval module 308, the reset check module 410, the configuration comparison module 412, the apply settings module 414, and/or the configuration history folder 416.)

In some aspects, the stand-alone application may be used primarily for creating and/or editing configurations (e.g., based on the settings listed above), and also for viewing already created configurations. This application may run on various Windows operating systems, including Windows 7 (Professional and/or Enterprise), WEST, Windows Server 2003, Windows Server 2008, and Windows Server 2008 R2. In some aspects, the stand-alone application, when running on a PC or a server based Windows OS, may only run in create, edit, and view modes. In some aspects, when the stand-alone application is running on a Windows thin client, for example, two additional functions may be exposed: 1) capture thin client settings and display them in a human readable format; and 2) apply settings from any configuration file.

According to certain aspects, the stand-alone application may support configuration history functionality. For example, the last ten successfully created/viewed/edited configurations on a non-thin-client device may be stored, although a greater number or a fewer number of configuration histories may be stored. On a thin client device, the stand-alone application may leverage the last five successfully applied configurations (e.g., same as what is exposed in the control panel applet, as described below).

According to various aspects of the subject technology, the control panel applet may be used primarily for: 1) importing (applying) configurations from local and remote locations; 2) exporting current system configuration to a local flash or USB drive; and 3) viewing/applying configurations stored in the configuration history (e.g., configuration history folder 416). For importing (applying), an administrator may be able to provide the actual IP address or friendly name of a FTP/HTTP server. For exporting, the configuration may be exported to a local storage or USB drive. However, the configuration may be exported to other suitable locations. For viewing/applying, the configuration history may be exposed to an administrator per thin client, as discussed above. Furthermore, options to specify custom DHCP option tags may be available in this the control panel applet for vendor tag, port, protocol, IP address etc.

Example of Implementation of Subject Technology

According to various aspects of the subject technology, a configuration manager is provided that may be compatible with WES 7 clients, WES 2009 clients, or other suitable clients. In some aspects, a user interface application module (e.g., the user interface application module 1500, which may also be referred to herein as Pyramid.exe) may exist under c:\Program Files \Wyse\ConfigMgmt, for example. In some aspects, this path is ensured to be in the file-based write-filter exclusion list. A configuration history folder (e.g., a snapshots folder) may exist under c: \Program Files \Wyse\ConfigMgmt, for example. A default xml configuration file WES7Config.xml may restore to factory defaults.

The ClientApp.dll and associated bitmaps may exist under windows \system32. According to certain aspects, the registry entries listed below exist:

```
[HKEY_LOCAL_MACHINE\Software\Wyse\ConfigMgmt]
"ActiveSnapshot"=""
"ActiveXML"=""
"DefaultURL"="Wyse\\WES7\\"
"Port"="80"
"Preserve"="!"
"Protocol"="http"
"ServeriP"=""
"URL"=""
"Username"="anonymous"
"Password"=""
"localXML"=""
"DHCPServerTag"="161"
"DHCPPathTag"="162"
"DHCPUsernameTag"="184"
"DHCPPasswordTag"="185"
"DHCPProtocolTag"="183"
```

In some aspects, the user interface application module may be made available to all users. According to certain aspects, XML may be designed to describe data and to focus on what data is. The tags in XML may be not predefined. A user can define his/her own tags. XML may be self-describing, and may use a DTD (Document Type Definition) to formally describe data. According to certain aspects, the configuration file may be in an XML format, and may be broadly divided into four main tags: 1) connections; 2) OS configuration; 3) device configuration; and 4) common configuration.

In some aspects, the connections tag may describe data related to RDP, View type of connections, and other suitable connections. Examples of RDP connections settings is listed below:

```
<allow_desktop_composition>0</allow_desktop_composition>
<allow_font_smoothing>0</allow_font_smoothing>
<audiocapturemode>0</audiocapturemode>
<audiomode>2</audiomode>
<authentication_level>2</authentication_level>
<autoreconnection_enabled>1</autoreconnection_enabled>
<bitmapcachepersistenable>1</bitmapcachepersistenable>
<compression> 1 </compression>
<connection_type>2</connection_type>
<desktopResolution>640x480</desktopResolution>
<disable_cursor_setting>0</disable_cursor_setting>
<disable_full_window_drag>1</disable_full_window_drag>
<disable_menu_anims>1</disable_menu_anims>
<disable_themes>0</disable_themes>
<disable_wallpaper>1</disable_wallpaper>
<displayconnectionbar>1</displayconnectionbar>
<gatewaycredentialssource>4</gatewaycredentialssource>
<gatewayprofileusagemethod>0</gatewayprofileusagemethod>
<gatewayusagemethod>4</gatewayusagemethod>
<keyboardhook>0</keyboardhook>
<negotiate_security_layer>1</negotiate_security_layer>
<prompt_for_credentials>0</prompt_for_credentials>
<promptcredentialonce>1</promptcredentialonce>
<redirectclipboard>0</redirectclipboard>
<redirectcomports>1 </redirectcomports>
<redirectdirectx>1</redirectdirectx>
<redirectdrives>0<Iredirectdrives>
<redirectposdevices>0</redirectposdevices>
<redirectprinters>0</redirectprinters>
<redirectsmmtcards>1</redirectsmartcards>
<remoteapplicationmode>0</remoteapplicationmode>
<screen_mode_id>1</screen_mode_id>
<session_bpp>15</session_bpp>
<use_multimon>0</use_multimon>
<use_redirection_server_name>0</use_redirection server name>
<videoplaybackmode>1</videoplaybackmode>
<connectionName>Pretty</connectionName>
```

-continued

```
<domain>wyse</domain>
<full_address>10.150.2.24</full_address>
<username>ayadav</username>
<winposstr>0,3,0,0,800,600</winposstr>
```

In some aspects, RDP connections (e.g., .rdp files) that are present under the document folder may be considered. In some aspects, .rdp files stored anywhere else may be not considered for export. If the configuration file contains RDP connection entries, then except for default.rdp, all other .rdp files may be deleted from the document folder, and their respective link files may also be deleted.

Examples of VMware View connections settings is listed below:

```
<serverURL>http:/110.150.5.5:443</serverURL>
<domainName>wyse.com</domainName>
<UserName>admin</UserName>
<password>password</password>
<DesktopName>desktop</DesktopName>
<desktopLayout>FullScreen</desktopLayout>
<desktopProtocol>0</desktopProtocol>
<loginasCurrentUser>0</loginasCurrentUser>
<brokerHistory>http:/110.150.5.5:443</brokerHistory>
<mrBroker>xxx</mrBroker>
<mrautoConnect></mrautoConnect>
<mruserName>admin</mruserName>
<mrDomain>domain</mrDomain>
<screenSize>large</screenSize>
```

Examples of Citrix connections settings includes:
<citrixServer>10.150.102.53</citrixServer>

The OS configuration tag may describe data related to a web browser (e.g., IE), Firewall, Aero, additional clocks, wallpaper, and other suitable data. For example, IE settings may include:

```
<internetExplorerSettings>
    <homePage>www.google.co.in</homePage>
    <internetZoneSettings>
        <internetZone>medium</internetZone>
        <localintranetZone>medium</localintranetZone>
        <trustedSiteZone>medium</trustedSiteZone>
        <restrictedSiteZone>medium</restrictedSiteZone>
    </internetZoneSettings>
    <internetProxy>
        <proxyBypassServer>10.150.132.2</proxyBypassServer>
        <proxyBypassPort>80</proxyBypassPort>
        <proxyBypass>false</proxyBypass>
    </internetProxy>
    <ieFavmiteSet>
        <favorite>
            <folderName>abc</folderName>
            <urlDescription>Telugu News Papers</urlDescription>
            <url>http://www.sakshi.com</url>
        </favorite>
        <favorite>
            <folderName>abc</folderName>
            <urlDescription>Wyse Technologies</urlDescription>
            <url>http://www.wyse.com</url>
        </favorite>
    </ieFavoriteSet>
</internetExplorerSettings>
```

For example, firewall settings may include:

```
<windowsFirewall>
    <enableFirewall>true</enableFirewall>
</windowsFirewall>
```

For example, Aero settings may include:

```
<aeroFeature>
    <enableAero>true</enableAero>
</aeroFeature>
```

For example, additional clocks settings may include:

```
<clocks>
    <clock1>
        <displayName>wyse1</displayName>
        <tzregKeyname>India Standard Time</tzregKeyname>
        <enable>false</enable>
    </clock1>
    <clock2>
        <displayName>wyse2</displayName>
        <tzregKeyname>W. Australia Standard Time</tzregKeyname>
        <enable>false</enable>
    </clock2>
</clocks>
```

In some aspects, the device configuration tag may describe data related to displays, mice, keyboards, networks, audio, power, and time zones. In some aspects, display settings may include:

```
<display>
    <displayDesktopBackground>
        <file>myBackground.jpg</file>
        <layout>center</layout>
    </displayDesktopBackground>
    <displayParams>
        <manual>
            <displayResolution>1024x768</displayResolution>
            <displayRefreshRate>60</displayRefreshRate>
            <colorDepth>16</colorDepth>
            <displayOrientation>0</displayOrientation>
        </manual>
    </displayParams>
</display>
```

In some aspects, the wallpaper is stored in a folder having the same name as the configuration file (e.g., an XML configuration file). Thus, if an XML configuration file named xyz.xml is exported, then a folder named xyz may be created in the same path as the XML file, and the wallpaper may be stored in that folder. In some aspects, if the xyz.xml file, for example, has been imported, then the folder and the XML file does not need to be deleted. If this is done, then exporting may cause an issue, as the wallpaper may not exist anymore (the wallpaper was applied from the xyz folder). According to certain aspects, on a remote repository in which a configuration file (either WES7Config.xml or <user>.xml) is contained, a folder by the same name (e.g., WES7Config or <user>) as the configuration file may be created. Changes such as a new wallpaper may be placed in this folder. In some aspects, the preferred format may be JPEG, and the size of the JPEG file may be no more than 1 megabyte to save on storage. However, other suitable formats and sizes may be used. In some aspects, checking may be not performed on a JPEG file size.

In some aspects, mouse settings may include:

```
<mouse>
    <hideMouse>false</hideMouse>
    <mouseSpeed>20</mouseSpeed>
    <mouseSwap>false</mouseSwap>
```

-continued

```
    <pointerTrail>5</pointerTrail>
    <scrollLines>5</scrollLines>
    <doubleClickSpeed>500</doubleClickSpeed>
    <snapPointer>false</snapPointer>
    <findMouseSonar>true</findMouseSonar>
<ClickLockTime>1200</ClickLockTime>
    <MouseClickLock>false</MouseClickLock>
</mouse>
```

In some aspects, keyboard settings may include:

```
<keyboard>
    <defKBLayout>en-US</ defKBLayout >
    <keyboardPref>false</keyboardPref>
    <repeatDelayMs>2</repeatDelayMs>
    <repeatRate>15</repeatRate>
    <menuAccess>true</menuAccess>
    <cursorBlinkRate>200</cursorBlinkRate>
    <inputLanguage>
        <langId>en-us</langid>
    </inputLanguage>
</keyboard>
```

In some aspects, the language identification is not displayed as country codes, but as human readable text.

In some aspects, the time zone settings may include:

```
<timeZone>
    <standardName>India Standard Time</standardName>
    <daylightName>India Daylight Time</daylightName>
    <bias>-330</bias>
    <daylightBias>0</daylightBias>
    <standardBias>0</standardBias>
    <timeZoneKeyName>India Standard ime</timeZoneKeyName>
    <dynamicDaylightTimeDisable>false</dynamicDaylightTimeDisable>
</timeZone>
```

In some aspects, the network settings may include:

```
<networkSettings>
    <ipAddress>
        <dhcp></dhcp>
        <dnsAddress>
            <staticDNS>
                <dns1>10.150.2.10</dns1>
                <dns2> </dns2>
            </staticDNS>
        </dnsAddress>
        <winsAddress>
    <wins1> </wins1>
    <wins2> </wins2>
        </winsAddress>
    </ipAddress>
</networkSettings>
```

In some aspects, the audio settings may include:

```
<audioSettings>
    <lineoutMute>false</lineoutMute>
    <lineoutVolume>0.1</lineoutVolume>
    <micMute>false</micMute>
    <micVolume>0.5</micVolume>
</audioSettings>
```

In some aspects, the power settings may include:

```
<powerSettings>
    <powerPlanDefault>balanced</powerPlanDefault>
    <dimdisplayOnBattery>1 minute</dimdisplayOnBattery>
    <dimdisplayPluggedin>2 minutes</dimdisplaypluggedin>
    <offdisplayOnBattery>2 minutes</offdisplayOnBattery>
    <offdisplayPluggedin>5 minutes</offdisplayPluggedIn>
    <sleepcomputerOnBattery>Never<lsleepcomputerOnBattery>
    <sleepcomputerPluggedin>Never<lsleepcomputerPluggedin>
</powerSettings>
```

According to certain aspects, the "balanced," "power saver," and the customized power plans may be supported.

According to various aspects of the subject technology, the common tag may describe extra and/or miscellaneous data. An OS type element may specify whether a configuration file is for WES 7, WES 2009, WTOS, Linux, or some other suitable operating system.

According to certain aspects, a reset tag may control a wipeout feature. If the reset tag value is set to "1," then a default configuration file (e.g., WES7Config.xml) may be applied first. The .rdp files and shortcut, in addition to the IE favorites may be deleted. In some aspects, vmView registry settings may be cleared. After this, the <user.xml> or global configuration file may be applied (e.g., WES7Config.xml). This option can only be set from a server side (e.g., server 112) user interface. An example of the reset tag settings is shown below:

```
        <common>
            <commonSettings>
                <OSType>WES 7</OSType>
                <reset>/</reset>
            </commonSettings>
        </common>
```

According to certain aspects, a schema language such as XSD can be used to express a set of rules to which an XML configuration file may conform in order to be considered valid according to that schema. For example, the XSD file may be named as WESTypes.xsd. The XSD file (e.g., validation file 406) may be used to validate the data present in the XML configuration file (e.g., S306a and/or S306b). The XSD file may also define as to what value a data can have and also the type of data. For example, an inquiry may be how to tell what values are valid for a gatewayCredentialsSource. The following line indicates how the gatewayCredentialsSource element is represented:

```
            <xs:element name="gatewaycredentialssource"
            type="gatewaycredentialssourceType"
            minOccurs="O"/>
```

The gatewaycredentialssourceType may be a custom defined type and may be defined below:

```
        <xs:simpleType name="gatewaycredentialssourceType">
            <xs:restriction base="xs:integer">
                <xs:enumeration id="Ask for password(NTLM)" value="0"/>
                <xs:enumeration id="Smart card" value="1"/>
                <xs:enumeration id="Allow me to select later" value="4"/>
            </xs:restriction>
        </xs:simpleType>
```

The above definition may state that the gatewayCredentialsSource can either have 0, 1, or 4 as its value in XML. Any other value may result in failure of validation of the xml configuration file.

According to various aspects of the subject technology, the following use case scenarios may arise for the control panel applet (e.g., Pyramid): 1) USB pen drive transfer (e.g., for a small organization); and 2) stand-alone/remote mode. In the USB pen drive transfer scenario, a company may be a small unit and may be limited in monetary resources. In this case, the control panel applet can be used to configure devices. For example, an administrator may configure a device thin client with specific requirements. The administrator may want to deploy this to ten other thin clients. Thus, the administrator can open the control panel applet, export the configuration to a USB pen drive, plug that USB drive to another thin client, and import the configuration using the control panel applet.

In the stand-alone/remote mode scenario, multiple clients may need to be configured from a remote repository. In this scenario, an administrator may select the remote option (e.g., as shown in FIG. 15A) and fill in the data related to remote IP and remote path. The administrator may select either FTP, HTTP, or HTTPs and click on a "Download and Apply" button. These settings may be saved after clicking on the "Download and Apply" button. The "Persist settings on reboot" may be checked if the configuration is to be applied after every boot of the client device 102. In one example, a default remote path is <ftproot>\Wyse\WES7.

According to certain aspects, a stand-alone application (e.g., the configuration application module 404 and/or 504) may be provided that generates a configuration file from scratch. This application can be used to edit an existing configuration file as well. The created/edited configuration file can be used to apply the configuration either in stand-alone mode or in remote mode.

According to certain aspects, the retrieval module 408 (e.g., which may also be referred to herein as Hagent_UI.exe) may be an engine that that runs at startup of a client device 102. This engine may look at the registry values under [HKEY_LOCAL_MACHINE\Software\Wyse\ConfigMgmt] or other suitable registries. Depending on the protocol, the engine may import configurations. If the protocol is local, then an ActiveXML may mention a path of an XML configuration file to be applied. If the XML configuration file exists at that path, then configurations may be imported.

According to certain aspects, if the protocol is FTP or HTTP, then the following order may be used for obtaining the XML configuration file:
  DHCP options (e.g., Method B-1)
  UI configured settings (e.g., Method B-3)
  Local default xml file (e.g., Method B-4)

The engine may look at the below DHCP tags below:

```
DHCPServerTag=161
DHCPPathTag=162
DHCPUsernameTag=184
DHCPPasswordTag=185
DHCPProtocolTag=183
```

According to certain aspects, except for the DHCPServerTag, all the other tags may be of type String. The DHCPServerTag may be configured as an "IPAddress" type.

If the foregoing DHCP options are not configured, connection fails, or a configuration file does not exist on the server, then the engine may fail over to the remote settings set from the control panel applet. If the remote settings are not configured (e.g., from the control panel applet), the connection fails, or the configuration file does not exist on the server, then the engine may fall back to the locally stored WES7Config.xml.

For example, on a server, using IIs, suppose an administrator sets C:\Pyramid as the virtual directory. Then the engine may expect a Wyse\WES7 folder to be existing under C:\Pyramid. Thus, if HTTP or HTTPs is selected and if login is local and no path is specified, then the engine may look for a configuration file named WES7Config.xml under C:\Pyramid\Wyse\WES7. If the path is specified, then the engine may look for WES7Config.xml under C:\Pyramid\Wyse\WES7\<path>. In the case of a domain login, the engine may look for <user.xml>.

In some aspects, if no protocol is mentioned in the DHCP-Protocol option (e.g., 183 by default), then HTTP may be considered. In some aspects, if user name and password are not mentioned in the DHCP option tags, then anonymous login may be considered. According to certain aspects, the port may be considered depending on the protocol. The port may be 21 for FTP, 80 for HTTP, and 443 for HTTPS, although other port values may be used.

According to various aspects of the subject technology, in a scenario of a local user and a domain user, the user may have either logged in locally or performed a domain log in. In some aspects, this scenario may be tested only in the remote mode. In some aspects, if a user performs a local log in, then the configuration file downloaded from the remote repository server may be WES7Config.xml. In some aspects, if the user performs a domain log in, then <username>.xml file may be downloaded and applied.

An example of an XML configuration file is shown below:

```
<xml version="1.0" encoding="UTF-8">
- <WESConfiguration xsi:noNamespaceSchemaLocation="WESTypes.xsd"
xmlns:xsi="http://www.w3.org/2001/XMLSchema-instance">
    - <connection>
        - <rdpConnectionSet>
            - <rdpConnection>
                <allow_desktop_composition>0</allow_desktop_composition>
                <allow_font_smoothing>0</allow_font_smoothing>
                <audiocapturemode>0</audiocapturemode>
                <audiomode>2</audiomode>
                <authentication_level>2</authentication_level>
                <autoreconnection_enabled>1</autoreconnection_enabled>
                <bitmapcachepersistenable>1</bitmapcachepersistenable>
                <compression>1</compression>
                <connection_type>2</connection_type>
                <desktopResolution>640x480</desktopResolution>
                <disable_cursor_setting>0</disable_cursor_setting>
                <disable_full_window_drag>1</disable_full_window_drag>
                <disable_menu_anims>1</disable_menu_anims>
                <disable_themes>0</disable_themes>
                <disable_wallpaper>1</disable_wallpaper>
```

```
                    <displayconnectionbar>1</displayconnectionbar>
                    <gatewaycredentialssource>4</gatewaycredentialssource>
                    <gatewayprofileusagemethod>0</gatewayprofileusagemethod>
                    <gatewayusagemethod>4</gatewayusagemethod>
                    <keyboardhook>0</keyboardhook>
                    <negotiate_security_layer>1</negotiate_security_layer>
                    <prompt_for_credentials>0</prompt_for_credentials>
                    <promptcredentialonce>1</promptcredentialonce>
                    <redirectclipboard>0</redirectclipboard>
                    <redirectcomports>1</redirectcomports>
                    <redirectdirectx>1</redirectdirectx>
                    <redirectdrives>0</redirectdrives>
                    <redirectposdevices>0</redirectposdevices>
                    <redirectprinters>0</redirectprinters>
                    <redirectsmartcards>1</redirectsmartcards>
                    <remoteapplicationmode>0</remoteapplicationmode>
                    <screen_mode_id>1</screen_mode_id>
                    <session_bpp>15</session_bpp>
                    <use_multimon>0</use_multimon>
                    <use_redirection_server_name>0</use_redirection server name>
                    <videoplaybackmode>1</videoplaybackmode>
                    <connectionName>Pretty</connectionName>
                    <domain>wyse</domain>
                    <full_address>10.150.2.24</full_address>
                    <username>ayadav</usernmne>
                    <winposstr>0,3,0,0,800,600</winposstr>
                </rdpConnection>
            </rdpConnectionSet>
        - <vmviewConnection>
            <serverURL>http:/110.5.5:443</serverURL>
            <domainName>wyse.com</domainName>
            <userName>admin</userName>
            <password>password</password>
            <desktopName>desktop</desktopName>
            <desktopLayout>FullScreen</desktopLayout>
            <desktopProtocol>RDP</desktopProtocol>
            <loginasCurrentUser>0</loginasCurrentUser>
            <brokerHistory>http:/110.5.5:443</brokerHistory>
            <mrBroker>xxx</mrBroker>
            <mrAutoConnect />
            <mrUserName>admin</mrUserName>
            <mrDomain>domain</mrDomain>
            <screenSize>large</screenSize>
        </vmviewConnection>
        - <citrixConnection>
                <citrixServer>10.150.2.53</citrixServer>
        </citrixConnection>
    </connection>
    - <deviceConfiguration>
            -<display>
                - <displayDesktopBackground>
                    -<file>
                        <fileName>myBackground.jpg</fileName>
                        <sourcePath />
                        <destPath />
                    </file>
                    <layout>center</layout>
                </displayDesktopBackground>
                - <displayParams>
                    -<manual>
                        <displayResolution>1024x768</displayResolution>
                        <displayRefreshRate>60</displayRefreshRate>
                        <colorDepth>16</colorDepth>
                        <displayOrientation>0</displayOrientation>
                    </manual>
                </displayParams>
            </display>
            -<mouse>
                <hideMouse>false</hideMouse>
                <mouseSpeed>20</mouseSpeed>
                <mouseSwap>false</mouseSwap>
                <pointerTrail>5</pointerTrail>
                <scrollLines>5</scrollLines>
                <doubleClickSpeed>500</doubleClickSpeed>
                <snapPointer>false</snapPointer>
                <findMouseSonar>true</findMouseSonar>
                <ClickLockTime>1200</ClickLockTime>
                <MouseClickLock>false</MouseClickLock>
            </mouse>
```

```xml
- <keyboard>
    <defKBLayout>en-US</defKBLayout>
    <keyboardPref>false</keyboardPref>
    <repeatDelayMs>2</repeatDelayMs>
    <repeatRate>15</repeatRate>
    <menuAccess>true</menuAccess>
    <cursorBlinkRate>200</cursorBlinkRate>
  - <inputLanguage>
      <langid>00000409</langid>
      <langid>0000040d</langid>
    </inputLanguage>
  </keyboard>
- <timeZone>
    <standardName>India Standard Time</standardName>
    <daylightName>India Daylight Time</daylightName>
    <bias>-330</bias>
    <daylightBias>0</daylightBias>
    <standardBias>0</standardBias>
    <timeZoneKeyName>India Standard Time</timeZoneKeyName>
    <dynamicDaylightTimeDisable>false</dynamicDaylightTimeDisable>
  </timeZone>
- <networkSettings>
  - <ipAddress>
      <dhcp />
    </ipAddress>
  - <dnsAddress>
    - <staticDNS>
        <dns1>10.150.2.100</dns1>
        <dns2>10.150.2.99</dns2>
      </staticDNS>
    </dnsAddress>
  - <winsAddress>
      <wins1 />
      <wins2 />
    </winsAddress>
  </networkSettings>
- <audioSettings>
    <lineoutMute>false</lineoutMute>
    <lineoutVolume>0.1</lineoutVolume>
    <micMute>false</micMute>
    <micVolume>0.5</micVolume>
  </audioSettings>
- <powerSettings>
    <powerPlanDefault>balanced</powerPlanDefault>
    <dimdisplayOnBattery>1 minute</dimdisplayOnBattery>
    <dimdisplayPluggedIn>2 minutes</dimdisplayPluggedIn>
    <offdisplayOnBattery>2 minutes</offdisplayOnBattery>
    <offdisplayPluggedIn>5 minutes</offdisplayPluggedIn>
    <sleepcomputerOnBattery>Never</sleepcomputerOnBattery>
    <sleepcomputerPluggedIn>Never</sleepcomputerPluggedIn>
  </powerSettings>
</deviceConfiguration>
- <osConfiguration>
  - <clocks>
    - <clock1>
        <displayName>wyse1</displayName>
        <tzregKeyname>Pacific Standard Time</tzregKeyname>
        <enable>true</enable>
      </clock1>
    - <clock2>
        <displayName>wyse2</displayName>
        <tzregKeyname>UTC dublin</tzregKeyname>
        <enable>true<lenable>
      </clock2>
    </clocks>
  - <aeroFeature>
      <enableAero>true</enableAero>
    </aeroFeature>
  - <windowsFirewall>
      <enableFirewall>true</enableFirewall>
    </windowsFirewall>
  - <internetExplorerSettings>
      <homePage>www.google.co.in</homePage>
    - <internetZoneSettings>
        <internetZone>medium</internetZone>
        <localIntranetZone>medium</localIntranetZone>
        <trustedSiteZone>medium</trustedSiteZone>
        <restrictedSiteZone>medium</restrictedSiteZone>
```

-continued
```
        </internetZoneSettings>
        - <internetProxy>
            <proxyEnable>0</proxyEnable>
            <proxyServer />
            <prox yServerPort>80</proxyServerPort>
            <proxyByPass />
        </internetProxy>
        - <ieFavoriteSet>
            - <favorite>
                <folderName>abc</folderName>
                <urlDescription>Telugu News Papers</urlDescription>
                <url>http://www.sakshi.com<1url>
            </favorite>
            - <favorite>
                <folderName>abc</folderName>
                <urlDescription>Wyse Technologies</urlDescription>
                <url>http://www.wyse.com</url>
            </favorite>
        </ieFavoriteSet>
    </internetExplorerSettings>
</osConfiguration>
-<common>
    - <commonSettings>
        <OSType>WES 7</OSType>
        <reset>0</reset>
    </commonSettings>
</common>
</WESConfiguration>
```

According to various aspects of the subject technology, a sample XML portion is shown below:

```
<osConfiguration>
    <clocks>
        <clock/>
            <displayName>wyse1</displayName>
            <tzregKeyname>Pacific Standard Time</tzregKeyname>
            <enable>true</enable>
        </clock1>
        <clock2>
            <displayName>wyse2</displayName>
            <tzregKeyname>UTC dublin</tzregKeyname>
            <enable>true</enable>
        </clock2>
    </clocks>
    <aeroFeature>
        <enableAero>true</enableAero>
    </aeroFeature>
    <windowsFirewall>
        <enableFirewall>true</enableFirewall>
    </windowsFirewall>
</osConfiguration>
```

According to various aspects of the subject technology, a sample XSD portion is shown below:

```
<xs:complexTypename="osConfigurationType">
    <xs:all>
        <xs:element name="clocks" type="clocksSetType"
            minOccurs="0"/>
        <xs:element name="aeroFeature" type="aeroType"
            minOccurs="0"/>
        <xs:element name="windowsFirewall"
            type="windowsFirewallType"
                minOccurs="0"/>
    </xs:all>
</xs:complexType>
<xs:complexTypename="clocksSetType">
    <xs:all>
        <xs:element name="clock1" type="clockType" minOccurs="0"/>
        <xs:element name="clock2" type="clockType" tninOccurs="0"/>
    </xs:all>
</xs:complexType>
```

-continued
```
<xs:complexTypename="clockType">
    <xs:all>
        <xs:element name="displayName" type="xs:stiing"/>
        <xs:element name="tzregKeyname" type="xs:stiing"/>
        <xs:element nmne="enable" type="xs:boolean"/>
    </xs:all>
</xs:complexType>
<xs:complexType name="aeroType">
<xs:all>
    <xs:element name="enableAero" type="xs:boolean"/>
</xs:all>
</xs:complexType>
<xs:complexType name="windowsFirewallType">
<xs:all>
    <xs:element name="enableFirewall" type="xs:boolean"/>
</xs:all>
</xs:complexType>
```

Illustration of Apparatus/Method/Machine Readable Storage Medium for Self-Provisioning of Configuration for a Specific-Purpose Client Having a Windows-Based Embedded Image with a Write-Filter (Described as Clauses)

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clause 1, 13, 25, and 38. The other clauses can be presented in a similar manner.

1. An apparatus for self-provisioning of configuration for a specific-purpose local client (e.g., client 102 of FIG. 1) having a windows-based embedded image with a write-filter (e.g., write-filter 420 of FIG. 4) and obviating reinstallation of an entire windows-based embedded image onto the specific-purpose local client, the apparatus comprising:

a retrieval module (e.g., retrieval module 408 of FIG. 4) of the specific-purpose local client configured to facilitate locating a repository server (e.g., repository server 104 of FIG. 1) containing a configuration file, the retrieval module configured to facilitate obtaining the configuration file from the repository server while the write-filter is enabled, while obviating reinstallation of an entire windows-based embedded image onto the specific-purpose local client; and an apply settings module (e.g., apply settings module 414) of the specific-purpose local client configured to apply a configuration change to the windows-based embedded image based on the configuration file or another configuration file, wherein the windows-based embedded image comprises the write-filter that prevents one or more changes applied to the windows-based embedded image with the write-filter enabled, from persisting across a reboot of the specific-purpose local client, wherein the apply settings module is configured to apply the configuration change to the windows-based embedded image while the write-filter is enabled, and wherein the windows-based embedded image supports a graphical user interface and comprises an operating system (e.g., operating system module 426 of FIG. 4) and one or more applications (e.g., application module 422 of FIG. 4) dedicated to the specific purpose.

2. The apparatus of clause 1, wherein after each reboot of the specific-purpose local client is initiated, the apply settings module is configured to automatically apply the configuration change to the windows-based embedded image to allow the configuration change to appear, to a user of the specific-purpose local client, to be persistent across a reboot of the specific-purpose local client.

3. The apparatus of clause 1, wherein after each reboot of the specific-purpose local client is initiated, the retrieval module is configured to automatically facilitate locating a repository server containing a configuration file and facilitate obtaining a configuration file.

4. The apparatus of clause 1,
wherein the write-filter comprises an exclusion list that identifies one or more of folders and modules that are to be retained on the specific-purpose local client across a reboot of the specific-purpose local client, wherein the exclusion list identifies the retrieval module and the apply settings module or one or mores folders that contain the retrieval module and the apply settings module to allow the retrieval module and the apply settings module to be retained on the specific-purpose local client across reboot of the specific-purpose local client, wherein while the configuration change applied to the windows-based embedded image while the write-filter is enabled is to be discarded from the specific-purpose local client across a reboot of the specific-purpose local client, after a reboot of the specific-purpose local client is initiated, the retrieval module is configured to automatically re-obtain the configuration file from the repository server or the another configuration file from a storage area that is retained on the specific-purpose local client across a reboot of the specific-purpose local client, and the apply settings module is configured to automatically re-apply the configuration change associated with the configuration file or the another configuration file.

5. The apparatus of clause 1, wherein the configuration change comprises one or more of the following: a configuration change to a remote desktop connection, a configuration change to a device of the specific-purpose local client, or a configuration change to the operating system of the specific-purpose local client.

6. The apparatus of clause 1, wherein the apply settings module is configured to, while the write-filter is enabled, facilitate saving the configuration file into a storage area that is to be retained on the specific-purpose local client across a reboot of the specific-purpose local client.

7. The apparatus of clause 1, wherein after a reboot of the specific-purpose local client is initiated, the apply settings module is configured to automatically apply, without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

8. The apparatus of clause 1, wherein the configuration file comprises an XML configuration file.

9. The apparatus of clause 1, wherein the retrieval module is configured to obtain address information of the repository server using at least one of a dynamic host configuration protocol (DHCP) or a domain name system (DNS).

10. The apparatus of clause 1, wherein the retrieval module is configured to obtain address information of the repository server from a local registry of the specific-purpose local client.

11. The apparatus of clause 1, wherein the another configuration file is a default configuration file saved in a storage area that is retained on the specific-purpose local client across a reboot of the specific-purpose local client.

12. The apparatus of clause 1, further comprising a reset check module of the specific-purpose local client configured to determine whether to reset a previous state of the windows-based embedded image based on the configuration file,
wherein if the reset check module determines that the previous state is to be reset, the apply settings module is configured to apply a default configuration to the windows-based embedded image and to apply the configuration change based on the configuration file to the windows-based embedded image after the default configuration is applied, and wherein if the reset check module determines that the previous state is not to be reset, the apply settings module is configured to apply the configuration change based on the configuration file, to the windows-based embedded image, while disallowing the default configuration from being applied to the windows-based embedded image.

Figure 19A:
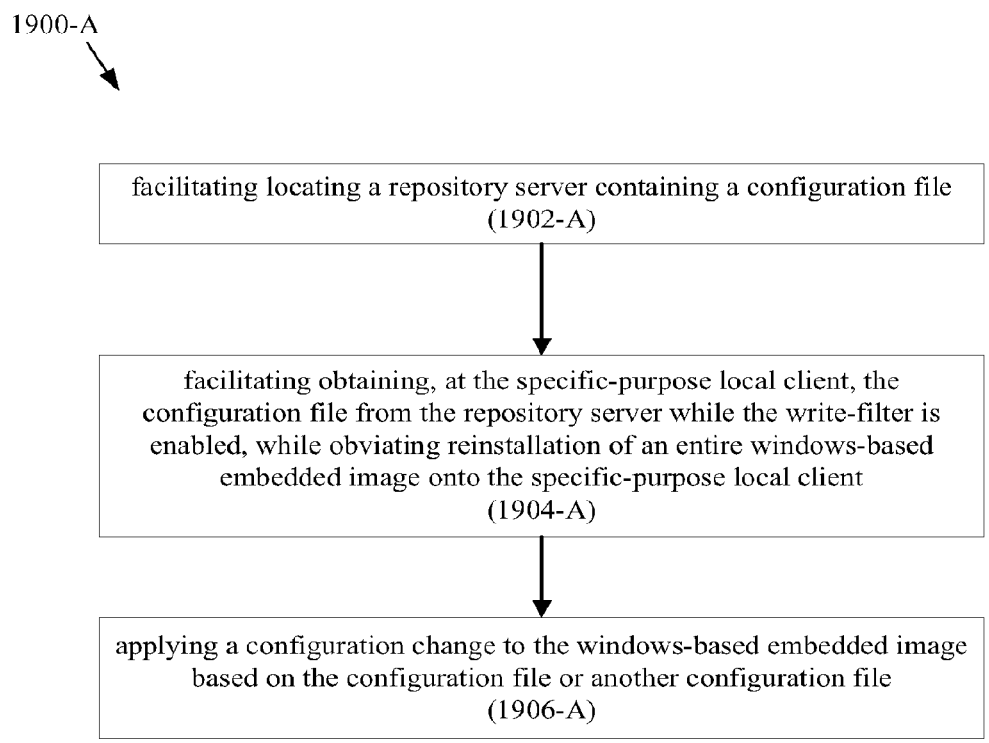
FIG. 19A is a block diagram representing an example of a method for self-provisioning of configuration for a specific-purpose local client having a windows-based embedded image with a write-filter and obviating reinstallation of an entire windows-based embedded image onto the specific-purpose local client, in accordance with various aspects of the subject technology.

13. A method (see, e.g., method 1900-A of FIG. 19A) for self-provisioning of configuration for a specific-purpose local client (e.g., client 102 of FIG. 1) having a windows-based embedded image with a write-filter (e.g., write-filter 420 of FIG. 4) and obviating reinstallation of an entire windows-based embedded image onto the specific-purpose local client, the method comprising:

facilitating locating a repository server containing a configuration file (see, e.g., item 1902-A in FIG. 19A);

facilitating obtaining, at the specific-purpose local client, the configuration file from the repository server while the write-filter is enabled, while obviating reinstallation of an entire windows-based embedded image onto the specific-purpose local client (see, e.g., item 1904-A in FIG. 19A); and applying a configuration change to the windows-based embedded image based on the configuration file or another configuration file (see, e.g., item 1906-A in FIG. 19A), wherein the windows-based embedded image comprises the write-filter that prevents one or more changes applied to the windows-based embedded image with the write-filter enabled, from persisting across a reboot of the specific-purpose local client, wherein the configuration change is applied to the windows-based embedded image while the write-filter is enabled, and wherein the windows-based embedded image supports a graphical user interface and comprises an operating system (e.g., operating system module 426 of FIG. 4) and one or more applications (e.g., application module 422 of FIG. 4) dedicated to the specific purpose.

14. The method of clause 13, wherein the applying comprises automatically applying, after each reboot of the specific-purpose local client is initiated, the configuration change to the windows-based embedded image to allow the configuration change to appear, to a user of the specific-purpose local client, to be persistent across a reboot of the specific-purpose local client.

15. The method of clause 13, wherein the facilitating locating the repository server and the facilitating obtaining the configuration file comprise automatically facilitating locating the repository server containing the configuration file and facilitating obtaining the configuration file, after each reboot of the specific-purpose local client is initiated.

16. The method of clause 13, wherein the write-filter comprises an exclusion list that identifies one or more of folders and modules that are to be retained on the specific-purpose local client across a reboot of the specific-purpose local client, wherein the exclusion list identifies a retrieval module and an apply settings module or one or mores folders that contain the retrieval module and the apply settings module to allow the retrieval module and the apply settings module to be retained on the specific-purpose local client across reboot of the specific-purpose local client, wherein while the configuration change applied to the windows-based embedded image while the write-filter is enabled is to be discarded from the specific-purpose local client across a reboot of the specific-purpose local client, after a reboot of the specific-purpose local client is initiated, the method further comprises:

automatically re-obtaining the configuration file from the repository server or the another configuration file from a storage area that is retained on the specific-purpose local client across a reboot of the specific-purpose local client; and automatically re-applying the configuration change associated with the configuration file or the another configuration file.

17. The method of clause 13, wherein the configuration change comprises one or more of the following: a configuration change to a remote desktop connection, a configuration change to a device of the specific-purpose local client, or a configuration change to the operating system of the specific-purpose local client.

18. The method of clause 13, further comprising facilitating saving, while the write-filter is enabled, the configuration file into a storage area that is to be retained on the specific-purpose local client across a reboot of the specific-purpose local client.

19. The method of clause 13, wherein the applying comprises automatically applying, after a reboot of the specific-purpose local client is initiated and without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

20. The method of clause 13, wherein the configuration file comprises an XML configuration file.

21. The method of clause 13, wherein the facilitating locating comprises obtaining address information of the repository server using at least one of a dynamic host configuration protocol (DHCP) or a domain name system (DNS).

22. The method of clause 13, wherein the facilitating locating comprises obtaining address information of the repository server from a local registry of the specific-purpose local client.

23. The method of clause 13, wherein the another configuration file is a default configuration file saved in a storage area that is retained on the specific-purpose local client across a reboot of the specific-purpose local client.

24. The method of clause 13, further comprising determining whether to reset a previous state of the windows-based embedded image based on the configuration file, wherein, if it is determined that the previous state is to be reset, the applying the configuration change comprises applying a default configuration to the windows-based embedded image before the configuration change is applied, and wherein, if it is determined that the previous state is not to be reset, the applying the configuration change comprises applying the configuration change based on the configuration file, to the windows-based embedded image, while disallowing the default configuration from being applied to the windows-based embedded image.

Figure 19B:
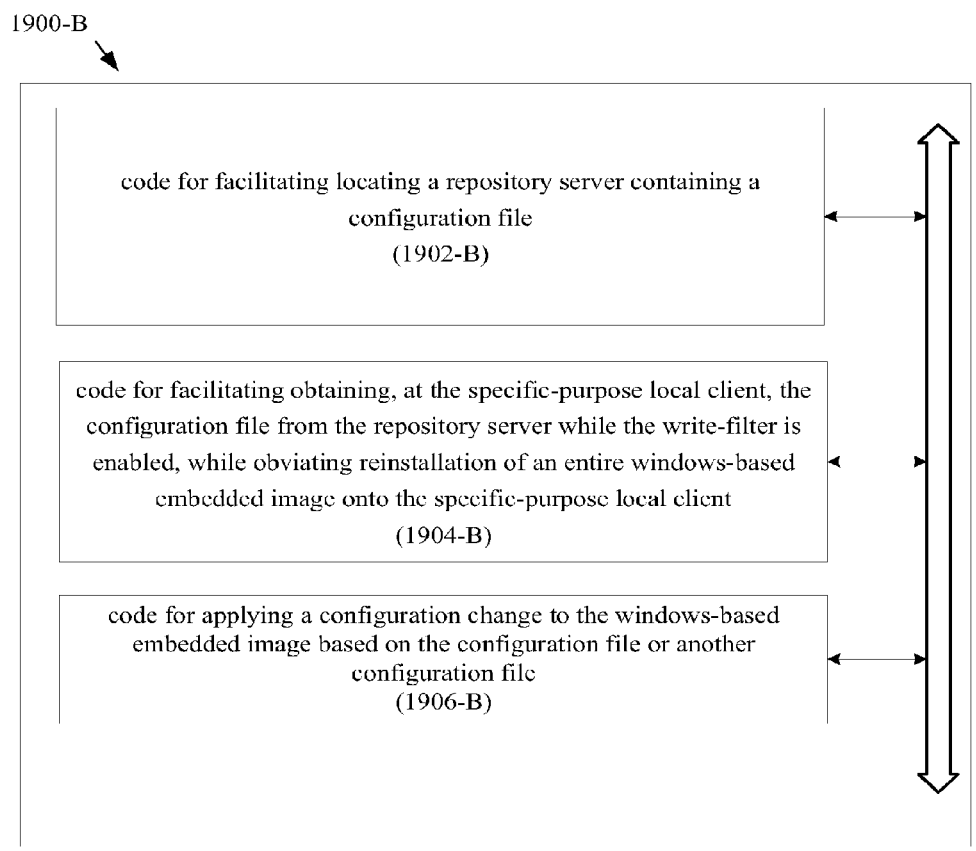
FIG. 19B is a block diagram representing code of an example of a machine-readable storage medium encoded with instructions executable by a processing system to perform a method for self-provisioning of configuration for a specific-purpose local client having a windows-based embedded image with a write-filter and obviating reinstallation of an entire windows-based embedded image onto the specific-purpose local client, in accordance with various aspects of the subject technology.

25. A machine-readable storage medium (see, e.g., machine-readable storage medium 1900-B of FIG. 19B) encoded with instructions executable by a processing system to perform a method for self-provisioning of configuration for a specific-purpose local client (e.g., client 102 of FIG. 1) having a windows-based embedded image with a write-filter (e.g., write-filter 420 of FIG. 4) and obviating reinstallation of an entire windows-based embedded image onto the specific-purpose local client, the instructions comprising code for:

facilitating locating a repository server containing a configuration file (see, e.g., item 1902-B in FIG. 19B);

facilitating obtaining, at the specific-purpose local client, the configuration file from the repository server while the write-filter is enabled, while obviating reinstallation of an entire windows-based embedded image onto the specific-purpose local client (see, e.g., item 1904-B in FIG. 19B); and applying a configuration change to the windows-based embedded image based on the configuration file or another configuration file (see, e.g., item 1906-B in FIG. 19B), wherein the windows-based embedded image comprises the write-filter that prevents one or more changes applied to the windows-based embedded image with the write-filter enabled, from persisting across a reboot of the specific-purpose local client, wherein the configuration change is applied to the windows-based embedded image while the write-filter is enabled, and wherein the windows-based embedded image supports a graphical user interface and comprises an operating system (e.g., operating system module 426 of FIG. 4) and one or more applications (e.g., application module 422 of FIG. 4) dedicated to the specific purpose.

26. The machine-readable storage medium of clause 25, wherein the applying comprises automatically applying, after each reboot of the specific-purpose local client is initiated, the configuration change to the windows-based embedded image to allow the configuration change to appear, to a user of the specific-purpose local client, to be persistent across a reboot of the specific-purpose local client.

27. The machine-readable storage medium of clause 25, wherein the facilitating locating the repository server and the facilitating obtaining the configuration file comprise automatically facilitating locating the repository server containing the configuration file and facilitating obtaining the configuration file, after each reboot of the specific-purpose local client is initiated.

28. The machine-readable storage medium of clause 25,
wherein the write-filter comprises an exclusion list that identifies one or more folders and modules that are to be retained on the specific-purpose local client across a
reboot of the specific-purpose local client, wherein the exclusion list identifies a retrieval module and an apply settings module or one or more folders that contain the retrieval module and the apply settings module to allow the retrieval module and the apply settings module to be retained on the specific-purpose local client across reboot of the specific-purpose local client,
wherein while the configuration change applied to the windows-based embedded image while the write-filter is enabled is to be discarded from the specific-purpose local client across a reboot of the specific-purpose local client after a reboot of the specific-purpose local client is initiated, the instructions further comprise code for:
automatically re-obtaining the configuration file from the repository server or the another configuration file from a storage area that is retained on the specific-purpose local client across a reboot of the specific-purpose local client; and
automatically re-applying the configuration change associated with the configuration file or the another configuration file.

29. The machine-readable storage medium of clause 25, wherein the configuration change comprises one or more of the following: a configuration change to a remote desktop connection, a configuration change to a device of the specific-purpose local client, or a configuration change to the operating system of the specific-purpose local client.

30. The machine-readable storage medium of clause 25, wherein the instructions further comprise code for facilitating saving, while the write-filter is enabled, the configuration file into a storage area that is to be retained on the specific-purpose local client across a reboot of the specific-purpose local client.

31. The machine-readable storage medium of clause 25, wherein the applying comprises automatically applying, after a reboot of the specific-purpose local client is initiated and without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

32. The machine-readable storage medium of clause 25, wherein the configuration file comprises an XML configuration file.

33. The machine-readable storage medium of clause 25, wherein the facilitating locating comprises obtaining address information of the repository server using at least one of a dynamic host configuration protocol (DHCP) or a domain name system (DNS).

34. The machine-readable storage medium of clause 25, wherein the facilitating locating comprises obtaining address information of the repository server from a local registry of the specific-purpose local client.

35. The machine-readable storage medium of clause 25, wherein the another configuration file is a default configuration file saved in a storage area that is retained on the specific-purpose local client across a reboot of the specific-purpose local client.

36. The machine-readable storage medium of clause 25, wherein the instructions further comprise code for determining whether to reset a previous state of the windows-based embedded image based on the configuration file,
wherein, if it is determined that the previous state is to be reset, the applying the configuration change comprises applying a default configuration to the windows-based embedded image before the configuration change is applied, and
wherein, if it is determined that the previous state is not to be reset, the applying the configuration change comprises applying the configuration change based on the configuration file, to the windows-based embedded image, while disallowing the default configuration from being applied to the windows-based embedded image.

37. A computing machine comprising the machine-readable storage medium of clause 25, wherein the computing machine comprises the specific-purpose local client.

Figure 19C:
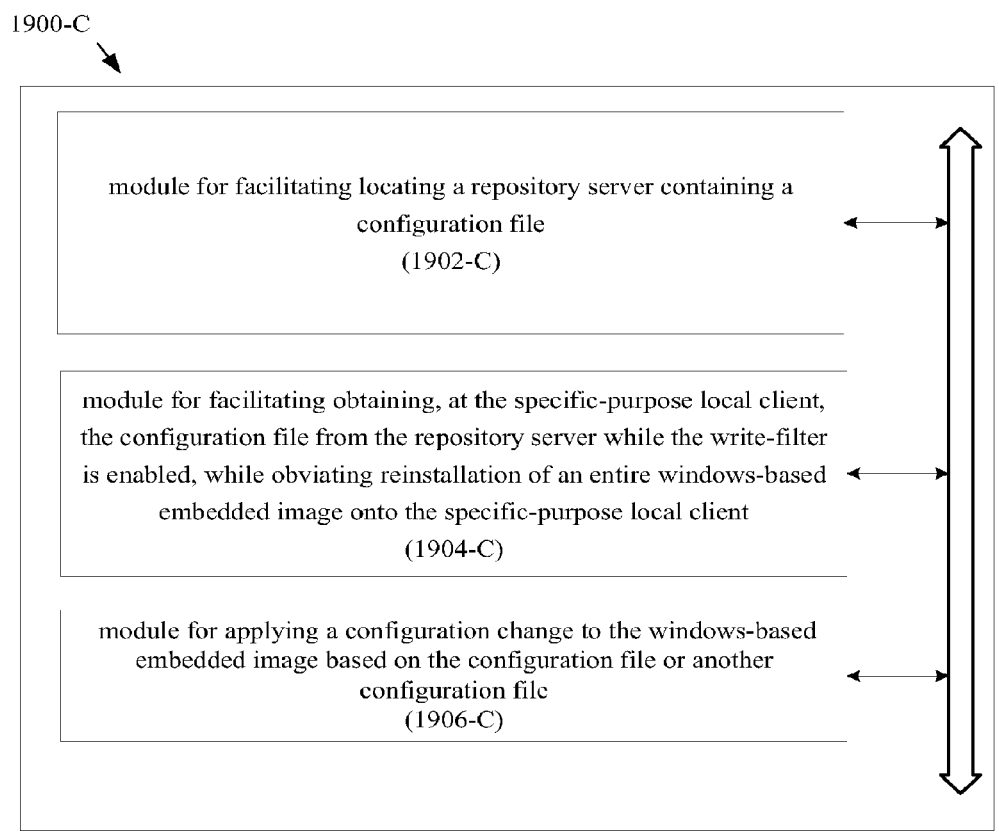
FIG. 19C is a block diagram module of an example of an apparatus for self-provisioning of configuration for a specific-purpose local client having a windows-based embedded image with a write-filter and obviating reinstallation of an entire windows-based embedded image onto the specific-purpose local client, in accordance with various aspects of the subject technology.

38. An apparatus (see, e.g., apparatus 1900-C of FIG. 19C) for self-provisioning of configuration for a specific-purpose local client (e.g., client 102 of FIG. 1) having a windows-based embedded image with a write-filter (e.g., write-filter 420 of FIG. 4) and obviating reinstallation of an entire windows-based embedded image onto the specific-purpose local client, the apparatus comprising:
means for facilitating locating a repository server containing a configuration file (see, e.g., item 1902-C in FIG. 19C);
means for facilitating obtaining, at the specific-purpose local client, the configuration file from the repository server while the write-filter is enabled, while obviating reinstallation of an entire windows-based embedded image onto the specific-purpose local client (see, e.g., item 1904-C in FIG. 19C); and
means for applying a configuration change to the windows-based embedded image based on the configuration file or another configuration file (see, e.g., item 1906-C in FIG. 19C),
wherein the windows-based embedded image comprises the write-filter that prevents one or more changes applied to the windows-based embedded image with the write-filter enabled, from persisting across a reboot of the specific-purpose local client,
wherein the configuration change is applied to the windows-based embedded image while the write-filter is enabled, and
wherein the windows-based embedded image supports a graphical user interface and comprises an operating system (e.g., operating system module 426 of FIG. 4) and one or more applications (e.g., application module 422 of FIG. 4) dedicated to the specific purpose.

39. The apparatus of clause 38, wherein the means for applying comprises means for automatically applying, after each reboot of the specific-purpose local client is initiated, the configuration change to the windows-based embedded image to allow the configuration change to appear, to a user of the specific-purpose local client, to be persistent across a reboot of the specific-purpose local client.

40. The apparatus of clause 38, wherein the means for facilitating locating the repository server and the means for facilitating obtaining the configuration file comprise means for automatically facilitating locating the repository server containing the configuration file and means for facilitating obtaining the configuration file, after each reboot of the specific-purpose local client is initiated.

41. The apparatus of clause 38,
wherein the write-filter comprises an exclusion list that identifies one or more folders and modules that are to be retained on the specific-purpose local client across a reboot of the specific-purpose local client,
wherein the exclusion list identifies a retrieval module and an apply settings module or one or more folders that contain the retrieval module and the apply settings module to allow the retrieval module and the apply settings module to be retained on the specific-purpose local client across reboot of the specific-purpose local client,
wherein while the configuration change applied to the windows-based embedded image while the write-filter is enabled is to be discarded from the specific-purpose local client across a reboot of the specific-purpose local client after a reboot of the specific-purpose local client is initiated, the apparatus further comprises:
means for automatically re-obtaining the configuration file from the repository server or the another configuration file from a storage area that is retained on the specific-purpose local client across a reboot of the specific-purpose local client; and
means for automatically re-applying the configuration change associated with the configuration file or the another configuration file.

42. The apparatus of clause 38, wherein the configuration change comprises one or more of the following: a configuration change to a remote desktop connection, a configuration change to a device of the specific-purpose local client, or a configuration change to the operating system of the specific-purpose local client.

43. The apparatus of clause 38, further comprising means for facilitating saving, while the write-filter is enabled, the configuration file into a storage area that is to be retained on the specific-purpose local client across a reboot of the specific-purpose local client.

44. The apparatus of clause 38, wherein the means for applying comprises means for automatically applying, after a reboot of the specific-purpose local client is initiated and without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

45. The apparatus of clause 38, wherein the configuration file comprises an XML configuration file.

46. The apparatus of clause 38, wherein the means for facilitating locating comprises means for obtaining address information of the repository server using at least one of a dynamic host configuration protocol (DHCP) or a domain name system (DNS).

47. The apparatus of clause 38, wherein the means for facilitating locating comprises means for obtaining address information of the repository server from a local registry of the specific-purpose local client.

48. The apparatus of clause 38, wherein the another configuration file is a default configuration file saved in a storage area that is retained on the specific-purpose local client across a reboot of the specific-purpose local client.

49. The apparatus of clause 38, further comprising means for determining whether to reset a previous state of the windows-based embedded image based on the configuration file,
wherein, if it is determined that the previous state is to be reset, the means for applying the configuration change comprises means for applying a default configuration to the windows-based embedded image before the configuration change is applied, and
wherein, if it is determined that the previous state is not to be reset, the means for applying the configuration change comprises means for applying the configuration change based on the configuration file, to the windows-based embedded image, while disallowing the default configuration from being applied to the windows-based embedded image.

50. The apparatus of clause 38, wherein the apparatus comprises the specific-purpose local client.

51. The apparatus of clause 38, wherein the apparatus comprises a processing system and a memory.

Illustration of Apparatus/Method/Machine Readable Storage Medium for Transferring Configuration Data from a Public Cloud Server and Applying onto a Mobile Client (Described as Clauses)

The subject technology is illustrated, for example, according to various aspects described below. Various examples of aspects of the subject technology are described as numbered clauses (52, 53, 54, etc.) for convenience. These are provided as examples, and do not limit the subject technology. It is noted that any of the dependent clauses may be combined in any combination, and placed into a respective independent clause, e.g., clause 52, 64, 76, and 89. The other clauses can be presented in a similar manner.

52. An apparatus for obtaining a configuration file over a public network (e.g., public network 118 of FIG. 1) and applying a persistent configuration change to a windows-based embedded image with a write-filter (e.g., write-filter 420 of FIG. 4) running on a mobile client (e.g., client 102e of FIG. 1) and obviating reinstallation of an entire windows-based embedded image onto the mobile client, the apparatus comprising:
a retrieval module (e.g., retrieval module 408 of FIG. 4) of the mobile client configured to facilitate locating a remote repository server (e.g., repository server 104 of FIG. 1) containing the configuration file, the retrieval module configured to facilitate obtaining the configuration file over the public network from the remote repository server while the write-filter is enabled, while obviating reinstallation of an entire windows-based embedded image onto the mobile client; and
an apply settings module (e.g., apply settings module 414 of FIG. 4) of the mobile client configured to, each time the mobile client boots up, apply a configuration change to the windows-based embedded image while the write-filter is enabled, based on the configuration file or another configuration file,
wherein the windows-based embedded image comprises the write-filter that prevents one or more changes applied to the windows-based embedded image with the write-filter enabled, from persisting across a reboot of the mobile client, and
wherein the windows-based embedded image supports a graphical user interface and comprises an operating system (e.g., operating system module 426 of FIG. 4) and one or more applications (e.g., application module 422 of FIG. 4) for the mobile client.

53. The apparatus of clause 52, wherein the retrieval module of the mobile client is configured to facilitate obtaining a configuration file over the public network from the remote repository server each time the mobile client boots up, and wherein the apply settings module is configured to apply the configuration change to the windows-based embedded image while the write-filter is enabled.

54. The apparatus of clause 52, wherein the remote repository server is a hypertext transfer protocol (HTTP) server, and the retrieval module is configured to facilitate obtaining the configuration file securely using hypertext transfer protocol secure (HTTPS).

55. The apparatus of clause 52, wherein after each reboot of the mobile client is initiated, the apply settings module is configured to automatically apply the configuration change to the windows-based embedded image to allow the configuration change to appear, to a user of the mobile client, to be persistent across a reboot of the mobile client.

56. The apparatus of clause 52, wherein after each reboot of the mobile client is initiated, the retrieval module is configured to automatically facilitate locating a repository server containing a configuration file and facilitate obtaining a configuration file.

57. The apparatus of clause 52, wherein the configuration change comprises one or more of the following: a configuration change to a remote desktop connection, a configuration change to a device of the mobile client, or a configuration change to the operating system of the mobile client.

58. The apparatus of clause 52, wherein the apply settings module is configured to, while the write-filter is enabled, facilitate saving the configuration file into a storage area that is to be retained on the mobile client across a reboot of the mobile client.

59. The apparatus of clause 52, wherein after a reboot of the mobile client is initiated, the apply settings module is configured to automatically apply, without a user's intervention, the configuration change based on the configuration file saved in a storage area that is retained on the mobile client across a reboot of the mobile client, to allow the configuration change to appear, to the user of the mobile client, to be persistent across a reboot of the mobile client.

60. The apparatus of clause 52, wherein the configuration file comprises an XML configuration file.

61. The apparatus of clause 52, wherein the retrieval module is configured to obtain address information of the repository server from a local registry of the mobile client.

62. The apparatus of clause 52, wherein the another configuration file is a default configuration file saved in a storage area that is retained on the mobile client across a reboot of the mobile client.

63. The apparatus of clause 52, further comprising a reset check module of the mobile client configured to determine whether to reset a previous state of the windows-based embedded image based on the configuration file,
wherein if the reset check module determines that the previous state is to be reset, the apply settings module is configured to apply a default configuration to the windows-based embedded image and to apply the configuration change based on the configuration file to the windows-based embedded image after the default configuration is applied, and
wherein if the reset check module determines that the previous state is not to be reset, the apply settings module is configured to apply the configuration change based on the configuration file, to the windows-based embedded image, while disallowing the default configuration from being applied to the windows-based embedded image.

Figure 20A:
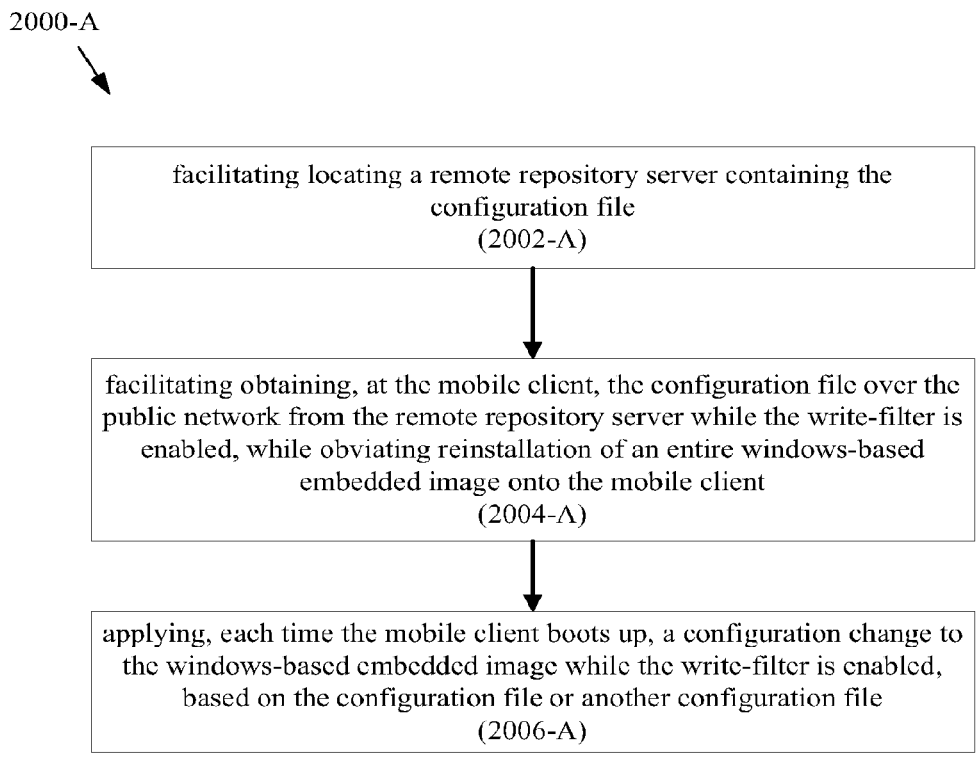
FIG. 20A is a block diagram representing an example of a method for obtaining a configuration file over a public network and applying a persistent configuration change to a windows-based embedded image with a write-filter running on a mobile client and obviating reinstallation of an entire windows-based embedded image onto the mobile client, in accordance with various aspects of the subject technology.

64. A method (see, e.g., method 2000-A of FIG. 20A) for obtaining a configuration file over a public network (e.g., public network 118 of FIG. 1) and applying a persistent configuration change to a windows-based embedded image with a write-filter (e.g., write-filter 420 of FIG. 4) running on a mobile client (e.g., client 102e of FIG. 1) and obviating reinstallation of an entire windows-based embedded image onto the mobile client, the method comprising:
facilitating locating a remote repository server containing the configuration file (see, e.g., item 2002-A in FIG. 20A);
facilitating obtaining, at the mobile client, the configuration file over the public network from the remote repository server while the write-filter is enabled, while obviating reinstallation of an entire windows-based embedded image onto the mobile client (see, e.g., item 2004-A in FIG. 20A); and
applying, each time the mobile client boots up, a configuration change to the windows-based embedded image while the write-filter is enabled, based on the configuration file or another configuration file (see, e.g., item 2006-A in FIG. 20A),
wherein the windows-based embedded image comprises the write-filter that prevents one or more changes applied to the windows-based embedded image with the write-filter enabled, from persisting across a reboot of the mobile client, and
wherein the windows-based embedded image supports a graphical user interface and comprises an operating system (e.g., operating system module 426 of FIG. 4) and one or more applications (e.g., application module 422 of FIG. 4) for the mobile client.

65. The method of clause 64, wherein the facilitating obtaining comprises facilitating obtaining the configuration file over the public network from the remote repository server each time the mobile client boots up.

66. The method of clause 64, wherein the remote repository server is a hypertext transfer protocol (HTTP) server, and wherein the facilitating obtaining comprises facilitating obtaining the configuration file securely using hypertext transfer protocol secure (HTTPS).

67. The method of clause 64, wherein the applying comprises automatically applying, after each reboot of the mobile client is initiated, the configuration change to the windows-based embedded image to allow the configuration change to appear, to a user of the mobile client, to be persistent across a reboot of the mobile client.

68. The method of clause 64, wherein the facilitating locating the remote repository server and the facilitating obtaining the configuration file comprise automatically facilitating locating the repository server containing the configuration file and facilitating obtaining the configuration file, after each reboot of the mobile client is initiated.

69. The method of clause 64, wherein the configuration change comprises one or more of the following: a configuration change to a remote desktop connection, a configuration change to a device of the mobile client, or a configuration change to the operating system of the mobile client.

70. The method of clause 64, further comprising facilitating saving, while the write-filter is enabled, the configuration file into a storage area that is to be retained on the mobile client across a reboot of the mobile client.

71. The method of clause 64, wherein the applying comprises automatically applying, after a reboot of the mobile client is initiated and without a user's intervention, the configuration change based on the configuration file saved in a storage area that is retained on the mobile client across a reboot of the mobile client, to allow the configuration change to appear, to the user of the mobile client, to be persistent across a reboot of the specific-purpose local client.

72. The method of clause 64, wherein the configuration file comprises an XML configuration file.

73. The method of clause 64, wherein the facilitating locating comprises obtaining address information of the repository server from a local registry of the mobile client.

74. The method of clause 64, wherein the another configuration file is a default configuration file saved in a storage area that is retained on the mobile client across a reboot of the mobile client.

75. The method of clause 64, further comprising determining whether to reset a previous state of the windows-based embedded image based on the configuration file,
wherein, if it is determined that the previous state is to be reset, the applying the configuration change comprises applying a default configuration to the windows-based embedded image before the configuration change is applied, and
wherein, if it is determined that the previous state is not to be reset, the applying the configuration change comprises applying the configuration change based on the configuration file, to the windows-based embedded image, while disallowing the default configuration from being applied to the windows-based embedded image.

Figure 20B:
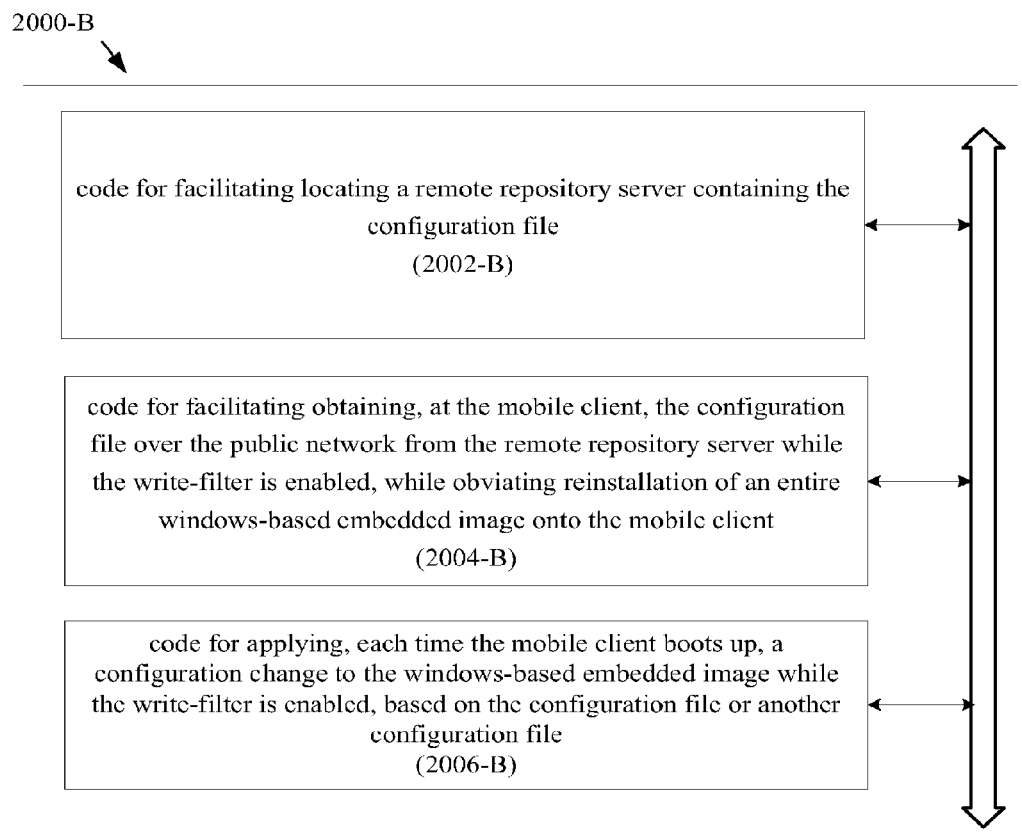
FIG. 20B is a block diagram representing code of an example of a machine-readable storage medium encoded with instructions executable by a processing system to perform a method for obtaining a configuration file over a public network and applying a persistent configuration change to a windows-based embedded image with a write-filter running on a mobile client and obviating reinstallation of an entire windows-based embedded image onto the mobile client, in accordance with various aspects of the subject technology.

76. A machine-readable storage medium (see, e.g., machine-readable storage medium 2000-B of FIG. 20B) encoded with instructions executable by a processing system to perform a method for obtaining a configuration file over a public network (e.g., public network 118 of FIG. 1) and applying a persistent configuration change to a windows-based embedded image with a write-filter (e.g., write-filter 420 of FIG. 4) running on a mobile client (e.g., client 102e of FIG. 1) and obviating reinstallation of an entire windows-based embedded image onto the mobile client, the instructions comprising code for:
facilitating locating a remote repository server containing the configuration file (see, e.g., item 2002-B in FIG. 20B);
facilitating obtaining, at the mobile client, the configuration file over the public network from the remote repository server while the write-filter is enabled, while obviating reinstallation of an entire windows-based embedded image onto the mobile client (see, e.g., item 2004-B in FIG. 20B); and
applying, each time the mobile client boots up, a configuration change to the windows-based embedded image while the write-filter is enabled, based on the configuration file or another configuration file (see, e.g., item 2006-B in FIG. 20B),
wherein the windows-based embedded image comprises the write-filter that prevents one or more changes applied to the windows-based embedded image with the write-filter enabled, from persisting across a reboot of the mobile client, and
wherein the windows-based embedded image supports a graphical user interface and comprises an operating system (e.g., operating system module 426 of FIG. 4) and one or more applications (e.g., application module 422 of FIG. 4) for the mobile client.

77. The machine-readable storage medium of clause 76, wherein the facilitating obtaining comprises facilitating obtaining the configuration file over the public network from the remote repository server each time the mobile client boots up.

78. The machine-readable storage medium of clause 76, wherein the remote repository server is a hypertext transfer protocol (HTTP) server, and wherein the facilitating obtaining comprises facilitating obtaining the configuration file securely using hypertext transfer protocol secure (HTTPS).

79. The machine-readable storage medium of clause 76, wherein the applying comprises automatically applying, after each reboot of the mobile client is initiated, the configuration change to the windows-based embedded image to allow the configuration change to appear, to a user of the mobile client, to be persistent across a reboot of the mobile client.

80. The machine-readable storage medium of clause 76, wherein the facilitating locating the remote repository server and the facilitating obtaining the configuration file comprise automatically facilitating locating the repository server containing the configuration file and facilitating obtaining the configuration file, after each reboot of the mobile client is initiated.

81. The machine-readable storage medium of clause 76, wherein the configuration change comprises one or more of the following: a configuration change to a remote desktop connection, a configuration change to a device of the mobile client, or a configuration change to the operating system of the mobile client.

82. The machine-readable storage medium of clause 76, wherein the instructions further comprise code for facilitating saving, while the write-filter is enabled, the configuration file into a storage area that is to be retained on the mobile client across a reboot of the mobile client.

83. The machine-readable storage medium of clause 76, wherein the applying comprises automatically applying, after a reboot of the mobile client is initiated and without a user's intervention, the configuration change based on the configuration file saved in a storage area that is retained on the mobile client across a reboot of the mobile client, to allow the configuration change to appear, to the user of the mobile client, to be persistent across a reboot of the specific-purpose local client.

84. The machine-readable storage medium of clause 76, wherein the configuration file comprises an XML configuration file.

85. The machine-readable storage medium of clause 76, wherein the facilitating locating comprises obtaining address information of the repository server from a local registry of the mobile client.

86. The machine-readable storage medium of clause 76, wherein the another configuration file is a default configuration file saved in a storage area that is retained on the mobile client across a reboot of the mobile client.

87. The machine-readable storage medium of clause 76, wherein the instructions further comprise code for determining whether to reset a previous state of the windows-based embedded image based on the configuration file,
wherein, if it is determined that the previous state is to be reset, the applying the configuration change comprises applying a default configuration to the windows-based embedded image before the configuration change is applied, and
wherein, if it is determined that the previous state is not to be reset, the applying the configuration change comprises applying the configuration change based on the configuration file, to the windows-based embedded image, while disallowing the default configuration from being applied to the windows-based embedded image.

88. A computing machine comprising the machine-readable storage medium of clause 76, wherein the computer machine comprises the mobile client.

Figure 20C:
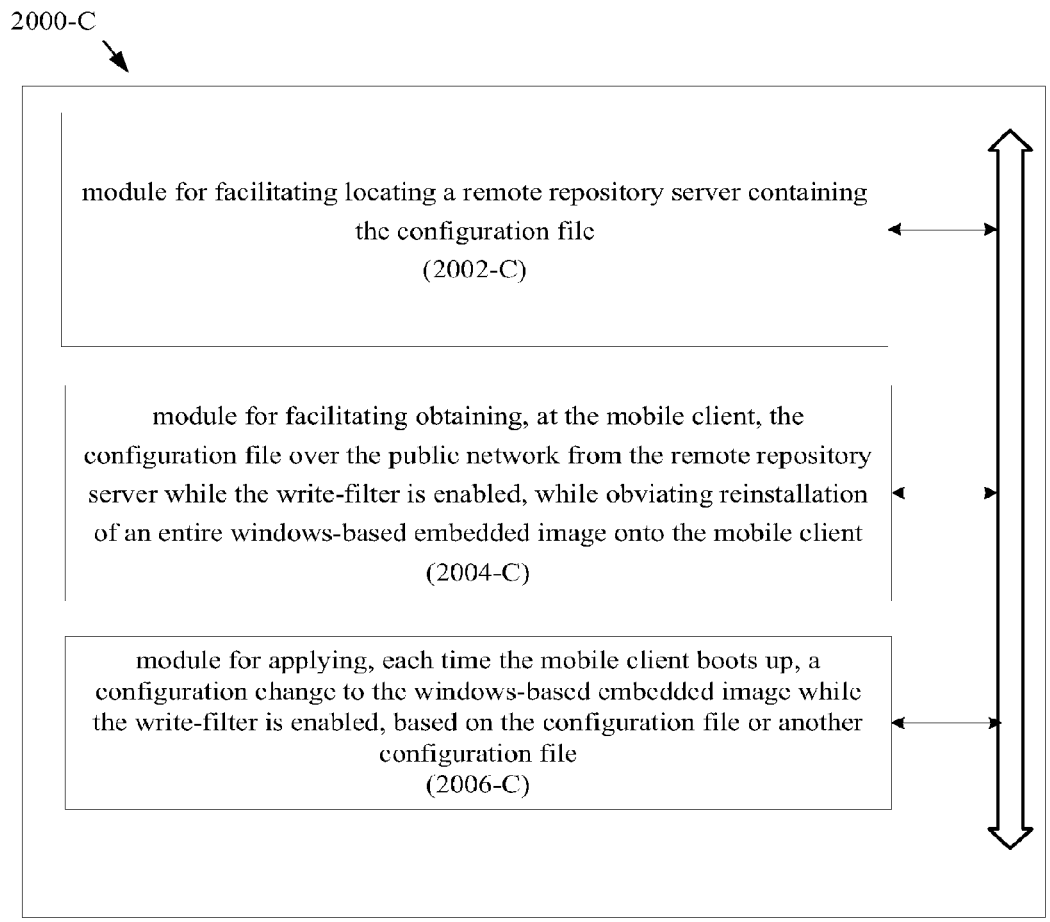
FIG. 20C is a block diagram module of an example of an apparatus for obtaining a configuration file over a public network and applying a persistent configuration change to a windows-based embedded image with a write-filter running on a mobile client and obviating reinstallation of an entire windows-based embedded image onto the mobile client, in accordance with various aspects of the subject technology.

89. An apparatus (see, e.g., apparatus 2000-C of FIG. 20C) for obtaining a configuration file over a public network (e.g., public network 118 of FIG. 1) and applying a persistent configuration change to a windows-based embedded image with a write-filter (e.g., write-filter 420 of FIG. 4) running on a mobile client (e.g., client 102e of FIG. 1) and obviating reinstallation of an entire windows-based embedded image onto the mobile client, the apparatus comprising:

means for facilitating locating a remote repository server containing the configuration file (see, e.g., item 2002-C in FIG. 20C);

means for facilitating obtaining, at the mobile client, the configuration file over the public network from the remote repository server while the write-filter is enabled, while obviating reinstallation of an entire windows-based embedded image onto the mobile client (see, e.g., item 2004-C in FIG. 20C); and means for applying, each time the mobile client boots up, a configuration change to the windows-based embedded image while the write-filter is enabled, based on the configuration file or another configuration file (see, e.g., item 2006-C in FIG. 20C), wherein the windows-based embedded image comprises the write-filter that prevents one or more changes applied to the windows-based embedded image with the write-filter enabled, from persisting across a reboot of the mobile client, and wherein the windows-based embedded image supports a graphical user interface and comprises an operating system (e.g., operating system module 426 of FIG. 4) and one or more applications (e.g., application module 422 of FIG. 4) for the mobile client.

90. The apparatus of clause 89, wherein the means for facilitating obtaining comprises means for facilitating obtaining the configuration file over the public network from the remote repository server each time the mobile client boots up.

91. The apparatus of clause 89, wherein the remote repository server is a hypertext transfer protocol (HTTP) server, and wherein the means for facilitating obtaining comprises facilitating obtaining the configuration file securely using hypertext transfer protocol secure (HTTPS).

92. The apparatus of clause 89, wherein the means for applying comprises means for automatically applying, after each reboot of the mobile client is initiated, the configuration change to the windows-based embedded image to allow the configuration change to appear, to a user of the mobile client, to be persistent across a reboot of the mobile client.

93. The apparatus of clause 89, wherein the means for facilitating locating the remote repository server and the means for facilitating obtaining the configuration file comprise means for automatically facilitating locating the repository server containing the configuration file and means for facilitating obtaining the configuration file, after each reboot of the mobile client is initiated.

94. The apparatus of clause 89, wherein the configuration change comprises one or more of the following: a configuration change to a remote desktop connection, a configuration change to a device of the mobile client, or a configuration change to the operating system of the mobile client.

95. The apparatus of clause 89, further comprising means for facilitating saving, while the write-filter is enabled, the configuration file into a storage area that is to be retained on the mobile client across a reboot of the mobile client.

96. The apparatus of clause 89, wherein the means for applying comprises automatically applying, after a reboot of the mobile client is initiated and without a user's intervention, the configuration change based on the configuration file saved in a storage area that is retained on the mobile client across a reboot of the mobile client, to allow the configuration change to appear, to the user of the mobile client, to be persistent across a reboot of the specific-purpose local client.

97. The apparatus of clause 89, wherein the configuration file comprises an XML configuration file.

98. The apparatus of clause 89, wherein the means for facilitating locating comprises means for obtaining address information of the repository server from a local registry of the mobile client.

99. The apparatus of clause 89, wherein the another configuration file is a default configuration file saved in a storage area that is retained on the mobile client across a reboot of the mobile client.

100. The apparatus of clause 89, further comprising means for determining whether to reset a previous state of the windows-based embedded image based on the configuration file, wherein, if it is determined that the previous state is to be reset, the means for applying the configuration change comprises means for applying a default configuration to the windows-based embedded image before the configuration change is applied, and wherein, if it is determined that the previous state is not to be reset, the means for applying the configuration change comprises means for applying the configuration change based on the configuration file, to the windows-based embedded image, while disallowing the default configuration from being applied to the windows-based embedded image.

101. The apparatus of clause 89, wherein the apparatus comprises the mobile client.

102. The apparatus of clause 89, wherein the apparatus comprises a processing system and a memory.

Illustration of Apparatus/Method/Machine Readable Storage Medium for Configuring and Customizing a Specific-Purpose Client Having a Windows-Based Embedded Image Using Extensible Markup Language (XML) Configuration (Described as Clauses)

The subject technology is illustrated, for example, according to various aspects described below. Various examples of aspects of the subject technology are described as numbered clauses (103, 104, 105, etc.) for convenience. These are provided as examples, and do not limit the subject technology. It is noted that any of the dependent clauses may be combined in any combination, and placed into a respective independent clause, e.g., clause 103, 110, 117, and 125. The other clauses can be presented in a similar manner.

103. An apparatus for configuring and customizing a specific-purpose local client (e.g., client 102 of FIG. 1) having a windows-based embedded image using extensible markup language (XML) configuration and obviating reinstallation of an entire windows-based embedded image onto the specific-purpose local client, the apparatus comprising:

a retrieval module (e.g., retrieval module 410 of FIG. 4) of the specific-purpose local client configured to automatically locate a remote repository server (e.g., repository server 104 of FIG. 1) containing an XML configuration file and automatically obtain the XML configuration file from the remote repository server each time the specific-purpose local client boots up; and an apply settings module (e.g., apply settings module 414 of FIG. 4) of the specific-purpose local client configured to automatically apply a configuration change to the windows-based embedded image based on the XML configuration file each time the specific-purpose local client boots up, wherein the configuration change persists across a reboot of the specific-purpose local client while obviating reinstallation of an entire windows-based embedded image onto the specific-purpose local client, wherein the XML configuration file is self-describing, user-definable, and validatable; and wherein the windows-based embedded image supports a graphical user interface and comprises an operating system (e.g., operating system module of FIG. 4) and one or more applications (e.g., application module of FIG. 4) dedicated to the specific purpose.

104. The apparatus of clause 103, wherein the windows-based embedded image comprises a write-filter that prevents one or more changes applied to the windows-based embedded image with the write-filter enabled, from persisting across a reboot of the specific-purpose local client, and wherein the apply settings module is configured to apply the configuration change to the windows-based embedded image while the write-filter is enabled.

105. The apparatus of clause 104, wherein the apply settings module is configured to, while the write-filter is enabled, facilitate saving the configuration file into a storage area that is to be retained on the specific-purpose local client across a reboot of the specific-purpose local client.

106. The apparatus of clause 103, wherein the configuration change comprises one or more of the following: a configuration change to a remote desktop connection, a configuration change to a device of the specific-purpose local client, and a configuration change to the operating system of the specific-purpose local client.

107. The apparatus of clause 103, wherein the retrieval module is configured to obtain address information of the remote repository server using at least one of a dynamic host configuration protocol (DHCP) or a domain name system (DNS).

108. The apparatus of clause 103, wherein the retrieval module is configured to obtain address information of the repository server from a local registry of the specific-purpose local client.

109. The apparatus of clause 103, further comprising a reset check module of the specific-purpose local client configured to determine whether to reset a previous state of the windows-based embedded image based on the XML configuration file, wherein, if the reset check module determines that the previous state is to be reset, the apply settings module is configured to apply a default configuration to the windows-based embedded image and to apply the configuration change based on the XML configuration file to the windows-based embedded image after the default configuration is applied, and wherein, if the reset check module determines that the previous state is not to be reset, the apply settings module is configured to apply the configuration change based on the XML configuration file, to the windows-based embedded image, while disallowing the default configuration from being applied to the windows-based embedded image.

Figure 21A:
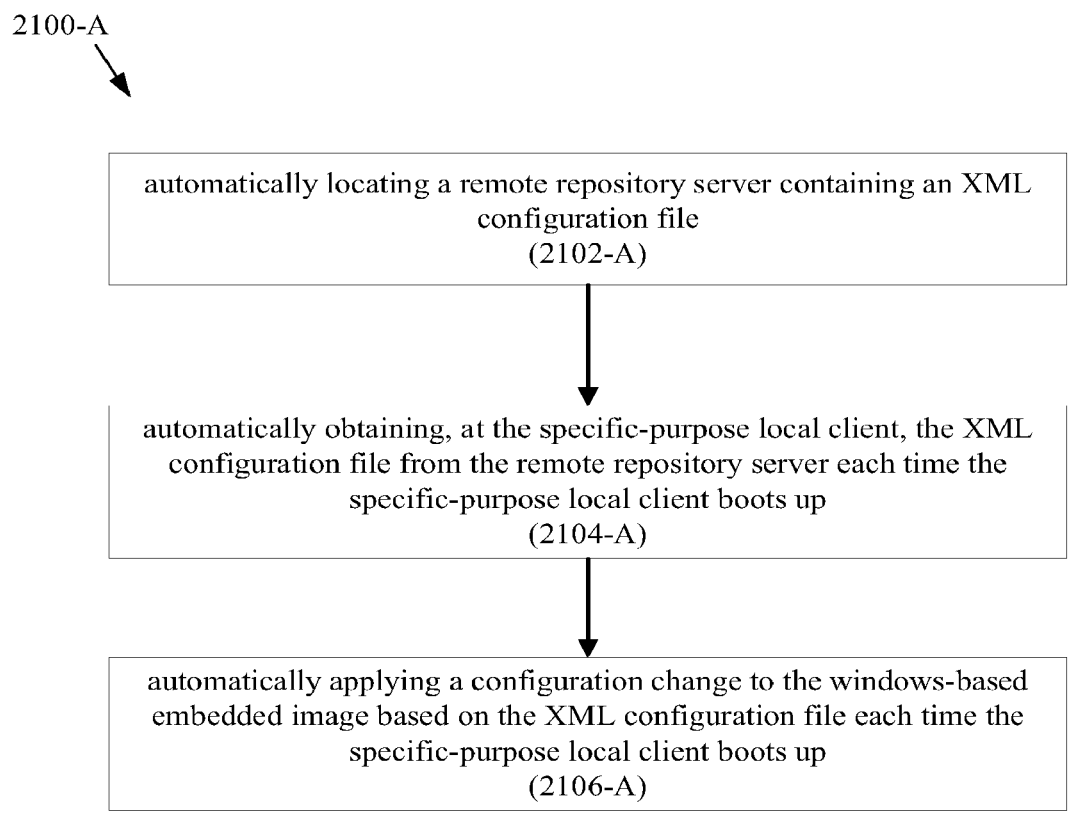
FIG. 21A is a block diagram representing an example of a method for configuring and customizing a specific-purpose local client having a windows-based embedded image using extensible markup language (XML) configuration and obviating reinstallation of an entire windows-based embedded image onto the specific-purpose local client, in accordance with various aspects of the subject technology.

110. A method (see, e.g., method 2100-A of FIG. 21A) for configuring and customizing a specific-purpose local client (e.g., client 102 of FIG. 1) having a windows-based embedded image using extensible markup language (XML) configuration and obviating reinstallation of an entire windows-based embedded image onto the specific-purpose local client, the method comprising:

automatically locating a remote repository server containing an XML configuration file (see, e.g., item 2102-A in FIG. 21A);

automatically obtaining, at the specific-purpose local client, the XML configuration file from the remote repository server each time the specific-purpose local client boots up (see, e.g., item 2104-A in FIG. 21A); and automatically applying a configuration change to the windows-based embedded image based on the XML configuration file each time the specific-purpose local client boots up (see, e.g., item 2106-A in FIG. 21A), wherein the configuration change persists across a reboot of the specific-purpose local client while obviating reinstallation of an entire windows-based embedded image on the specific-purpose local client, wherein the XML configuration file is self-describing, user-definable, and validatable; and wherein the windows-based embedded image supports a graphical user interface and comprises an operating system (e.g., operating system module of FIG. 4) and one or more applications (e.g., application module of FIG. 4) dedicated to the specific purpose.

111. The method of clause 110, wherein the windows-based embedded image comprises a write-filter that prevents one or more changes applied to the windows-based embedded image with the write-filter enabled, from persisting across a reboot of the specific-purpose local client, and wherein the automatically applying comprises applying the configuration change to the windows-based embedded image while the write-filter is enabled.

112. The method of clause 111, further comprising facilitating saving, while the write-filter is enabled, the configuration file into a storage area that is to be retained on the specific-purpose local client across a reboot of the specific-purpose local client.

113. The method of clause 110, wherein the configuration change comprises one or more of the following: a configuration change to a remote desktop connection, a configuration change to a device of the specific-purpose local client, and a configuration change to the operating system of the specific-purpose local client.

114. The method of clause 110, wherein the automatically locating comprises obtaining address information of the remote repository server using at least one of a dynamic host configuration protocol (DHCP) or a domain name system (DNS).

115. The method of clause 110, wherein the automatically locating comprises obtaining address information of the repository server from a local registry of the specific-purpose local client.

116. The method of clause 110, further comprising determining whether to reset a previous state of the windows-based embedded image based on the XML configuration file, wherein, if it is determined that the previous state is to be reset, the automatically applying the configuration change comprises applying a default configuration to the windows-based embedded image before the configuration change is applied, and wherein, if it is determined that the previous state is not to be reset, the automatically applying the configuration change comprises applying the configuration change based on the XML configuration file, to the windows-based embedded image, while disallowing the default configuration from being applied to the windows-based embedded image.

Figure 21B:
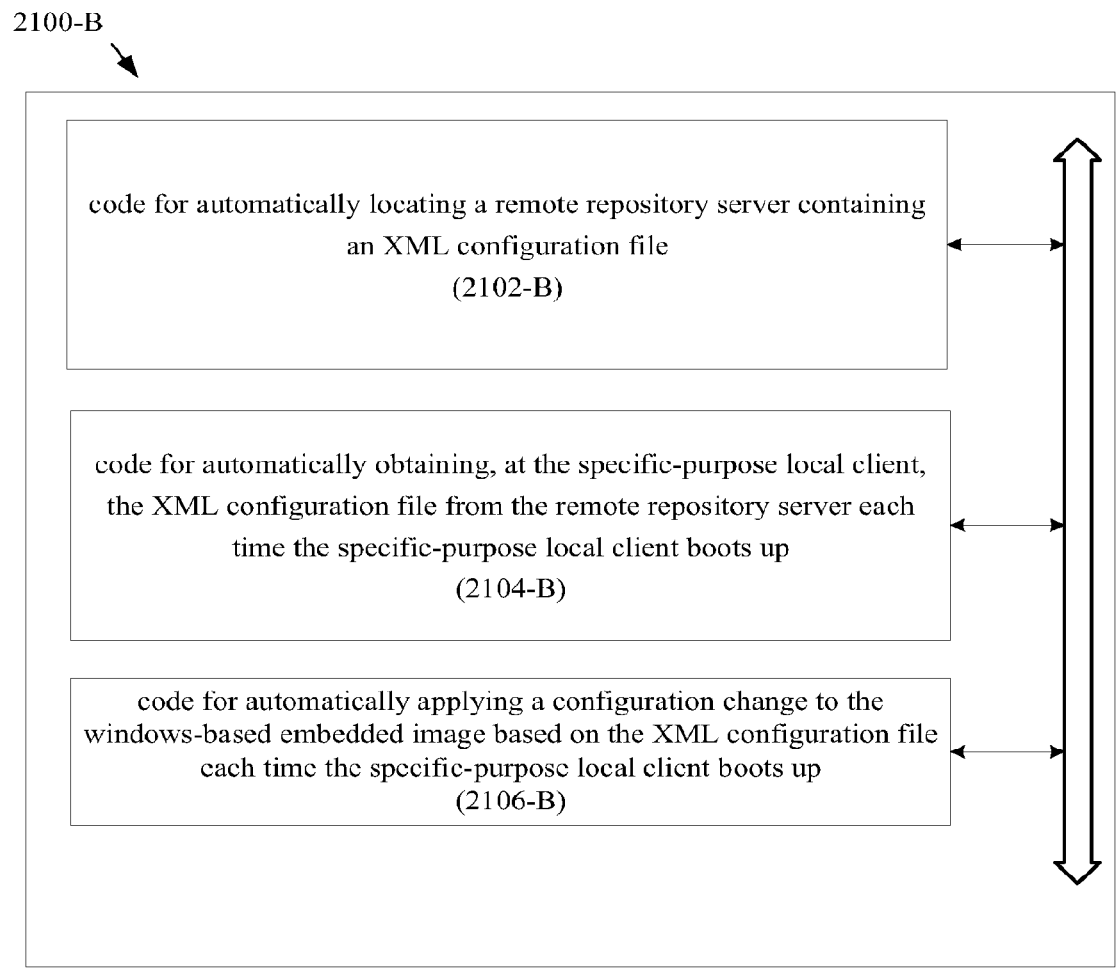
FIG. 21B is a block diagram representing code of an example of a machine-readable storage medium encoded with instructions executable by a processing system to perform a method for configuring and customizing a specific-purpose local client having a windows-based embedded image using extensible markup language (XML) configuration and obviating reinstallation of an entire windows-based embedded image onto the specific-purpose local client, in accordance with various aspects of the subject technology.

117. A machine-readable storage medium (see, e.g., machine-readable storage medium 2100-B of FIG. 21B)

encoded with instructions executable by a processing system to perform a method for configuring and customizing a specific-purpose local client (e.g., client 102 of FIG. 1) having a windows-based embedded image using extensible markup language (XML) configuration and obviating reinstallation of an entire windows-based embedded image onto the specific-purpose local client, the instructions comprising code for:
- automatically locating a remote repository server containing an XML configuration file (see, e.g., item 2102-B in FIG. 21B);
- automatically obtaining, at the specific-purpose local client, the XML configuration file from the remote repository server each time the specific-purpose local client boots up (see, e.g., item 2104-B in FIG. 21B); and
- automatically applying a configuration change to the windows-based embedded image based on the XML configuration file each time the specific-purpose local client boots up (see, e.g., item 2106-B in FIG. 21B),
- wherein the configuration change persists across a reboot of the specific-purpose local client while obviating reinstallation of an entire windows-based embedded image on the specific-purpose local client,
- wherein the XML configuration file is self-describing, user-definable, and validatable; and
- wherein the windows-based embedded image supports a graphical user interface and comprises an operating system (e.g., operating system module of FIG. 4) and one or more applications (e.g., application module of FIG. 4) dedicated to the specific purpose.

118. The machine-readable storage medium of clause 117, wherein the windows-based embedded image comprises a write-filter that prevents one or more changes applied to the windows-based embedded image with the write-filter enabled, from persisting across a reboot of the specific-purpose local client, and wherein the automatically applying comprises applying the configuration change to the windows-based embedded image while the write-filter is enabled.

119. The machine-readable storage medium of clause 118, wherein the instructions further comprise code for facilitating saving, while the write-filter is enabled, the configuration file into a storage area that is to be retained on the specific-purpose local client across a reboot of the specific-purpose local client.

120. The machine-readable storage medium of clause 117, wherein the configuration change comprises one or more of the following: a configuration change to a remote desktop connection, a configuration change to a device of the specific-purpose local client, and a configuration change to the operating system of the specific-purpose local client.

121. The machine-readable storage medium of clause 117, wherein the automatically locating comprises obtaining address information of the remote repository server using at least one of a dynamic host configuration protocol (DHCP) or a domain name system (DNS).

122. The machine-readable storage medium of clause 117, wherein the automatically locating comprises obtaining address information of the repository server from a local registry of the specific-purpose local client.

123. The machine-readable storage medium of clause 117, wherein the instructions further comprise code for determining whether to reset a previous state of the windows-based embedded image based on the XML configuration file,
- wherein, if it is determined that the previous state is to be reset, the automatically applying the configuration change comprises applying a default configuration to the windows-based embedded image before the configuration change is applied, and
- wherein, if it is determined that the previous state is not to be reset, the automatically applying the configuration change comprises applying the configuration change based on the XML configuration file, to the windows-based embedded image, while disallowing the default configuration from being applied to the windows-based embedded image.

124. A computing machine comprising the machine-readable storage medium of clause 117, wherein the computing machine comprises the specific-purpose local client.

Figure 21C:
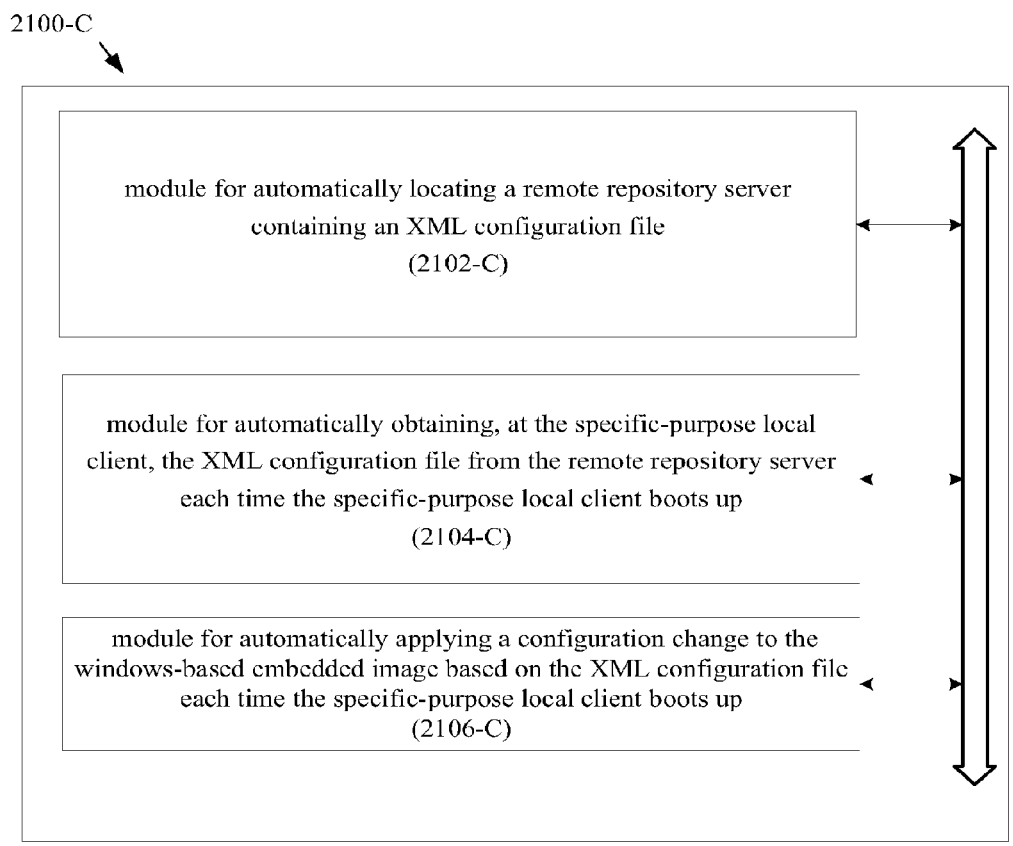
FIG. 21C is a block diagram module of an example of an apparatus for configuring and customizing a specific-purpose local client having a windows-based embedded image using extensible markup language (XML) configuration and obviating reinstallation of an entire windows-based embedded image onto the specific-purpose local client, in accordance with various aspects of the subject technology.

125. An apparatus (see, e.g., apparatus 2100-C of FIG. 21C) for configuring and customizing a specific-purpose local client (e.g., client 102 of FIG. 1) having a windows-based embedded image using extensible markup language (XML) configuration and obviating reinstallation of an entire windows-based embedded image onto the specific-purpose local client, the apparatus comprising:
- means for automatically locating a remote repository server containing an XML configuration file (see, e.g., item 2102-C in FIG. 21C);
- means for automatically obtaining, at the specific-purpose local client, the XML configuration file from the remote repository server each time the specific-purpose local client boots up (see, e.g., item 2104-C in FIG. 21C); and
- means for automatically applying a configuration change to the windows-based embedded image based on the XML configuration file each time the specific-purpose local client boots up (see, e.g., item 2106-C in FIG. 21C),
- wherein the configuration change persists across a reboot of the specific-purpose local client while obviating reinstallation of an entire windows-based embedded image on the specific-purpose local client,
- wherein the XML configuration file is self-describing, user-definable, and validatable; and
- wherein the windows-based embedded image supports a graphical user interface and comprises an operating system (e.g., operating system module of FIG. 4) and one or more applications (e.g., application module of FIG. 4) dedicated to the specific purpose.

126. The apparatus of clause 125, wherein the windows-based embedded image comprises a write-filter that prevents one or more changes applied to the windows-based embedded image with the write-filter enabled, from persisting across a reboot of the specific-purpose local client, and wherein the means for automatically applying comprises means for applying the configuration change to the windows-based embedded image while the write-filter is enabled.

127. The apparatus of clause 126, further comprising means for facilitating saving, while the write-filter is enabled, the configuration file into a storage area that is to be retained on the specific-purpose local client across a reboot of the specific-purpose local client.

128. The apparatus of clause 125, wherein the configuration change comprises one or more of the following: a configuration change to a remote desktop connection, a configuration change to a device of the specific-purpose local client, and a configuration change to the operating system of the specific-purpose local client.

129. The apparatus of clause 125, wherein the means for automatically locating comprises means for obtaining address information of the remote repository server using at least one of a dynamic host configuration protocol (DHCP) or a domain name system (DNS).

130. The apparatus of clause 125, wherein the means for automatically locating comprises means for obtaining address information of the repository server from a local registry of the specific-purpose local client.

131. The apparatus of clause 125, further comprising means for determining whether to reset a previous state of the windows-based embedded image based on the XML configuration file,
   wherein, if it is determined that the previous state is to be reset, the means for automatically applying the configuration change comprises means for applying a default configuration to the windows-based embedded image before the configuration change is applied, and
   wherein, if it is determined that the previous state is not to be reset, the means for automatically applying the configuration change comprises means for applying the configuration change based on the XML configuration file, to the windows-based embedded image, while disallowing the default configuration from being applied to the windows-based embedded image.

132. The apparatus of clause 125, wherein the apparatus comprises the specific-purpose local client.

133. The apparatus of clause 125, wherein the apparatus comprises a processing system and a memory.

Illustration of Apparatus/Method/Machine Readable Storage Medium for State-Based Provisioning of a Client Having a Windows-Based Embedded Image (Described as Clauses)

The subject technology is illustrated, for example, according to various aspects described below. Various examples of aspects of the subject technology are described as numbered clauses (134, 135, 136, etc.) for convenience. These are provided as examples, and do not limit the subject technology. It is noted that any of the dependent clauses may be combined in any combination, and placed into a respective independent clause, e.g., clause 134, 148, 162, and 177. The other clauses can be presented in a similar manner.

134. An apparatus for state-based provisioning of a local client (e.g., client 102 of FIG. 1) having a windows-based embedded image, the apparatus comprising:
   a retrieval module (e.g., retrieval module 408 of FIG. 4) of the local client configured to facilitate locating a remote repository server (e.g., repository server 104 of FIG. 1) containing a configuration file, the retrieval module configured to facilitate obtaining the configuration file from the remote repository server;
   a reset check module (e.g., reset check module 410 of FIG. 4) of the local client configured to determine whether to reset a previous state of the windows-based embedded image based on the configuration file; and
   an apply settings module (e.g., apply settings module 414 of FIG. 4) of the local client configured to apply, to the windows-based embedded image, one of a first configuration change and a second configuration change based on the determination, the first configuration change comprising a configuration update to the previous state of the windows-based embedded image, the second configuration change comprising a change to the windows-based embedded image independent of the previous state of the windows-based embedded image,
   wherein the windows-based embedded image supports a graphical user interface and comprises an operating system (e.g., operating system module 426 of FIG. 4) and one or more applications (e.g., application module 422 of FIG. 4).

135. The apparatus of clause 134,
   wherein, if the reset check module determines that the previous state is to be reset, the apply settings module is configured to apply a default configuration to the windows-based embedded image and to apply a configuration based on the configuration file to the windows-based embedded image after the default configuration is applied, wherein the second configuration change comprises the default configuration and the configuration, and
   wherein, if the reset check module determines that the previous state is not to be reset, the apply settings module is configured to apply the configuration based on the configuration file, to the windows-based embedded image, while disallowing the default configuration from being applied to the windows-based embedded image, wherein the first configuration change comprises the configuration.

136. The apparatus of clause 135, wherein the default configuration is applied based on a default configuration file contained in the local client.

137. The apparatus of clause 134, wherein the windows-based embedded image comprises a write-filter that prevents one or more changes applied to the windows-based embedded image with the write-filter enabled, from persisting across a reboot of the local client.

138. The apparatus of clause 137, wherein the retrieval module is configured to facilitate obtaining the configuration file from the repository server while the write-filter is enabled, while obviating reinstallation of an entire windows-based embedded image onto the local client.

139. The apparatus of clause 137, wherein the apply settings module is configured to apply one of the first configuration change and the second configuration change to the windows-based embedded image while the write-filter is enabled.

140. The apparatus of clause 137, wherein the apply settings module is configured to, while the write-filter is enabled, facilitate saving the configuration file into a storage area that is to be retained on the local client across a reboot of the local client.

141. The apparatus of clause 134, wherein after each reboot of the local client is initiated, the apply settings module is configured to automatically apply one of the first configuration change and the second configuration change to the windows-based embedded image to allow one of the first configuration change and the second configuration change to appear, to a user of the local client, to be persistent across a reboot of the local client.

142. The apparatus of clause 134, wherein after each reboot of the local client is initiated, the retrieval module is configured to automatically facilitate locating a repository server containing a configuration file and facilitate obtaining a configuration file.

143. The apparatus of clause 134, wherein each of the first configuration change and the second configuration change comprises one or more of the following: a configuration change to a remote desktop connection, a configuration change to a device of the local client, or a configuration change to the operating system of the local client.

144. The apparatus of clause 134, wherein after a reboot of the local client is initiated, the apply settings module is configured to automatically apply, without a user's intervention, one of the first configuration change and the second configuration change based on the configuration file saved in a storage area that is retained on the local client across a reboot of the local client, to allow one of the first configuration change and the second configuration change to appear, to the user of the local client, to be persistent across a reboot of the local client.

145. The apparatus of clause 134, wherein the configuration file comprises an XML configuration file.

146. The apparatus of clause 134, wherein the retrieval module is configured to obtain address information of the repository server using at least one of a dynamic host configuration protocol (DHCP) or a domain name system (DNS).

147. The apparatus of clause 134, wherein the retrieval module is configured to obtain address information of the repository server from a local registry of the local client.

Figure 22A:
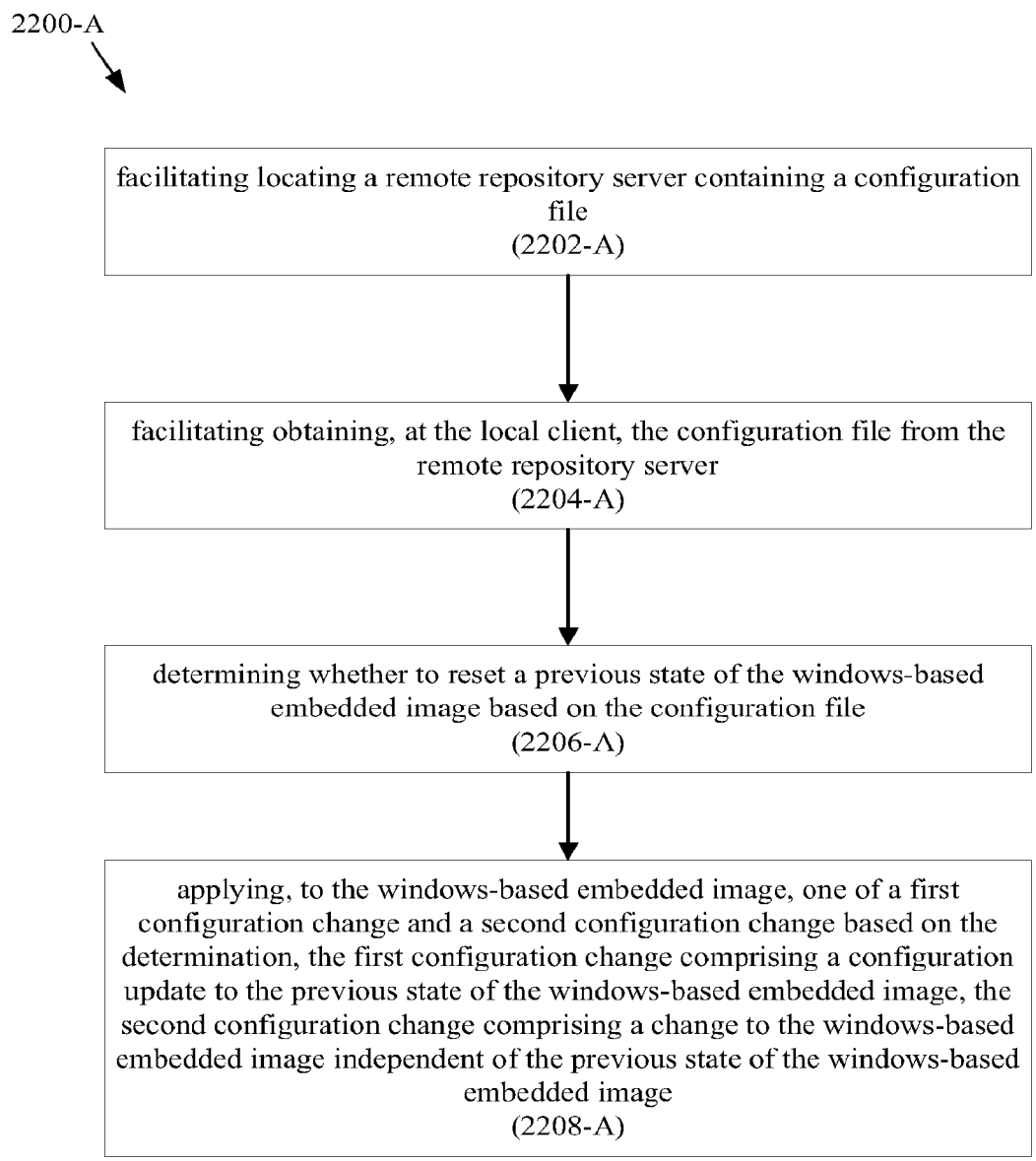
FIG. 22A is a block diagram representing an example of a method for state-based provisioning of a local client having a windows-based embedded image, in accordance with various aspects of the subject technology.

148. A method (see, e.g., method 2200-A of FIG. 22A) for state-based provisioning of a local client (e.g., client 102 of FIG. 1) having a windows-based embedded image, the method comprising:
  facilitating locating a remote repository server containing a configuration file (see, e.g., item 2202-A in FIG. 22A);
  facilitating obtaining, at the local client, the configuration file from the remote repository server (see, e.g., item 2204-A in FIG. 22A);
  determining whether to reset a previous state of the windows-based embedded image based on the configuration file (see, e.g., item 2206-A in FIG. 22A); and
  applying, to the windows-based embedded image, one of a first configuration change and a second configuration change based on the determination, the first configuration change comprising a configuration update to the previous state of the windows-based embedded image, the second configuration change comprising a change to the windows-based embedded image independent of the previous state of the windows-based embedded image (see, e.g., item 2208-A in FIG. 22A),
  wherein the windows-based embedded image supports a graphical user interface and comprises an operating system (e.g., operating system module 426 of FIG. 4) and one or more applications (e.g., application module 422 of FIG. 4).

149. The method of clause 148,
  wherein, if it is determined that the previous state is to be reset, the applying the one of the first configuration change and the second configuration change comprises applying a default configuration to the windows-based embedded image and applying a configuration based on the configuration file to the windows-based embedded image after the default configuration is applied, wherein the second configuration change comprises the default configuration and the configuration, and
  wherein, if it is determined that the previous state is not to be reset, the applying the one of the first configuration change and the second configuration change comprises applying the configuration based on the configuration file, to the windows-based embedded image, while disallowing the default configuration from being applied to the windows-based embedded image, wherein the first configuration change comprises the configuration.

150. The method of clause 149, wherein the default configuration is applied based on a default configuration file contained in the local client.

151. The method of clause 148, wherein the windows-based embedded image comprises a write-filter that prevents one or more changes applied to the windows-based embedded image with the write-filter enabled, from persisting across a reboot of the local client.

152. The method of clause 151, wherein the facilitating obtaining comprises facilitating obtaining the configuration file from the repository server while the write-filter is enabled, while obviating reinstallation of an entire windows-based embedded image onto the local client.

153. The method of clause 151, wherein the applying comprises applying the one of the first configuration change and the second configuration change to the windows-based embedded image while the write-filter is enabled.

154. The method of clause 151, further comprising facilitating saving, while the write filter is enabled, the configuration file into a storage area that is to be retained on the local client across a reboot of the local client.

155. The method of clause 148, wherein the applying comprises automatically applying, after each reboot of the local client is initiated, one of the first configuration change and the second configuration change to the windows-based embedded image to allow one of the first configuration change and the second configuration change to appear, to a user of the local client, to be persistent across a reboot of the local client.

156. The method of clause 148, wherein the facilitating locating the remote repository server and the facilitating obtaining the configuration file comprise automatically facilitating locating the repository server containing the configuration file and facilitating obtaining the configuration file, after each reboot of the local client is initiated.

157. The method of clause 148, wherein each of the first configuration change and the second configuration change comprises one or more of the following: a configuration change to a remote desktop connection, a configuration change to a device of the local client, or a configuration change to the operating system of the local client.

158. The method of clause 148, wherein the applying comprises automatically applying, after a reboot of the local client is initiated and without a user's intervention, one of the first configuration change and the second configuration change based on the configuration file saved in a storage area that is retained on the local client across a reboot of the local client, to allow one of the first configuration change and the second configuration change to appear, to the user of the local client, to be persistent across a reboot of the local client.

159. The method of clause 148, wherein the configuration file comprises an XML configuration file.

160. The method of clause 148, wherein the facilitating locating comprises obtaining address information of the repository server using at least one of a dynamic host configuration protocol (DHCP) or a domain name system (DNS).

161. The method of clause 148, wherein the facilitating locating comprises obtaining address information of the repository server from a local registry of the local client.

Figure 22B:
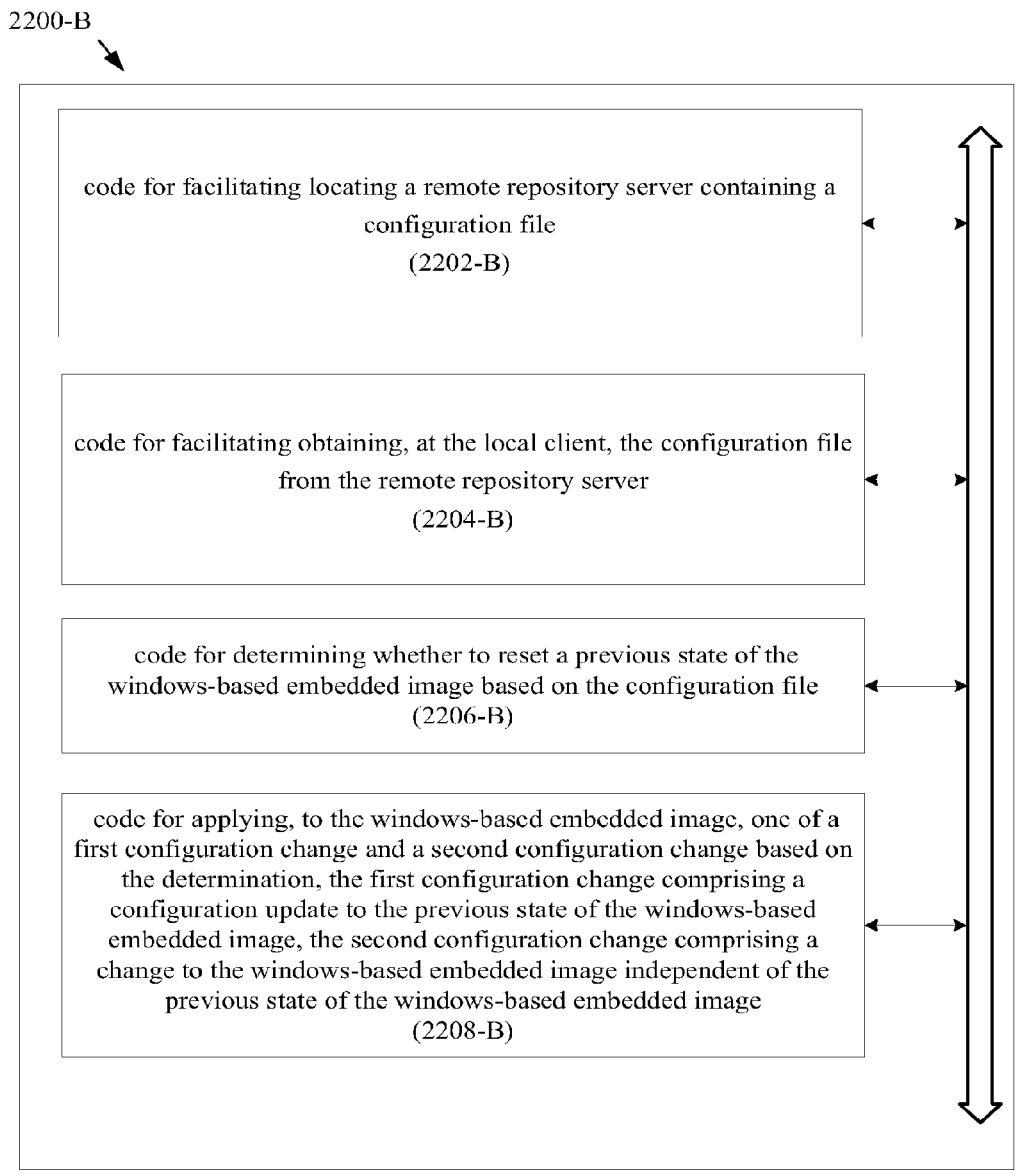
FIG. 22B is a block diagram representing code of an example of a machine-readable storage medium encoded with instructions executable by a processing system to perform a method for state-based provisioning of a local client having a windows-based embedded image, in accordance with various aspects of the subject technology.

162. A machine-readable storage medium (see, e.g., machine-readable storage medium 2200-B of FIG. 22B) encoded with instructions executable by a processing system to perform a method for state-based provisioning of a local client (e.g., client 102 of FIG. 1) having a windows-based embedded image, the instructions comprising code for:
  facilitating locating a remote repository server containing a configuration file (see, e.g., item 2202-B in FIG. 22B);
  facilitating obtaining, at the local client, the configuration file from the remote repository server (see, e.g., item 2204-B in FIG. 22B);
  determining whether to reset a previous state of the windows-based embedded image based on the configuration file (see, e.g., item 2206-B in FIG. 22B); and
  applying, to the windows-based embedded image, one of a first configuration change and a second configuration change based on the determination, the first configuration change comprising a configuration update to the previous state of the windows-based embedded image, the second configuration change comprising a change to the windows-based embedded image independent of the previous state of the windows-based embedded image (see, e.g., item 2208-B in FIG. 22B), wherein the windows-based embedded image supports a graphical user interface and comprises an operating system (e.g., operating system module 426 of FIG. 4) and one or more applications (e.g., application module 422 of FIG. 4).

163. The machine-readable storage medium of clause 162, wherein, if it is determined that the previous state is to be reset, the applying the one of the first configuration change and the second configuration change comprises applying a default configuration to the windows-based embedded image and applying a configuration based on the configuration file to the windows-based embedded image after the default configuration is applied, wherein the second configuration change comprises the default configuration and the configuration, and wherein, if it is determined that the previous state is not to be reset, the applying the one of the first configuration change and the second configuration change comprises applying the configuration based on the configuration file, to the windows-based embedded image, while disallowing the default configuration from being applied to the windows-based embedded image, wherein the first configuration change comprises the configuration.

164. The machine-readable storage medium of clause 163, wherein the default configuration is applied based on a default configuration file contained in the local client.

165. The machine-readable storage medium of clause 162, wherein the windows-based embedded image comprises a write-filter that prevents one or more changes applied to the windows-based embedded image with the write-filter enabled, from persisting across a reboot of the local client.

166. The machine-readable storage medium of clause 165, wherein the facilitating obtaining comprises facilitating obtaining the configuration file from the repository server while the write-filter is enabled, while obviating reinstallation of an entire windows-based embedded image onto the local client.

167. The machine-readable storage medium of clause 165, wherein the applying comprises applying the one of the first configuration change and the second configuration change to the windows-based embedded image while the write-filter is enabled.

168. The machine-readable storage medium of clause 165, wherein the instructions further comprise code for facilitating saving, while the write-filter is enabled, the configuration file into a storage area that is to be retained on the local client across a reboot of the local client.

169. The machine-readable storage medium of clause 162, wherein the applying comprises automatically applying, after each reboot of the local client is initiated, one of the first configuration change and the second configuration change to the windows-based embedded image to allow one of the first configuration change and the second configuration change to appear, to a user of the local client, to be persistent across a reboot of the local client.

170. The machine-readable storage medium of clause 162, wherein the facilitating locating the remote repository server and the facilitating obtaining the configuration file comprise automatically facilitating locating the repository server containing the configuration file and facilitating obtaining the configuration file, after each reboot of the local client is initiated.

171. The machine-readable storage medium of clause 162, wherein each of the first configuration change and the second configuration change comprises one or more of the following: a configuration change to a remote desktop connection, a configuration change to a device of the local client, or a configuration change to the operating system of the local client.

172. The machine-readable storage medium of clause 162, wherein the applying comprises automatically applying, after a reboot of the local client is initiated and without a user's intervention, one of the first configuration change and the second configuration change based on the configuration file saved in a storage area that is retained on the local client across a reboot of the local client, to allow one of the first configuration change and the second configuration change to appear, to the user of the local client, to be persistent across a reboot of the local client.

173. The machine-readable storage medium of clause 162, wherein the configuration file comprises an XML configuration file.

174. The machine-readable storage medium of clause 162, wherein the facilitating locating comprises obtaining address information of the repository server using at least one of a dynamic host configuration protocol (DHCP) or a domain name system (DNS).

175. The machine-readable storage medium of clause 162, wherein the facilitating locating comprises obtaining address information of the repository server from a local registry of the local client.

176. A computing machine comprising the machine-readable storage medium of clause 162, wherein the computing machine comprises the local client.

Figure 22C:
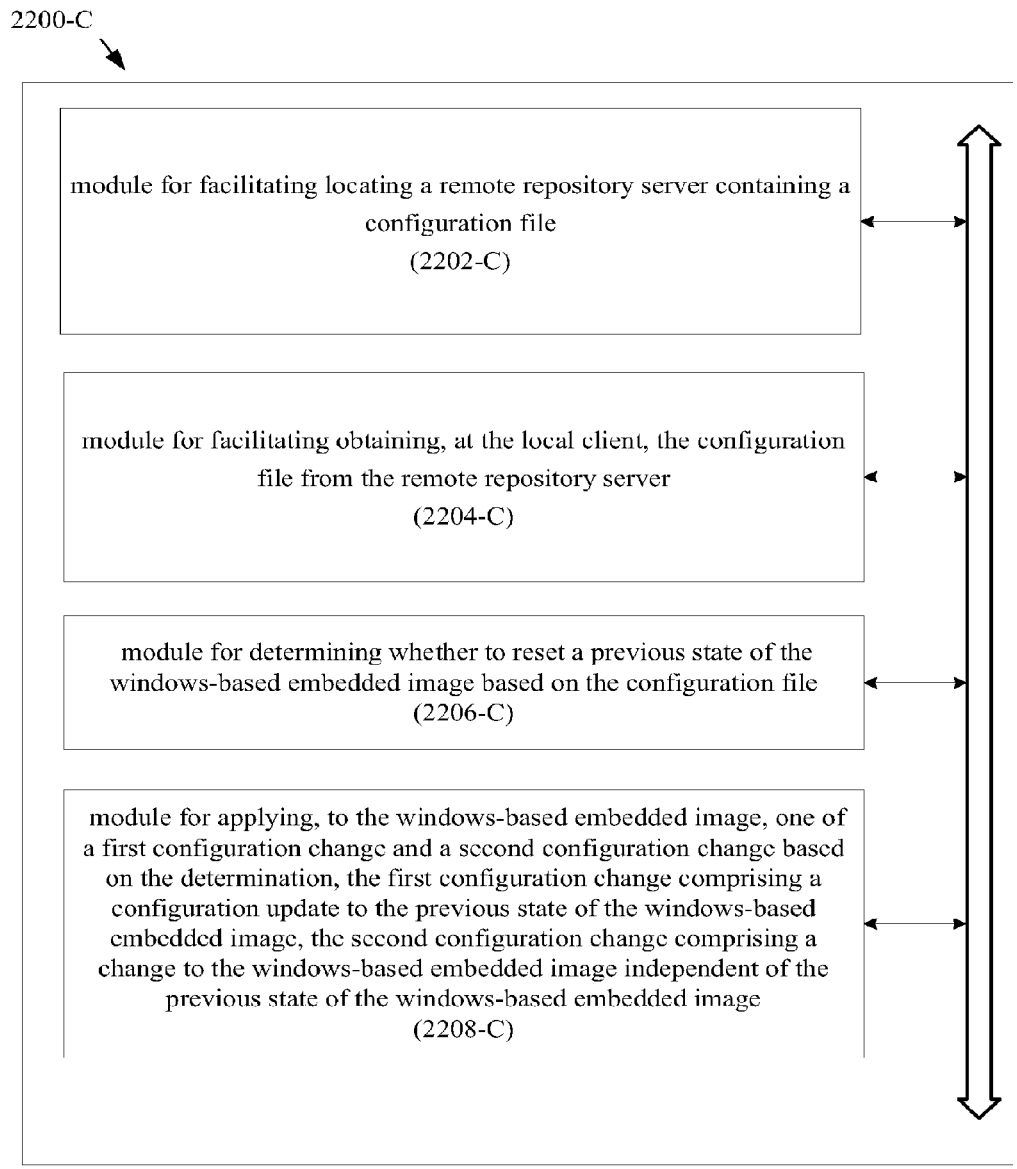
FIG. 22C is a block diagram module of an example of an apparatus for state-based provisioning of a local client having a windows-based embedded image, in accordance with various aspects of the subject technology.

177. An apparatus (see, e.g., apparatus 2200-C of FIG. 22C) for state-based provisioning of a local client (e.g., client 102 of FIG. 1) having a windows-based embedded image, the apparatus comprising:
- means for facilitating locating a remote repository server containing a configuration file (see, e.g., item 2202-C in FIG. 22C);
- means for facilitating obtaining, at the local client, the configuration file from the remote repository server (see, e.g., item 2204-C in FIG. 22C);
- means for determining whether to reset a previous state of the windows-based embedded image based on the configuration file (see, e.g., item 2206-C in FIG. 22C); and
- means for applying, to the windows-based embedded image, one of a first configuration change and a second configuration change based on the determination, the first configuration change comprising a configuration update to the previous state of the windows-based embedded image, the second configuration change comprising a change to the windows-based embedded image independent of the previous state of the windows-based embedded image (see, e.g., item 2208-C in FIG. 22C),
- wherein the windows-based embedded image supports a graphical user interface and comprises an operating system (e.g., operating system module 426 of FIG. 4) and one or more applications (e.g., application module 422 of FIG. 4).

178. The apparatus of clause 177,
wherein, if it is determined that the previous state is to be reset, the means for applying the one of the first configuration change and the second configuration change comprises means for applying a default configuration to the windows-based embedded image and means for applying a configuration based on the configuration file to the windows-based embedded image after the default configuration is applied, wherein the second configuration change comprises the default configuration and the configuration, and wherein, if it is determined that the previous state is not to be reset, the means for applying the one of the first configuration change and the second configuration change comprises means for applying the configuration based on the configuration file, to the windows-based embedded image, while disallowing the default configuration from being applied to the windows-based embedded image, wherein the first configuration change comprises the configuration.

179. The apparatus of clause 178, wherein the default configuration is applied based on a default configuration file contained in the local client.

180. The apparatus of clause 177, wherein the windows-based embedded image comprises a write-filter that prevents one or more changes applied to the windows-based embedded image with the write-filter enabled, from persisting across a reboot of the local client.

181. The apparatus of clause 180, wherein the means for facilitating obtaining comprises means for facilitating obtaining the configuration file from the repository server while the write-filter is enabled, while obviating reinstallation of an entire windows-based embedded image onto the local client.

182. The apparatus of clause 180, wherein the means for applying comprises means for applying the one of the first configuration change and the second configuration change to the windows-based embedded image while the write-filter is enabled.

183. The apparatus of clause 180, further comprising means for facilitating saving, while the write-filter is enabled, the configuration file into a storage area that is to be retained on the local client across a reboot of the local client.

184. The apparatus of clause 177, wherein the means for applying comprises means for automatically applying, after each reboot of the local client is initiated, one of the first configuration change and the second configuration change to the windows-based embedded image to allow one of the first configuration change and the second configuration change to appear, to a user of the local client, to be persistent across a reboot of the local client.

185. The apparatus of clause 177, wherein the means for facilitating locating the remote repository server and the means for facilitating obtaining the configuration file comprise automatically facilitating locating the repository server containing the configuration file and means for facilitating obtaining the configuration file, after each reboot of the local client is initiated.

186. The apparatus of clause 177, wherein each of the first configuration change and the second configuration change comprises one or more of the following: a configuration change to a remote desktop connection, a configuration change to a device of the local client, or a configuration change to the operating system of the local client.

187. The apparatus of clause 177, wherein the means for applying comprises means for automatically applying, after a reboot of the local client is initiated and without a user's intervention, one of the first configuration change and the second configuration change based on the configuration file saved in a storage area that is retained on the local client across a reboot of the local client, to allow one of the first configuration change and the second configuration change to appear, to the user of the local client, to be persistent across a reboot of the local client.

188. The apparatus of clause 177, wherein the configuration file comprises an XML configuration file.

189. The apparatus of clause 177, wherein the means for facilitating locating comprises means for obtaining address information of the repository server using at least one of a dynamic host configuration protocol (DHCP) or a domain name system (DNS).

190. The apparatus of clause 177, wherein the means for facilitating locating comprises means for obtaining address information of the repository server from a local registry of the local client.

191. The apparatus of clause 177, wherein the apparatus comprises the local client.

192. The apparatus of clause 177, wherein the apparatus comprises a processing system and a memory.

Illustration of Apparatus/Method/Machine Readable Storage Medium for Comparing and Provisioning Configurations for a Client Having a Windows-Based Embedded Image (Described as Clauses)

The subject technology is illustrated, for example, according to various aspects described below. Various examples of aspects of the subject technology are described as numbered clauses (193, 194, 195, etc.) for convenience. These are provided as examples, and do not limit the subject technology. It is noted that any of the dependent clauses may be combined in any combination, and placed into a respective independent clause, e.g., clause 193, 206, 219, and 233. The other clauses can be presented in a similar manner.

193. An apparatus for comparing and provisioning configurations for a local client (e.g., client 102 of FIG. 1) having a windows-based embedded image, the apparatus comprising:
  a retrieval module (e.g., retrieval module 410 of FIG. 4) of the local client configured to facilitate locating a remote repository server (e.g., repository server 104 of FIG. 1) containing a new configuration file, the retrieval module configured to facilitate obtaining the new configuration file from the remote repository server, the retrieval module configured to facilitate obtaining a previous configuration file associated with a previous configuration change successfully applied to the windows-based embedded image;
  a configuration comparison module (e.g., configuration comparison module 412 of FIG. 4) of the local client configured to compare the new configuration file with the previous configuration file; and
  an apply settings module (e.g., apply settings module 414 of FIG. 4) of the local client configured to apply, to the windows-based embedded image, one of a new configuration change and the previous configuration change based on the comparison,
  wherein the new configuration change is based on the new configuration file, and
  wherein the windows-based embedded image supports a graphical user interface and comprises an operating system (e.g., operating system module 426 of FIG. 4) and one or more applications (e.g., application module 422 of FIG. 4).

194. The apparatus of clause 193,
  wherein, if the new configuration file is the same as the previous configuration file, then the apply settings module is configured to apply the previous configuration change to the windows-based embedded image based on the previous configuration file, and
  wherein, if the new configuration file is different from the previous configuration file, then the apply settings module is configured to apply the new configuration change to the windows-based embedded image based on the new configuration file.

195. The apparatus of clause 193, wherein the windows-based embedded image comprises the write-filter that prevents one or more changes applied to the windows-based embedded image with the write-filter enabled, from persisting across a reboot of the local client.

196. The apparatus of clause 195, wherein the retrieval module is configured to facilitate obtaining the new configuration file from the repository server while the write-filter is enabled, while obviating reinstallation of an entire windows-based embedded image onto the local client.

197. The apparatus of clause 195, wherein the apply settings module is configured to apply one of the new configuration change and the previous configuration change to the windows-based embedded image while the write-filter is enabled.

198. The apparatus of clause 195, wherein the apply settings module is configured to, while the write-filter is enabled, facilitate saving the previous configuration file into a storage area that is to be retained on the local client across a reboot of the local client.

199. The apparatus of clause 193, wherein after each reboot of the local client is initiated, the apply settings module is configured to automatically apply one of the new configuration change and the previous configuration change to the windows-based embedded image to allow one of the new configuration change and the previous configuration change to appear, to a user of the local client, to be persistent across a reboot of the local client.

200. The apparatus of clause 193, wherein after each reboot of the local client is initiated, the retrieval module is configured to automatically facilitate locating a repository server containing a new configuration file and facilitate obtaining a new configuration file.

201. The apparatus of clause 193, wherein each of the new configuration change and the previous configuration change comprises one or more of the following: a configuration change to a remote desktop connection, a configuration change to a device of the local client, or a configuration change to the operating system of the local client.

202. The apparatus of clause 193, wherein after a reboot of the local client is initiated, the apply settings module is configured to automatically apply, without a user's intervention, the previous configuration change based on the previous configuration file saved in a storage area that is retained on the local client across a reboot of the local client, to allow the previous configuration change to appear, to the user of the local client, to be persistent across a reboot of the local client.

203. The apparatus of clause 193, wherein at least one of the new configuration file and the previous configuration file comprises an XML configuration file.

204. The apparatus of clause 193, wherein the retrieval module is configured to obtain address information of the repository server using at least one of a dynamic host configuration protocol (DHCP) or a domain name system (DNS).

205. The apparatus of clause 193, wherein the retrieval module is configured to obtain address information of the repository server from a local registry of the local client.

Figure 23A:
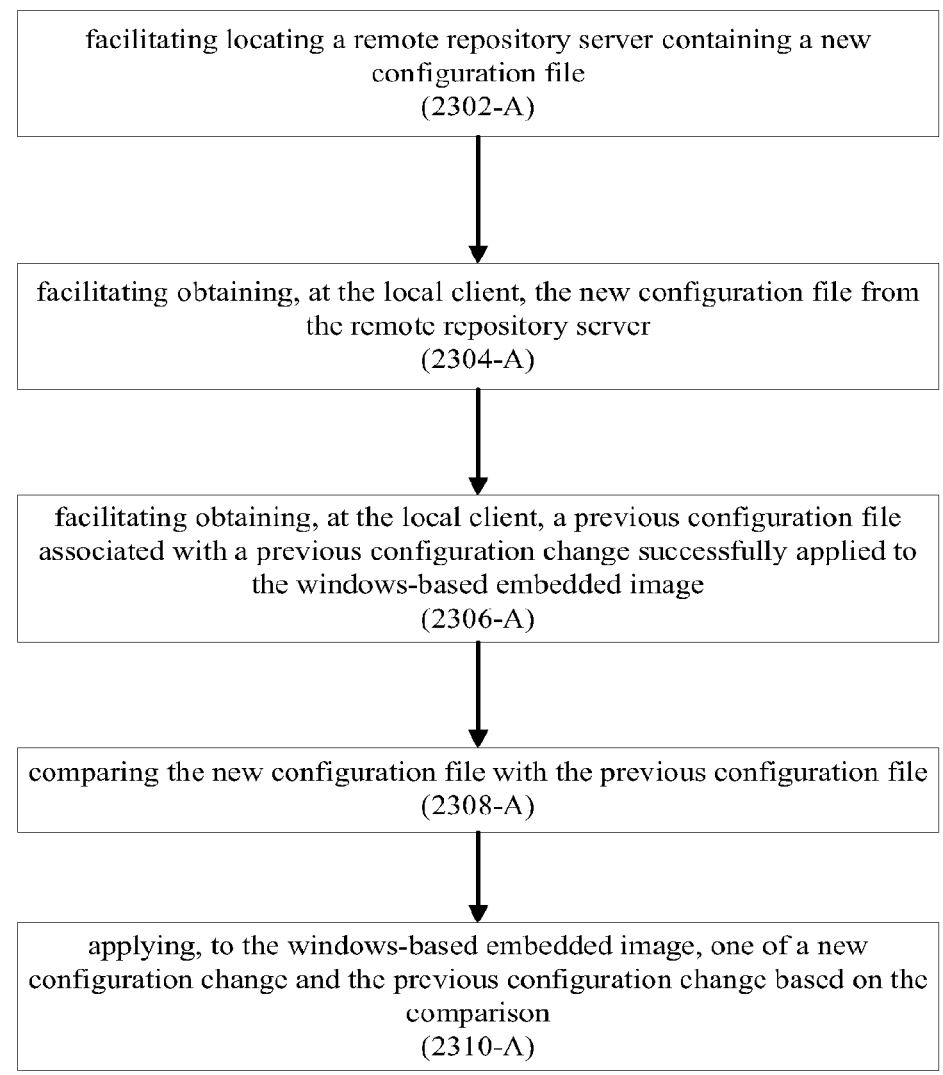
FIG. 23A is a block diagram representing an example of a method for comparing and provisioning configurations for a local client having a windows-based embedded image, in accordance with various aspects of the subject technology.

206. A method (see, e.g., method 2300-A of FIG. 23A) for comparing and provisioning configurations for a local client (e.g., client 102 of FIG. 1) having a windows-based embedded image, the method comprising:

facilitating locating a remote repository server containing a new configuration file (see, e.g., item 2302-A in FIG. 23A);

facilitating obtaining, at the local client, the new configuration file from the remote repository server (see, e.g., item 2304-A in FIG. 23A);

facilitating obtaining, at the local client, a previous configuration file associated with a previous configuration change successfully applied to the windows-based embedded image (see, e.g., item 2306-A in FIG. 23A);

comparing the new configuration file with the previous configuration file (see, e.g., item 2308-A in FIG. 23A); and applying, to the windows-based embedded image, one of a new configuration change and the previous configuration change based on the comparison (see, e.g., item 2310-A in FIG. 23A), wherein the new configuration change is based on the new configuration file, and wherein the windows-based embedded image supports a graphical user interface and comprises an operating system (e.g., operating system module 426 of FIG. 4) and one or more applications (e.g., application module 422 of FIG. 4).

207. The method of clause 206, wherein, if the new configuration file is the same as the previous configuration file, then the applying to the windows-based embedded image comprises applying the previous configuration change to the windows-based embedded image based on the previous configuration file, and wherein, if the new configuration file is different from the previous configuration file, then the applying to the windows-based embedded image comprises applying the new configuration change to the windows-based embedded image based on the new configuration file.

208. The method of clause 206, wherein the windows-based embedded image comprises the write-filter that prevents one or more changes applied to the windows-based embedded image with the write-filter enabled, from persisting across a reboot of the local client.

209. The method of clause 208, wherein the facilitating obtaining comprises facilitating obtaining the new configuration file from the repository server while the write-filter is enabled, while obviating reinstallation of an entire windows-based embedded image onto the local client.

210. The method of clause 208, wherein the applying comprises applying one of the new configuration change and the previous configuration change to the windows-based embedded image while the write-filter is enabled.

211. The method of clause 208, further comprising facilitating saving, while the write-filter is enabled, the previous configuration file into a storage area that is to be retained on the local client across a reboot of the local client.

212. The method of clause 206, wherein the applying comprises automatically applying, after each reboot of the local client is initiated, one of the new configuration change and the previous configuration change to the windows-based embedded image to allow one of the new configuration change and the previous configuration change to appear, to a user of the local client, to be persistent across a reboot of the local client.

213. The method of clause 206, wherein the facilitating locating the remote repository server and the facilitating obtaining the new configuration file comprise automatically facilitating locating the repository server containing the new configuration file and facilitating obtaining the new configuration file, after each reboot of the local client is initiated.

214. The method of clause 206, wherein each of the new configuration change and the previous configuration change comprises one or more of the following: a configuration change to a remote desktop connection, a configuration change to a device of the local client, or a configuration change to the operating system of the local client.

215. The method of clause 206, wherein the applying comprises automatically applying, after a reboot of the local client is initiated and without a user's intervention, the previous configuration change based on the previous configuration file saved in a storage area that is retained on the local client across a reboot of the local client, to allow the previous configuration change to appear, to the user of the local client, to be persistent across a reboot of the local client.

216. The method of clause 206, wherein at least one of the new configuration file and the previous configuration file comprises an XML configuration file.

217. The method of clause 206, wherein the facilitating locating comprises obtaining address information of the repository server using at least one of a dynamic host configuration protocol (DHCP) or a domain name system (DNS).

218. The method of clause 206, wherein the facilitating locating comprises obtaining address information of the repository server from a local registry of the local client.

Figure 23B:
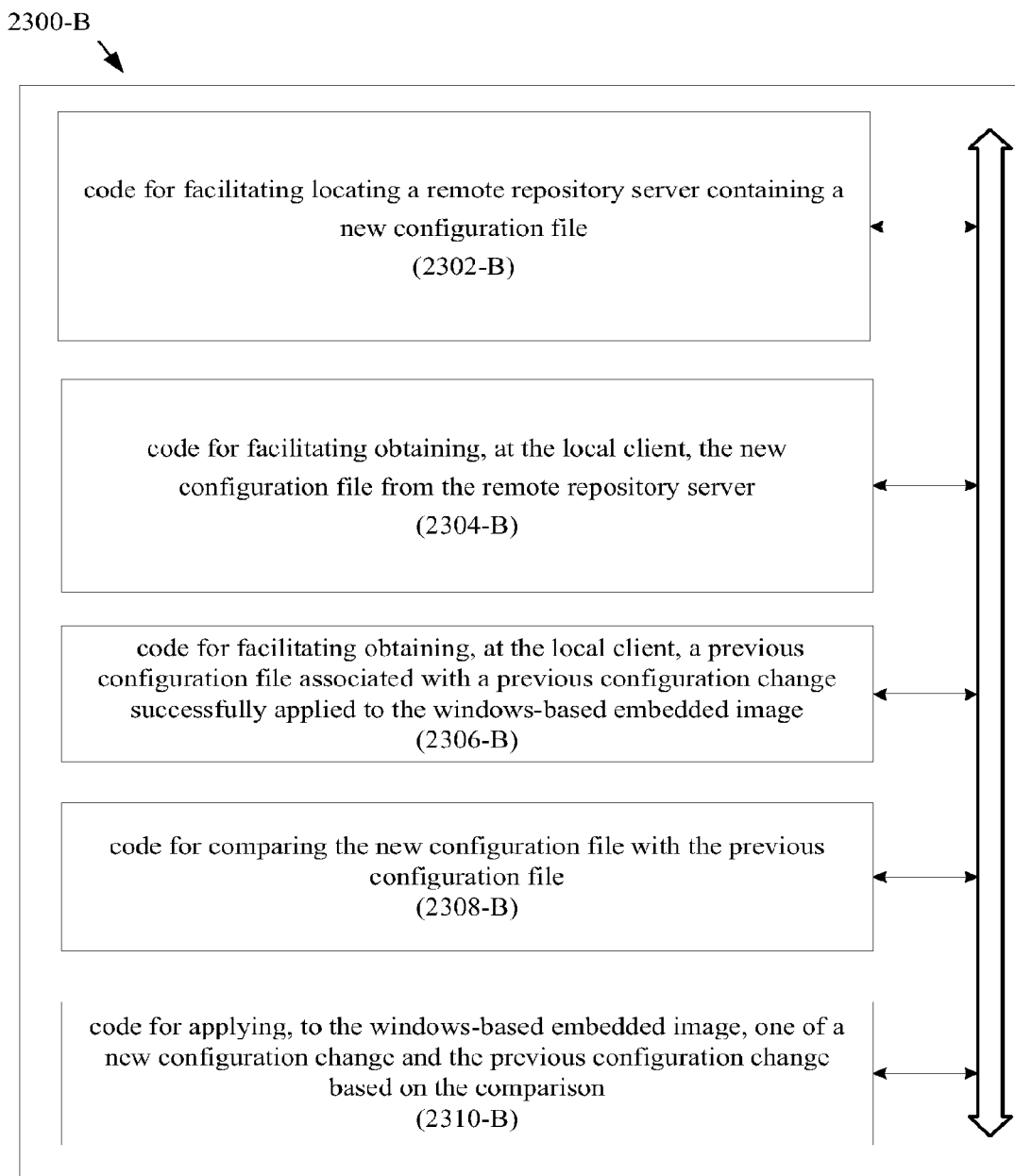
FIG. 23B is a block diagram representing code of an example of a machine-readable storage medium encoded with instructions executable by a processing system to perform a method for comparing and provisioning configurations for a local client having a windows-based embedded image, in accordance with various aspects of the subject technology.

219. A machine-readable storage medium (see, e.g., machine-readable storage medium 2300-B of FIG. 23B) encoded with instructions executable by a processing system to perform a method for comparing and provisioning configurations for a local client (e.g., client 102 of FIG. 1) having a windows-based embedded image, the instructions comprising code for:

facilitating locating a remote repository server containing a new configuration file (see, e.g., item 2302-B in FIG. 23B);

facilitating obtaining, at the local client, the new configuration file from the remote repository server (see, e.g., item 2304-B in FIG. 23B);

facilitating obtaining, at the local client, a previous configuration file associated with a previous configuration change successfully applied to the windows-based embedded image (see, e.g., item 2306-B in FIG. 23B);

comparing the new configuration file with the previous configuration file (see, e.g., item 2308-B in FIG. 23B); and applying, to the windows-based embedded image, one of a new configuration change and the previous configuration change based on the comparison (see, e.g., item 2310-B in FIG. 23B), wherein the new configuration change is based on the new configuration file, and wherein the windows-based embedded image supports a graphical user interface and comprises an operating system (e.g., operating system module 426 of FIG. 4) and one or more applications (e.g., application module 422 of FIG. 4).

220. The machine-readable storage medium of clause 219, wherein, if the new configuration file is the same as the previous configuration file, then the applying to the windows-based embedded image comprises applying the previous configuration change to the windows-based embedded image based on the previous configuration file, and wherein, if the new configuration file is different from the previous configuration file, then the applying to the windows-based embedded image comprises applying the new configuration change to the windows-based embedded image based on the new configuration file.

221. The machine-readable storage medium of clause 219, wherein the windows-based embedded image comprises the write-filter that prevents one or more changes applied to the windows-based embedded image with the write-filter enabled, from persisting across a reboot of the local client.

222. The machine-readable storage medium of clause 221, wherein the facilitating obtaining comprises facilitating obtaining the new configuration file from the repository server while the write-filter is enabled, while obviating reinstallation of an entire windows-based embedded image onto the local client.

223. The machine-readable storage medium of clause 221, wherein the applying comprises applying one of the new configuration change and the previous configuration change to the windows-based embedded image while the write-filter is enabled.

224. The machine-readable storage medium of clause 221, wherein the instructions further comprise code for facilitating saving, while the write-filter is enabled, the previous configuration file into a storage area that is to be retained on the local client across a reboot of the local client.

225. The machine-readable storage medium of clause 219, wherein the applying comprises automatically applying, after each reboot of the local client is initiated, one of the new configuration change and the previous configuration change to the windows-based embedded image to allow one of the new configuration change and the previous configuration change to appear, to a user of the local client, to be persistent across a reboot of the local client.

226. The machine-readable storage medium of clause 219, wherein the facilitating locating the remote repository server and the facilitating obtaining the new configuration file comprise automatically facilitating locating the repository server containing the new configuration file and facilitating obtaining the new configuration file, after each reboot of the local client is initiated.

227. The machine-readable storage medium of clause 219, wherein each of the new configuration change and the previous configuration change comprises one or more of the following: a configuration change to a remote desktop connection, a configuration change to a device of the local client, or a configuration change to the operating system of the local client.

228. The machine-readable storage medium of clause 219, wherein the applying comprises automatically applying, after a reboot of the local client is initiated and without a user's intervention, the previous configuration change based on the previous configuration file saved in a storage area that is retained on the local client across a reboot of the local client, to allow the previous configuration change to appear, to the user of the local client, to be persistent across a reboot of the local client.

229. The machine-readable storage medium of clause 219, wherein at least one of the new configuration file and the previous configuration file comprises an XML configuration file.

230. The machine-readable storage medium of clause 219, wherein the facilitating locating comprises obtaining address information of the repository server using at least one of a dynamic host configuration protocol (DHCP) or a domain name system (DNS).

231. The machine-readable storage medium of clause 219, wherein the facilitating locating comprises obtaining address information of the repository server from a local registry of the local client.

232. A computing machine comprising the machine-readable storage medium of clause 219, wherein the computing machine comprises the local client.

Figure 23C:
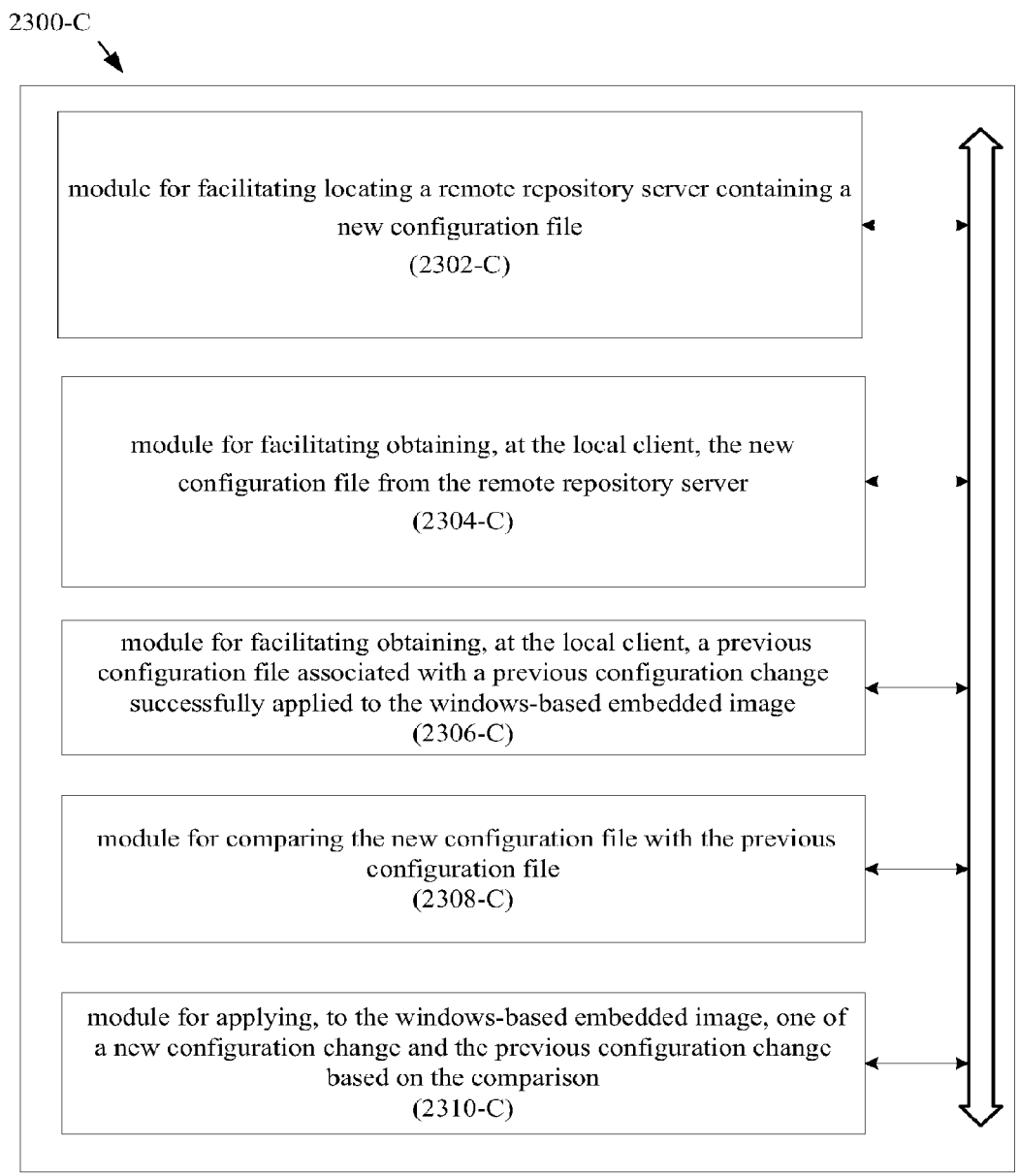
FIG. 23C is a block diagram module of an example of an apparatus for comparing and provisioning configurations for a local client having a windows-based embedded image, in accordance with various aspects of the subject technology.

233. An apparatus (see, e.g., apparatus 2300-C of FIG. 23C) for comparing and provisioning configurations for a local client (e.g., client 102 of FIG. 1) having a windows-based embedded image, the apparatus comprising:

means for facilitating locating a remote repository server containing a new configuration file (see, e.g., item 2302-C in FIG. 23C);

means for facilitating obtaining, at the local client, the new configuration file from the remote repository server (see, e.g., item 2304-C in FIG. 23C);

means for facilitating obtaining, at the local client, a previous configuration file associated with a previous configuration change successfully applied to the windows-based embedded image (see, e.g., item 2306-C in FIG. 23C);

means for comparing the new configuration file with the previous configuration file (see, e.g., item 2308-C in FIG. 23C); and means for applying, to the windows-based embedded image, one of a new configuration change and the previous configuration change based on the comparison (see, e.g., item 2310-C in FIG. 23C), wherein the new configuration change is based on the new configuration file, and wherein the windows-based embedded image supports a graphical user interface and comprises an operating system (e.g., operating system module 426 of FIG. 4) and one or more applications (e.g., application module 422 of FIG. 4).

234. The apparatus of clause 233, wherein, if the new configuration file is the same as the previous configuration file, then the means for applying to the windows-based embedded image comprises means for applying the previous configuration change to the windows-based embedded image based on the previous configuration file, and wherein, if the new configuration file is different from the previous configuration file, then the means for applying to the windows-based embedded image comprises means for applying the new configuration change to the windows-based embedded image based on the new configuration file.

235. The apparatus of clause 233, wherein the windows-based embedded image comprises the write-filter that prevents one or more changes applied to the windows-based embedded image with the write-filter enabled, from persisting across a reboot of the local client.

236. The apparatus of clause 235, wherein the means for facilitating obtaining comprises means for facilitating obtaining the new configuration file from the repository server while the write-filter is enabled, while obviating reinstallation of an entire windows-based embedded image onto the local client.

237. The apparatus of clause 235, wherein the means for applying comprises means for applying one of the new configuration change and the previous configuration change to the windows-based embedded image while the write-filter is enabled.

238. The apparatus of clause 235, further comprising means for facilitating saving, while the write-filter is enabled, the previous configuration file into a storage area that is to be retained on the local client across a reboot of the local client.

239. The apparatus of clause 233, wherein the means for applying comprises means for automatically applying, after each reboot of the local client is initiated, one of the new configuration change and the previous configuration change to the windows-based embedded image to allow one of the new configuration change and the previous configuration change to appear, to a user of the local client, to be persistent across a reboot of the local client.

240. The apparatus of clause 233, wherein the means for facilitating locating the remote repository server and the means for facilitating obtaining the new configuration file comprise means for automatically facilitating locating the repository server containing the new configuration file and means for facilitating obtaining the new configuration file, after each reboot of the local client is initiated.

241. The apparatus of clause 233, wherein each of the new configuration change and the previous configuration change comprises one or more of the following: a configuration change to a remote desktop connection, a configuration change to a device of the local client, or a configuration change to the operating system of the local client.

242. The apparatus of clause 233, wherein the means for applying comprises means for automatically applying, after a reboot of the local client is initiated and without a user's intervention, the previous configuration change based on the previous configuration file saved in a storage area that is retained on the local client across a reboot of the local client, to allow the previous configuration change to appear, to the user of the local client, to be persistent across a reboot of the local client.

243. The apparatus of clause 233, wherein at least one of the new configuration file and the previous configuration file comprises an XML configuration file.

244. The apparatus of clause 233, wherein the means for facilitating locating comprises means for obtaining address information of the repository server using at least one of a dynamic host configuration protocol (DHCP) or a domain name system (DNS).

245. The apparatus of clause 233, wherein the means for facilitating locating comprises means for obtaining address information of the repository server from a local registry of the local client.

246. The apparatus of clause 233, wherein the apparatus comprises the local client.

247. The apparatus of clause 233, wherein the apparatus comprises a processing system and a memory.

Illustration of Apparatus/Method/Machine Readable Storage Medium for Automatic Retrieval, Parsing and Application of Configuration for a Specific-Purpose Client Having a Windows-Based Embedded Image with a Write-Filter (Described as Clauses)

The subject technology is illustrated, for example, according to various aspects described below. Various examples of aspects of the subject technology are described as numbered clauses (248, 249, 250, etc.) for convenience. These are provided as examples, and do not limit the subject technology. It is noted that any of the dependent clauses may be combined in any combination, and placed into a respective independent clause, e.g., clause 248, 262, 276, and 291. The other clauses can be presented in a similar manner.

248. An apparatus for automatic retrieval, parsing and application of configuration for a specific-purpose local client (e.g., client 102 of FIG. 1) having a windows-based embedded image with a write-filter (e.g., write-filter 420 of FIG. 4) while obviating reinstallation of an entire windows-based embedded image onto the specific-purpose local client and while allowing persistent configuration change across a reboot, the apparatus comprising:

a retrieval module (e.g., retrieval module 408 of FIG. 4) of the specific-purpose local client configured to, each time the specific-purpose local client boots up, automatically locate a remote repository server (e.g., repository server 104 of FIG. 1) containing a configuration file and automatically obtain the configuration file from the remote repository server over a network (e.g., public network 118 or corporate network 114 of FIG. 1) while the write-filter is enabled;

an apply settings module (e.g., apply settings module 414 of FIG. 4) of the specific-purpose local client configured to, each time the specific-purpose local client boots up, automatically load the configuration file, automatically parse at least a portion of the configuration file associated with a group of settings for the windows-based embedded image, and automatically apply, to the windows-based embedded image, a configuration change based on the at least a portion of the configuration file while the write-filter is enabled, wherein the windows-based embedded image comprises the write-filter to allow one or more changes applied to the windows-based embedded image with the write-filter enabled, to be discarded when the specific-purpose local client is shut down, wherein the configuration change persists across a reboot of the specific-purpose local client while obviating reinstallation of the windows-based embedded image with the configuration change onto the specific-purpose local client, and wherein the windows-based embedded image supports a graphical user interface and comprises an operating system (e.g., operating system module 426 of FIG. 4) and one or more applications (e.g., application module 422 of FIG. 4) dedicated to the specific purpose.

249. The apparatus of clause 248, wherein the apply settings module is configured to determine if the configuration file specifies a new version of a driver to be installed on the specific-purpose local client, wherein the apparatus further comprises a configuration comparison module of the specific-purpose local client, the configuration comparison module configured to compare the new version of the driver to a previous version of the driver installed on the specific-purpose local client, and wherein, if the new version of the driver is different from the previous version of the driver, the apply settings module is configured to determine if the write-filter is enabled, configured to disable the write-filter if enabled, and configured to install, on the specific-purpose local client, the new version of the driver while the write-filter is disabled.

250. The apparatus of clause 248, wherein the apply settings module is configured to determine if the configuration file specifies a new version of an application to be installed on the specific-purpose local client, wherein the apparatus further comprises a configuration comparison module of the specific-purpose local client, the configuration comparison module configured to compare the new version of the application to a previous version of the application installed on the specific-purpose local client, and wherein, if the new version of the application is different from the previous version of the application, the apply settings module is configured to determine if the write-filter is enabled, configured to disable the write-filter if enabled, and configured to install, on the specific-purpose local client, the new version of the application while the write-filter is disabled.

251. The apparatus of clause 248, wherein the configuration file specifies a new version of a driver to be installed on the specific-purpose local client, wherein the apparatus further comprises a configuration comparison module of the specific-purpose local client, the configuration comparison module configured to compare the new version of the driver to a previous version of the driver installed on the specific-purpose local client, and wherein, if the new version of the driver is different from the previous version of the driver, the apply settings module is configured to install, on the specific-purpose local client, the new version of the driver while the write-filter is disabled.

252. The apparatus of clause 248, wherein the configuration file specifies a new version of an application to be installed on the specific-purpose local client, wherein the apparatus further comprises a configuration comparison module of the specific-purpose local client, the configuration comparison module configured to compare the new version of the application to a previous version of the application installed on the specific-purpose local client, and wherein, if the new version of the application is different from the previous version of the application, the apply settings module is configured to install, on the specific-purpose local client, the new version of the application while the write-filter is disabled.

253. The apparatus of clause 248, wherein the group of settings for the windows-based embedded image comprises a connections group, and wherein the configuration change comprises a configuration change to a remote desktop connection.

254. The apparatus of clause 248, wherein the group of settings for the windows-based embedded image comprises an operating systems group, and wherein the configuration change comprises a configuration change to the operating system of the specific-purpose local client.

255. The apparatus of clause 248, wherein the group of settings for the windows-based embedded image comprises a device configuration group, and wherein the configuration change comprises a configuration change to a device of the specific-purpose local client.

256. The apparatus of clause 248, wherein the apply settings module is configured to, while the write-filter is enabled, facilitate saving the configuration file into a storage area that is to be retained on the specific-purpose local client across a reboot of the specific-purpose local client.

257. The apparatus of clause 248, wherein after a reboot of the specific-purpose local client is initiated, the apply settings module is configured to automatically apply, without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

258. The apparatus of clause 248, wherein the configuration file comprises an XML configuration file.

259. The apparatus of clause 248, wherein the retrieval module is configured to obtain address information of the repository server using at least one of a dynamic host configuration protocol (DHCP) or a domain name system (DNS).

260. The apparatus of clause 248, wherein the retrieval module is configured to obtain address information of the repository server from a local registry of the specific-purpose local client.

261. The apparatus of clause 248, further comprising a reset check module of the specific-purpose local client configured to determine whether to reset a previous state of the windows-based embedded image based on the configuration file, wherein, if the reset check module determines that the previous state is to be reset, the apply settings module is configured to apply a default configuration to the windows-based embedded image and to apply the configuration change based on the configuration file to the windows-based embedded image after the default configuration is applied, and wherein, if the reset check module determines that the previous state is not to be reset, the apply settings module is configured to apply the configuration change based on the configuration file, to the windows-based embedded image, while disallowing the default configuration from being applied to the windows-based embedded image.

Figure 24B:
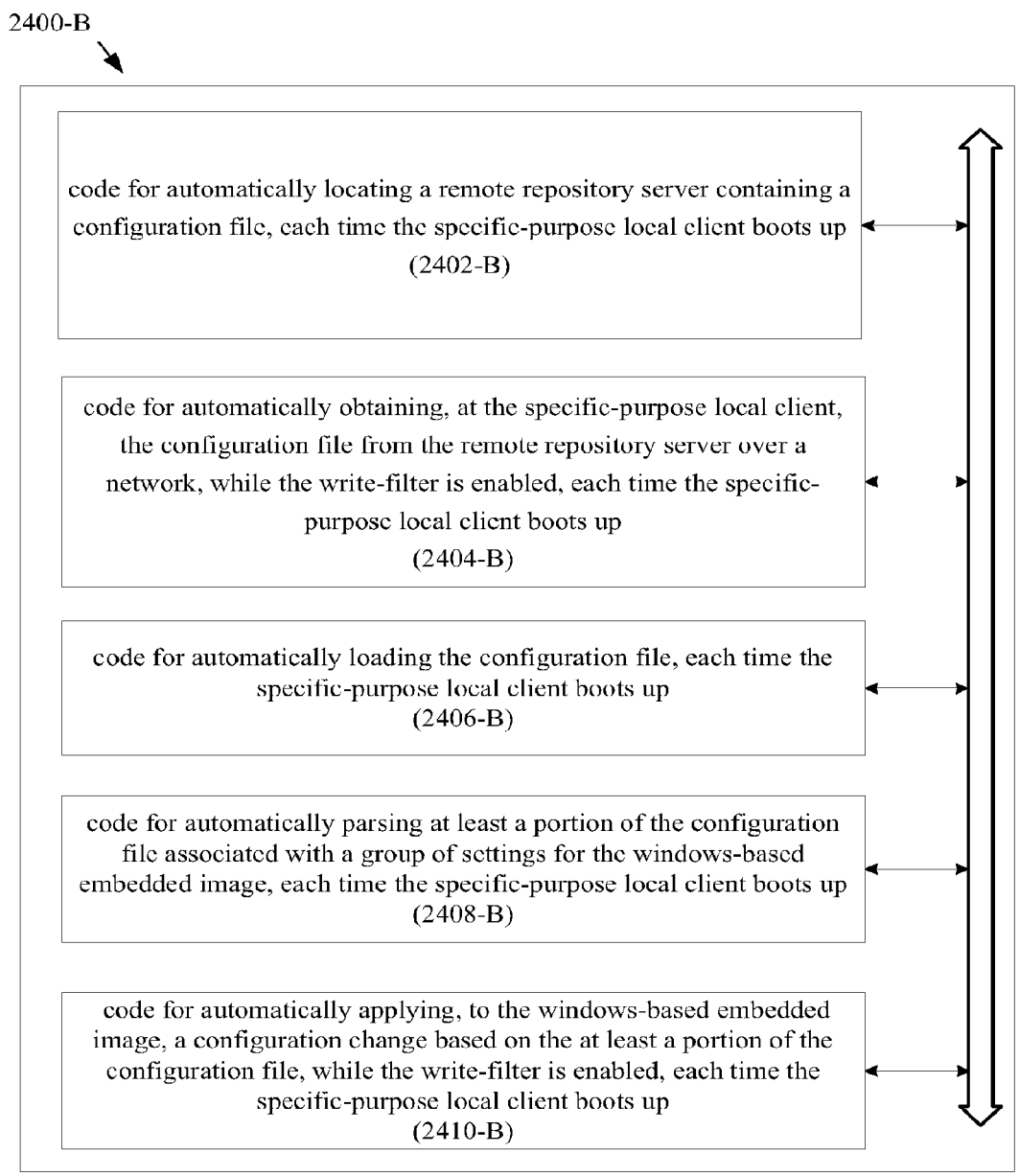
FIG. 24B is a block diagram representing code of an example of a machine-readable storage medium encoded with instructions executable by a processing system to perform a method for automatic retrieval, parsing and application of configuration for a specific-purpose local client having a windows-based embedded image with a write-filter while obviating reinstallation of an entire windows-based embedded image onto the specific-purpose local client and while allowing persistent configuration change across a reboot, in accordance with various aspects of the subject technology.

262. A method (see, e.g., method 2400-A of FIG. 24A) for automatic retrieval, parsing and application of configuration for a specific-purpose local client (e.g., client 102 of FIG. 1) having a windows-based embedded image with a write-filter (e.g., write-filter 420 of FIG. 4) while obviating reinstallation of an entire windows-based embedded image onto the specific-purpose local client and while allowing persistent configuration change across a reboot, the method comprising:

automatically locating a remote repository server containing a configuration file, each time the specific-purpose local client boots up (see, e.g., item 2402-A in FIG. 24A);

automatically obtaining, at the specific-purpose local client, the configuration file from the remote repository server over a network, while the write-filter is enabled, each time the specific-purpose local client boots up (see, e.g., item 2404-A in FIG. 24A);

automatically loading the configuration file, each time the specific-purpose local client boots up (see, e.g., item 2406-A in FIG. 24A);

automatically parsing at least a portion of the configuration file associated with a group of settings for the windows-based embedded image, each time the specific-purpose local client boots up (see, e.g., item 2408-A in FIG. 24A);

automatically applying, to the windows-based embedded image, a configuration change based on the at least a portion of the configuration file, while the write-filter is enabled, each time the specific-purpose local client boots up (see, e.g., item 2410-A in FIG. 24A), wherein the windows-based embedded image comprises the write-filter to allow one or more changes applied to the windows-based embedded image with the write-filter enabled, to be discarded when the specific-purpose local client is shut down, wherein the configuration change persists across a reboot of the specific-purpose local client while obviating reinstallation of the windows-based embedded image with the configuration change onto the specific-purpose local client, and wherein the windows-based embedded image supports a graphical user interface and comprises an operating system (e.g., operating system module 426 of FIG. 4) and one or more applications (e.g., application module 422 of FIG. 4) dedicated to the specific purpose.

263. The method of clause 262, further comprising:
determining if the configuration file specifies a new version of a driver to be installed on the specific-purpose local client; and
comprising the new version of the driver to a previous version of the driver installed on the specific-purpose local client,
wherein if the new version of the driver is different from the previous version of the driver, the method further comprises:

determining if the write-filter is enabled;
disabling the write-filter if the write-filter is enabled; and
installing, on the specific-purpose local client, the new version of the driver while the write-filter is disabled.

264. The method of clause 262, further comprising:
determining if the configuration file specifies a new version of an application to be installed on the specific-purpose local client; and
comparing the new version of the application to a previous version of the application installed on the specific-purpose local client,
wherein if the new version of the application is different from the previous version of the application, the method further comprises:
determining if the write-filter is enabled;
disabling the write-filter if the write-filter is enabled; and
installing, on the specific-purpose local client, the new version of the application while the write-filter is disabled.

265. The method of clause 262, wherein the configuration file specifies a new version of a driver to be installed on the specific-purpose local client, and wherein the method further comprises:
comparing the new version of the driver to a previous version of the driver installed on the specific-purpose local client; and
installing the new version of the driver on the specific-purpose local client while the write-filter is disabled if the new version of the driver is different from the previous version of the driver.

266. The method of clause 262, wherein the configuration file specifies a new version of an application to be installed on the specific-purpose local client, and wherein the method further comprises:
comparing the new version of the application to a previous version of the application installed on the specific-purpose local client; and
installing the new version of the application on the specific-purpose local client while the write-filter is disabled if the new version of the application is different from the previous version of the application.

267. The method of clause 262, wherein the group of settings for the windows-based embedded image comprises a connections group, and wherein the configuration change comprises a configuration change to a remote desktop connection.

268. The method of clause 262, wherein the group of settings for the windows-based embedded image comprises an operating systems group, and wherein the configuration change comprises a configuration change to the operating system of the specific-purpose local client.

269. The method of clause 262, wherein the group of settings for the windows-based embedded image comprises a device configuration group, and wherein the configuration change comprises a configuration change to a device of the specific-purpose local client.

270. The method of clause 262, further comprising facilitating saving, while the write-filter is enabled, the configuration file into a storage area that is to be retained on the specific-purpose local client across a reboot of the specific-purpose local client.

271. The method of clause 262, wherein the automatically applying comprises automatically applying, after a reboot of the specific-purpose local client is initiated and without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

272. The method of clause 262, wherein the configuration file comprises an XML configuration file.

273. The method of clause 262, wherein the automatically locating comprises obtaining address information of the repository server using at least one of a dynamic host configuration protocol (DHCP) or a domain name system (DNS).

274. The method of clause 262, wherein the automatically locating comprises obtaining address information of the repository server from a local registry of the specific-purpose local client.

275. The method of clause 262, further comprising determining whether to reset a previous state of the windows-based embedded image based on the configuration file,
wherein, if it is determined that the previous state is to be reset, the automatically applying the configuration change comprises applying a default configuration to the windows-based embedded image before the configuration change is applied, and
wherein, if it is determined that the previous state is not to be reset, the automatically applying the configuration change comprises applying the configuration change based on the configuration file, to the windows-based embedded image, while disallowing the default configuration from being applied to the windows-based embedded image.

276. A machine-readable storage medium (see, e.g., machine-readable storage medium 2400-B of FIG. 24B) encoded with instructions executable by a processing system to perform a method for automatic retrieval, parsing and application of configuration for a specific-purpose local client (e.g., client 102 of FIG. 1) having a windows-based embedded image with a write-filter (e.g., write-filter 420 of FIG. 4) while obviating reinstallation of an entire windows-based embedded image onto the specific-purpose local client and while allowing persistent configuration change across a reboot, the instructions comprising code for:
automatically locating a remote repository server containing a configuration file, each time the specific-purpose local client boots up (see, e.g., item 2402-B in FIG. 24B);
automatically obtaining, at the specific-purpose local client, the configuration file from the remote repository server over a network, while the write-filter is enabled, each time the specific-purpose local client boots up (see, e.g., item 2404-B in FIG. 24B);
automatically loading the configuration file, each time the specific-purpose local client boots up (see, e.g., item 2406-B in FIG. 24B);
automatically parsing at least a portion of the configuration file associated with a group of settings for the windows-based embedded image, each time the specific-purpose local client boots up (see, e.g., item 2408-B in FIG. 24B);
automatically applying, to the windows-based embedded image, a configuration change based on the at least a portion of the configuration file, while the write-filter is enabled, each time the specific-purpose local client boots up (see, e.g., item 2410-B in FIG. 24B),
wherein the windows-based embedded image comprises the write-filter to allow one or more changes applied to the windows-based embedded image with the write-filter enabled, to be discarded when the specific-purpose local client is shut down,
wherein the configuration change persists across a reboot of the specific-purpose local client while obviating reinstallation of the windows-based embedded image with the configuration change onto the specific-purpose local client, and
wherein the windows-based embedded image supports a graphical user interface and comprises an operating system (e.g., operating system module 426 of FIG. 4) and one or more applications (e.g., application module 422 of FIG. 4) dedicated to the specific purpose.

277. The machine-readable storage medium of clause 276, wherein the instructions further comprise code for:
determining if the configuration file specifies a new version of a driver to be installed on the specific-purpose local client; and
comprising the new version of the driver to a previous version of the driver installed on the specific-purpose local client,
the driver, the instructions further comprise code for:
determining if the write-filter is enabled;
disabling the write-filter if the write-filter is enabled; and
installing, on the specific-purpose local client, the new version of the driver while the write-filter is disabled.

278. The machine-readable storage medium of clause 276, wherein the instructions further comprise code for:
determining if the configuration file specifies a new version of an application to be installed on the specific-purpose local client; and
comparing the new version of the application to a previous version of the application installed on the specific-purpose local client,
wherein if the new version of the application is different from the previous version of the application, the instructions further comprise code for:
determining if the write-filter is enabled;
disabling the write-filter if the write-filter is enabled; and
installing, on the specific-purpose local client, the new version of the application while the write-filter is disabled.

279. The machine-readable storage medium of clause 276, wherein the configuration file specifies a new version of a driver to be installed on the specific-purpose local client, and wherein the instructions further comprise code for:
comparing the new version of the driver to a previous version of the driver installed on the specific-purpose local client; and
installing the new version of the driver on the specific-purpose local client while the write-filter is disabled if the new version of the driver is different from the previous version of the driver.

280. The machine-readable storage medium of clause 176, wherein the configuration file specifies a new version of an application to be installed on the specific-purpose local client, and wherein the instructions further comprise code for:
comparing the new version of the application to a previous version of the application installed on the specific-purpose local client; and
installing the new version of the application on the specific-purpose local client while the write-filter is disabled if the new version of the application is different from the previous version of the application.

281. The machine-readable storage medium of clause 276, wherein the group of settings for the windows-based embedded image comprises a connections group, and wherein the configuration change comprises a configuration change to a remote desktop connection.

282. The machine-readable storage medium of clause 276, wherein the group of settings for the windows-based embedded image comprises an operating systems group, and wherein the configuration change comprises a configuration change to the operating system of the specific-purpose local client.

283. The machine-readable storage medium of clause 276, wherein the group of settings for the windows-based embedded image comprises a device configuration group, and wherein the configuration change comprises a configuration change to a device of the specific-purpose local client.

284. The machine-readable storage medium of clause 276, wherein the instructions further comprise code for facilitating saving, while the write-filter is enabled, the configuration file into a storage area that is to be retained on the specific-purpose local client across a reboot of the specific-purpose local client.

285. The machine-readable storage medium of clause 276, wherein the automatically applying comprises automatically applying, after a reboot of the specific-purpose local client is initiated and without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

286. The machine-readable storage medium of clause 176, wherein the configuration file comprises an XML configuration file.

287. The machine-readable storage medium of clause 276, wherein the automatically locating comprises obtaining address information of the repository server using at least one of a dynamic host configuration protocol (DHCP) or a domain name system (DNS).

288. The machine-readable storage medium of clause 276, wherein the automatically locating comprises obtaining address information of the repository server from a local registry of the specific-purpose local client.

289. The machine-readable storage medium of clause 276, wherein the instructions further comprise code for determining whether to reset a previous state of the windows-based embedded image based on the configuration file,
  wherein, if it is determined that the previous state is to be reset, the automatically applying the configuration change comprises applying a default configuration to the windows-based embedded image before the configuration change is applied, and
  wherein, if it is determined that the previous state is not to be reset, the automatically applying the configuration change comprises applying the configuration change based on the configuration file, to the windows-based embedded image, while disallowing the default configuration from being applied to the windows-based embedded image.

290. A computing machine comprising the machine-readable storage medium of clause 276, wherein the computing machine comprises the specific-purpose local client.

Figure 24C:
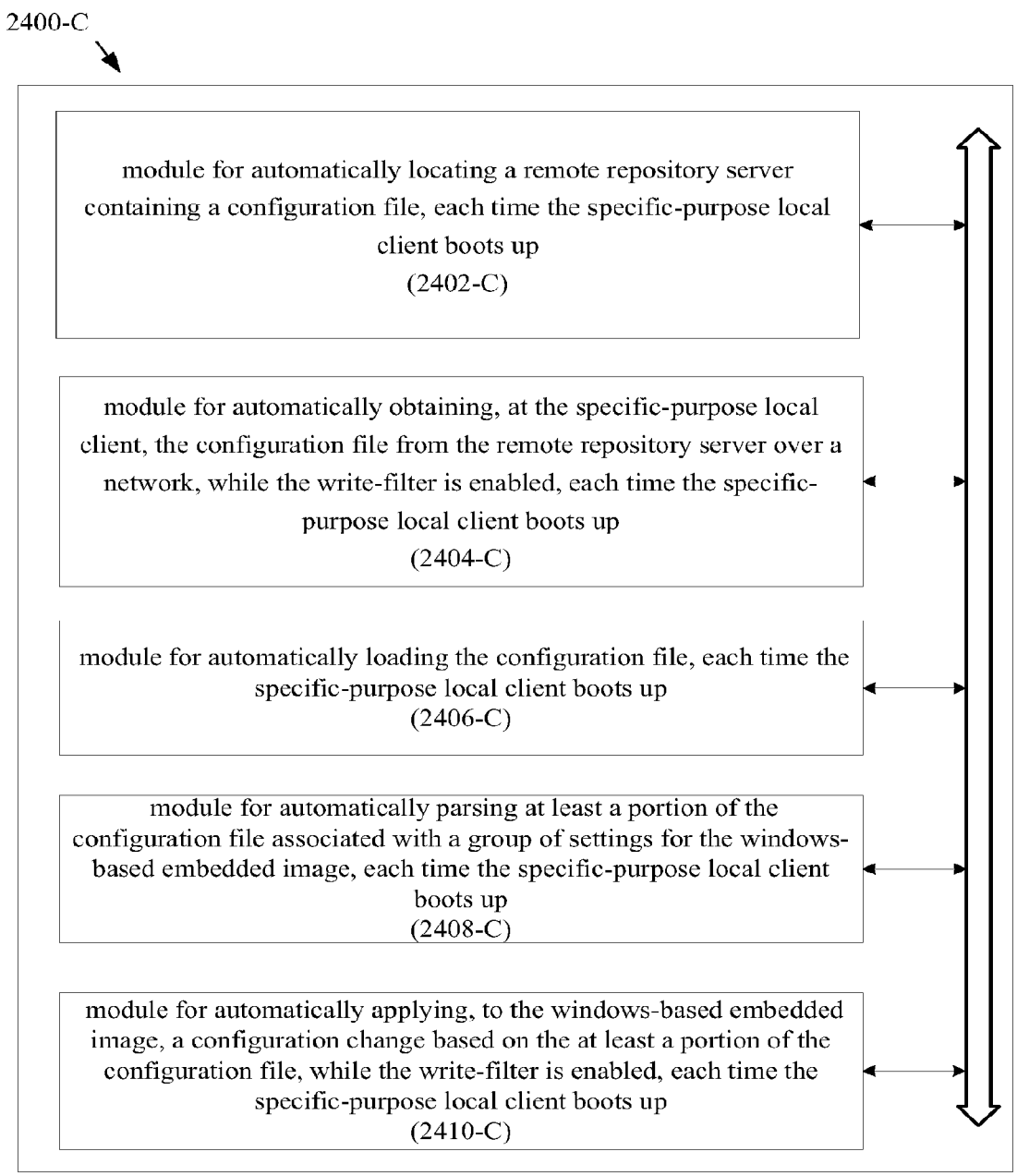
FIG. 24C is a block diagram module of an example of an apparatus for automatic retrieval, parsing and application of configuration for a specific-purpose local client having a windows-based embedded image with a write-filter while obviating reinstallation of an entire windows-based embedded image onto the specific-purpose local client and while allowing persistent configuration change across a reboot, in accordance with various aspects of the subject technology.

291. An apparatus (see, e.g., apparatus 2400-C of FIG. 24C) for automatic retrieval, parsing and application of configuration for a specific-purpose local client (e.g., client 102 of FIG. 1) having a windows-based embedded image with a write-filter (e.g., write-filter 420 of FIG. 4) while obviating reinstallation of an entire windows-based embedded image onto the specific-purpose local client and while allowing persistent configuration change across a reboot, the apparatus comprising:

means for automatically locating a remote repository server containing a configuration file, each time the specific-purpose local client boots up (see, e.g., item 2402-C in FIG. 24C);
means for automatically obtaining, at the specific-purpose local client, the configuration file from the remote repository server over a network, while the write-filter is enabled, each time the specific-purpose local client boots up (see, e.g., item 2404-C in FIG. 24C);
means for automatically loading the configuration file, each time the specific-purpose local client boots up (see, e.g., item 2406-C in FIG. 24C);
means for automatically parsing at least a portion of the configuration file associated with a group of settings for the windows-based embedded image, each time the specific-purpose local client boots up (see, e.g., item 2408-C in FIG. 24C);
means for automatically applying, to the windows-based embedded image, a configuration change based on the at least a portion of the configuration file, while the write-filter is enabled, each time the specific-purpose local client boots up (see, e.g., item 2410-C in FIG. 24C),
wherein the windows-based embedded image comprises the write-filter to allow one or more changes applied to the windows-based embedded image with the write-filter enabled, to be discarded when the specific-purpose local client is shut down,
wherein the configuration change persists across a reboot of the specific-purpose local client while obviating reinstallation of the windows-based embedded image with the configuration change onto the specific-purpose local client, and
wherein the windows-based embedded image supports a graphical user interface and comprises an operating system (e.g., operating system module 426 of FIG. 4) and one or more applications (e.g., application module 422 of FIG. 4) dedicated to the specific purpose.

292. The apparatus of clause 291, further comprising:
means for determining if the configuration file specifies a new version of a driver to be installed on the specific-purpose local client; and
means for comparing the new version of the driver to a previous version of the driver installed on the specific-purpose local client,
wherein if the new version of the driver is different from the previous version of the driver, the apparatus further comprises:
  means for determining if the write-filter is enabled;
  means for disabling the write-filter if the write-filter is enabled; and
  means for installing, on the specific-purpose local client, the new version of the driver while the write-filter is disabled.

293. The apparatus of clause 291, further comprising:
means for determining if the configuration file specifies a new version of an application to be installed on the specific-purpose local client; and
means for comparing the new version of the application to a previous version of the application installed on the specific-purpose local client,
wherein if the new version of the application is different from the previous version of the application, the apparatus further comprises:
  means for determining if the write-filter is enabled;
  means for disabling the write-filter if the write-filter is enabled; and means for installing, on the specific-purpose local client, the new version of the application while the write-filter is disabled.

294. The apparatus of clause 291, wherein the configuration file specifies a new version of a driver to be installed on the specific-purpose local client, and wherein the apparatus further comprises:
  means for comparing the new version of the driver to a previous version of the driver installed on the specific-purpose local client; and
  means for installing the new version of the driver on the specific-purpose local client while the write-filter is disabled if the new version of the driver is different from the previous version of the driver.

295. The apparatus of clause 291, wherein the configuration file specifies a new version of an application to be installed on the specific-purpose local client, and wherein the apparatus further comprises:
  means for comparing the new version of the application to a previous version of the application installed on the specific-purpose local client; and
  means for installing the new version of the application on the specific-purpose local client while the write-filter is disabled if the new version of the application is different from the previous version of the application.

296. The apparatus of clause 291, wherein the group of settings for the windows-based embedded image comprises a connections group, and wherein the configuration change comprises a configuration change to a remote desktop connection.

297. The apparatus of clause 291, wherein the group of settings for the windows-based embedded image comprises an operating systems group, and wherein the configuration change comprises a configuration change to the operating system of the specific-purpose local client.

298. The apparatus of clause 291, wherein the group of settings for the windows-based embedded image comprises a device configuration group, and wherein the configuration change comprises a configuration change to a device of the specific-purpose local client.

299. The apparatus of clause 291, further comprising means for facilitating saving, while the write-filter is enabled, the configuration file into a storage area that is to be retained on the specific-purpose local client across a reboot of the specific-purpose local client.

300. The apparatus of clause 291, wherein the means for automatically applying comprises means for automatically applying, after a reboot of the specific-purpose local client is initiated and without a user's intervention, the configuration change based on the configuration file saved in a storage area that is retained on the specific-purpose local client across a reboot of the specific-purpose local client, to allow the configuration change to appear, to the user of the specific-purpose local client, to be persistent across a reboot of the specific-purpose local client.

301. The apparatus of clause 291, wherein the configuration file comprises an XML configuration file.

302. The apparatus of clause 291, wherein the means for automatically locating comprises means for obtaining address information of the repository server using at least one of a dynamic host configuration protocol (DHCP) or a domain name system (DNS).

303. The apparatus of clause 291, wherein the means for automatically locating comprises means for obtaining address information of the repository server from a local registry of the specific-purpose local client.

304. The apparatus of clause 291, further comprising means for determining whether to reset a previous state of the windows-based embedded image based on the configuration file,
  wherein, if it is determined that the previous state is to be reset, the means for automatically applying the configuration change comprises means for applying a default configuration to the windows-based embedded image before the configuration change is applied, and
  wherein, if it is determined that the previous state is not to be reset, the means for automatically applying the configuration change comprises means for applying the configuration change based on the configuration file, to the windows-based embedded image, while disallowing the default configuration from being applied to the windows-based embedded image.

305. The apparatus of clause 291, wherein the apparatus comprises the specific-purpose local client.

306. The apparatus of clause 291, wherein the apparatus comprises a processing system and a memory.

Illustration of Apparatus/Method/Machine Readable Storage Medium for Generating, Validating and Applying Custom Extensible Markup Language (XML) Configuration on a Client Having a Windows-Based Embedded Image (Described as Clauses)

The subject technology is illustrated, for example, according to various aspects described below. Various examples of aspects of the subject technology are described as numbered clauses (307, 308, 309, etc.) for convenience. These are provided as examples, and do not limit the subject technology. It is noted that any of the dependent clauses may be combined in any combination, and placed into a respective independent clause, e.g., clause 307, 319, 331, and 344. The other clauses can be presented in a similar manner.

307. An apparatus for generating, validating and applying custom extensible markup language (XML) configuration on a specific-purpose local client (e.g., client 102 of FIG. 1) having a windows-based embedded image and obviating reinstallation of an entire windows-based embedded image onto the specific-purpose local client, the apparatus comprising:
  a configuration generation module (e.g., configuration generation module 430 of FIG. 4) configured to generate an XML configuration file and configured to validate the XML configuration file based on a validation file (e.g., validation file 406 of FIG. 4 or validation file 506 of FIG. 5);
  a retrieval module (e.g., retrieval module 408 of FIG. 4) of the specific-purpose local client configured to automatically obtain the XML configuration file each time the specific-purpose local client boots up; and
  an apply settings module (e.g., apply settings module 414 of FIG. 4) of the specific-purpose local client configured to automatically apply, to the windows-based embedded image, a configuration change based on the XML configuration file each time the specific-purpose local client boots up,
  wherein the configuration change persists across a reboot of the specific-purpose local client while obviating reinstallation of an entire windows-based embedded image with the configuration change on the specific-purpose local client, and
  wherein the windows-based embedded image supports a graphical user interface and comprises an operating system (e.g., operating system module 426 of FIG. 4) and one or more applications (e.g., application module 422 of FIG. 4) dedicated to the specific purpose.

308. The apparatus of clause 307, wherein the validation file comprises an XML schema definition (XSD) file.

309. The apparatus of clause 308, wherein the configuration generation module is configured to determine whether the XML configuration file conforms to one or more rules specified in the XML schema (XSD) file.

310. The apparatus of clause 307, wherein the retrieval module is configured to obtain the XML configuration file by importing the XML configuration file from at least one of a storage device external to the specific-purpose local client and a remote repository server.

311. The apparatus of clause 307, wherein the configuration generation module comprises a configuration capture module configured to capture one or more settings of the specific-purpose local client, the configuration generation module configured to generate the XML configuration file based on the captured one or more settings.

312. The apparatus of clause 311, wherein the one or more settings comprise at least one of settings of a device of the specific-purpose local client, settings of the operating system, and connections settings.

313. The apparatus of clause 307, wherein the configuration generation module is configured to export the XML configuration file to at least one of a storage device external to the specific-purpose local client and a remote repository server.

314. The apparatus of clause 307, wherein the configuration generation module is configured to facilitate saving the XML configuration file into a storage area that is to be retained on the specific-purpose local client across a reboot of the specific-purpose local client.

315. The apparatus of clause 307, wherein after a reboot of the specific-purpose local client is initiated, the apply settings module is configured to automatically apply, without a user's intervention, the configuration change based on the XML configuration file saved in a storage area that is retained on the specific-purpose local client across a reboot of the specific-purpose local client, to allow the configuration change to appear, to the user of the specific-purpose local client, to be persistent across a reboot of the specific-purpose local client.

316. The apparatus of clause 307, wherein the configuration generation module comprises a configuration application module configured to provide a user interface for generating and/or editing the XML configuration file.

317. The apparatus of clause 307, wherein the configuration change comprises one or more of the following: a configuration change to a remote desktop connection, a configuration change to a device of the specific-purpose local client, or a configuration change to the operating system of the specific-purpose local client.

318. The apparatus of clause 307, further comprising a reset check module of the specific-purpose local client configured to determine whether to reset a previous state of the windows-based embedded image based on the XML configuration file,
wherein, if the reset check module determines that the previous state is to be reset, the apply settings module is configured to apply a default configuration to the windows-based embedded image and to apply the configuration change based on the XML configuration file to the windows-based embedded image after the default configuration is applied, and
wherein, if the reset check module determines that the previous state is not to be reset, the apply settings module is configured to apply the configuration change based on the XML configuration file, to the windows-based embedded image, while disallowing the default configuration from being applied to the windows-based embedded image.

Figure 25A:
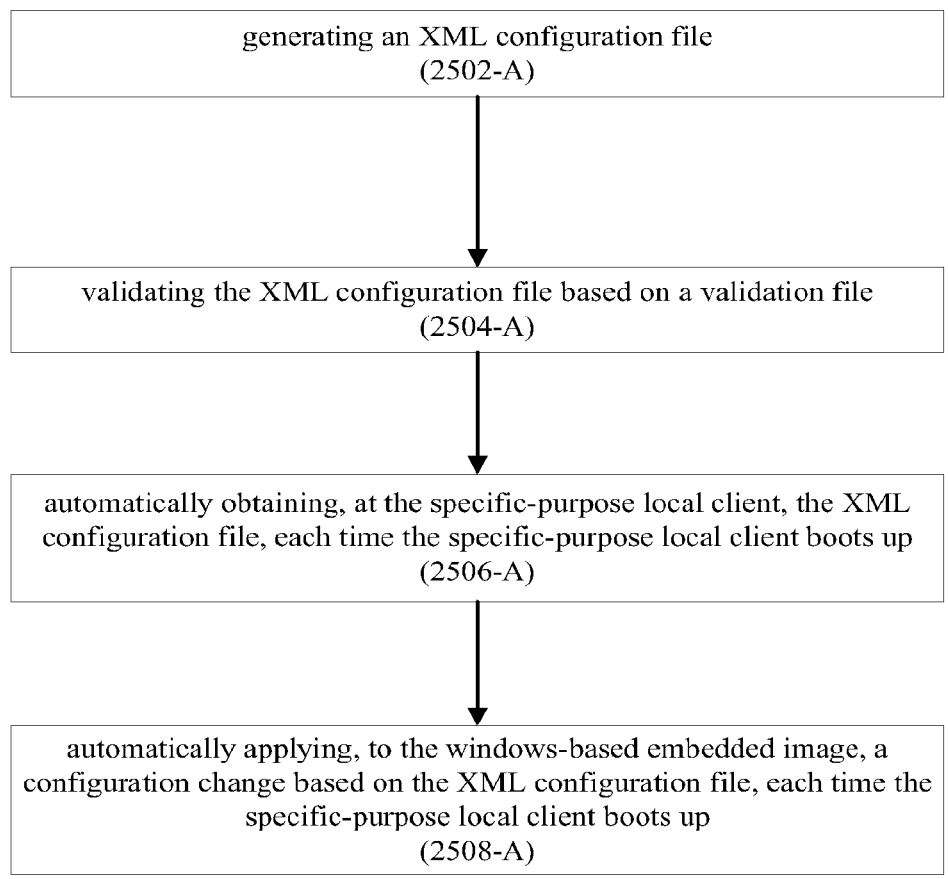
FIG. 25A is a block diagram representing an example of a method for generating, validating and applying custom extensible markup language (XML) configuration on a specific-purpose local client having a windows-based embedded image and obviating reinstallation of an entire windows-based embedded image onto the specific-purpose local client, in accordance with various aspects of the subject technology.

319. A method (see, e.g., method 2500-A of FIG. 25A) for generating, validating and applying custom extensible markup language (XML) configuration on a specific-purpose local client (e.g., client 102 of FIG. 1) having a windows-based embedded image and obviating reinstallation of an entire windows-based embedded image onto the specific-purpose local client, the method comprising:
generating an XML configuration file (see, e.g., item 2502-A in FIG. 25A);
validating the XML configuration file based on a validation file (see, e.g., item 2504-A in FIG. 25A);
automatically obtaining, at the specific-purpose local client, the XML configuration file, each time the specific-purpose local client boots up (see, e.g., item 2506-A in FIG. 25A); and
automatically applying, to the windows-based embedded image, a configuration change based on the XML configuration file, each time the specific-purpose local client boots up (see, e.g., item 2508-A in FIG. 25A),
wherein the configuration change persists across a reboot of the specific-purpose local client while obviating reinstallation of an entire windows-based embedded image with the configuration change on the specific-purpose local client, and
wherein the windows-based embedded image supports a graphical user interface and comprises an operating system (e.g., operating system module 426 of FIG. 4) and one or more applications (e.g., application module 422 of FIG. 4) dedicated to the specific purpose.

320. The method of clause 319, wherein the validation file comprises an XML schema definition (XSD) file.

321. The method of clause 320, wherein the validating comprises determining whether the XML configuration file conforms to one or more rules specified in the XML schema (XSD) file.

322. The method of clause 319, wherein the automatically obtaining comprises importing the XML configuration file from at least one of a storage device external to the specific-purpose local client and a remote repository server.

323. The method of clause 319, further comprising capturing one or more settings of the specific-purpose local client, wherein the generating the XML configuration file comprises generating the XML configuration file based on the captured one or more settings.

324. The method of clause 323, wherein the one or more settings comprise at least one of settings of a device of the specific-purpose local client, settings of the operating system, and connections settings.

325. The method of clause 319, further comprising exporting the XML configuration file to at least one of a storage device external to the specific-purpose local client and a remote repository server.

326. The method of clause 319, further comprising facilitating saving the XML configuration file into a storage area that is to be retained on the specific-purpose local client across a reboot of the specific-purpose local client.

327. The method of clause 319, wherein the automatically applying comprises automatically applying, after a reboot of the specific-purpose local client is initiated and without a user's intervention, the configuration change based on the XML configuration file saved in a storage area that is retained on the specific-purpose local client across a reboot of the specific-purpose local client, to allow the configuration change to appear, to the user of the specific-purpose local client, to be persistent across a reboot of the specific-purpose local client.

328. The method of clause 319, further comprising providing a user interface for generating and/or editing the XML configuration file.

329. The method of clause 319, wherein the configuration change comprises one or more of the following: a configuration change to a remote desktop connection, a configuration change to a device of the specific-purpose local client, or a configuration change to the operating system of the specific-purpose local client.

330. The method of clause 319, further comprising determining whether to reset a previous state of the windows-based embedded image based on the XML configuration file,
  wherein, if it is determined that the previous state is to be reset, the automatically applying the configuration change comprises applying a default configuration to the windows-based embedded image before the configuration change is applied, and
  wherein, if it is determined that the previous state is not to be reset, the automatically applying the configuration change comprises applying the configuration change based on the XML configuration file, to the windows-based embedded image, while disallowing the default configuration from being applied to the windows-based embedded image.

Figure 25B:
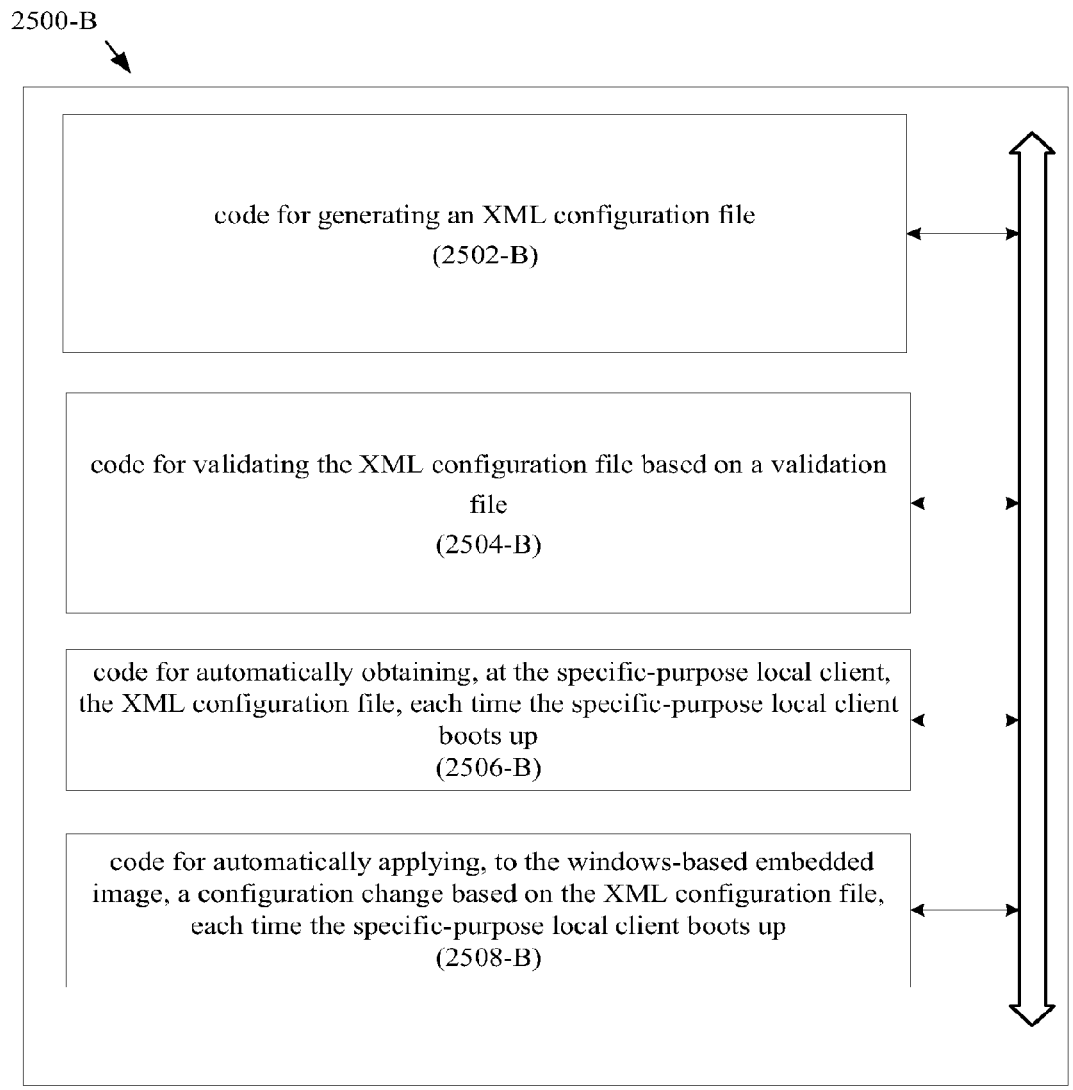
FIG. 25B is a block diagram representing code of an example of a machine-readable storage medium encoded with instructions executable by a processing system to perform a method for generating, validating and applying custom extensible markup language (XML) configuration on a specific-purpose local client having a windows-based embedded image and obviating reinstallation of an entire windows-based embedded image onto the specific-purpose local client, in accordance with various aspects of the subject technology.

331. A machine-readable storage medium (see, e.g., machine-readable storage medium 2500-B of FIG. 25B) encoded with instructions executable by a processing system to perform a method for generating, validating and applying custom extensible markup language (XML) configuration on a specific-purpose local client (e.g., client 102 of FIG. 1) having a windows-based embedded image and obviating reinstallation of an entire windows-based embedded image onto the specific-purpose local client, the instructions comprising code for:
  generating an XML configuration file (see, e.g., item 2502-B in FIG. 25B);
  validating the XML configuration file based on a validation file (see, e.g., item 2504-B in FIG. 25B);
  automatically obtaining, at the specific-purpose local client, the XML configuration file, each time the specific-purpose local client boots up (see, e.g., item 2506-B in FIG. 25B); and
  automatically applying, to the windows-based embedded image, a configuration change based on the XML configuration file, each time the specific-purpose local client boots up (see, e.g., item 2508-B in FIG. 25B),
  wherein the configuration change persists across a reboot of the specific-purpose local client while obviating reinstallation of an entire windows-based embedded image with the configuration change on the specific-purpose local client, and
  wherein the windows-based embedded image supports a graphical user interface and comprises an operating system (e.g., operating system module 426 of FIG. 4) and one or more applications (e.g., application module 422 of FIG. 4) dedicated to the specific purpose.

332. The machine-readable storage medium of clause 331, wherein the validation file comprises an XML schema definition (XSD) file.

333. The machine-readable storage medium of clause 332, wherein the validating comprises determining whether the XML configuration file conforms to one or more rules specified in the XML schema (XSD) file.

334. The machine-readable storage medium of clause 331, wherein the automatically obtaining comprises importing the XML configuration file from at least one of a storage device external to the specific-purpose local client and a remote repository server.

335. The machine-readable storage medium of clause 331, wherein the instructions further comprise code for capturing one or more settings of the specific-purpose local client, wherein the generating the XML configuration file comprises generating the XML configuration file based on the captured one or more settings.

336. The machine-readable storage medium of clause 335, wherein the one or more settings comprise at least one of settings of a device of the specific-purpose local client, settings of the operating system, and connections settings.

337. The machine-readable storage medium of clause 331, wherein the instructions further comprise code for exporting the XML configuration file to at least one of a storage device external to the specific-purpose local client and a remote repository server.

338. The machine-readable storage medium of clause 331, wherein the instructions further comprise code for facilitating saving the XML configuration file into a storage area that is to be retained on the specific-purpose local client across a reboot of the specific-purpose local client.

339. The machine-readable storage medium of clause 331, wherein the automatically applying comprises automatically applying, after a reboot of the specific-purpose local client is initiated and without a user's intervention, the configuration change based on the XML configuration file saved in a storage area that is retained on the specific-purpose local client across a reboot of the specific-purpose local client, to allow the configuration change to appear, to the user of the specific-purpose local client, to be persistent across a reboot of the specific-purpose local client.

340. The machine-readable storage medium of clause 331, wherein the instructions further comprise code for providing a user interface for generating and/or editing the XML configuration file.

341. The machine-readable storage medium of clause 331, wherein the configuration change comprises one or more of the following: a configuration change to a remote desktop connection, a configuration change to a device of the specific-purpose local client, or a configuration change to the operating system of the specific-purpose local client.

342. The machine-readable storage medium of clause 331, wherein the instructions further comprise code for determining whether to reset a previous state of the windows-based embedded image based on the XML configuration file,
  wherein, if it is determined that the previous state is to be reset, the automatically applying the configuration change comprises applying a default configuration to the windows-based embedded image before the configuration change is applied, and
  wherein, if it is determined that the previous state is not to be reset, the automatically applying the configuration change comprises applying the configuration change based on the XML configuration file, to the windows-based embedded image, while disallowing the default configuration from being applied to the windows-based embedded image.

343. A computing machine comprising the machine-readable storage medium of clause 331, wherein the computing machine comprises the specific-purpose local client.

Figure 25C:
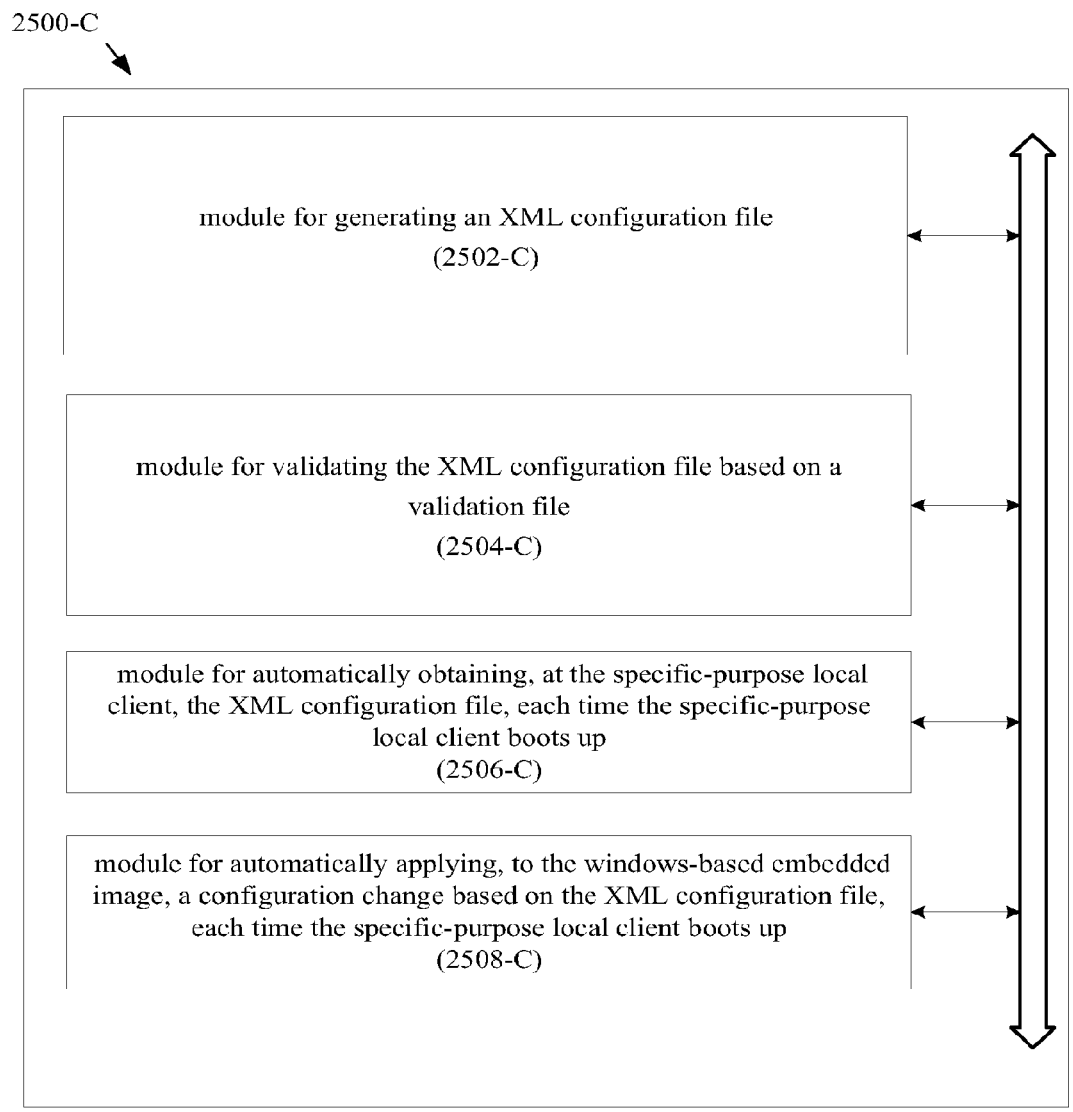
FIG. 25C is a block diagram module of an example of an apparatus for generating, validating and applying custom extensible markup language (XML) configuration on a specific-purpose local client having a windows-based embedded image and obviating reinstallation of an entire windows-based embedded image onto the specific-purpose local client, in accordance with various aspects of the subject technology.

344. An apparatus (see, e.g., apparatus 2500-C of FIG. 25C) for generating, validating and applying custom extensible markup language (XML) configuration on a specific-purpose local client (e.g., client 102 of FIG. 1) having a windows-based embedded image and obviating reinstallation of an entire windows-based embedded image onto the specific-purpose local client, the apparatus comprising:

> means for generating an XML configuration file (see, e.g., item 2502-C in FIG. 25C);
>
> means for validating the XML configuration file based on a validation file (see, e.g., item 2504-C in FIG. 25C);
>
> means for automatically obtaining, at the specific-purpose local client, the XML configuration file, each time the specific-purpose local client boots up (see, e.g., item 2506-C in FIG. 25C); and
>
> means for automatically applying, to the windows-based embedded image, a configuration change based on the XML configuration file, each time the specific-purpose local client boots up (see, e.g., item 2508-C in FIG. 25C),
>
> wherein the configuration change persists across a reboot of the specific-purpose local client while obviating reinstallation of an entire windows-based embedded image with the configuration change on the specific-purpose local client, and
>
> wherein the windows-based embedded image supports a graphical user interface and comprises an operating system (e.g., operating system module 426 of FIG. 4) and one or more applications (e.g., application module 422 of FIG. 4) dedicated to the specific purpose.

345. The apparatus of clause 344, wherein the validation file comprises an XML schema definition (XSD) file.

346. The apparatus of clause 345, wherein the means for validating comprises means for determining whether the XML configuration file conforms to one or more rules specified in the XML schema (XSD) file.

347. The apparatus of clause 344, wherein the means for automatically obtaining comprises means for importing the XML configuration file from at least one of a storage device external to the specific-purpose local client and a remote repository server.

348. The apparatus of clause 344, further comprising means for capturing one or more settings of the specific-purpose local client, wherein the means for generating the XML configuration file comprises means for generating the XML configuration file based on the captured one or more settings.

349. The apparatus of clause 348, wherein the one or more settings comprise at least one of settings of a device of the specific-purpose local client, settings of the operating system, and connections settings.

350. The apparatus of clause 344, further comprising means for exporting the XML configuration file to at least one of a storage device external to the specific-purpose local client and a remote repository server.

351. The apparatus of clause 344, further comprising means for facilitating saving the XML configuration file into a storage area that is to be retained on the specific-purpose local client across a reboot of the specific-purpose local client.

352. The apparatus of clause 344, wherein the means for automatically applying comprises means for automatically applying, after a reboot of the specific-purpose local client is initiated and without a user's intervention, the configuration change based on the XML configuration file saved in a storage area that is retained on the specific-purpose local client across a reboot of the specific-purpose local client, to allow the configuration change to appear, to the user of the specific-purpose local client, to be persistent across a reboot of the specific-purpose local client.

353. The apparatus of clause 344, further comprising means for providing a user interface for generating and/or editing the XML configuration file.

354. The apparatus of clause 344, wherein the configuration change comprises one or more of the following: a configuration change to a remote desktop connection, a configuration change to a device of the specific-purpose local client, or a configuration change to the operating system of the specific-purpose local client.

355. The apparatus of clause 344, further comprising means for determining whether to reset a previous state of the windows-based embedded image based on the XML configuration file, > wherein, if it is determined that the previous state is to be reset, the means for automatically applying the configuration change comprises means for applying a default configuration to the windows-based embedded image before the configuration change is applied, and
>
> wherein, if it is determined that the previous state is not to be reset, the means for automatically applying the configuration change comprises means for applying the configuration change based on the XML configuration file, to the windows-based embedded image, while disallowing the default configuration from being applied to the windows-based embedded image.

356. The apparatus of clause 344, wherein the apparatus comprises the specific-purpose local client.

357. The apparatus of clause 344, wherein the apparatus comprises a processing system and a memory.

Illustration of Apparatus/Method/Machine Readable Storage Medium for Specific-Purpose Client with Configuration History for Self-Provisioning of Configuration and Obviating Reinstallation of Embedded Image (Described as Clauses)

The subject technology is illustrated, for example, according to various aspects described below. Various examples of aspects of the subject technology are described as numbered clauses (358, 359, 360, etc.) for convenience. These are provided as examples, and do not limit the subject technology. It is noted that any of the dependent clauses may be combined in any combination, and placed into a respective independent clause, e.g., clause 358, 368, 374, and 381. The other clauses can be presented in a similar manner.

358. A specific-purpose local client (e.g., client 102 of FIG. 1) for self-provisioning of configuration and for obviating reinstallation of an entire windows-based embedded image onto the specific-purpose local client, the specific-purpose local client having a windows-based embedded image with a write-filter (e.g., write-filter 420 of FIG. 4), the specific-purpose local client comprising:

> a configuration history memory unit (e.g., configuration history folder 416 of FIG. 4) configured to store a plurality of extensible markup language (XML) configuration files, wherein the plurality of XML configuration files comprise a previous XML configuration file associated with a previous configuration change successfully applied to the windows-based embedded image, wherein the configuration history memory unit is in a persistent storage area (e.g., exclusion list of FIGS. 14A and 14B) of the specific-purpose local client to allow the plurality of XML configuration files to be retained on the specific-purpose local client when the specific-purpose local client is shut down;
>
> a retrieval module (e.g., retrieval module 408 of FIG. 4) configured, for each boot up of the specific-purpose local client, to facilitate automatically locating a remote repository server (e.g., repository server 104 of FIG. 1) containing a new XML configuration file, to facilitate automatically obtaining the new XML configuration file from the remote repository server over a network (e.g., public network 118 or corporate network 114 of FIG. 1) while the write-filter is enabled, and to facilitate automatically obtaining the previous XML configuration file from the configuration history memory unit;

a configuration comparison module (e.g., configuration comparison module 412 of FIG. 4) configured to compare the new XML configuration file with the previous XML configuration file and to determine whether to save the new XML configuration file into the configuration history memory unit based at least on the comparison; and an apply settings module (e.g., apply settings module 414 of FIG. 4) configured to apply, to the windows-based embedded image, one of a new configuration change and the previous configuration change based on the comparison while the write-filter is enabled, wherein the new configuration change is based on the new XML configuration file, wherein the windows-based embedded image comprises the write-filter to have one or more changes applied to the windows-based embedded image with the write-filter enabled, be discarded when the specific-purpose local client is shut down, wherein the one of the new configuration change and the previous configuration change persists across a reboot of the specific-purpose local client while obviating reinstallation of an entire windows-based embedded image on the specific-purpose local client, wherein the windows-based embedded image supports a graphical user interface and comprises an operating system (e.g., operating system module 426 of FIG. 4) and one or more applications (e.g., application module 422 of FIG. 4) dedicated to the specific purpose, and wherein each of the new configuration change and the previous configuration change comprises one or more of the following: a configuration change to a remote desktop connection, a configuration change to a device of the specific-purpose local client, and a configuration change to the operating system of the specific-purpose local client.

359. The specific-purpose local client of clause 358, wherein the configuration comparison module is configured to determine if the new XML configuration file is different from the plurality of extensible markup language (XML) configuration files, and wherein the apply settings module is configured to facilitate saving the new XML configuration file into the configuration history memory unit if the new XML configuration file is different from the plurality of extensible markup language (XML) configuration files.

360. The specific-purpose local client of clause 358, wherein the apply settings module is configured to apply, to the windows-based embedded image, the new configuration change if the new XML configuration file is different from the previous XML configuration file.

361. The specific-purpose local client of clause 360, wherein the new XML configuration file is different from the previous XML configuration file, and wherein the apply settings module is configured to, while the write-filter is enabled, facilitate saving the new XML configuration file into the configuration history memory unit that is to be retained on the specific-purpose local client across a reboot of the specific-purpose local client.

362. The specific-purpose local client of clause 360, wherein the new XML configuration file is different from the previous XML configuration file, and wherein after a reboot of the specific-purpose local client is initiated, the apply settings module is configured to automatically apply, without a user's intervention, the new configuration change based on the new XML configuration file saved in the configuration history memory unit that is retained on the specific-purpose local client across a reboot of the specific-purpose local client, to allow the new configuration change to appear, to the user of the specific-purpose local client, to be persistent across a reboot of the specific-purpose local client.

363. The specific-purpose local client of clause 360,
wherein the new XML configuration file is different from the previous XML configuration file,
wherein the specific-purpose local client further comprises a reset check module of the specific-purpose local client configured to determine whether to reset a previous state of the windows-based embedded image based on the new XML configuration file,
wherein, if the reset check module determines that the previous state is to be reset, the apply settings module is configured to apply a default configuration to the windows-based embedded image and to apply the new configuration change based on the new XML configuration file to the windows-based embedded image after the default configuration is applied, and
wherein, if the reset check module determines that the previous state is not to be reset, the apply settings module is configured to apply the new configuration change based on the new XML configuration file, to the windows-based embedded image, while disallowing the default configuration from being applied to the windows-based embedded image.

364. The specific-purpose local client of clause 358, wherein the apply settings module is configured to apply, to the windows-based embedded image, the previous configuration change if the new XML configuration file is the same as the previous XML configuration file.

365. The specific-purpose local client of clause 358, wherein after each reboot of the specific-purpose local client is initiated, the apply settings module is configured to automatically apply one of the new configuration change and the previous configuration change to the
windows-based embedded image to allow one of the new configuration change and the previous configuration change to appear, to a user of the specific-purpose local client, to be persistent across a reboot of the specific-purpose local client.

366. The specific-purpose local client of clause 358, wherein the retrieval module is configured to obtain address information of the repository server using at least one of a dynamic host configuration protocol (DHCP) or a domain name system (DNS).

367. The specific-purpose local client of clause 358, wherein the retrieval module is configured to obtain address information of the repository server from a local registry of the specific-purpose local client.

Figure 26A:
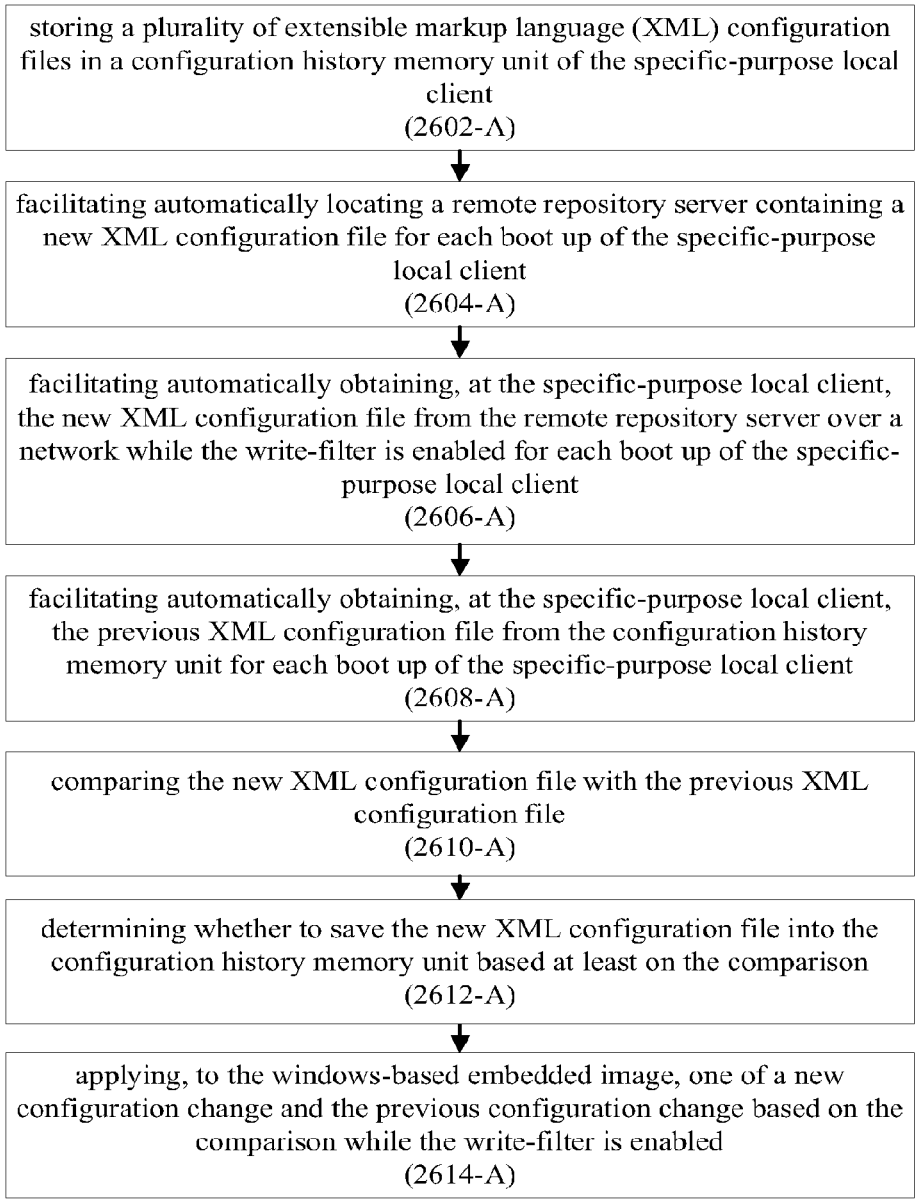
FIG. 26A is a block diagram representing an example of a method for self-provisioning of configuration and for obviating reinstallation of an entire windows-based embedded image onto a specific-purpose local client having a windows-based embedded image with a write-filter, in accordance with various aspects of the subject technology.

368. A method (see, e.g., method 2600-A of FIG. 26A) for self-provisioning of configuration and for obviating reinstallation of an entire windows-based embedded image onto a specific-purpose local client (e.g., client 102 of FIG. 1), the specific-purpose local client having a windows-based embedded image with a write-filter (e.g., write-filter 420 of FIG. 4), the method comprising:

storing a plurality of extensible markup language (XML) configuration files in a configuration history memory unit of the specific-purpose local client (see, e.g., item 2602-A in FIG. 26A), wherein the plurality of XML configuration files comprise a previous XML configuration file associated with a previous configuration change successfully applied to the windows-based embedded image, wherein the configuration history memory unit is in a persistent storage area of the specific-purpose local client to allow the plurality of XML configuration files to be retained on the specific-purpose local client when the specific-purpose local client is shut down;

facilitating automatically locating a remote repository server containing a new XML configuration file for each boot up of the specific-purpose local client (see, e.g., item 2604-A in FIG. 26A);

facilitating automatically obtaining, at the specific-purpose local client, the new XML configuration file from the remote repository server over a network while the write filter is enabled for each boot up of the specific-purpose local client (see, e.g., item 2606-A in FIG. 26A);

facilitating automatically obtaining, at the specific-purpose local client, the previous XML configuration file from the configuration history memory unit for each boot up of the specific-purpose local client (see, e.g., item 2608-A in FIG. 26A);

comparing the new XML configuration file with the previous XML configuration file (see, e.g., item 2610-A in FIG. 26A);

determining whether to save the new XML configuration file into the configuration history memory unit based at least on the comparison (see, e.g., item 2612-A in FIG. 26A); and applying, to the windows-based embedded image, one of a new configuration change and the previous configuration change based on the comparison while the write-filter is enabled (see, e.g., item 2614-A in FIG. 26A), wherein the new configuration change is based on the new XML configuration file, wherein the windows-based embedded image comprises the write-filter to have one or more changes applied to the windows-based embedded image with the write-filter enabled, be discarded when the specific-purpose local client is shut down, wherein the one of the new configuration change and the previous configuration change persists across a reboot of the specific-purpose local client while obviating reinstallation of an entire windows-based embedded image on the specific-purpose local client, wherein the windows-based embedded image supports a graphical user interface and comprises an operating system (e.g., operating system module 426 of FIG. 4) and one or more applications (e.g., application module 422 of FIG. 4) dedicated to the specific purpose, and wherein each of the new configuration change and the previous configuration change comprises one or more of the following: a configuration change to a remote desktop connection, a configuration change to a device of the specific-purpose local client, and a configuration change to the operating system of the specific-purpose local client.

369. The method of clause 368, wherein the comparing comprises determining if the new XML configuration file is different from the plurality of extensible markup language (XML) configuration files, and wherein the method further comprises facilitating saving the new XML configuration file into the configuration history memory unit if the new XML configuration file is different from the plurality of extensible markup language (XML) configuration files.

370. The method of clause 368, wherein the applying comprises applying, to the windows-based embedded image, the new configuration change if the new XML configuration file is different from the previous XML configuration file.

371. The method of clause 370, wherein the new XML configuration file is different from the previous XML configuration file, and wherein the method further comprises facilitating saving, while the write-filter is enabled, the new XML configuration file into the configuration history memory unit that is to be retained on the specific-purpose local client across a reboot of the specific-purpose local client.

372. The method of clause 370, wherein the new XML configuration file is different from the previous XML configuration file, and wherein the applying comprises automatically applying, after a reboot of the specific-purpose local client is initiated and without a user's intervention, the new configuration change based on the new XML configuration file saved in the configuration history memory unit that is retained on the specific-purpose local client across a reboot of the specific-purpose local client, to allow the new configuration change to appear, to the user of the specific-purpose local client, to be persistent across a reboot of the specific-purpose local client.

373. The method of clause 370, wherein the new XML configuration file is different from the previous XML configuration file, wherein the method further comprises determining whether to reset a previous state of the windows-based embedded image based on the new XML configuration file, wherein, if it is determined that the previous state is to be reset, the applying the one of the new configuration change and the previous configuration change comprises applying a default configuration to the windows-based embedded image before the configuration change is applied, and wherein, if it is determined that the previous state is not to be reset, the applying the one of the new configuration change and the previous configuration change comprises applying the new configuration change based on the new XML configuration file, to the windows-based embedded image, while disallowing the default configuration from being applied to the windows-based embedded image.

Figure 26B:
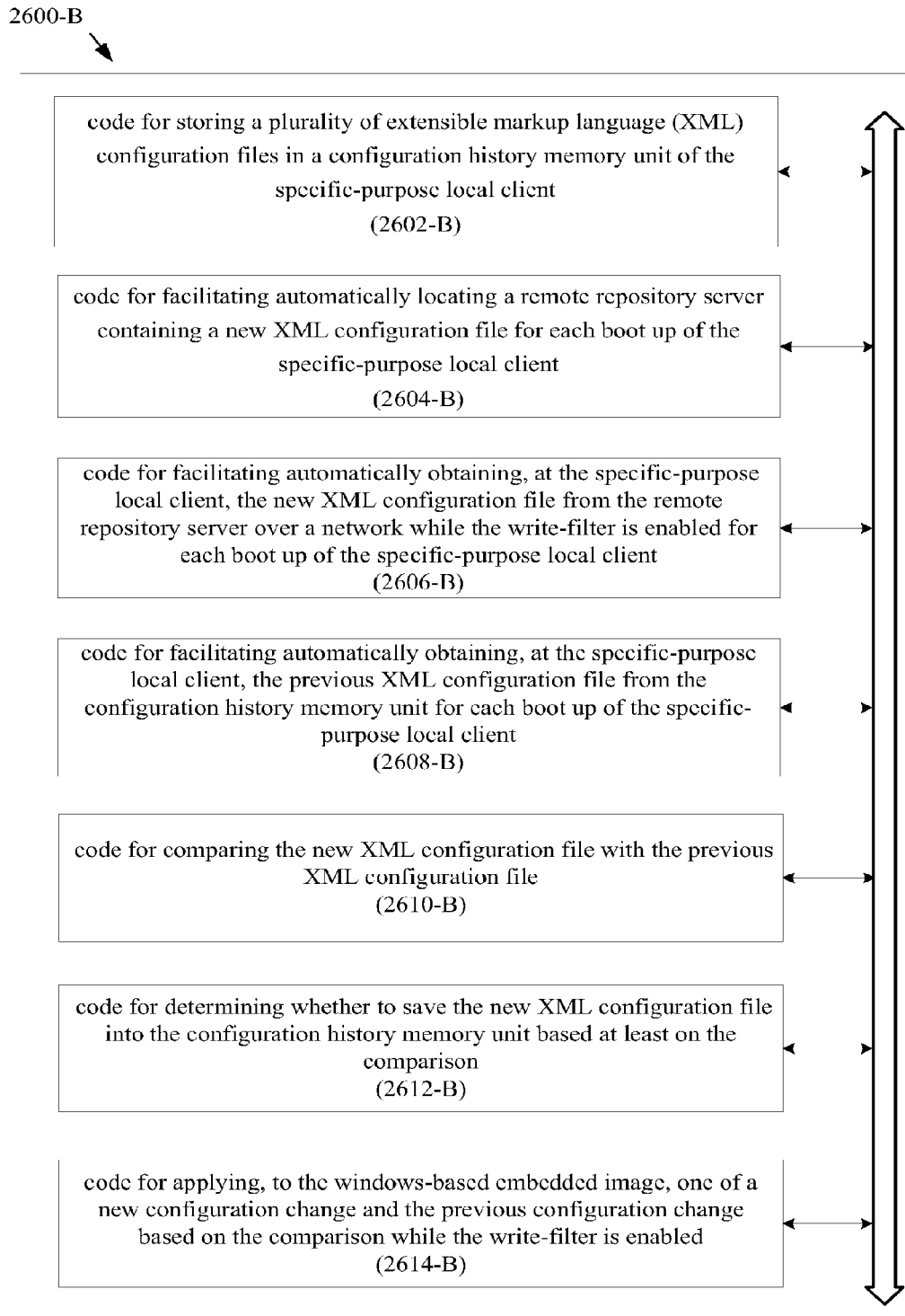
FIG. 26B is a block diagram representing code of an example of a machine-readable storage medium encoded with instructions executable by a processing system to perform a method for self-provisioning of configuration and for obviating reinstallation of an entire windows-based embedded image onto a specific-purpose local client having a windows-based embedded image with a write-filter, in accordance with various aspects of the subject technology.

374. A machine-readable storage medium (see, e.g., machine-readable storage medium 2600-B of FIG. 26B) encoded with instructions executable by a processing system to perform a method for self-provisioning of configuration and for obviating reinstallation of an entire windows-based embedded image onto a specific-purpose local client (e.g., client 102 of FIG. 1), the specific-purpose local client having a windows-based embedded image with a write-filter (e.g., write-filter 420 of FIG. 4), the instructions comprising code for:

storing a plurality of extensible markup language (XML) configuration files in a configuration history memory unit of the specific-purpose local client (see, e.g., item 2602-B in FIG. 26B), wherein the plurality of XML configuration files comprise a previous XML configuration file associated with a previous configuration change successfully applied to the windows-based embedded image, wherein the configuration history memory unit is in a persistent storage area of the specific-purpose local client to allow the plurality of XML configuration files to be retained on the specific-purpose local client when the specific-purpose local client is shut down;

facilitating automatically locating a remote repository server containing a new XML configuration file for each boot up of the specific-purpose local client (see, e.g., item 2604-B in FIG. 26B);

facilitating automatically obtaining, at the specific-purpose local client, the new XML configuration file from the remote repository server over a network while the write-filter is enabled for each boot up of the specific-purpose local client (see, e.g., item 2606-B in FIG. 26B);

facilitating automatically obtaining, at the specific-purpose local client, the previous XML configuration file from the configuration history memory unit for each boot up of the specific-purpose local client (see, e.g., item 2608-B in FIG. 26B);

comparing the new XML configuration file with the previous XML configuration file (see, e.g., item 2610-B in FIG. 26B);

determining whether to save the new XML configuration file into the configuration history memory unit based at least on the comparison (see, e.g., item 2612-B in FIG. 26B); and applying, to the windows-based embedded image, one of a new configuration change and the previous configuration change based on the comparison while the write-filter is enabled (see, e.g., item 2614-B in FIG. 26B), wherein the new configuration change is based on the new XML configuration file, wherein the windows-based embedded image comprises the write-filter to have one or more changes applied to the windows-based embedded image with the write-filter enabled, be discarded when the specific-purpose local client is shut down, wherein the one of the new configuration change and the previous configuration change persists across a reboot of the specific-purpose local client while obviating reinstallation of an entire windows-based embedded image on the specific-purpose local client, wherein the windows-based embedded image supports a graphical user interface and comprises an operating system (e.g., operating system module 426 of FIG. 4) and one or more applications (e.g., application module 422 of FIG. 4) dedicated to the specific purpose, and wherein each of the new configuration change and the previous configuration change comprises one or more of the following: a configuration change to a remote desktop connection, a configuration change to a device of the specific-purpose local client, and a configuration change to the operating system of the specific-purpose local client.

375. The machine-readable storage medium of clause 374, wherein the comparing comprises determining if the new XML configuration file is different from the plurality of extensible markup language (XML) configuration files, and wherein the instructions further comprise code for facilitating saving the new XML configuration file into the configuration history memory unit if the new XML configuration file is different from the plurality of extensible markup language (XML) configuration files.

376. The machine-readable storage medium of clause 374, wherein the applying comprises applying, to the windows-based embedded image, the new configuration change if the new XML configuration file is different from the previous XML configuration file.

377. The machine-readable storage medium of clause 376, wherein the new XML configuration file is different from the previous XML configuration file, and wherein the instructions further comprise code for facilitating saving, while the write-filter is enabled, the new XML configuration file into the configuration history memory unit that is to be retained on the specific-purpose local client across a reboot of the specific-purpose local client.

378. The machine-readable storage medium of clause 376, wherein the new XML configuration file is different from the previous XML configuration file, and wherein the applying comprises automatically applying, after a reboot of the specific-purpose local client is initiated and without a user's intervention, the new configuration change based on the new XML configuration file saved in the configuration history memory unit that is retained on the specific-purpose local client across a reboot of the specific-purpose local client, to allow the new configuration change to appear, to the user of the specific-purpose local client, to be persistent across a reboot of the specific-purpose local client.

379. The machine-readable storage medium of clause 376,
wherein the new XML configuration file is different from the previous XML configuration file,
wherein the instructions further comprise code for determining whether to reset a previous state of the windows-based embedded image based on the new XML configuration file,
wherein, if it is determined that the previous state is to be reset, the applying the one of the new configuration change and the previous configuration change comprises applying a default configuration to the windows-based embedded image before the one of the new configuration change and the previous configuration change is applied, and
wherein, if it is determined that the previous state is not to be reset, the applying the one of the new configuration change and the previous configuration change comprises applying the new configuration change based on the new XML configuration file, to the windows-based embedded image, while disallowing the default configuration from being applied to the windows-based embedded image.

380. A computing machine comprising the machine-readable storage medium of clause 374, wherein the computing machine comprises the specific-purpose local client.

Figure 26C:
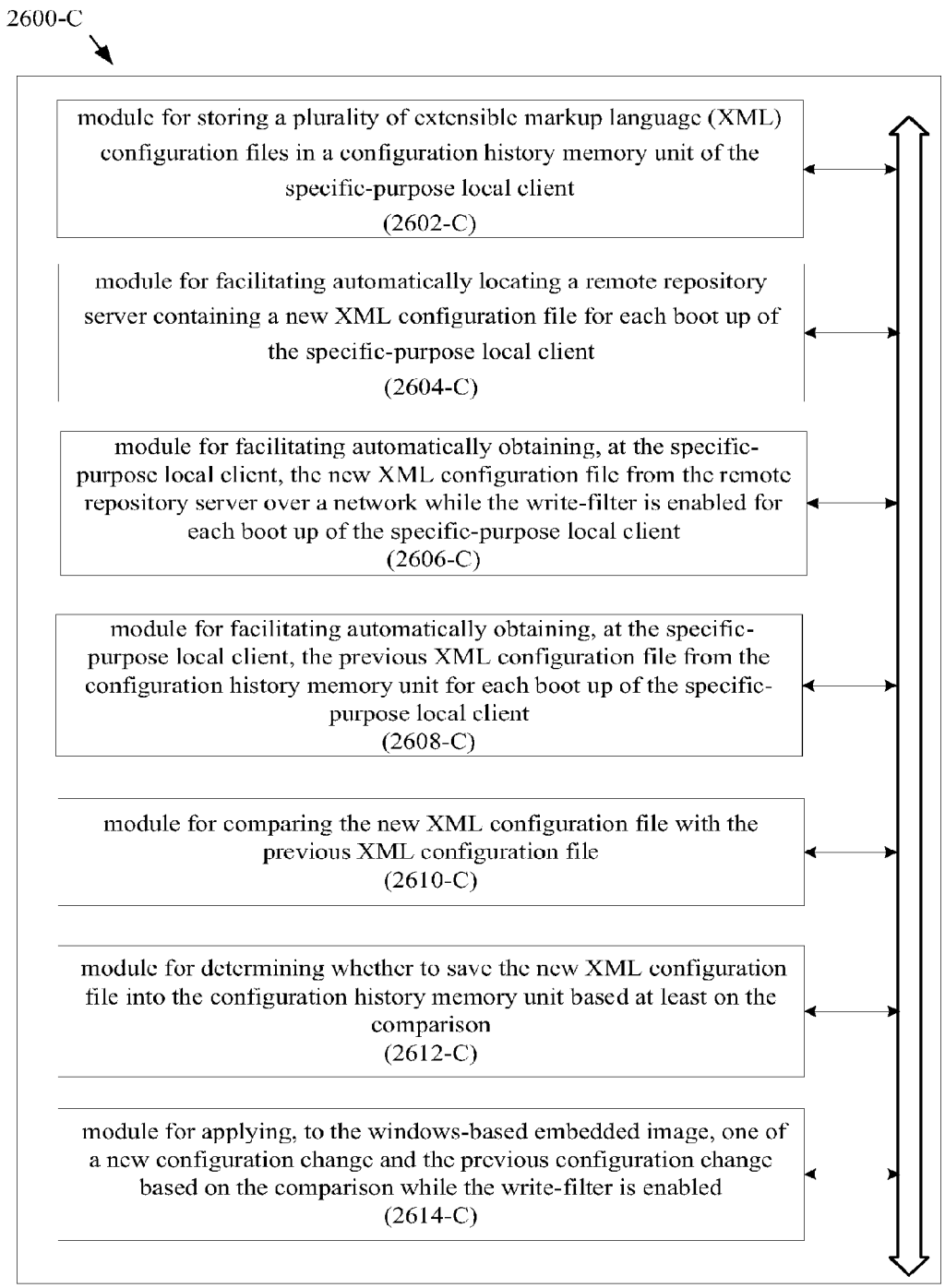
FIG. 26C is a block diagram module of an example of an apparatus for self-provisioning of configuration and for obviating reinstallation of an entire windows-based embedded image onto a specific-purpose local client having a windows-based embedded image with a write-filter, in accordance with various aspects of the subject technology.

381. An apparatus (see, e.g., apparatus 2600-C of FIG. 26C) for self-provisioning of configuration and for obviating reinstallation of an entire windows-based embedded image onto a specific-purpose local client (e.g., client 102 of FIG. 1), the specific-purpose local client having a windows-based embedded image with a write-filter (e.g., write-filter 420 of FIG. 4), the apparatus comprising:

means for storing a plurality of extensible markup language (XML) configuration files in a configuration history memory unit of the specific-purpose local client (see, e.g., item 2602-C in FIG. 26C), wherein the plurality of XML configuration files comprise a previous XML configuration file associated with a previous configuration change successfully applied to the windows-based embedded image, wherein the configuration history memory unit is in a persistent storage area of the specific-purpose local client to allow the plurality of XML configuration files to be retained on the specific-purpose local client when the specific-purpose local client is shut down;

means for facilitating automatically locating a remote repository server containing a new XML configuration file for each boot up of the specific-purpose local client (see, e.g., item 2604-C in FIG. 26C);

means for facilitating automatically obtaining, at the specific-purpose local client, the new XML configuration file from the remote repository server over a network while the write-filter is enabled for each boot up of the specific-purpose local client (see, e.g., item 2606-C in FIG. 26C);

means for facilitating automatically obtaining, at the specific-purpose local client, the previous XML configuration file from the configuration history memory unit for each boot up of the specific-purpose local client (see, e.g., item 2608-C in FIG. 26C);

means for comparing the new XML configuration file with the previous XML configuration file (see, e.g., item 2610-C in FIG. 26C);

means for determining whether to save the new XML configuration file into the configuration history memory unit based at least on the comparison (see, e.g., item 2612-C in FIG. 26C); and means for applying, to the windows-based embedded image, one of a new configuration change and the previous configuration change based on the comparison while the write-filter is enabled (see, e.g., item 2614-C in FIG. 26C), wherein the new configuration change is based on the new XML configuration file, wherein the windows-based embedded image comprises the write-filter to have one or more changes applied to the windows-based embedded image with the write-filter enabled, be discarded when the specific-purpose local client is shut down, wherein the one of the new configuration change and the previous configuration change persists across a reboot of the specific-purpose local client while obviating reinstallation of an entire windows-based embedded image on the specific-purpose local client, wherein the windows-based embedded image supports a graphical user interface and comprises an operating system (e.g., operating system module 426 of FIG. 4) and one or more applications (e.g., application module 422 of FIG. 4) dedicated to the specific purpose, and wherein each of the new configuration change and the previous configuration change comprises one or more of the following: a configuration change to a remote desktop connection, a configuration change to a device of the specific-purpose local client, and a configuration change to the operating system of the specific-purpose local client.

382. The apparatus of clause 381, wherein the means for comparing comprises means for determining if the new XML configuration file is different from the plurality of extensible markup language (XML) configuration files, and wherein the apparatus further comprises means for facilitating saving the new XML configuration file into the configuration history memory unit if the new XML configuration file is different from the plurality of extensible markup language (XML) configuration files.

383. The apparatus of clause 381, wherein the means for applying comprises means for applying, to the windows-based embedded image, the new configuration change if the new XML configuration file is different from the previous XML configuration file.

384. The apparatus of clause 383, wherein the new XML configuration file is different from the previous XML configuration file, and wherein the apparatus further comprises means for facilitating saving, while the write-filter is enabled, the new XML configuration file into the configuration history memory unit that is to be retained on the specific-purpose local client across a reboot of the specific-purpose local client.

385. The apparatus of clause 383, wherein the new XML configuration file is different from the previous XML configuration file, and wherein the means for applying comprises means for automatically applying, after a reboot of the specific-purpose local client is initiated and without a user's intervention, the new configuration change based on the new XML configuration file saved in the configuration history memory unit that is retained on the specific-purpose local client across a reboot of the specific-purpose local client, to allow the new configuration change to appear, to the user of the specific-purpose local client, to be persistent across a reboot of the specific-purpose local client.

386. The apparatus of clause 383,
wherein the new XML configuration file is different from the previous XML configuration file,
wherein the apparatus further comprises means for determining whether to reset a previous state of the windows-based embedded image based on the new XML configuration file,
wherein, if it is determined that the previous state is to be reset, the means for applying the one of the new configuration change and the previous configuration change comprises means for applying a default configuration to the windows-based embedded image before the one of the new configuration change and the previous configuration change is applied, and
wherein, if it is determined that the previous state is not to be reset, the means for applying the one of the new configuration change and the previous configuration change comprises means for applying the new configuration change based on the new XML configuration file, to the windows-based embedded image, while disallowing the default configuration from being applied to the windows-based embedded image.

387. The apparatus of clause 381, wherein the apparatus comprises the specific-purpose local client.

388. The apparatus of clause 381, wherein the apparatus comprises a processing system and a memory.

389. A processor comprising one or more modules configured to perform the method or function described in any one of the foregoing clauses (e.g., clauses 1-388).

390. A machine-readable storage medium encoded with instructions executable by a processing system to perform the method or function described in any one of the foregoing clauses (e.g., clauses 1-388).

391. A machine-readable storage medium comprising code for causing a client or a server (e.g., local client, a specific-purpose client device or a server) to perform the method or function described in any one of the foregoing clauses (e.g., clauses 1-388).

392. The machine-readable storage medium of clause 390 or 391, wherein the client or the processing system comprises the machine-readable storage medium.

393. An apparatus comprising means for performing the method or function described in any one of the foregoing (e.g., clauses 1-388).

394. An apparatus of any one of the foregoing clauses (e.g., clauses 1-388), wherein the apparatus comprises a processing system and a memory.

395. An apparatus comprising components operable to perform the method or function described in any one of the foregoing clauses (e.g., clauses 1-388).

In one aspect, any of the foregoing clauses may depend from any one of the foregoing independent clauses or any one of the foregoing dependent clauses. In one aspect, any of the clauses may be combined with any other clauses. In one aspect, the methods, means and modules (e.g., software modules or hardware modules) described above can be represented in drawings.

Those of skill in the art would appreciate that the various illustrative blocks, modules, elements, components, methods, and algorithms described herein may be implemented as electronic hardware, computer software, or combinations of both.

For example, a module (e.g., a configuration generation module 430, a configuration capture module 402, a configuration application module 404, a retrieval module 408, a reset check module 410, a configuration comparison module 412, an apply settings module 414, an application module 422, a driver module 424, an operating system module 426, a user interface application module 1500, a configuration application module 504, an operating system module 508, or any other modules) may be implemented as electronic hardware, computer software, or combinations of both. In one aspect, a module(s) may be an apparatus since a module(s) may include instructions encoded or stored on a machine-readable medium, on another device, or on a portion thereof. In one aspect, a module(s) may be software (e.g., an application, a subroutine) stored in a machine-readable medium and executable by a processing system or a processor. In another aspect, a module(s) may be hardware (e.g., machine-readable medium encoded with instructions, a pre-programmed general-purpose computer, or a special purpose electronic or optical device).

Various modules may reside in one machine or in multiple machines. In one example, modules for the server side (e.g., a configuration application module 504, an operating system module 508, etc.) may be located in one server or spread over multiple servers. In another example, modules for the client side (e.g., a configuration generation module 430, a configuration capture module 402, a configuration application module 404, a retrieval module 408, a reset check module 410, a configuration comparison module 412, an apply settings module 414, an application module 422, a driver module 424, an operating system module 426, a user interface application module 1500, etc.) may be located in one client device or spread over multiple client devices.

In one aspect of the disclosure, when actions or functions are described as being performed by a module or a component (e.g., creating, retrieving, applying, capturing, validating, storing, attempting retrieval, checking, comparing, obtaining, facilitating, loading, parsing, installing, resetting, stopping, registering, adding, disabling, enabling, locating), it is understood that such actions or functions are performed by the module or the component directly or indirectly. As an example, when a module is described as performing an action, it is understood that the module may perform the action directly or may perform the action indirectly, for example, by facilitating such an action. For instance, when a configuration file is described as being obtained by a module, it is understood that the module may obtain the configuration file indirectly by facilitating obtaining the configuration file. In some aspects, it is understood that certain functions can be divided into different modules to be performed (e.g., a function for an apply settings module 414 can be performed by a retrieval module 408, etc.).

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

Various components and blocks may be arranged differently (e.g., arranged in a different order, or partitioned in a different way) all without departing from the scope of the subject technology. In one aspect of the disclosure, the modules (or elements) recited in the accompanying claims may be performed by one module or by a smaller number of modules, and this arrangement is within the scope of the claims. In another aspect, the modules (or elements) recited in the accompanying claims may be performed by a larger number of modules, and this arrangement is within the scope of the claims. In yet another aspect, a module (or an element) recited in the accompanying claims may be performed by multiple modules, and this arrangement is within the scope of the claims. In yet another aspect, a function(s) of a module(s) may be performed by another module(s), and this arrangement is within the scope of the claims.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for configuring and customizing a local client having an embedded image, comprising:
   a processor; and
   a memory having stored thereon computer-executable instructions that, when executed by the processor, are configured to cause the processor to:
      automatically locate a remote repository server containing an XML configuration file based on personalized settings of a user;
      automatically obtain the XML configuration file from the remote repository server each time a local client boots up;
      automatically determine, each time the local client boots up, whether to reset a previous state of the embedded image based on the XML configuration file; and
      automatically apply a default configuration and a configuration change based on the XML configuration file to the embedded image if it is determined that the previous state is to be reset, the configuration change persisting across a reboot of the local client.

2. The apparatus of claim 1, wherein:
   the embedded image comprises a write-filter that prevents one or more changes applied to the embedded image with the write-filter enabled from persisting across the reboot of the local client; and
   the configuration change is applied to the embedded image while the write-filter is enabled.

3. The apparatus of claim 2, wherein the computer-executable instructions, when executed by the processor, are further configured to cause the processor to, while the write-filter is enabled, save the confirmation file into a storage area retained on the local client across the reboot of the local client.

4. The apparatus of claim 1, wherein the configuration change comprises one or more of the following: a configuration change to a remote desktop connection, a configuration change to a device of the local client, or a configuration change to an operating system of the local client.

5. The apparatus of claim 1, wherein the computer-executable instructions, when executed by the processor, are further configured to cause the processor to obtain address information of the remote repository server using at least one of a dynamic host configuration protocol (DHCP) or a domain name system (DNS).

6. The apparatus of claim 1, wherein the computer-executable instructions, when executed by the processor, are further configured to cause the processor to obtain address information of the repository server from a local registry of the local client.

7. The apparatus of claim 1, wherein the personalized settings of the user include at least one of graphics settings, keyboard settings, mouse settings, web browser settings, operating system settings, network settings, and power settings.

8. The apparatus of claim 1, wherein the embedded image supports a graphical user interface and comprises an operating system and one or more applications dedicated to a specific purpose.

9. A method for configuring and customizing a local client having an embedded image using extensible markup language (XML) configuration comprising:
   automatically locating, by a processor of the local client, a remote repository server containing an XML configuration file based on a user's personalized settings;
   automatically obtaining, by the processor, the XML configuration file from the remote repository server each time the local client boots up;
   automatically determining, by the processor each time the local client boots up, whether to reset a previous state of the embedded image based on the XML configuration file; and
   automatically applying, by the processor, a default configuration and a configuration change based on the XML configuration file to the embedded image if it is determined that the previous state is to be reset, the configuration change persisting across a reboot of the local client.

10. The method of claim 9, wherein the embedded image comprises a write-filter that prevents one or more changes applied to the embedded image with the write-filter enabled from persisting across a reboot of the local client, and wherein the configuration change is applied to the embedded image while the write-filter is enabled.

11. The method of claim 10, further comprising:
   while the write-filter is enabled, saving the confirmation file into a storage area that is to be retained on the local client across a reboot of the local client.

12. The method of claim 9, wherein the configuration change comprises one or more of the following: a configuration change to a remote desktop connection, a configuration change to a device of the local client, or a configuration change to the operating system of the local client.

13. The method of claim 9, further comprising:
   obtaining address information of the remote repository server using at least one of a dynamic host configuration protocol (DHCP) or a domain name system (DNS).

14. The method of claim 9, wherein the user's personalized settings include at least one of graphics settings, keyboard settings, mouse settings, web browser settings, operating system settings, network settings, or power settings.

15. A non-transitory machine-readable storage medium encoded with instructions executable by a processing system to perform a method for configuring and customizing a local client having an embedded image using extensible markup language (XML) configuration and obviating reinstallation of an entire embedded image onto the local client, the instructions comprising code for:
   automatically locating, by a processor of the local client, a remote repository server containing an XML configuration file based on a user's personalized settings;

automatically obtaining, by the processor, the XML configuration file from the remote repository server each time the local client boots up;

automatically determining, by the processor each time the local client boots up, whether to reset a previous state of the embedded image based on the XML configuration file; and automatically applying, by the processor, a default configuration and a configuration change based on the XML configuration file to the embedded image if it is determined that the previous state is to be reset, the configuration change persisting across a reboot of the local client.

16. The non-transitory machine-readable storage medium of claim 15, wherein the embedded image comprises a write-filter that prevents one or more changes applied to the embedded image with the write-filter enabled from persisting across a reboot of the local client, and wherein the configuration change is applied to the embedded image while the write-filter is enabled.

17. The non-transitory machine-readable storage medium of claim 16, wherein the instructions further comprise code for, while the write-filter is enabled, saving the confirmation file into a storage area that is to be retained on the local client across a reboot of the local client.

18. The non-transitory machine-readable storage medium of claim 15, wherein the configuration change comprises one or more of the following:

a configuration change to a remote desktop connection, a configuration change to a device of the local client, or a configuration change to the operating system of the local client.

19. The non-transitory machine-readable storage medium of claim 15, wherein the instructions further comprise code for obtaining address information of the remote repository server using at least one of a dynamic host configuration protocol (DHCP) or a domain name system (DNS).

20. The non-transitory machine-readable storage medium of claim 15, wherein the instructions further comprise code for obtaining address information of the repository server from a local registry of the local client.

* * * * *